United States Patent [19]

Hyodo et al.

[11] Patent Number: 5,278,697
[45] Date of Patent: Jan. 11, 1994

[54] ZOOM LENS SYSTEM FOR USE IN COPYING APPARATUS

[75] Inventors: Haruhiro Hyodo; Hideyuki Kurahashi, both of Toyohashi, Japan

[73] Assignee: Minolta Camera Kabushiki Kaisha, Japan

[21] Appl. No.: 901,768

[22] Filed: Jun. 19, 1992

[30] Foreign Application Priority Data

Jun. 28, 1991 [JP] Japan .................................. 3-183867
Jun. 28, 1991 [JP] Japan .................................. 3-183868
Jun. 28, 1991 [JP] Japan .................................. 3-183869

[51] Int. Cl.$^5$ ..................... G02B 15/14; G02B 9/62
[52] U.S. Cl. .................... 359/679; 359/761; 359/740
[58] Field of Search ............... 359/679, 761, 740

[56] References Cited

U.S. PATENT DOCUMENTS 4,805,999  2/1989  Ueda et al. ..................... 359/679
4,813,773  3/1989  Minefuji .......................... 359/679

FOREIGN PATENT DOCUMENTS 5967512  4/1984  Japan .

*Primary Examiner*—Scott J. Sugarman
*Attorney, Agent, or Firm*—Price, Gess & Ubell

[57] ABSTRACT

A zoom lens system, for use in a copying apparatus, is provided with, from the object side, a first lens unit of a negative power including a negative lens element, a second lens unit of a positive power including a positive lens element and a negative meniscus lens element concave to the image side, an aperture stop, a third lens unit arranged symmetrically with the second lens unit with respect to the aperture stop, and a fourth lens unit arranged symmetrically with the first lens unit with respect to the aperture stop. The second lens unit and the fourth lens unit are moved in a same direction in association with each other so that the total length of the zoom lens system is minimum at unity magnification. The aperture stop moves so that the symmetry of the entire zoom lens system is maintained. An object-image distance is maintained constant by moving the entire zoom lens system.

13 Claims, 142 Drawing Sheets

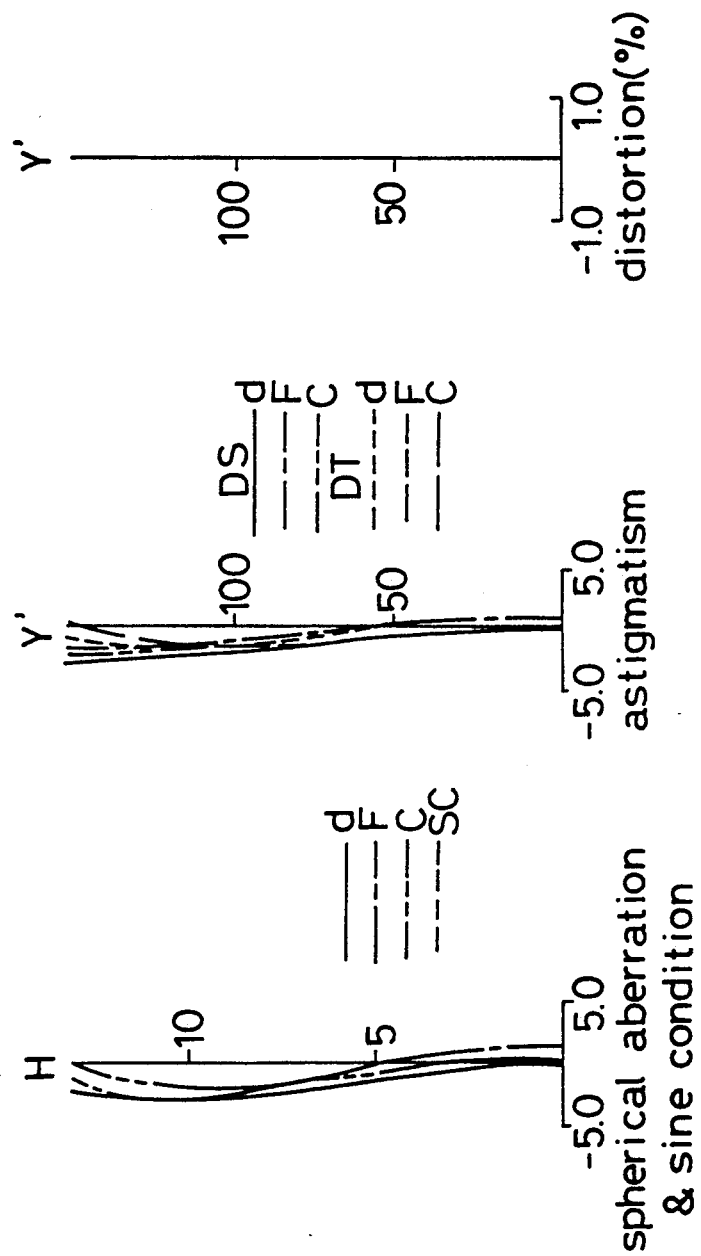

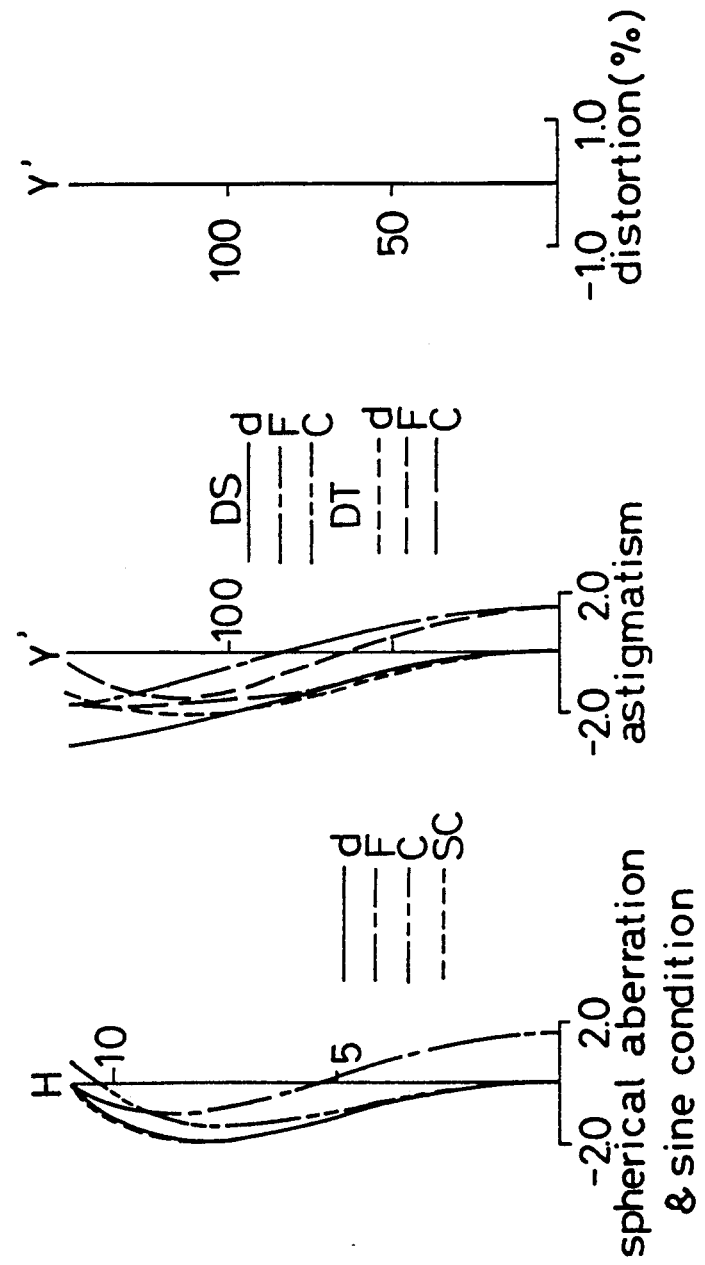

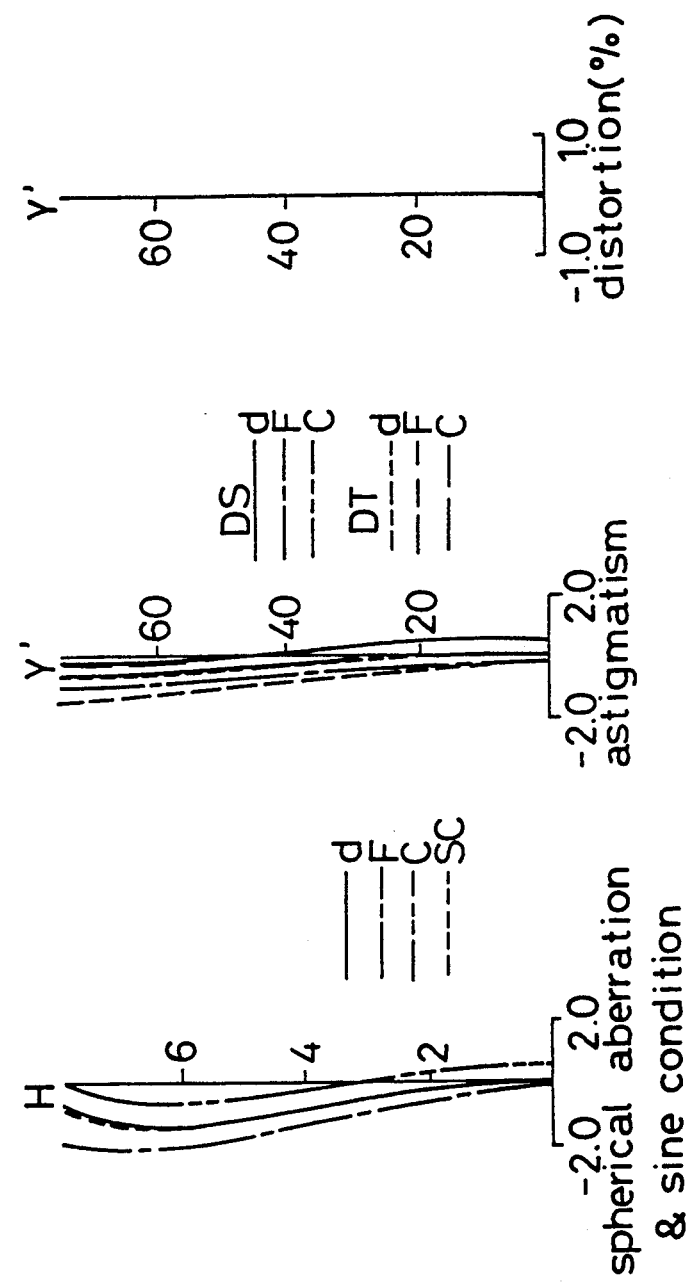

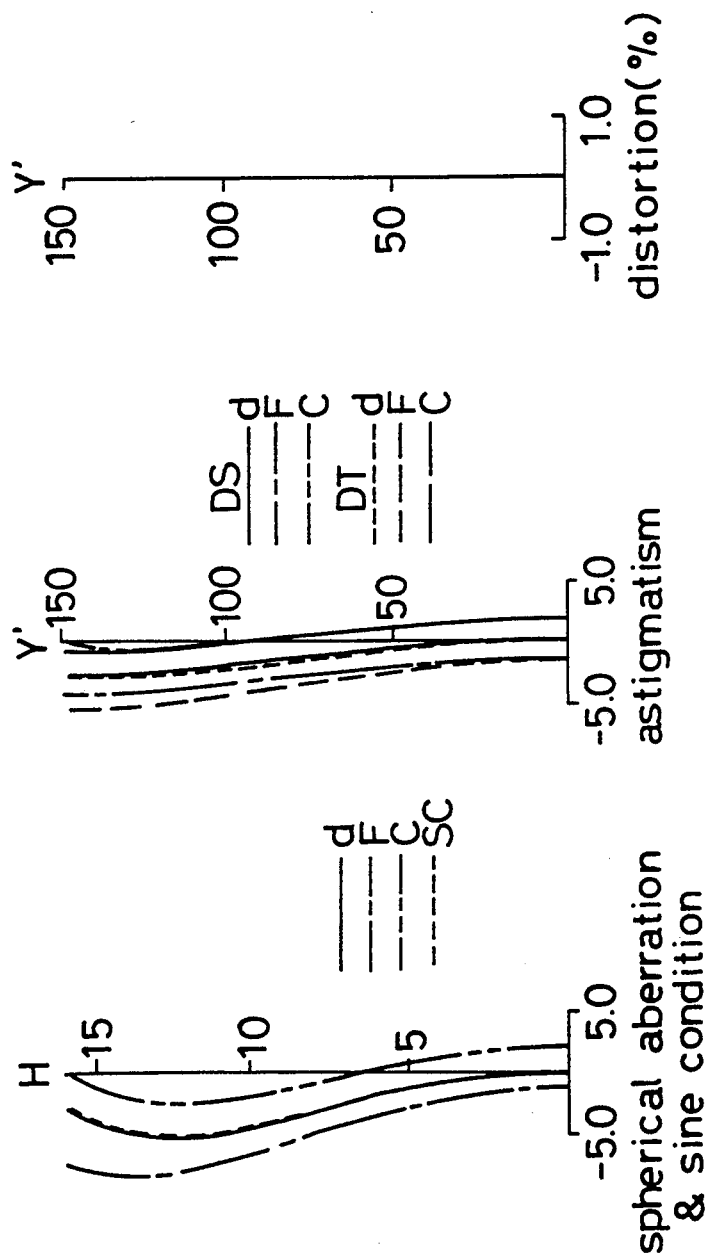

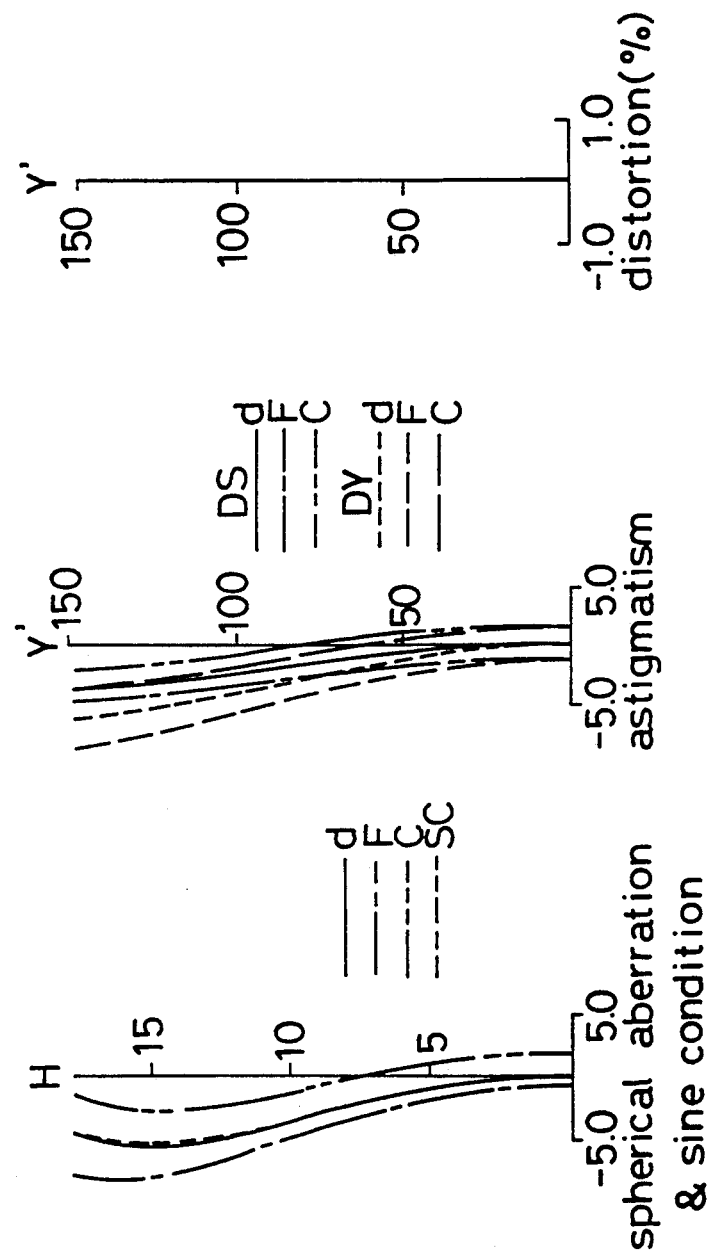

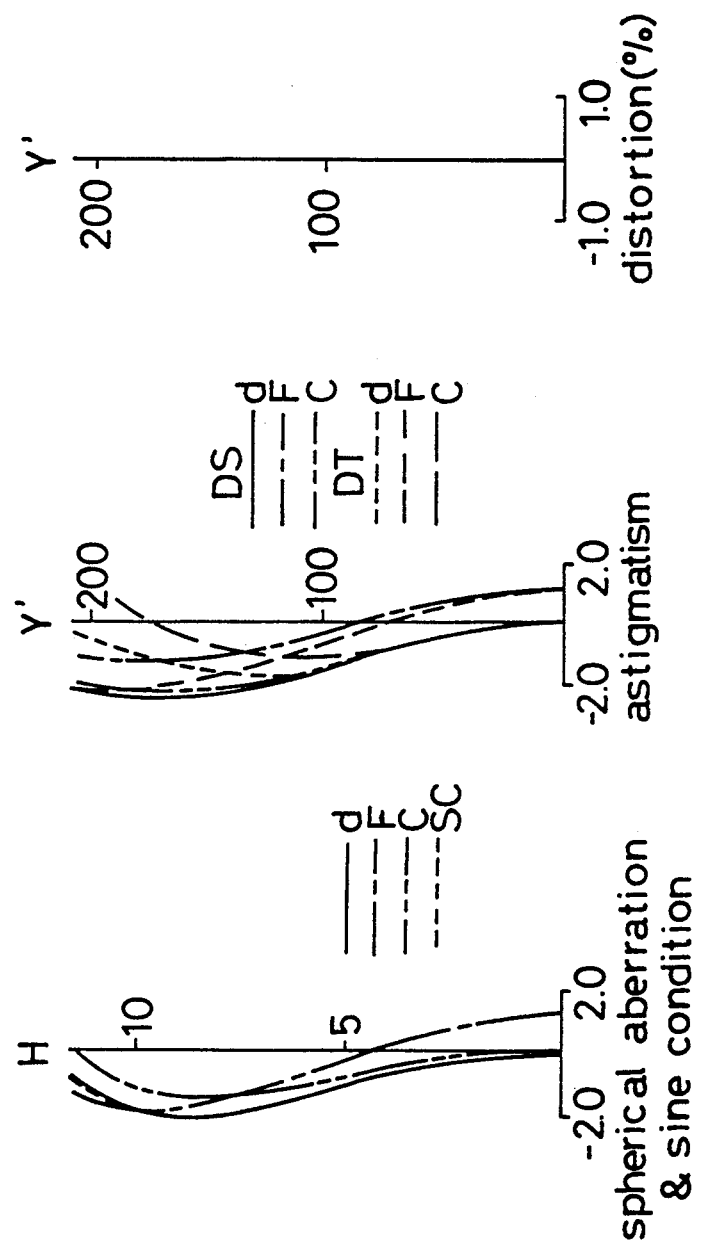

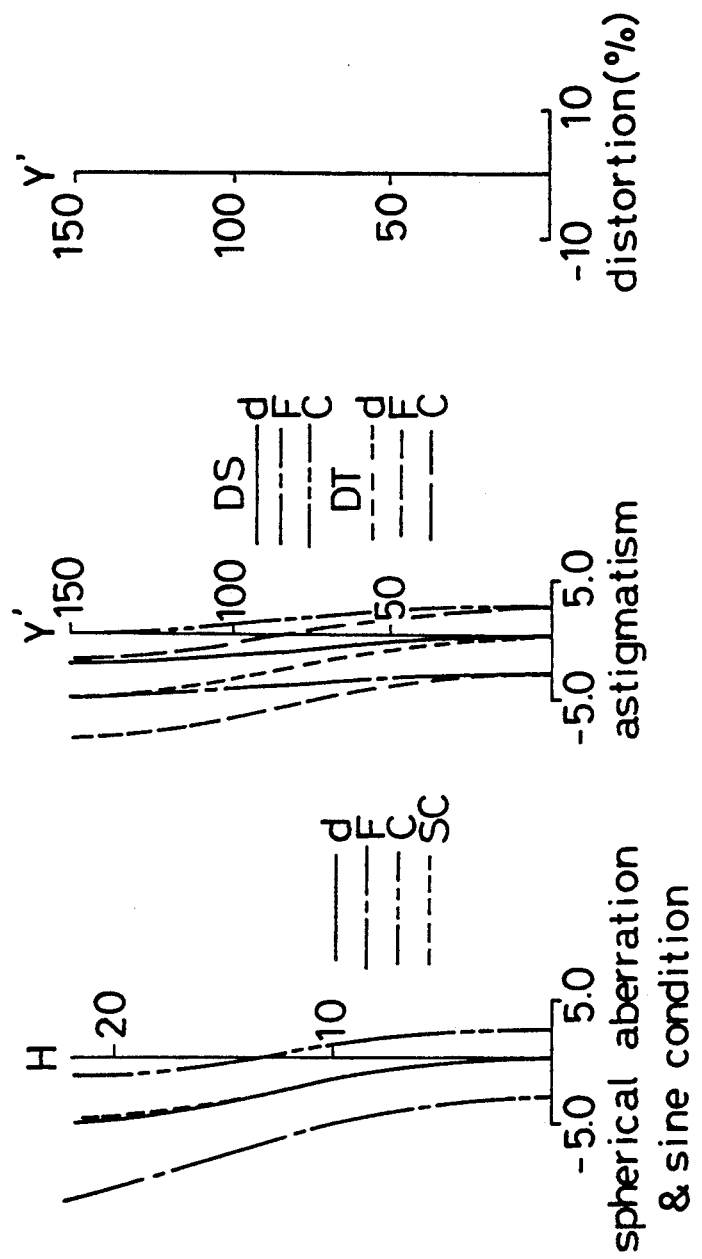

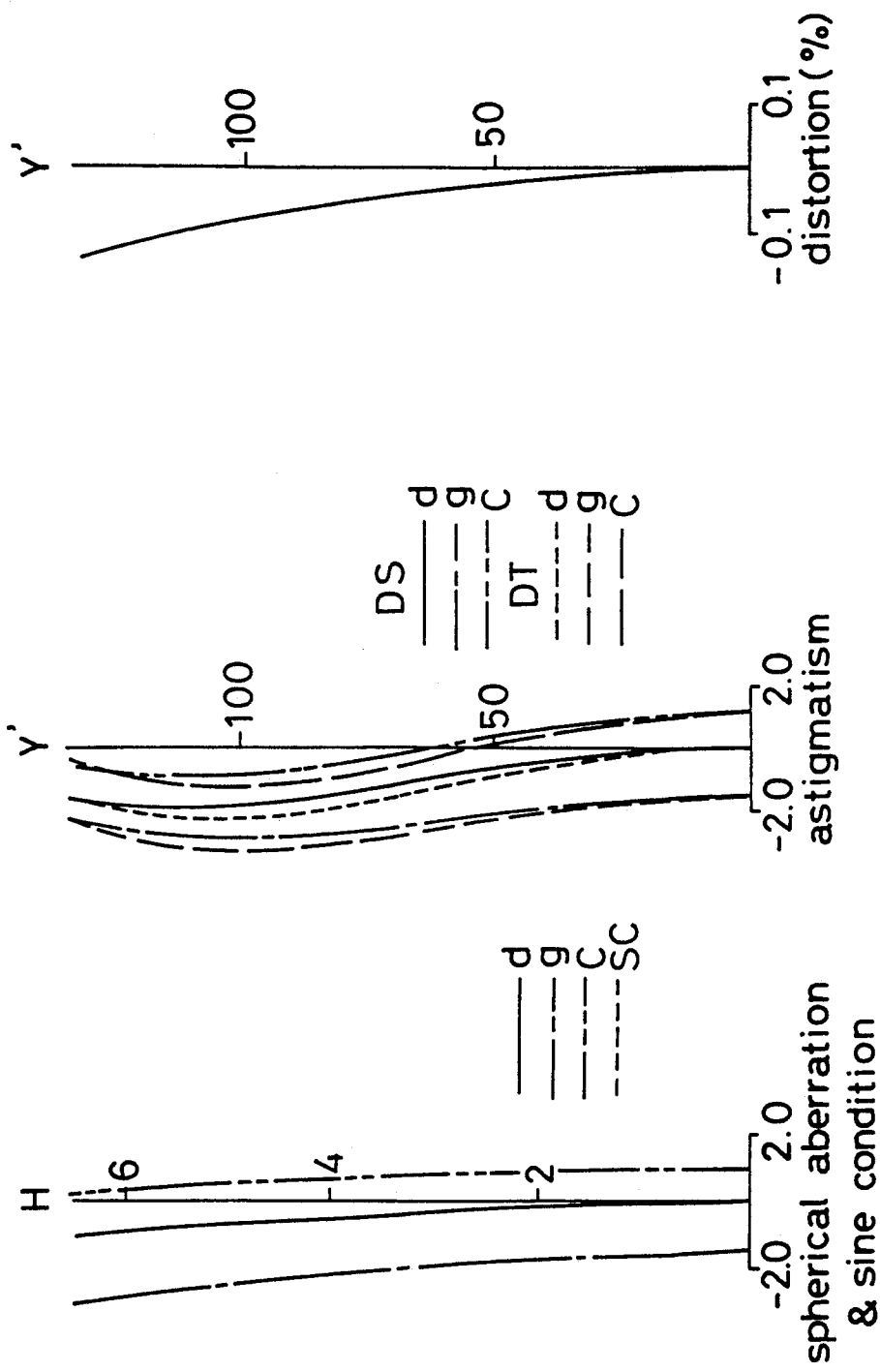

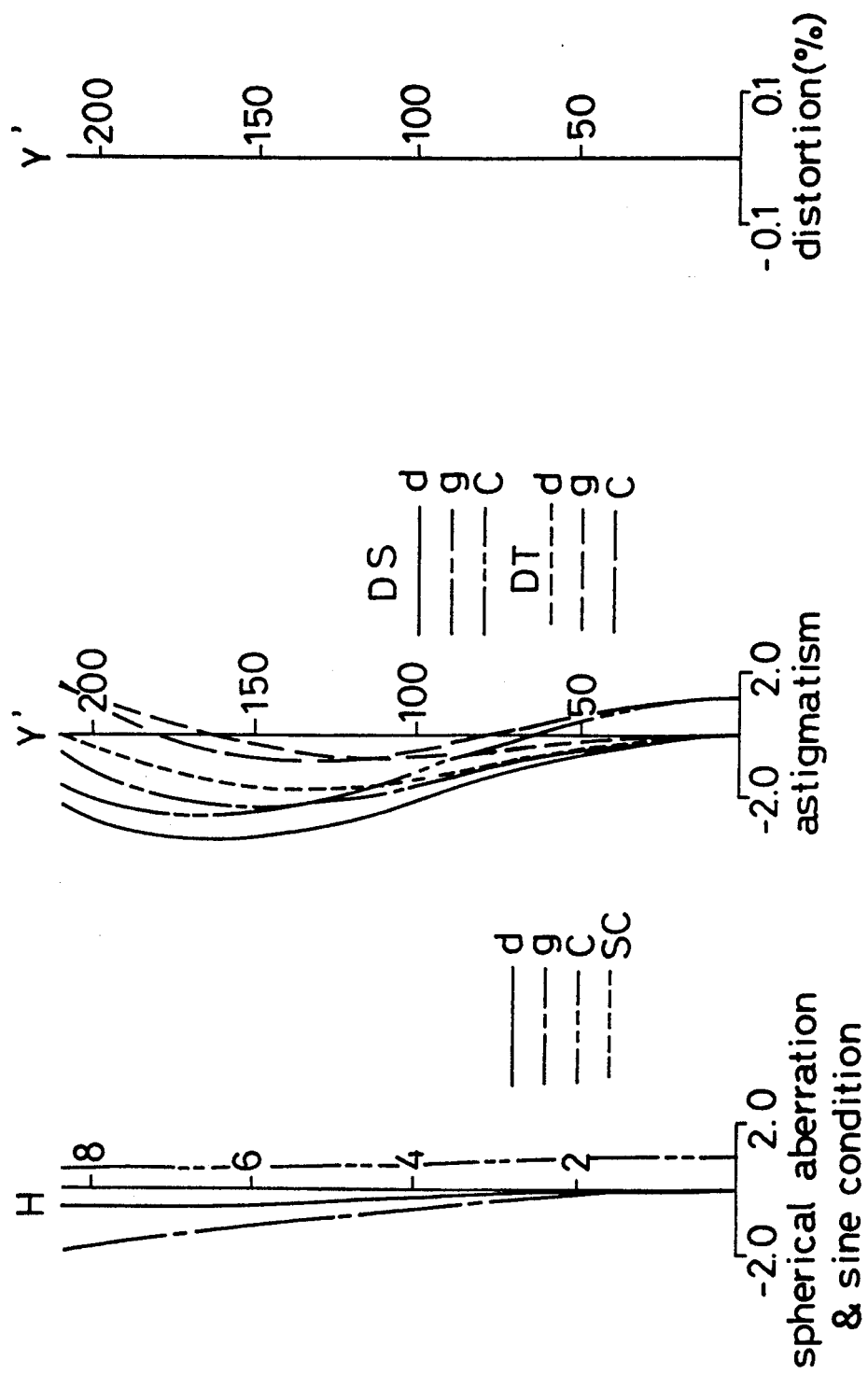

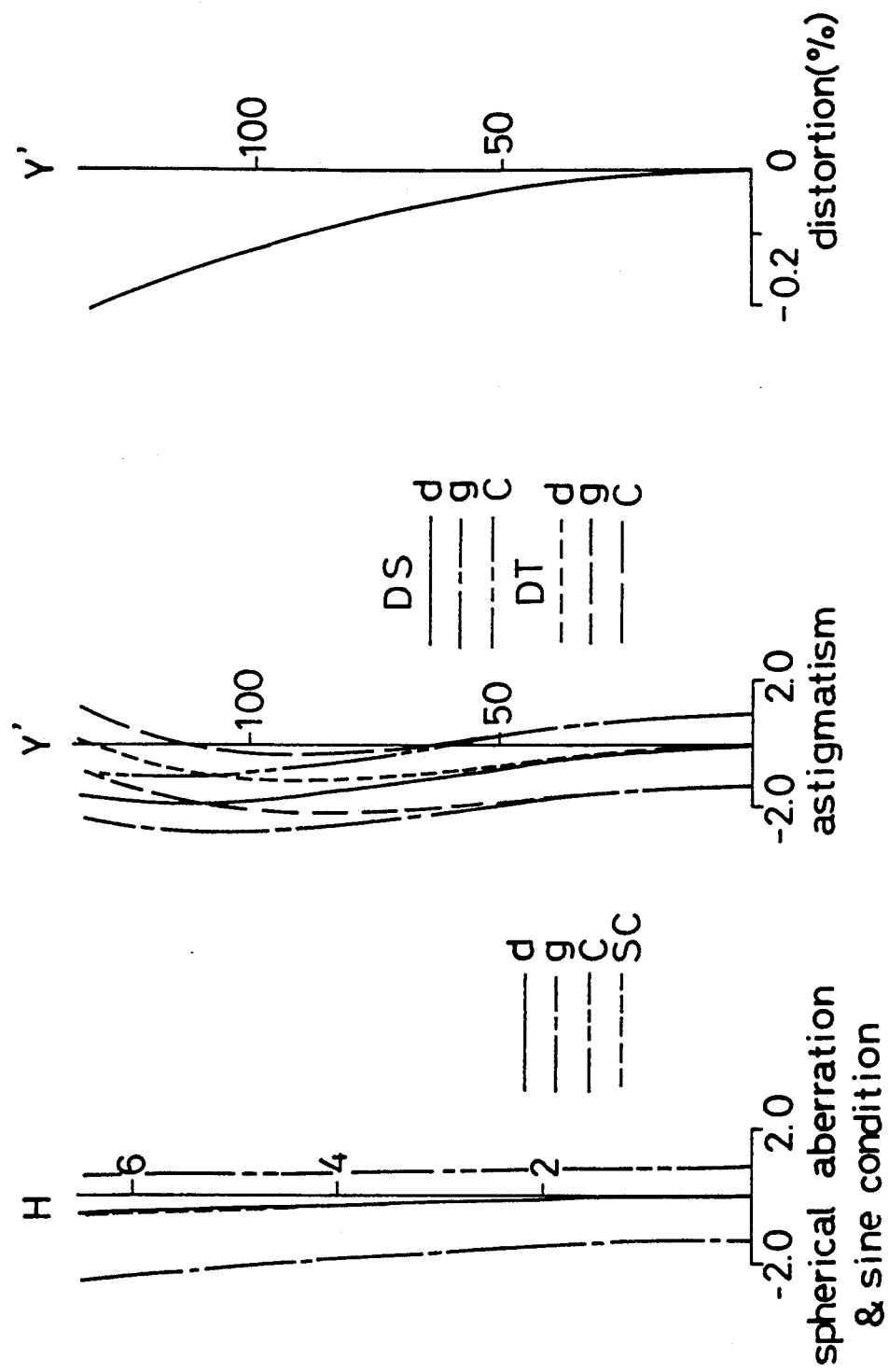

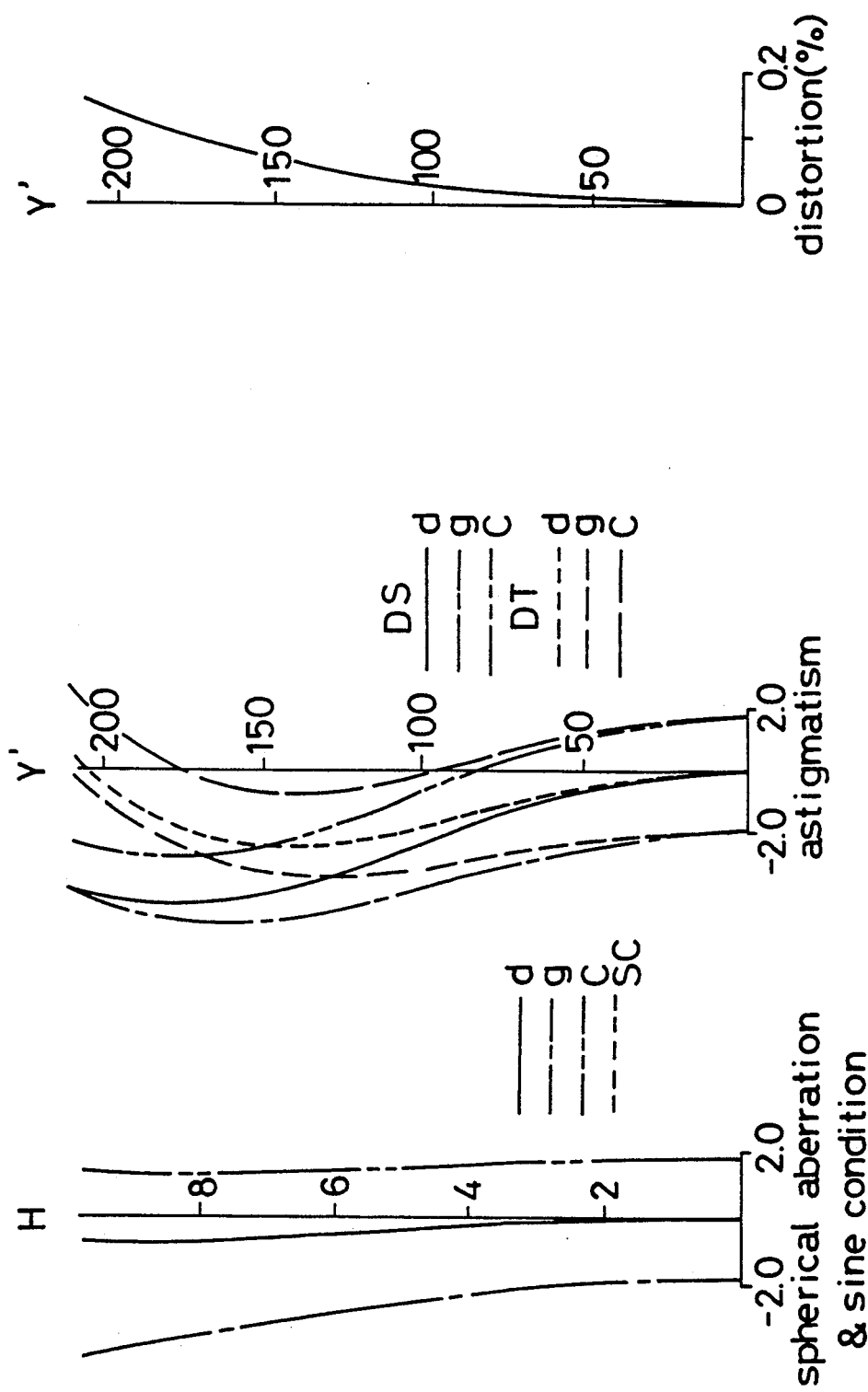

Fig.40B
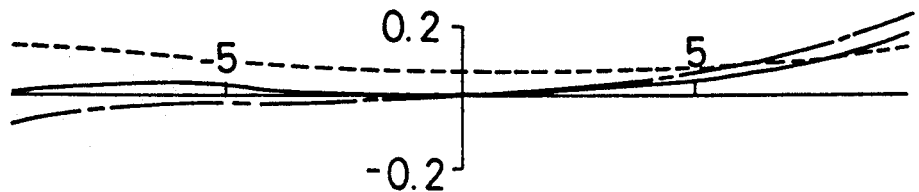
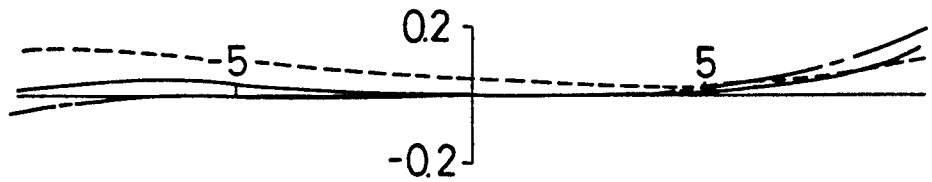
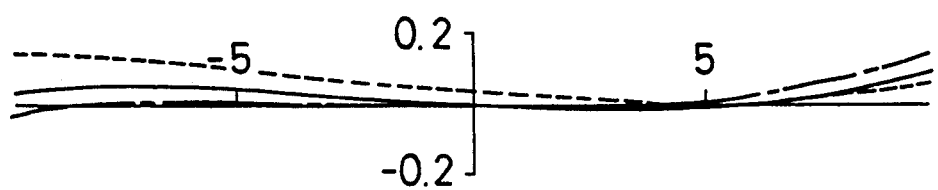
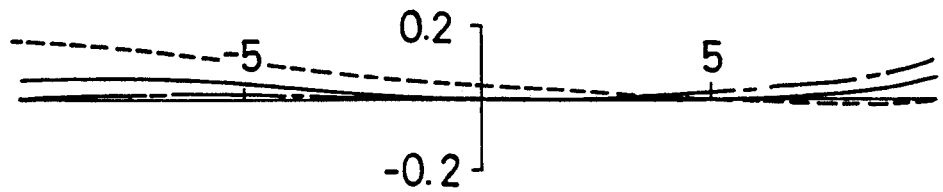
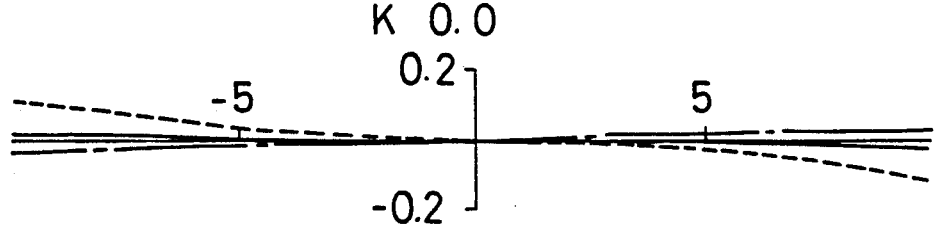

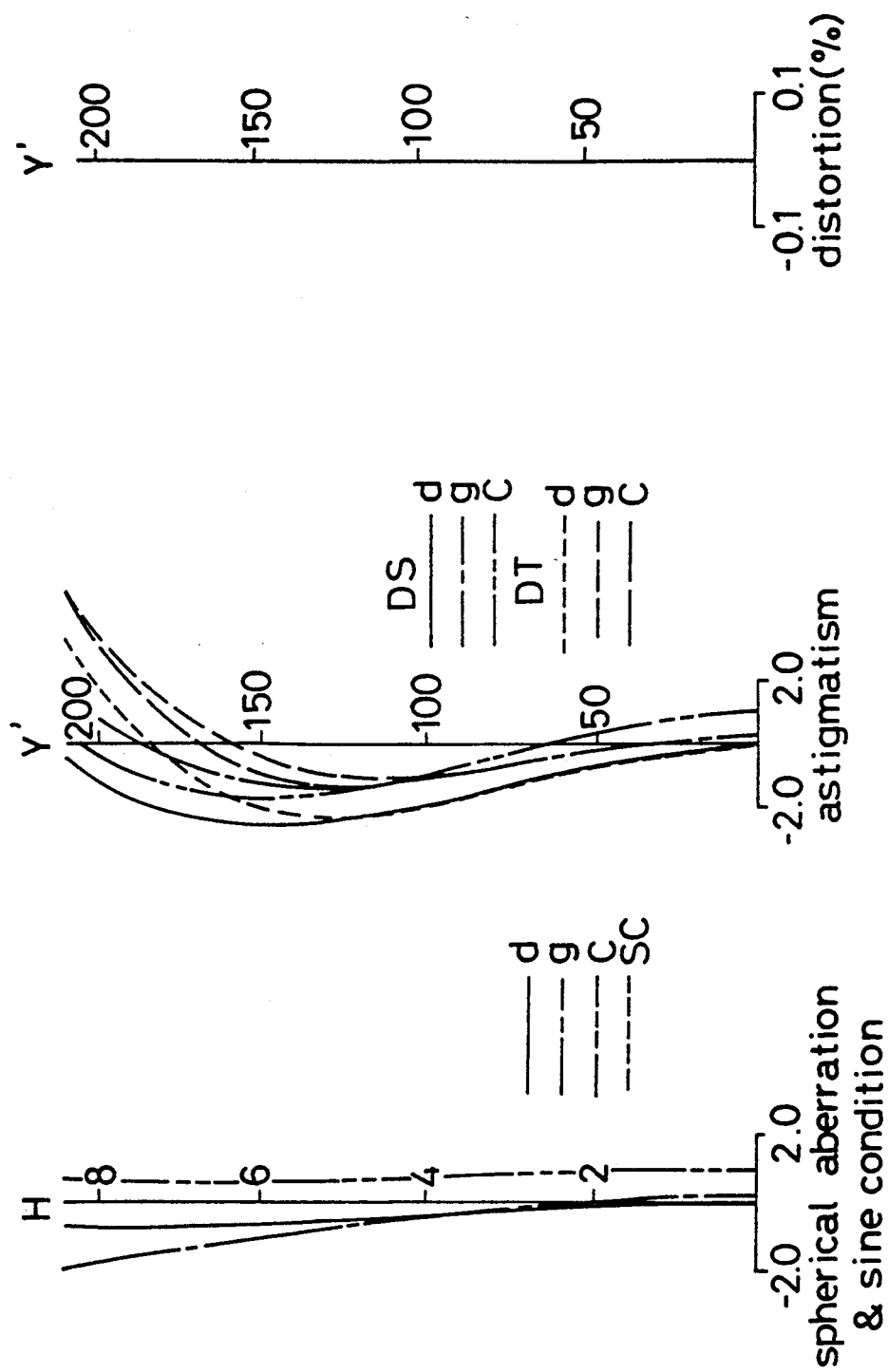

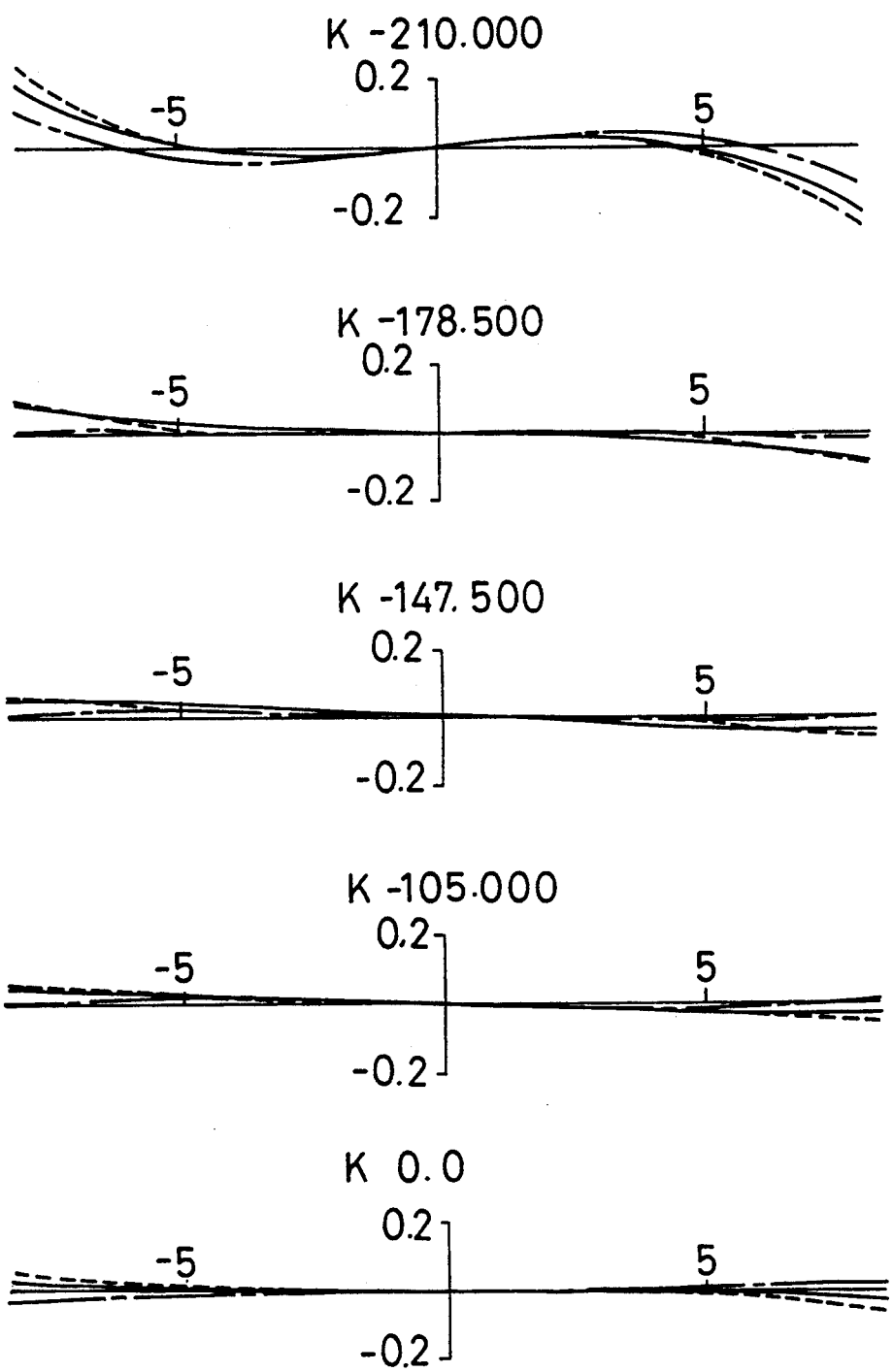

Fig. 43B
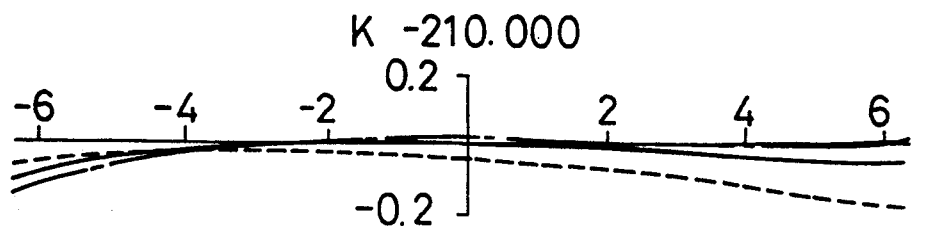
K −210.000
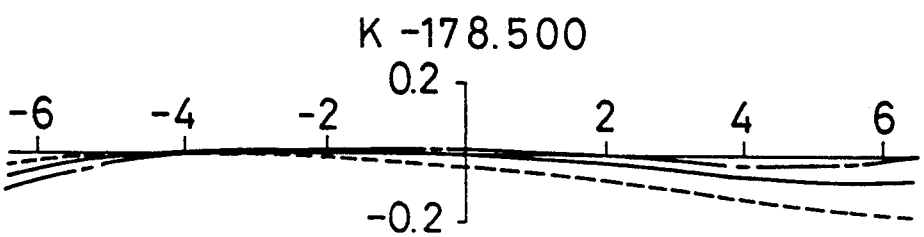
K −178.500
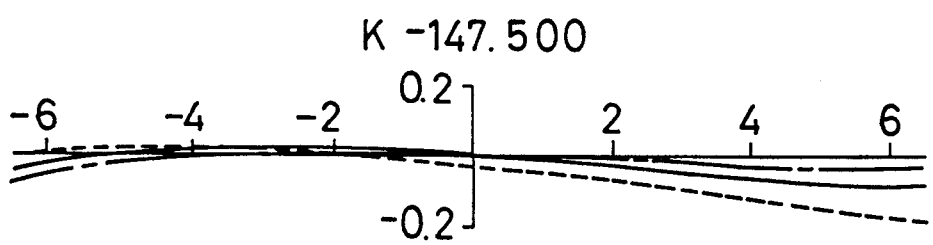
K −147.500
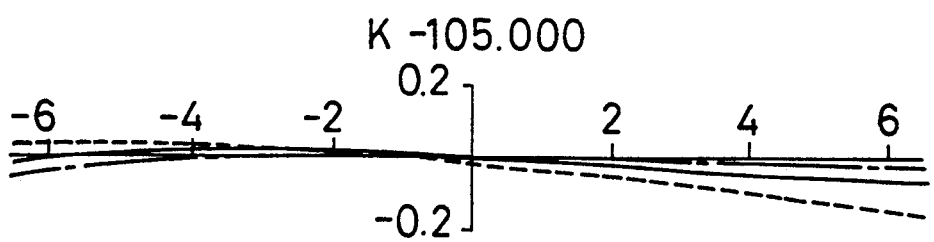
K −105.000
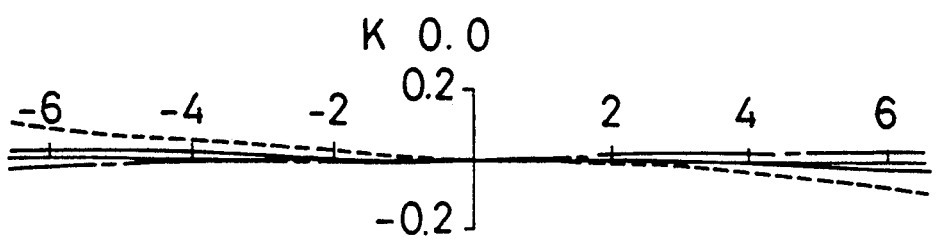
K 0.0

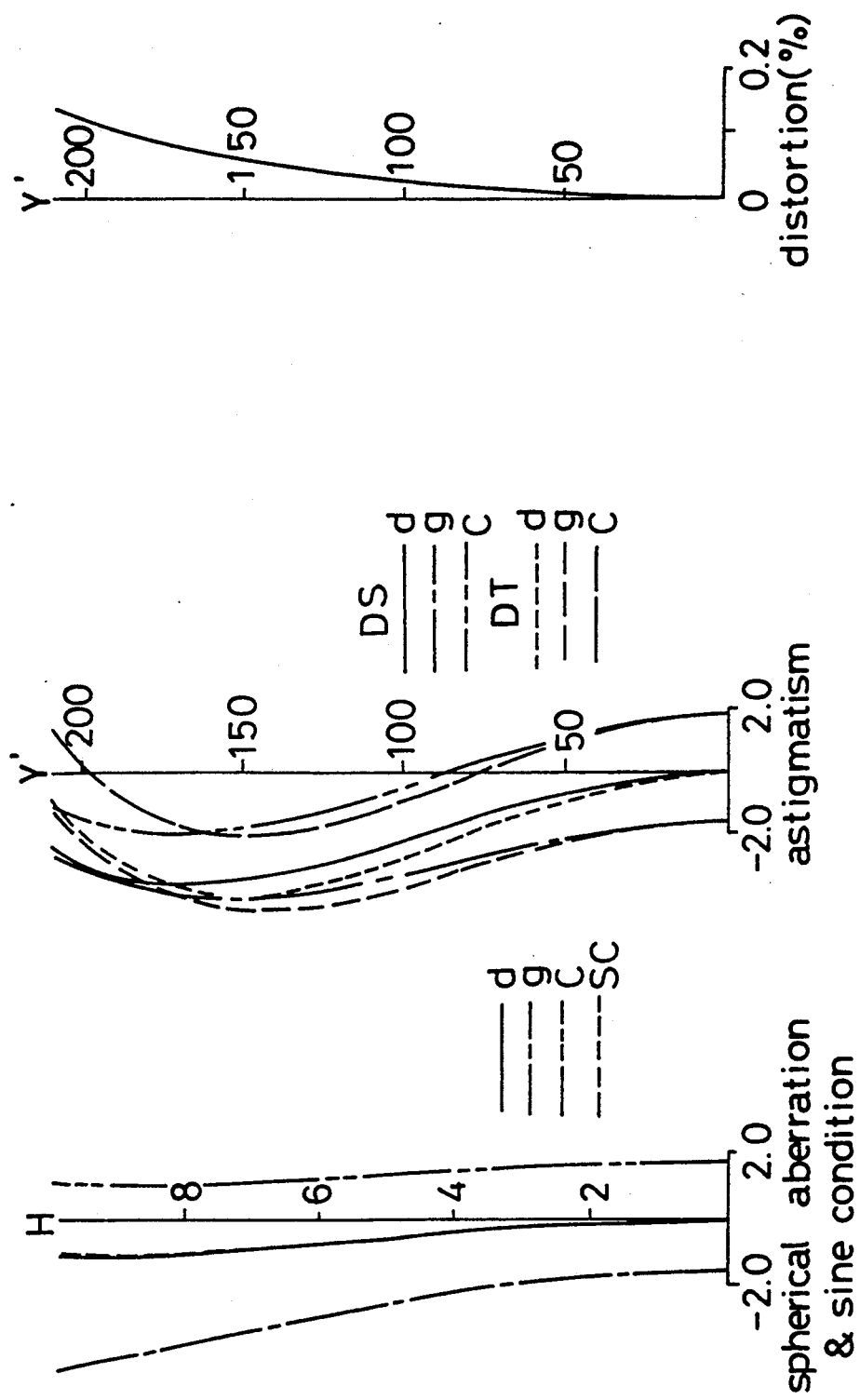

Fig. 44B
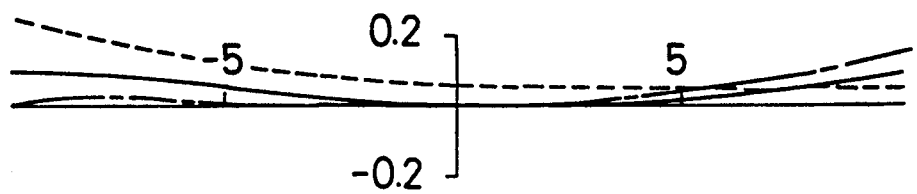
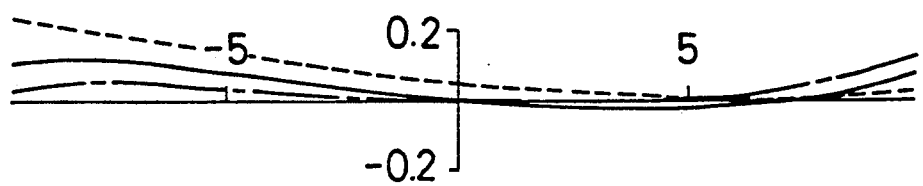
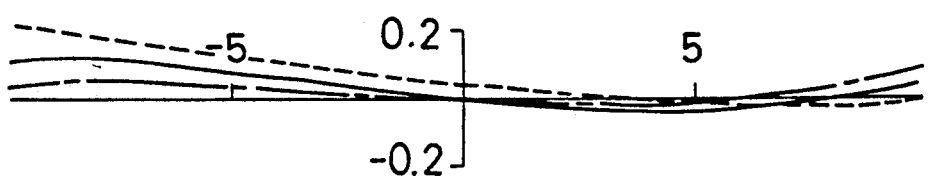
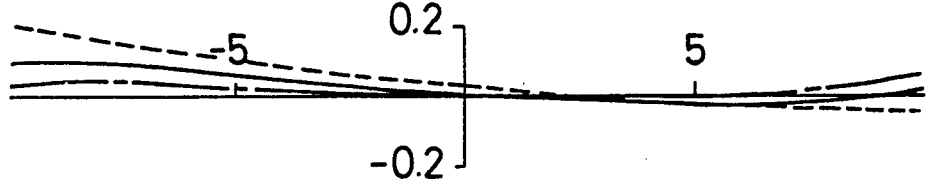
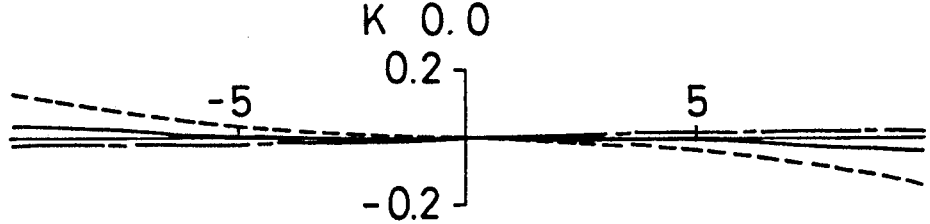

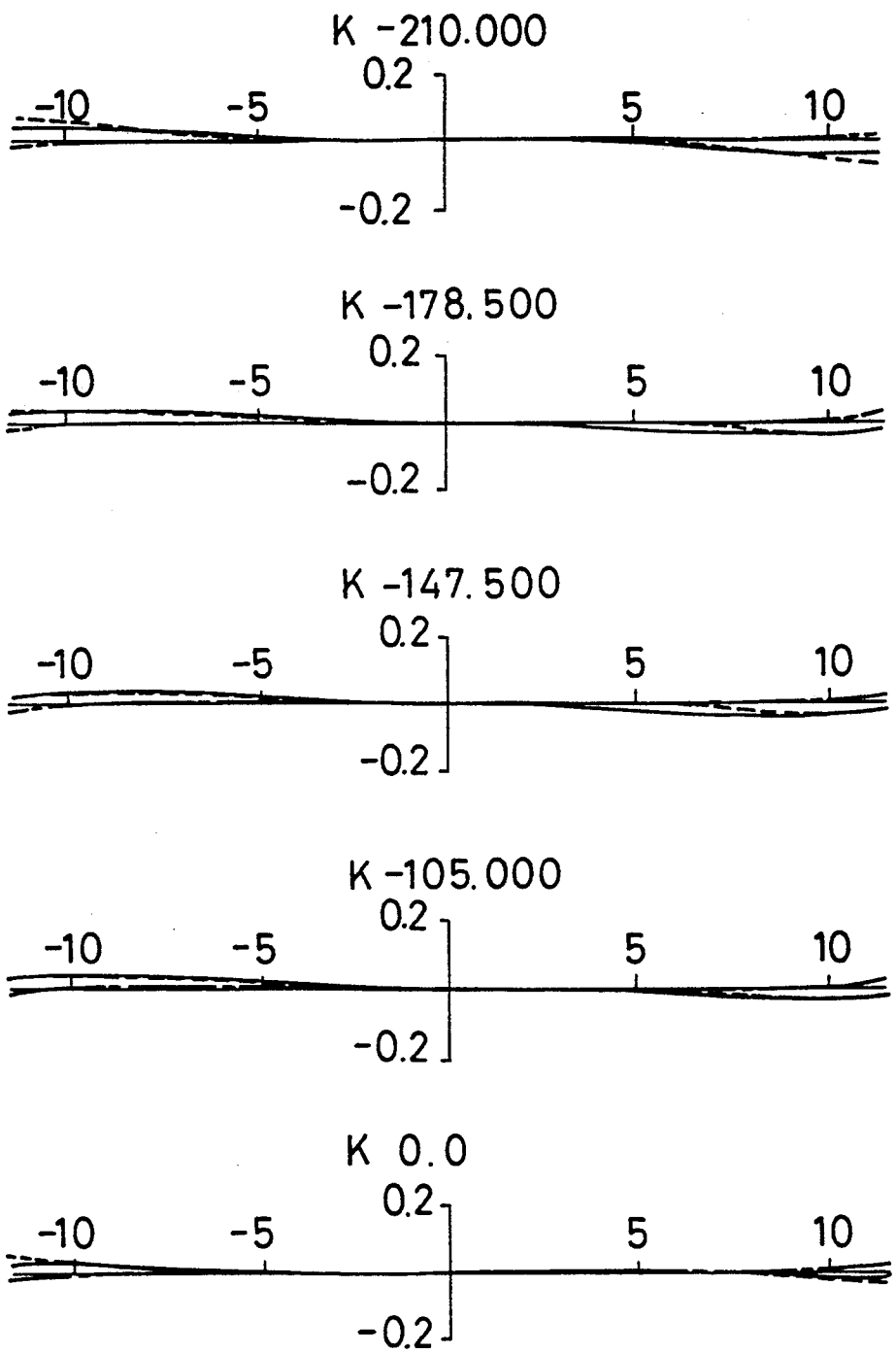

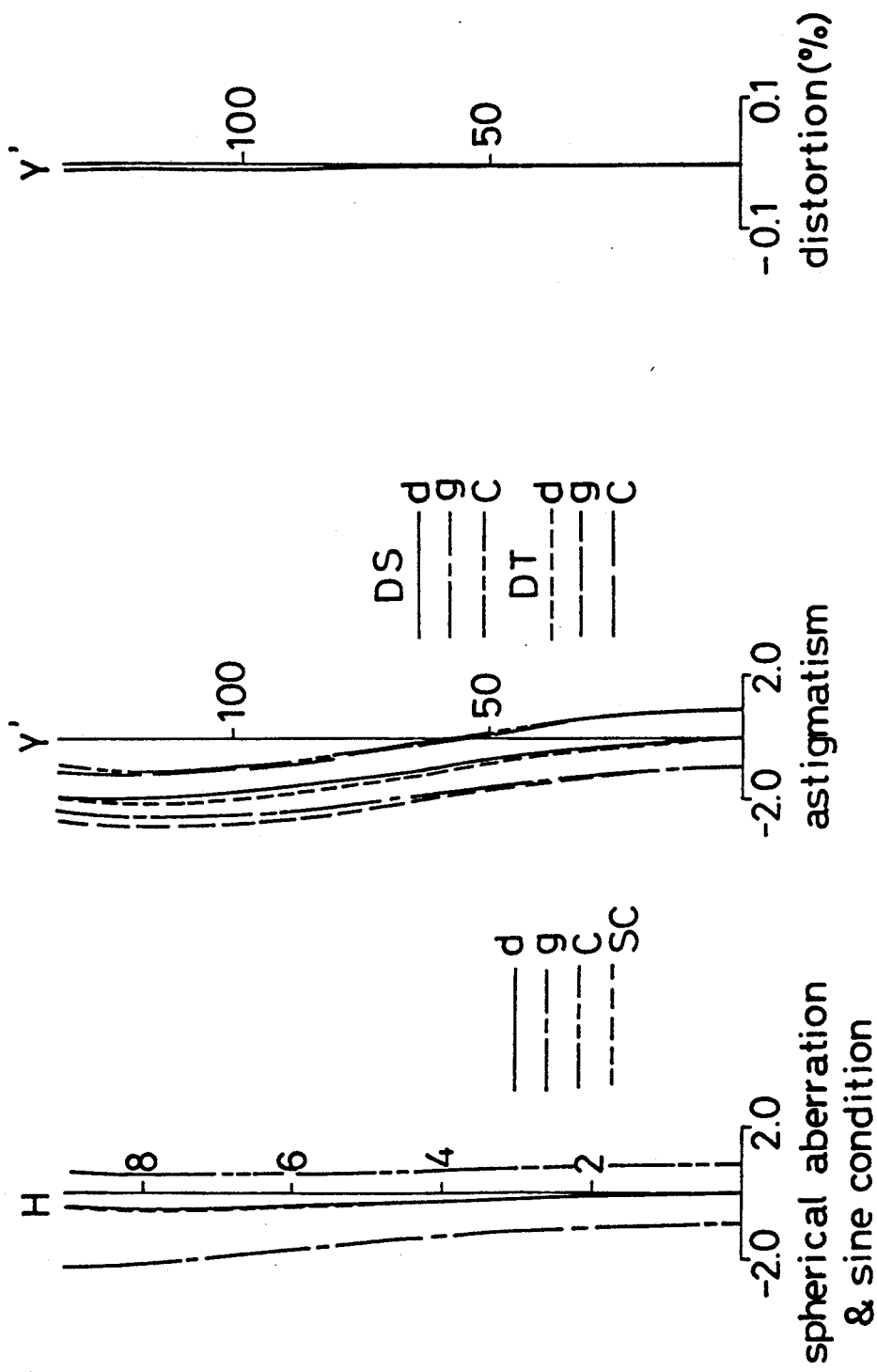

Fig.47B
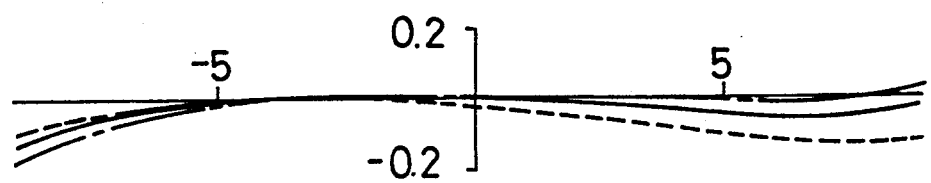
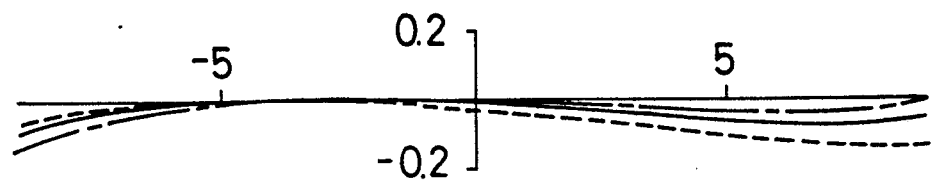
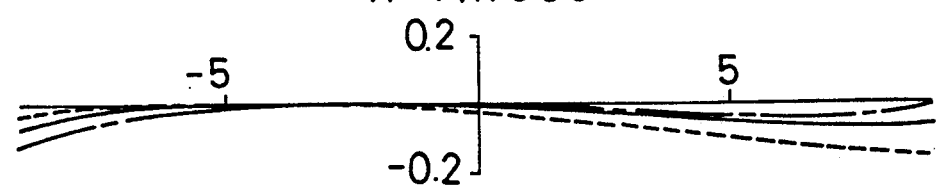
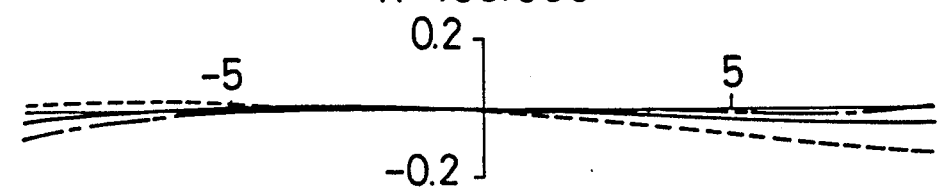
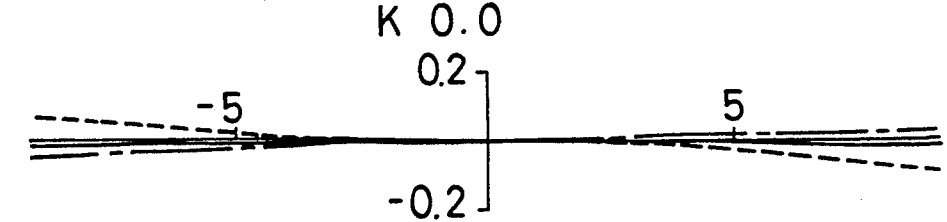

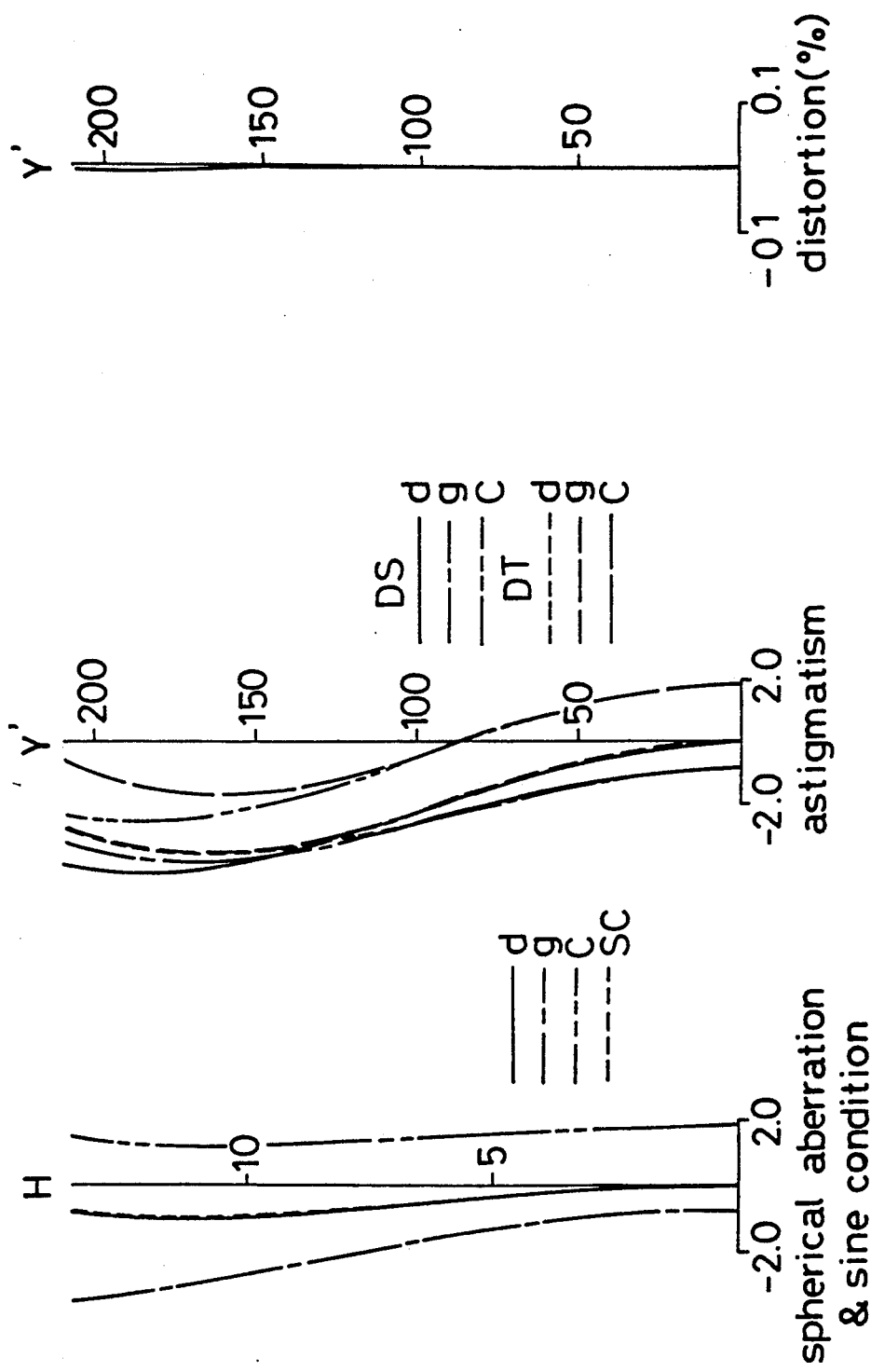

Fig. 48B
——— d
--- g
—·— c
K −148.515
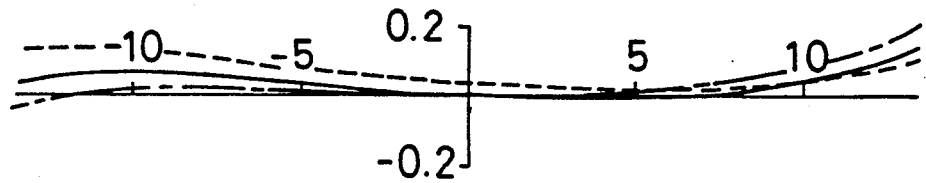
K −126.238
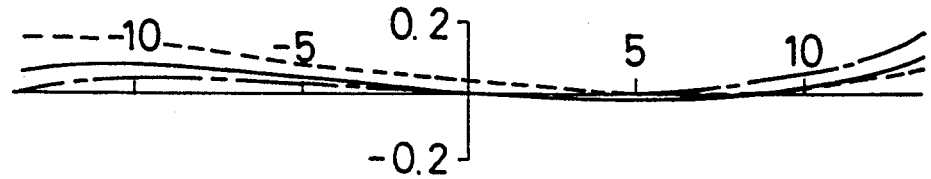
K −104.314
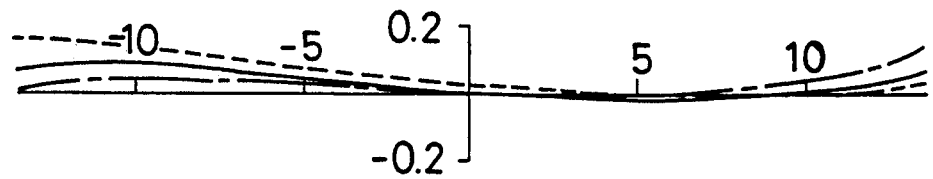
K −74.257
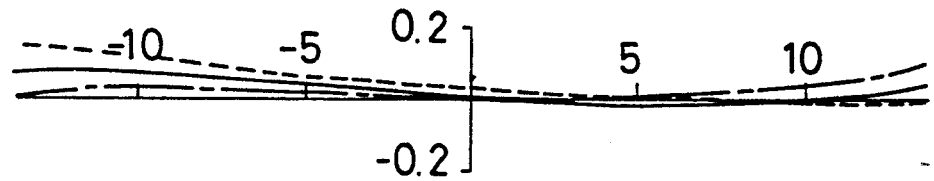
K 0.0
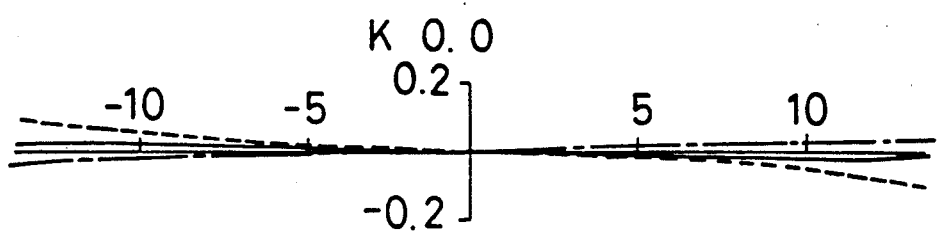

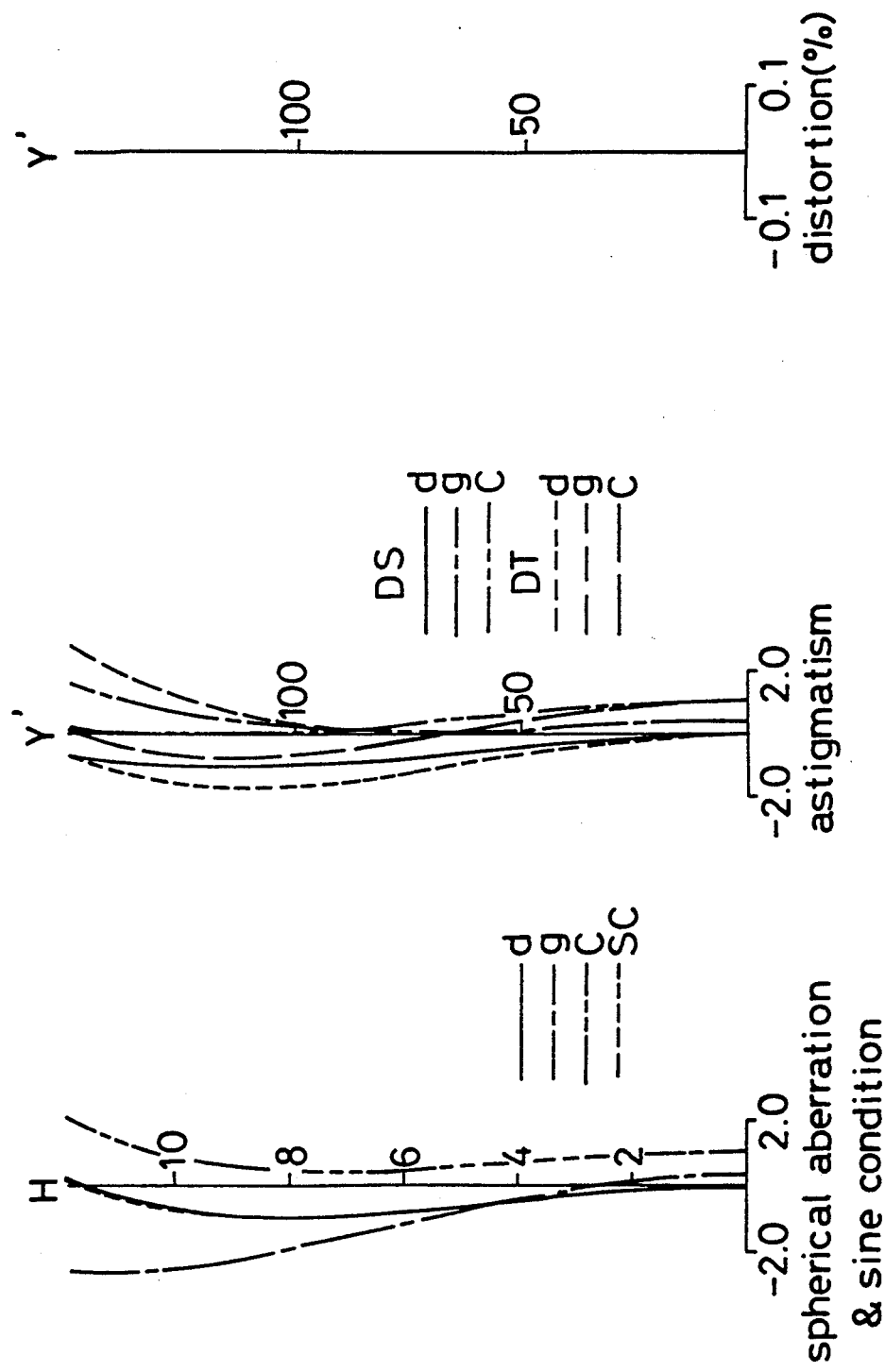

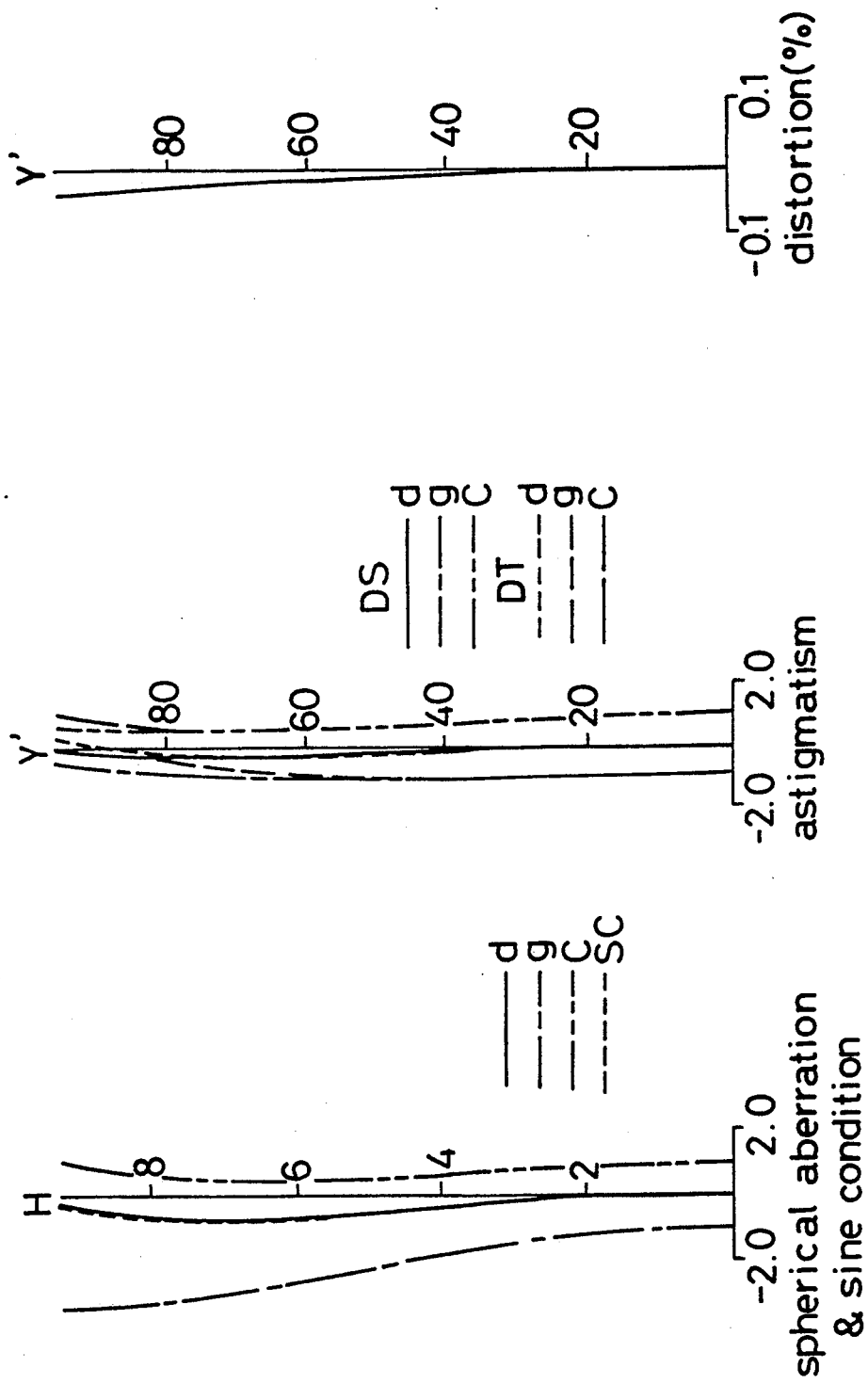

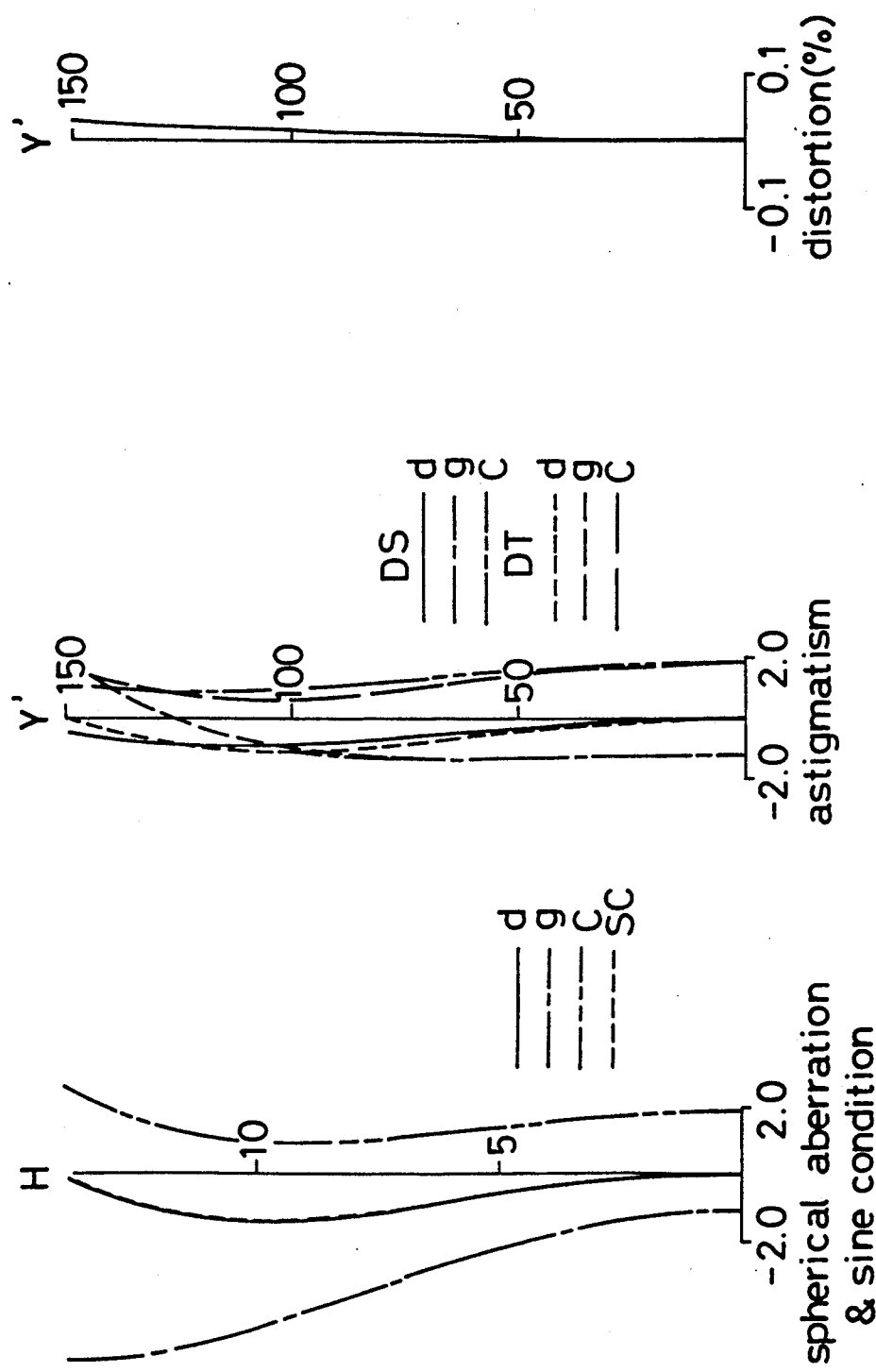

Fig.52B
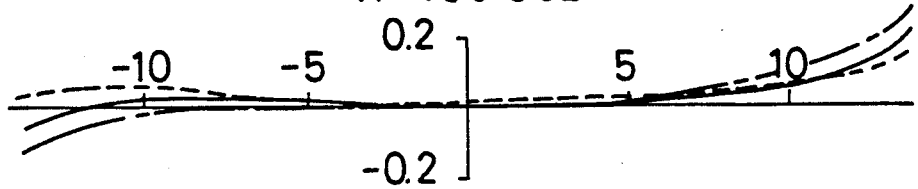
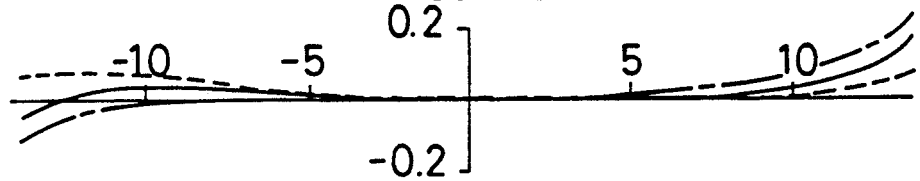
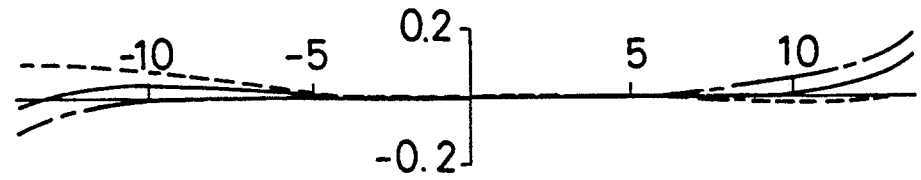
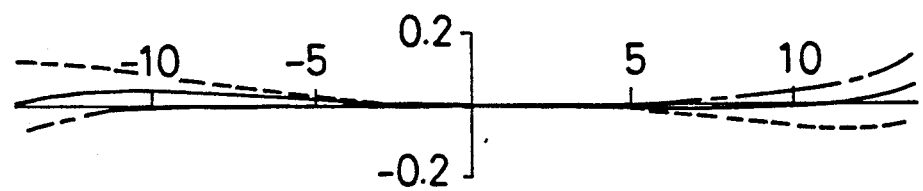
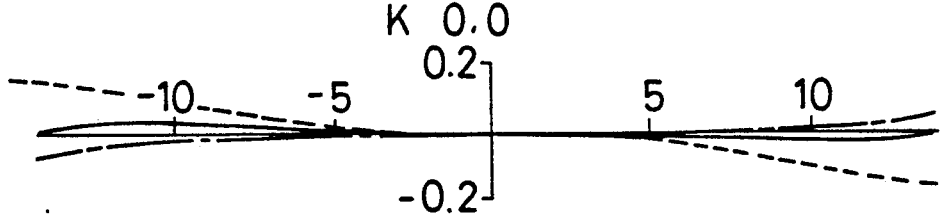

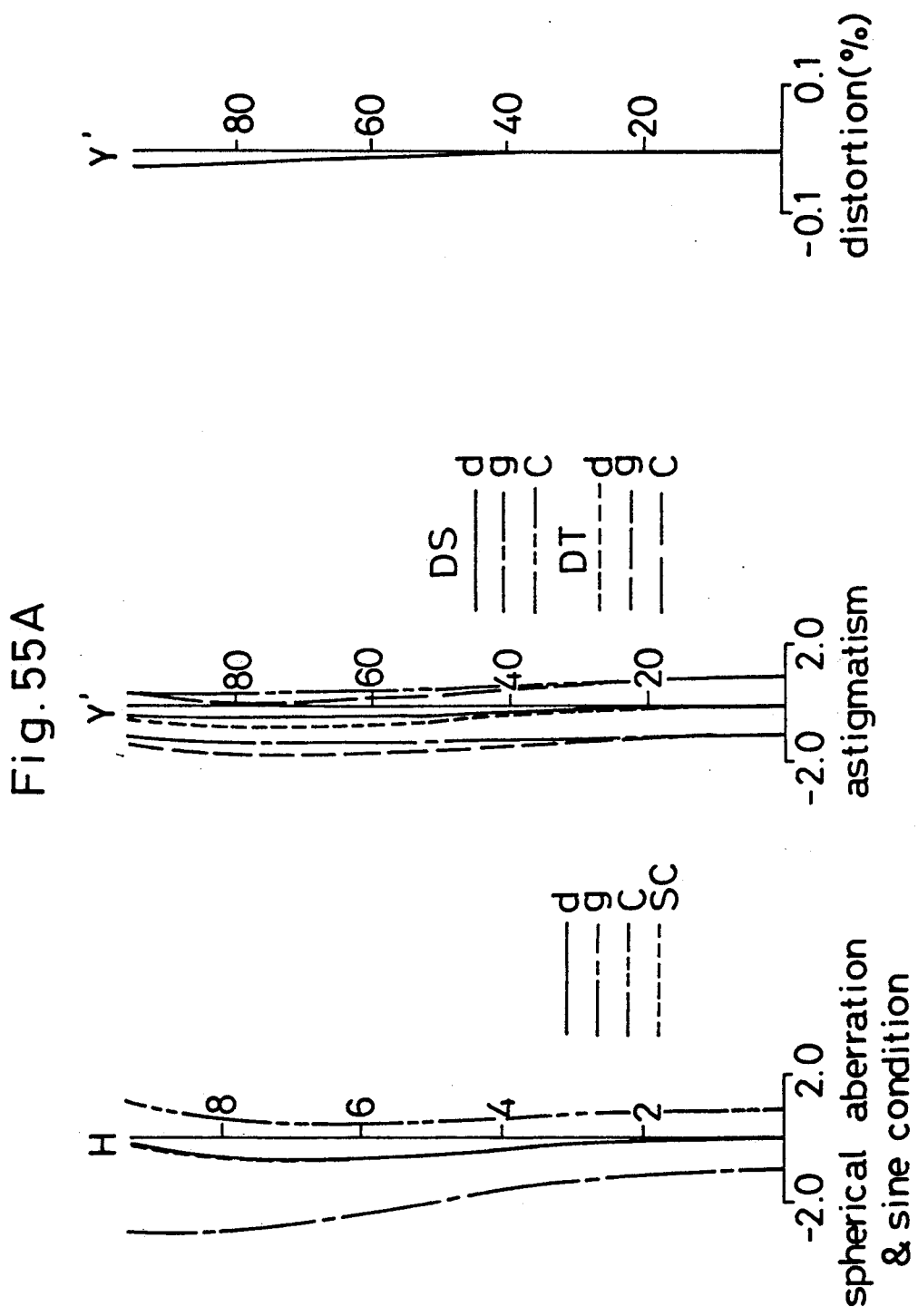

Fig. 55B
——— d
----- g
—·—·— c
K −150.000
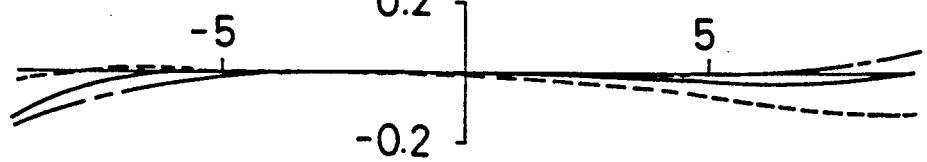
K −127.500
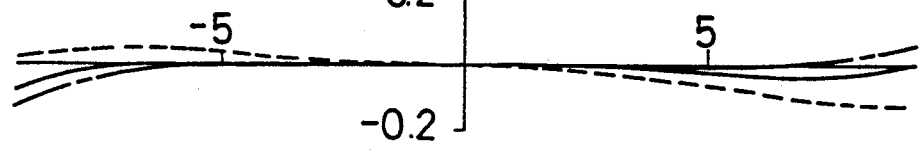
K −105.000
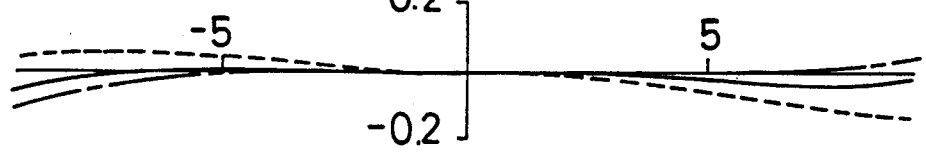
K −75.000
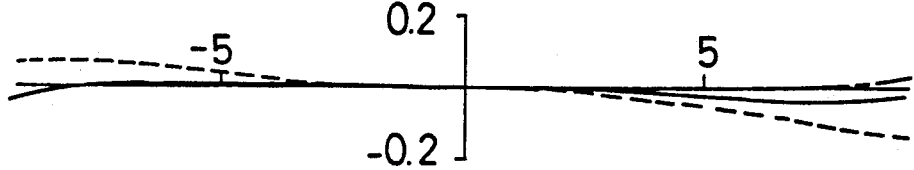
K 0.0
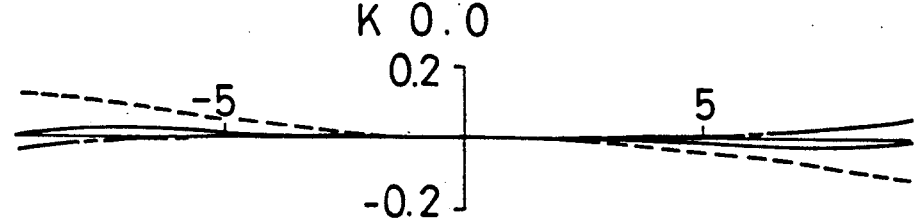

Fig.56B
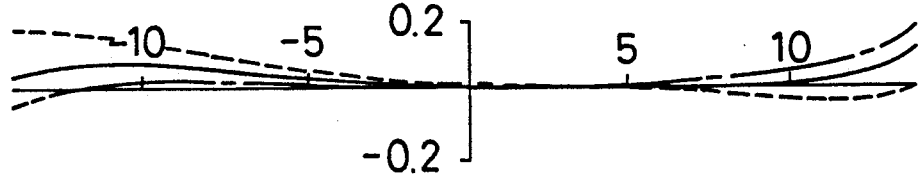
K −106.082
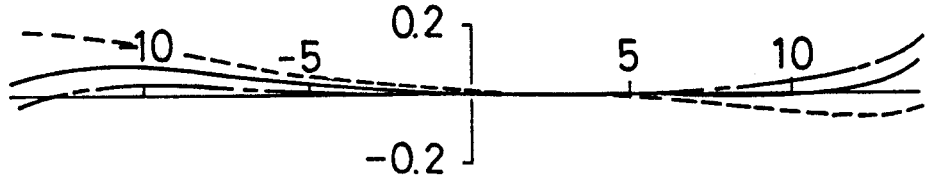
K −90.170
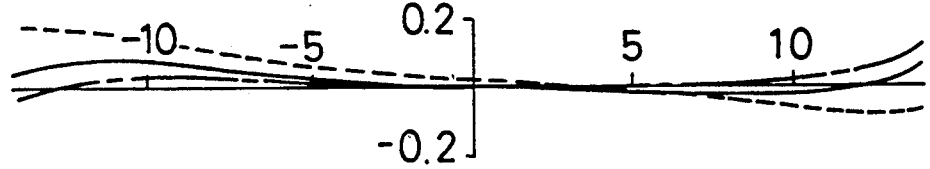
K −74.257
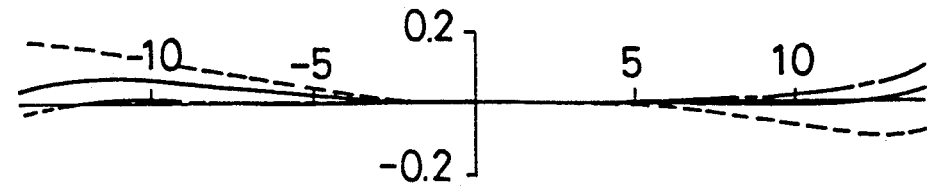
K −53.041
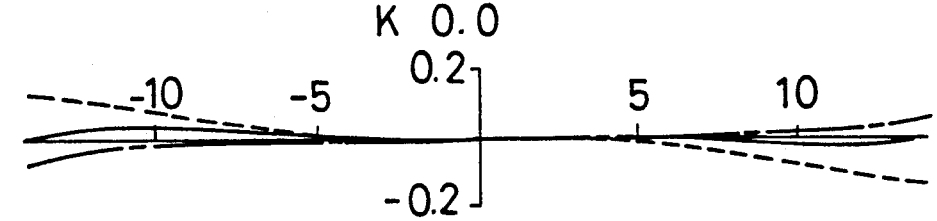
K 0.0

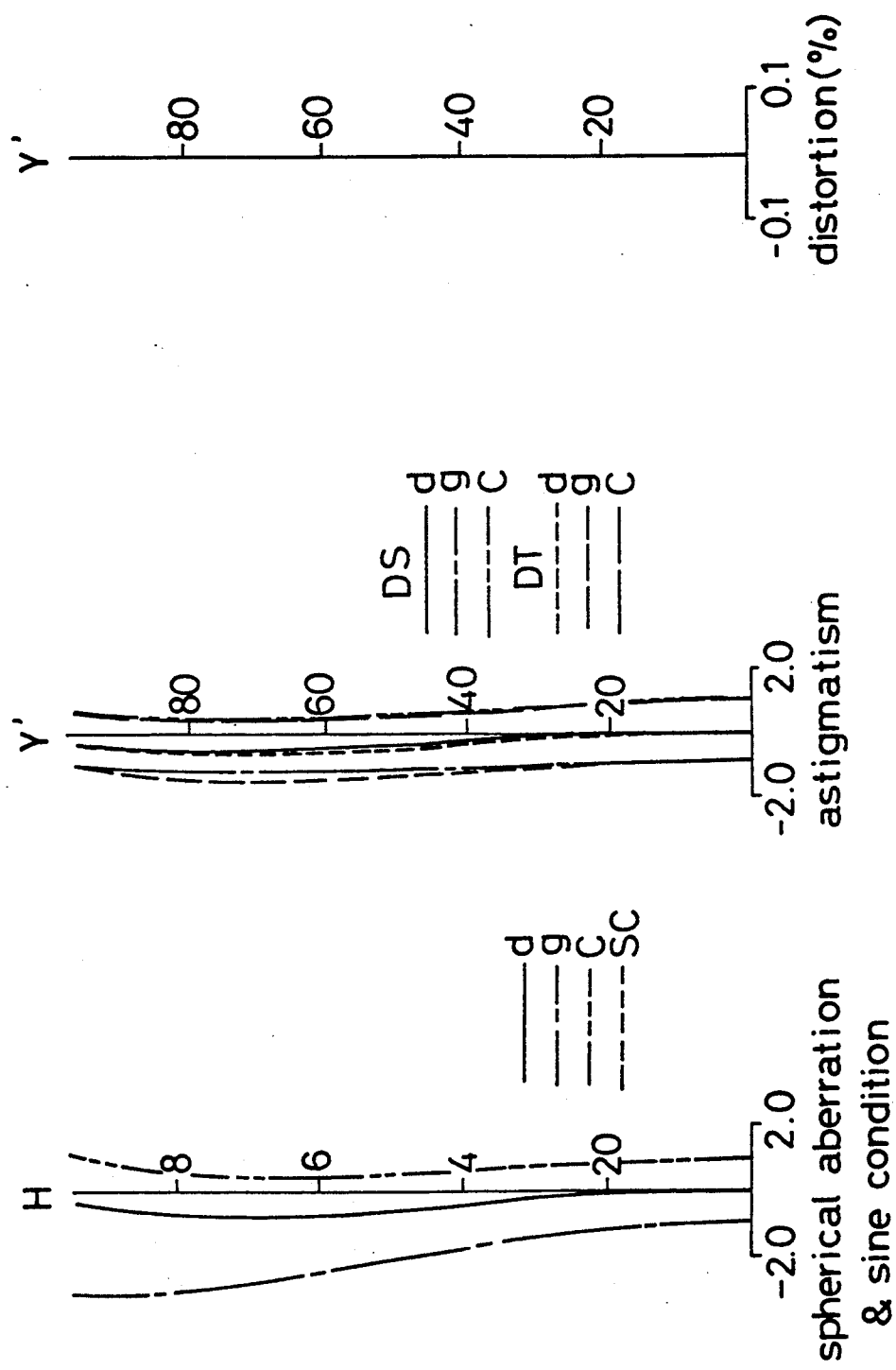

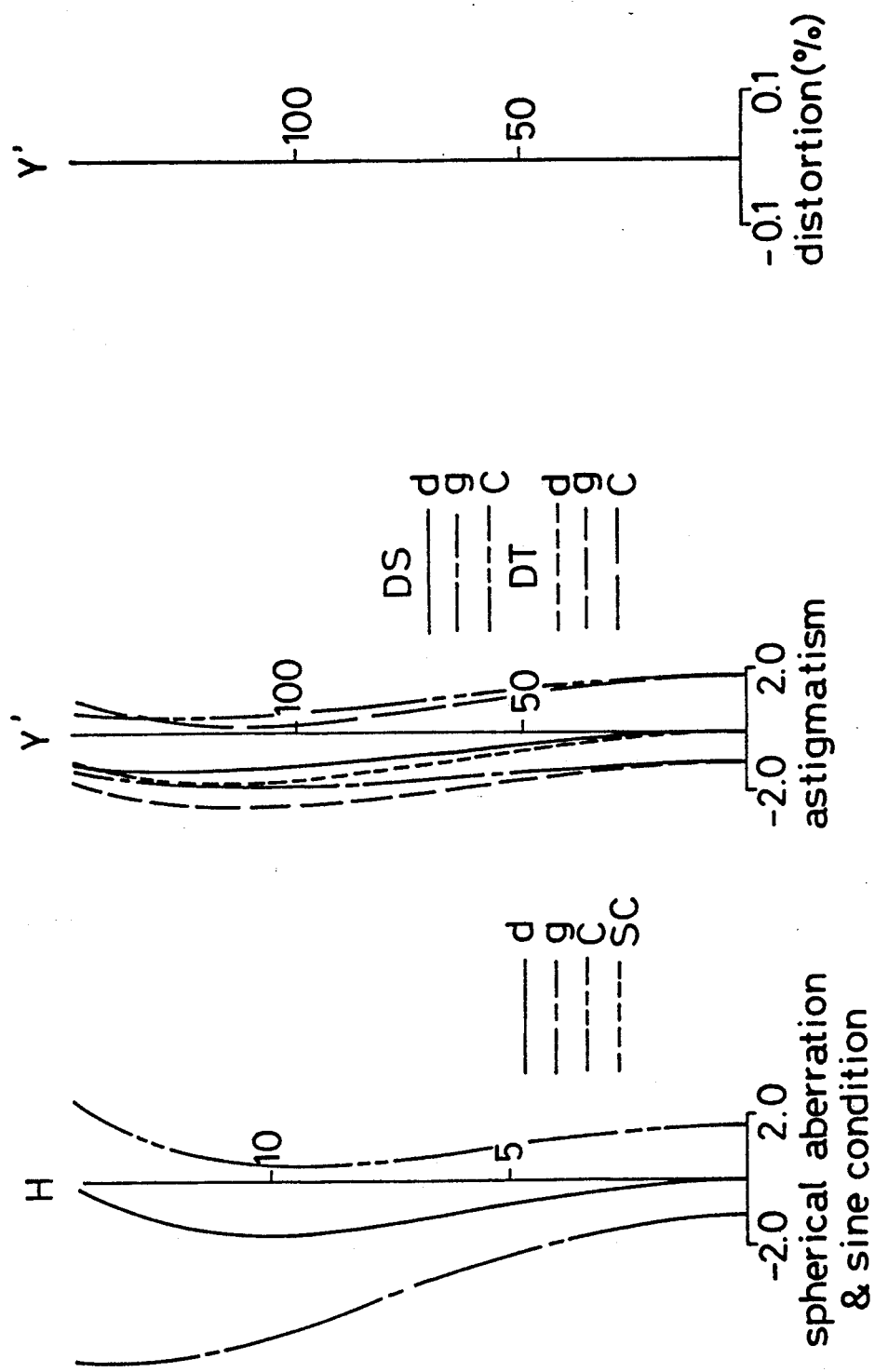

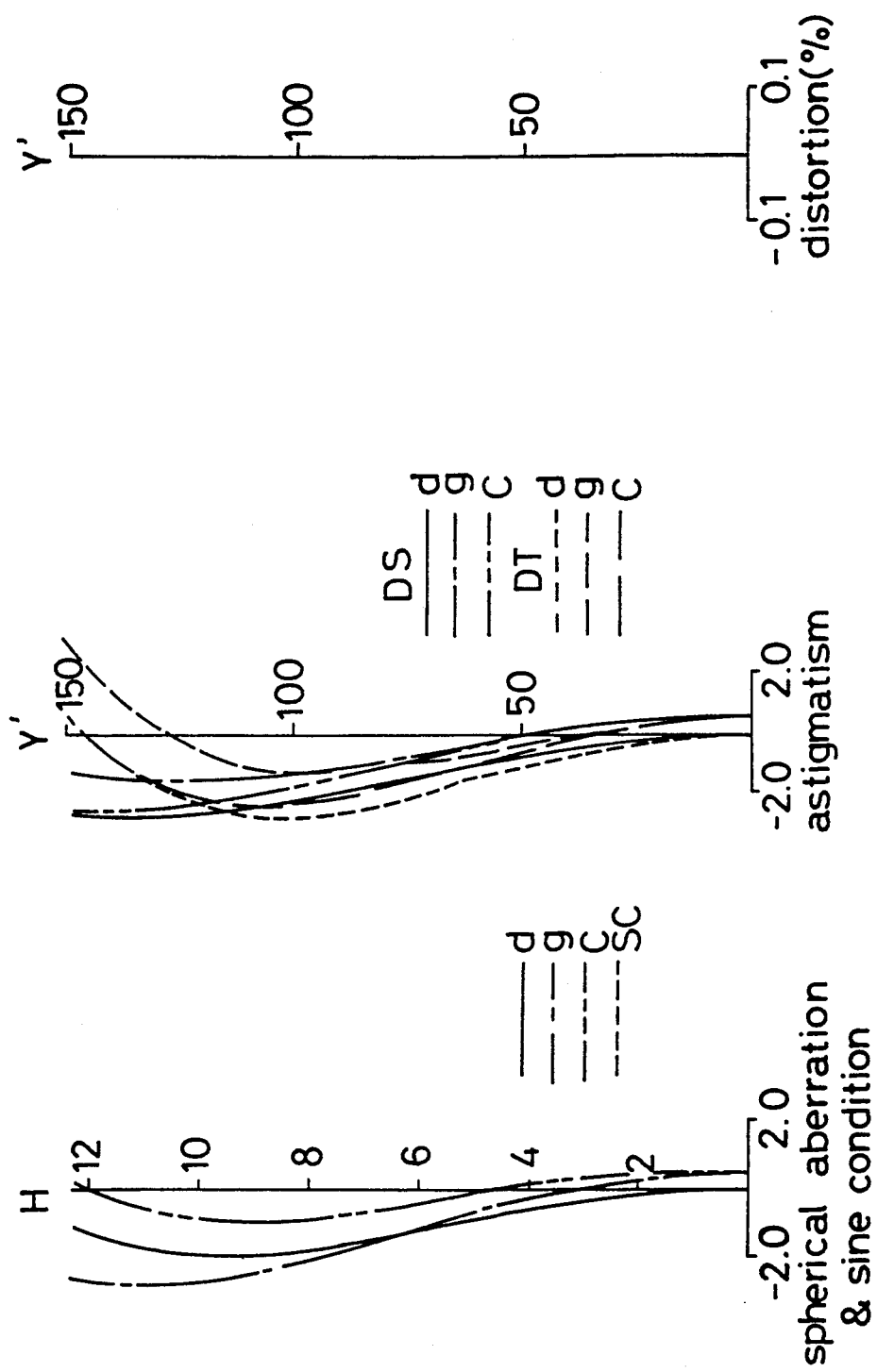

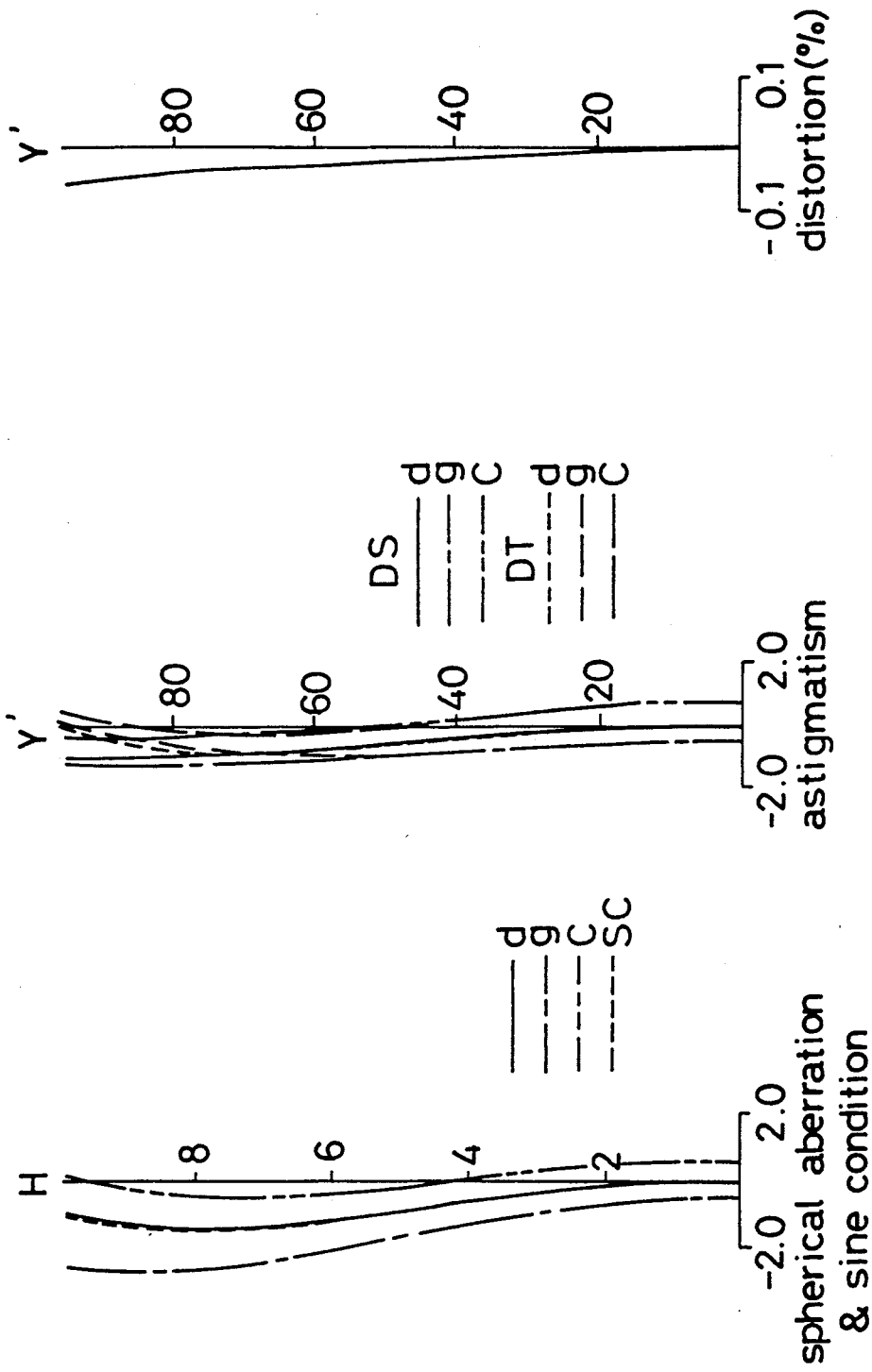

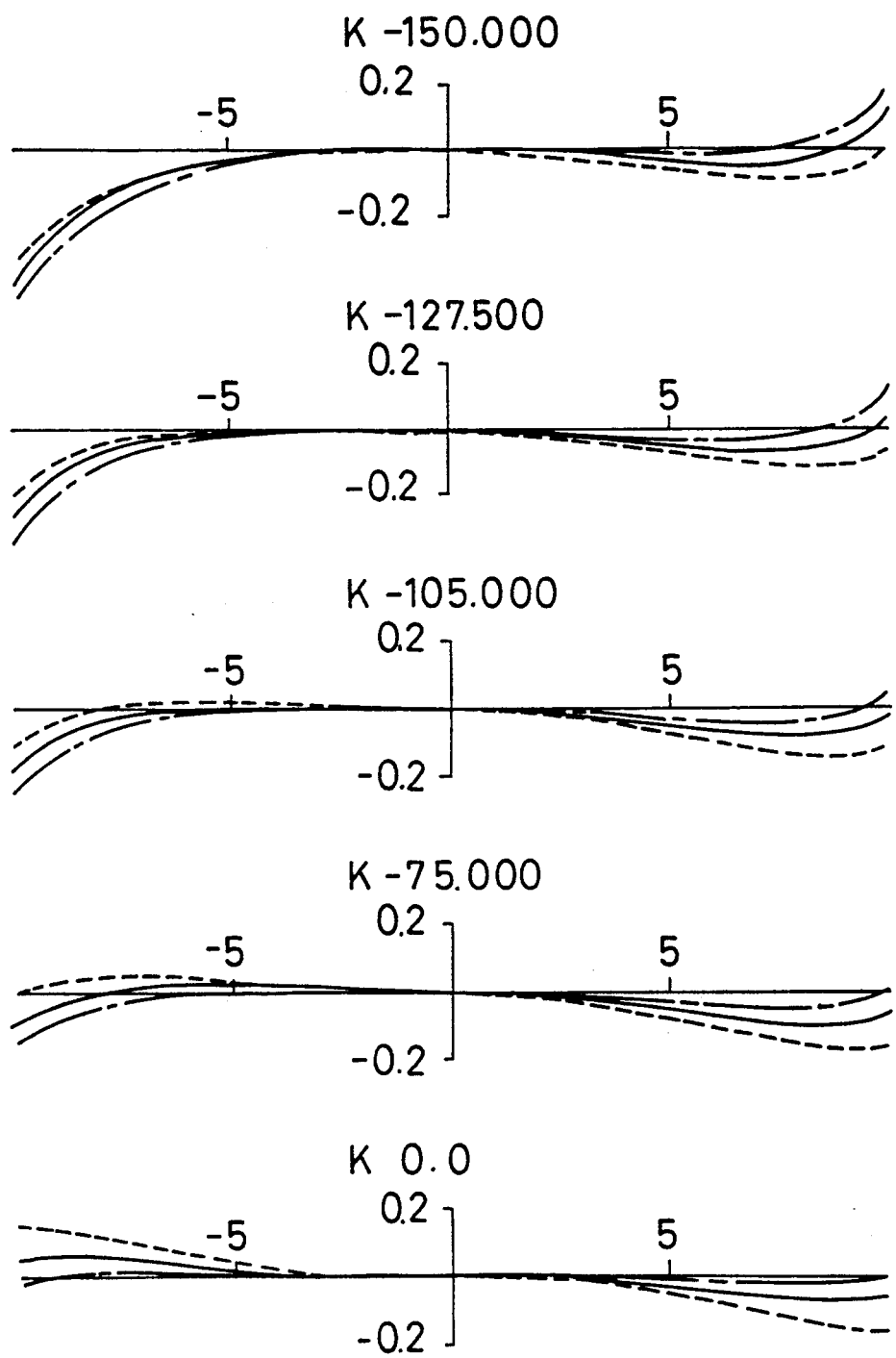

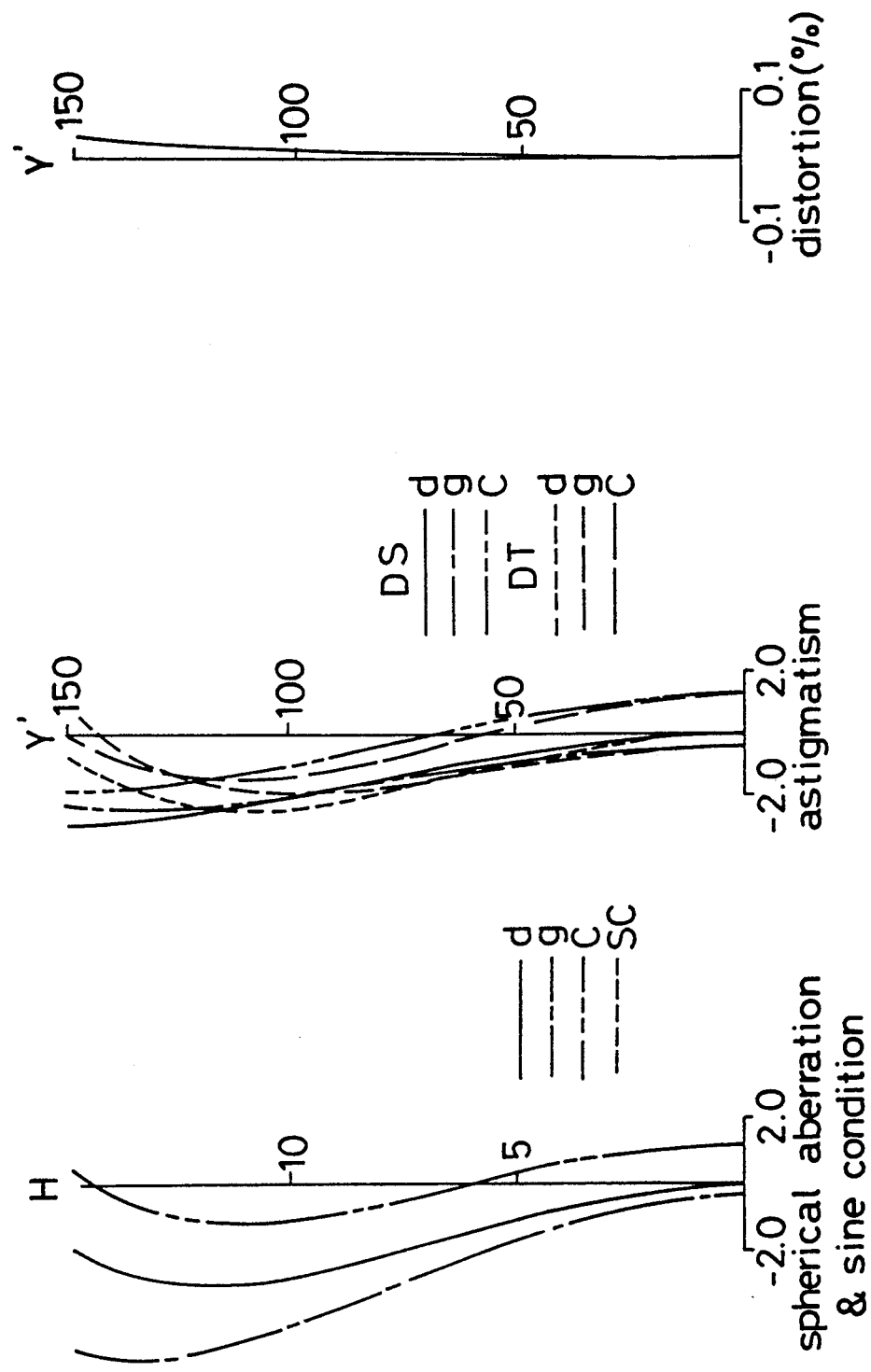

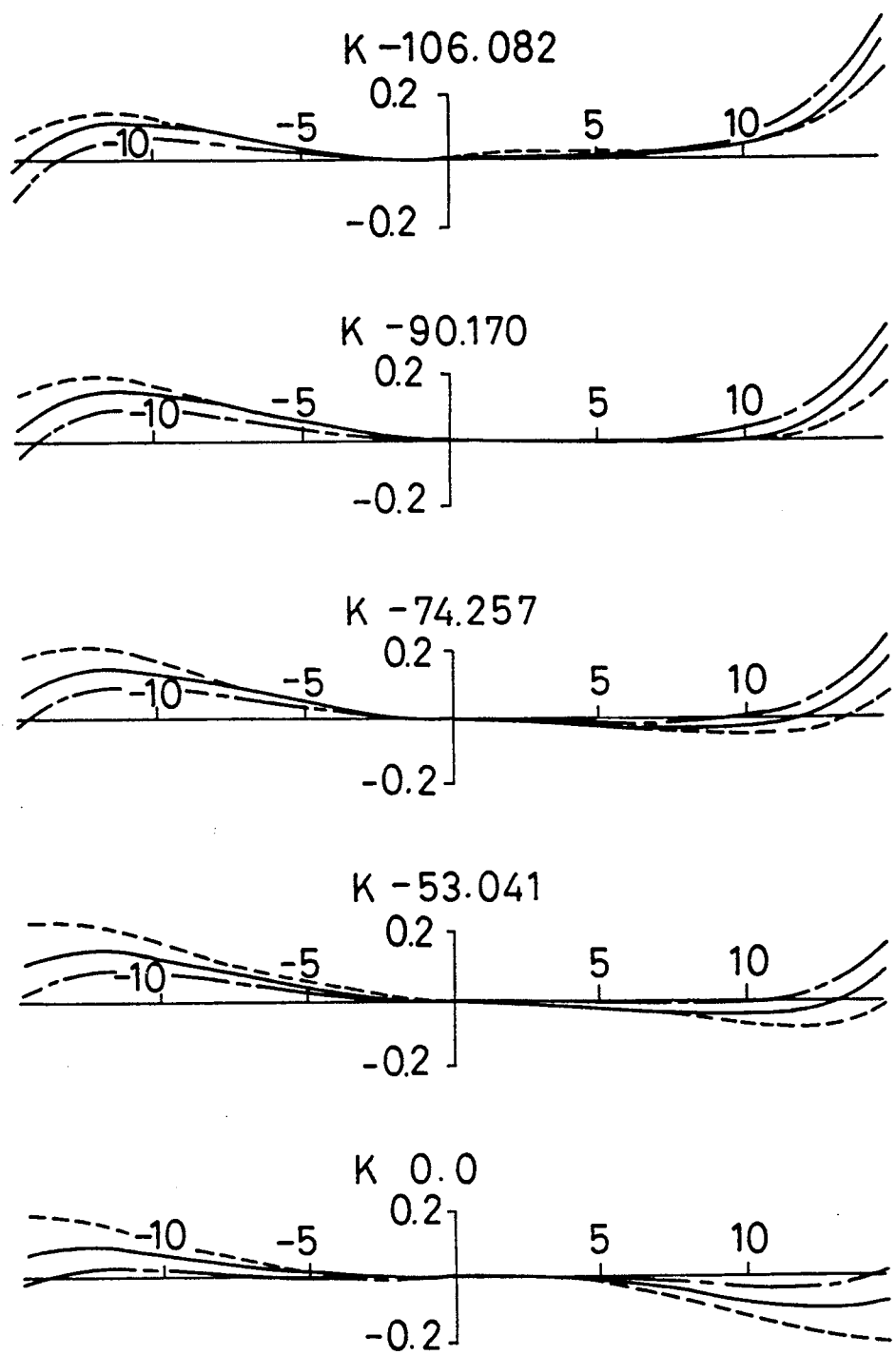

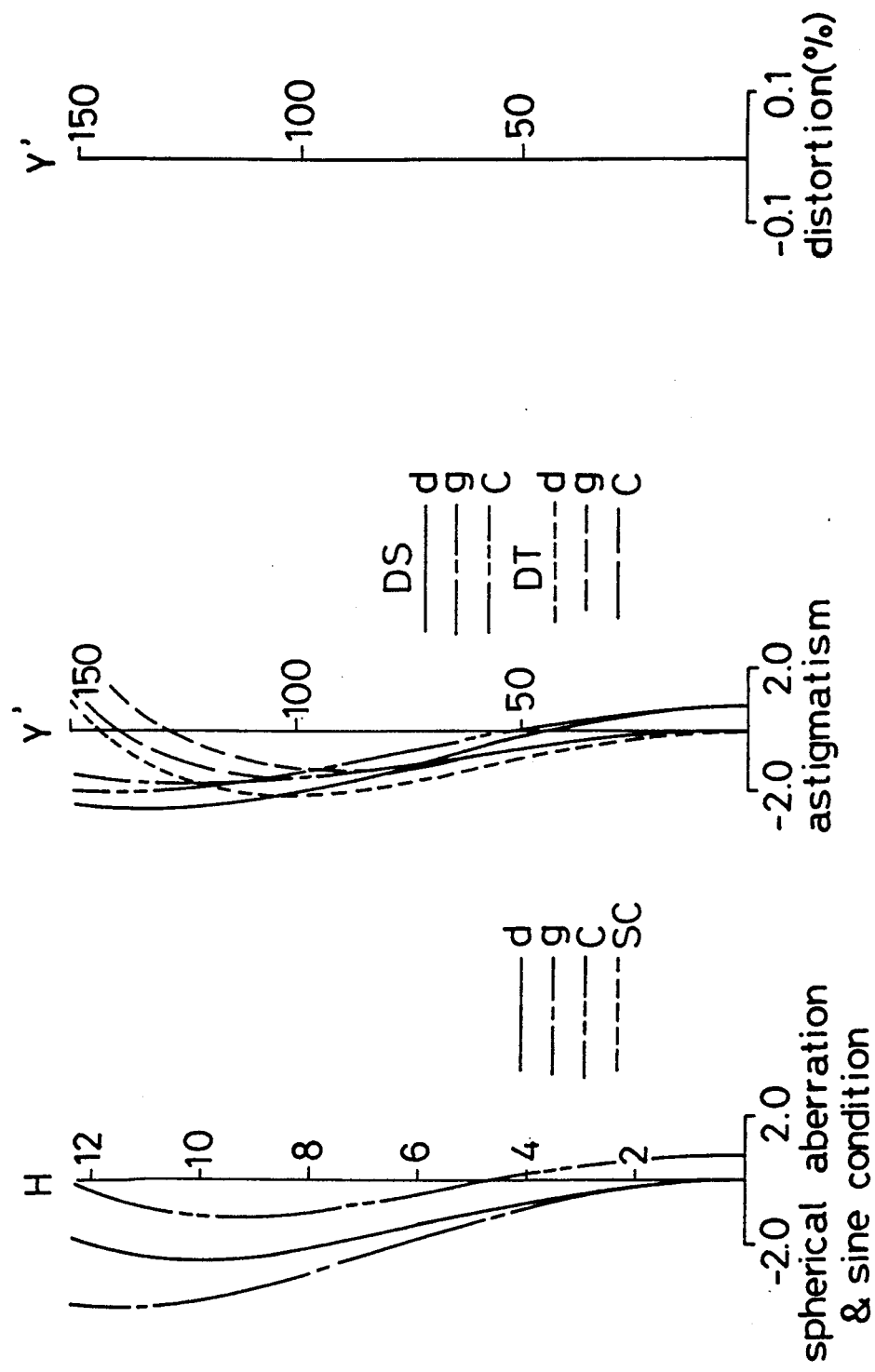

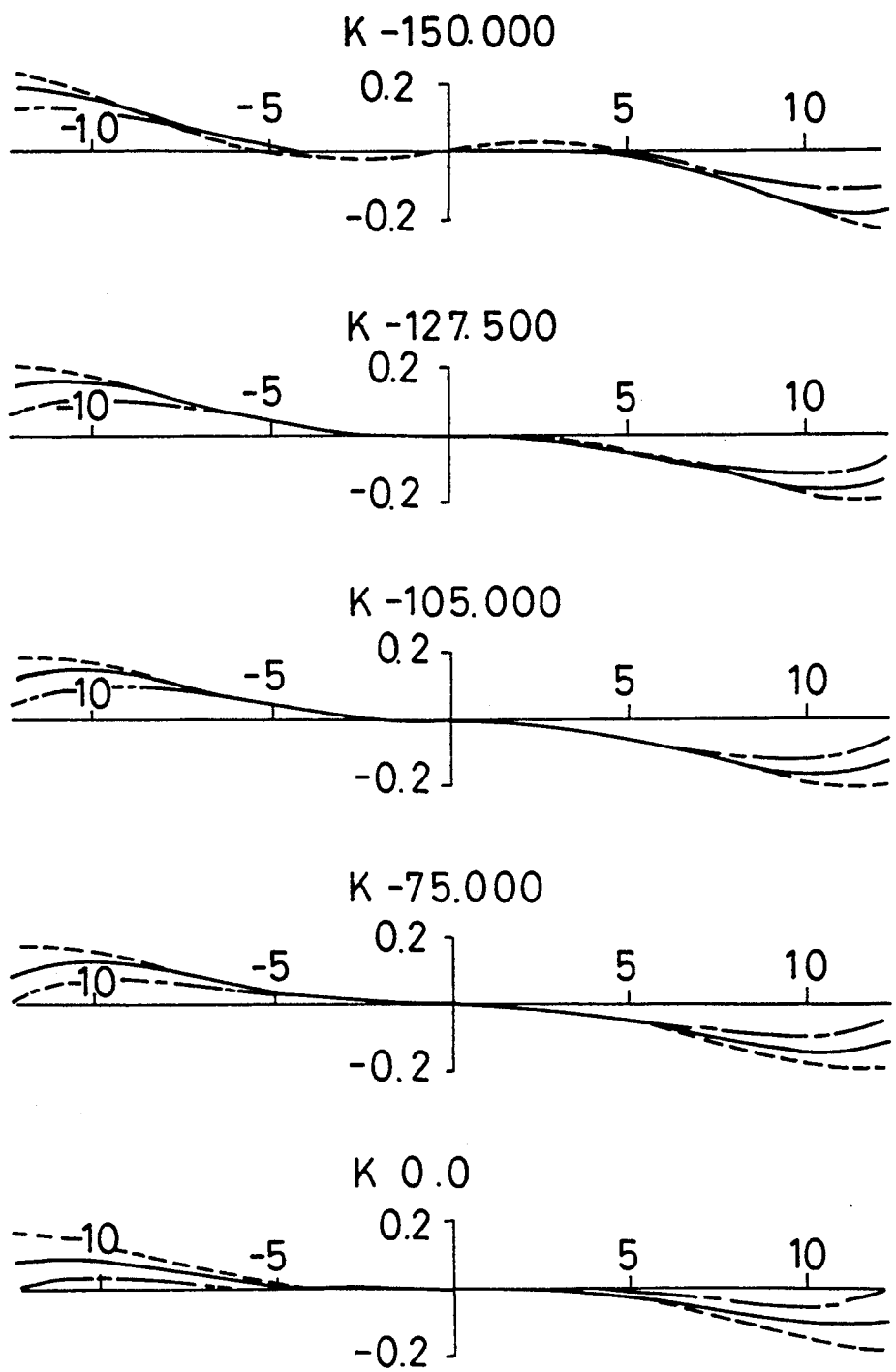

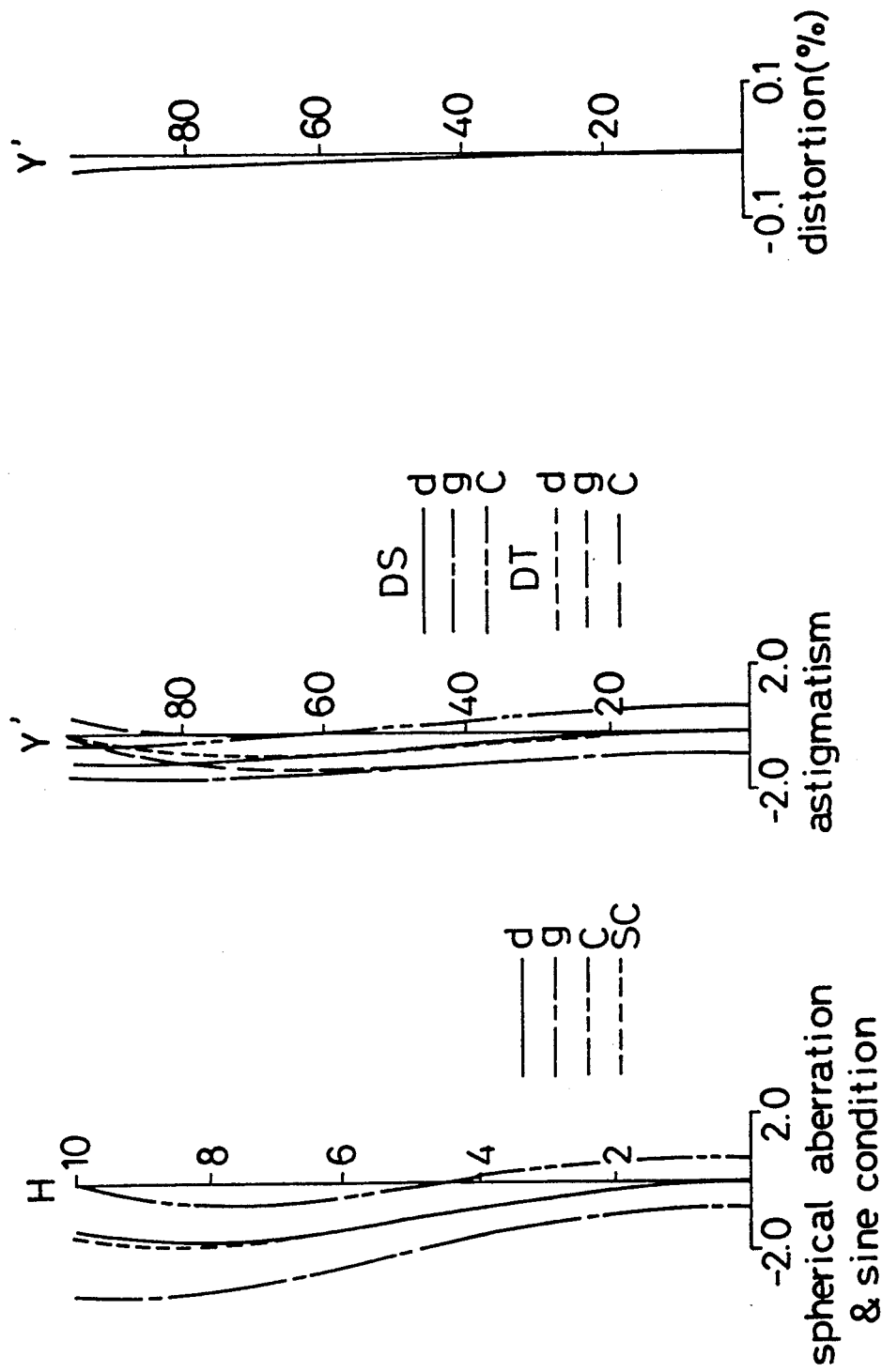

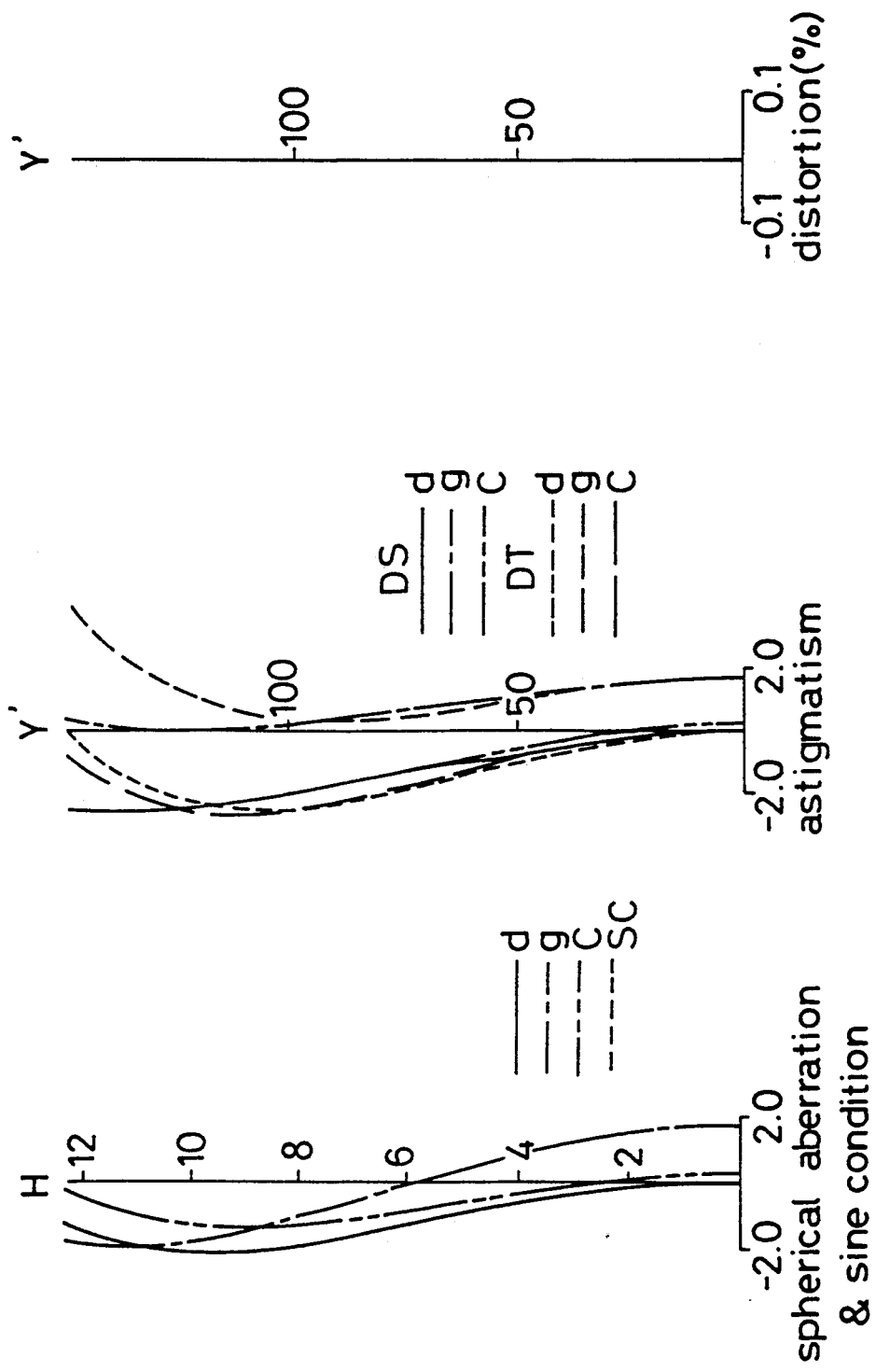

Fig.70B
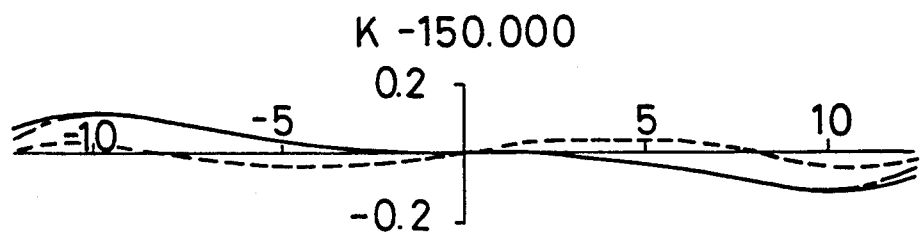
K -150.000
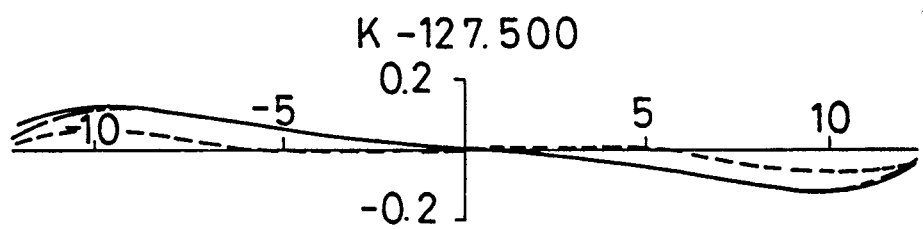
K -127.500
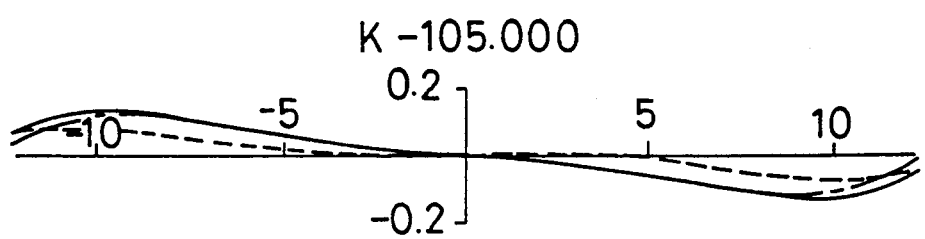
K -105.000
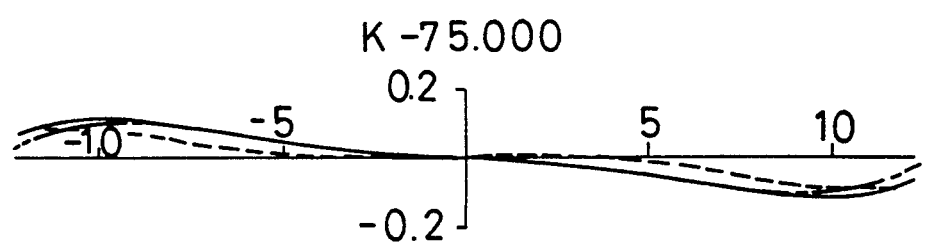
K -75.000
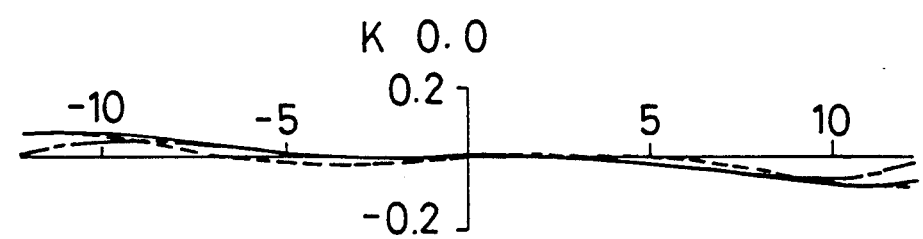
K 0.0

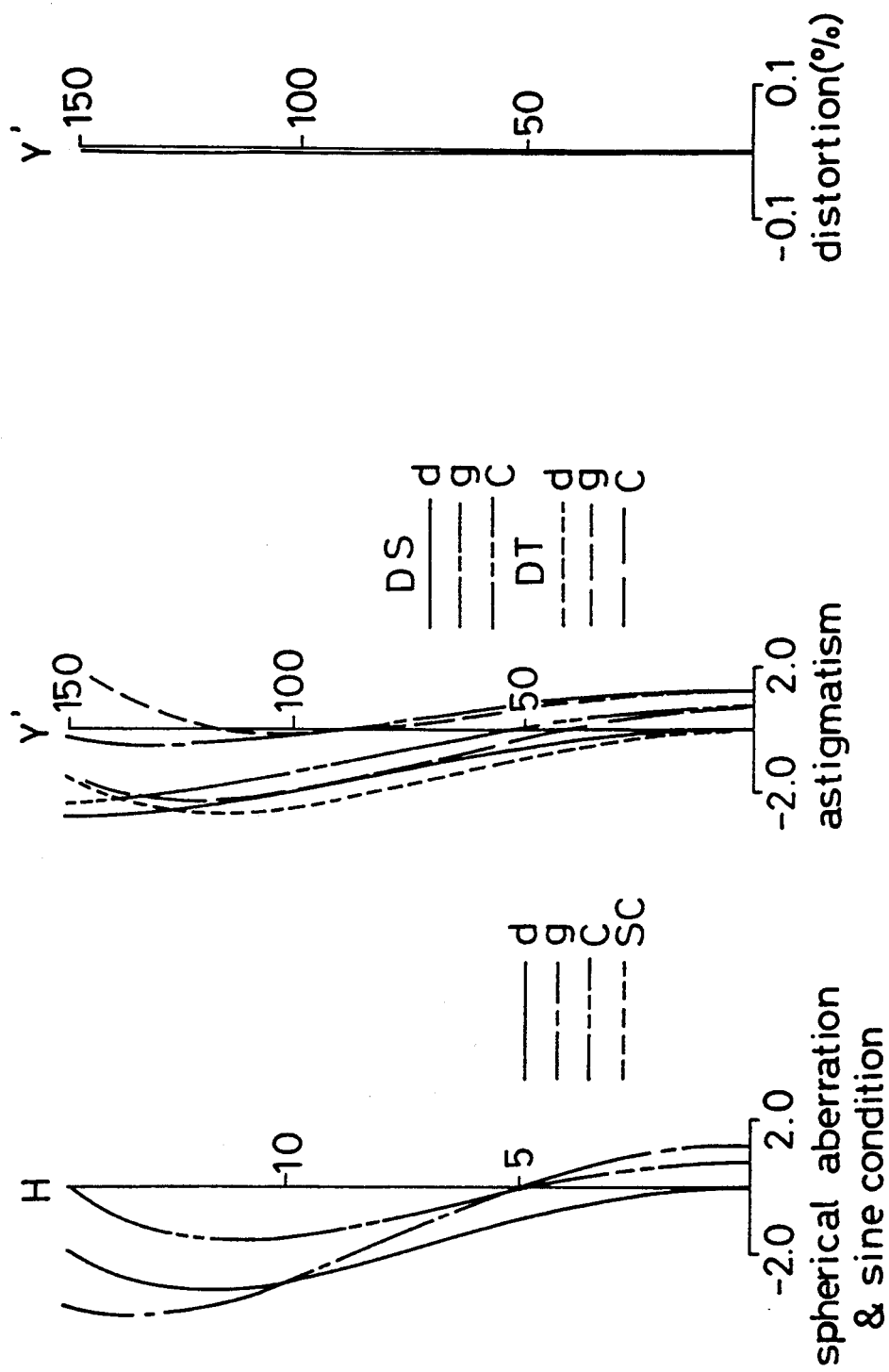

Fig.72B
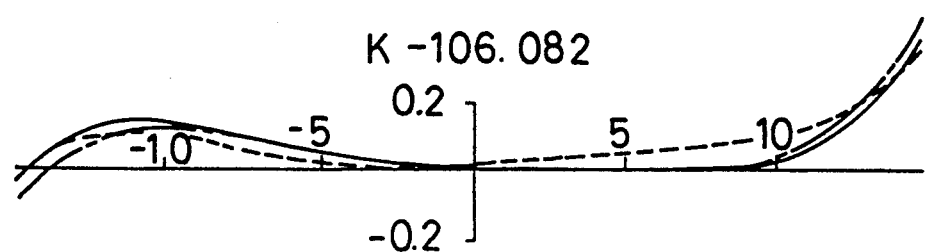
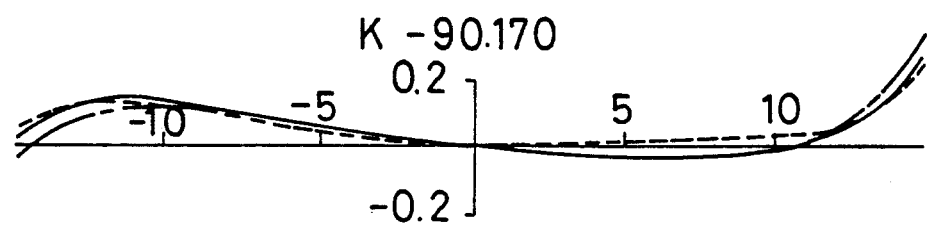
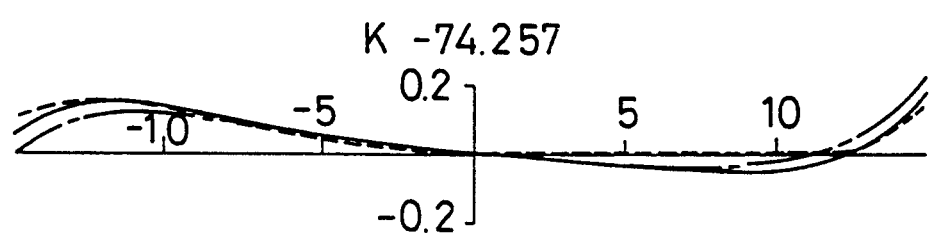
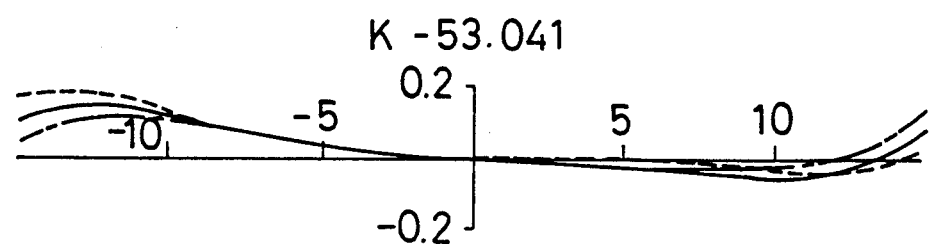
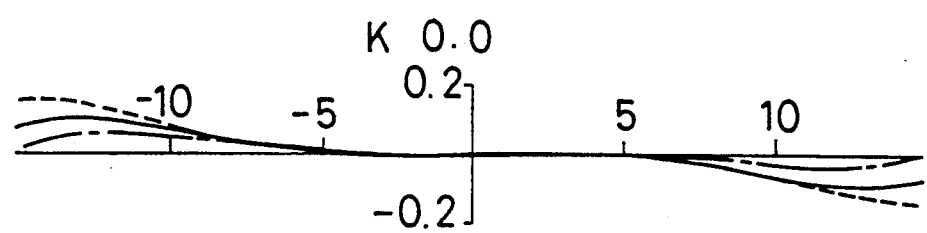

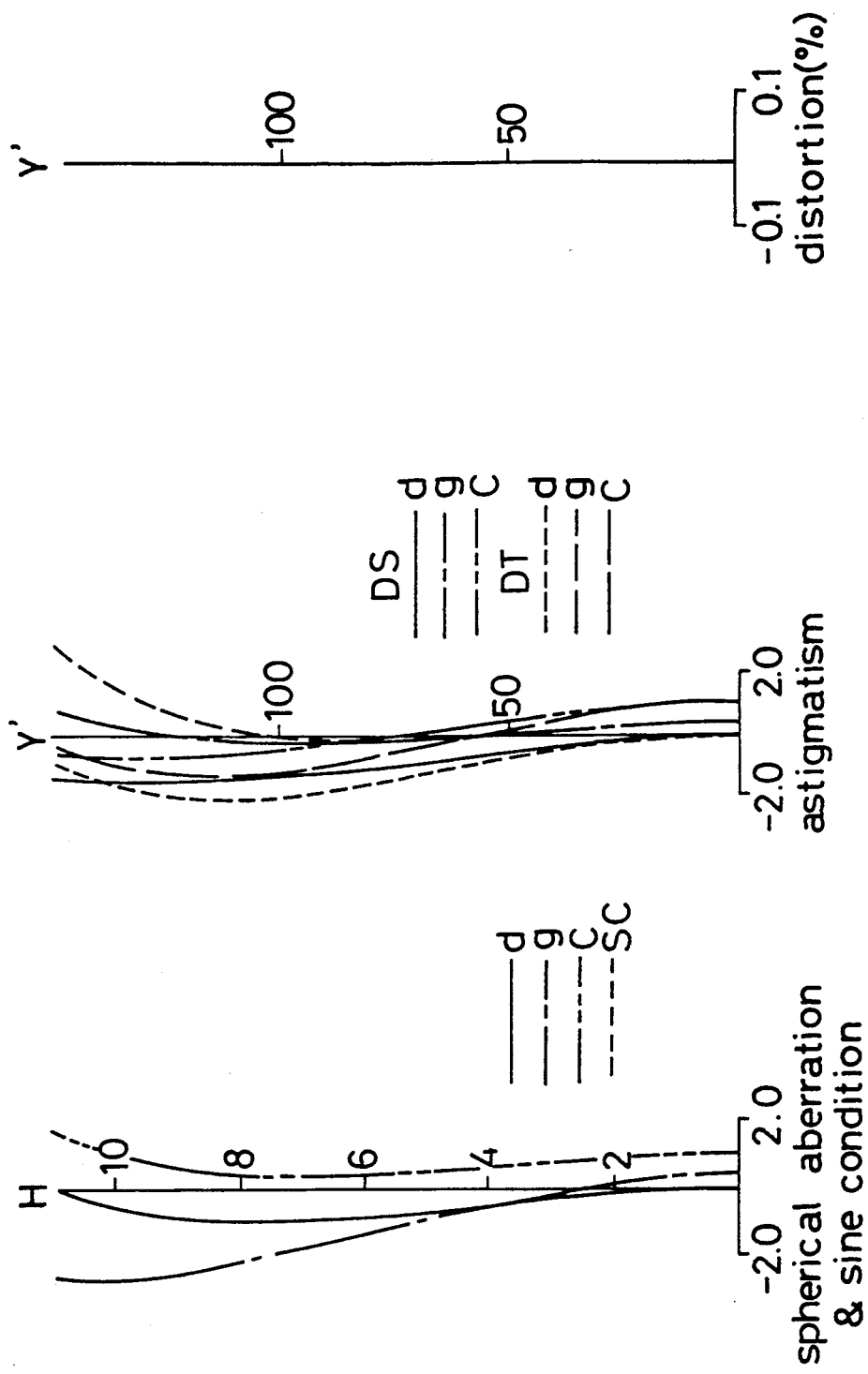

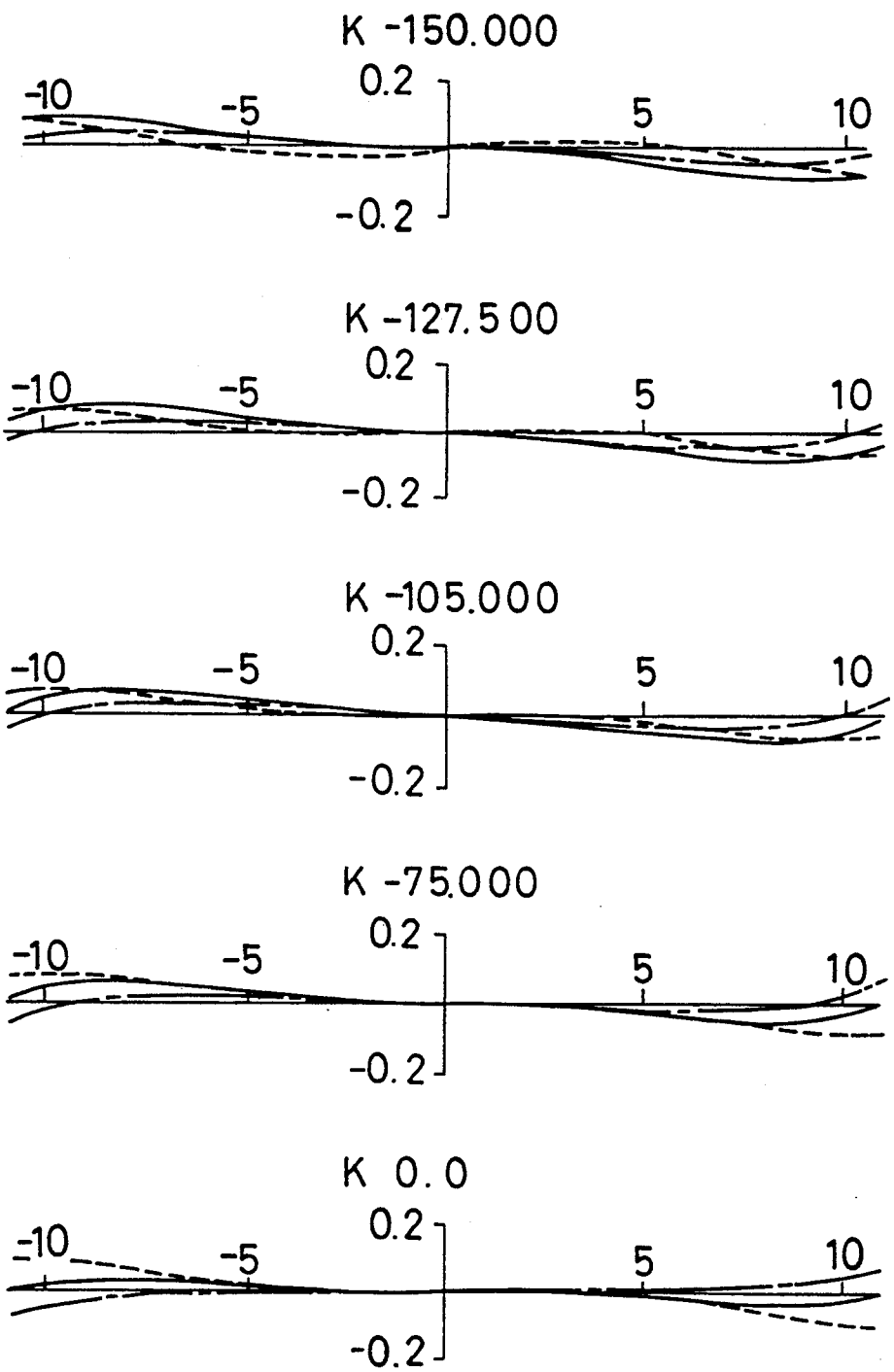

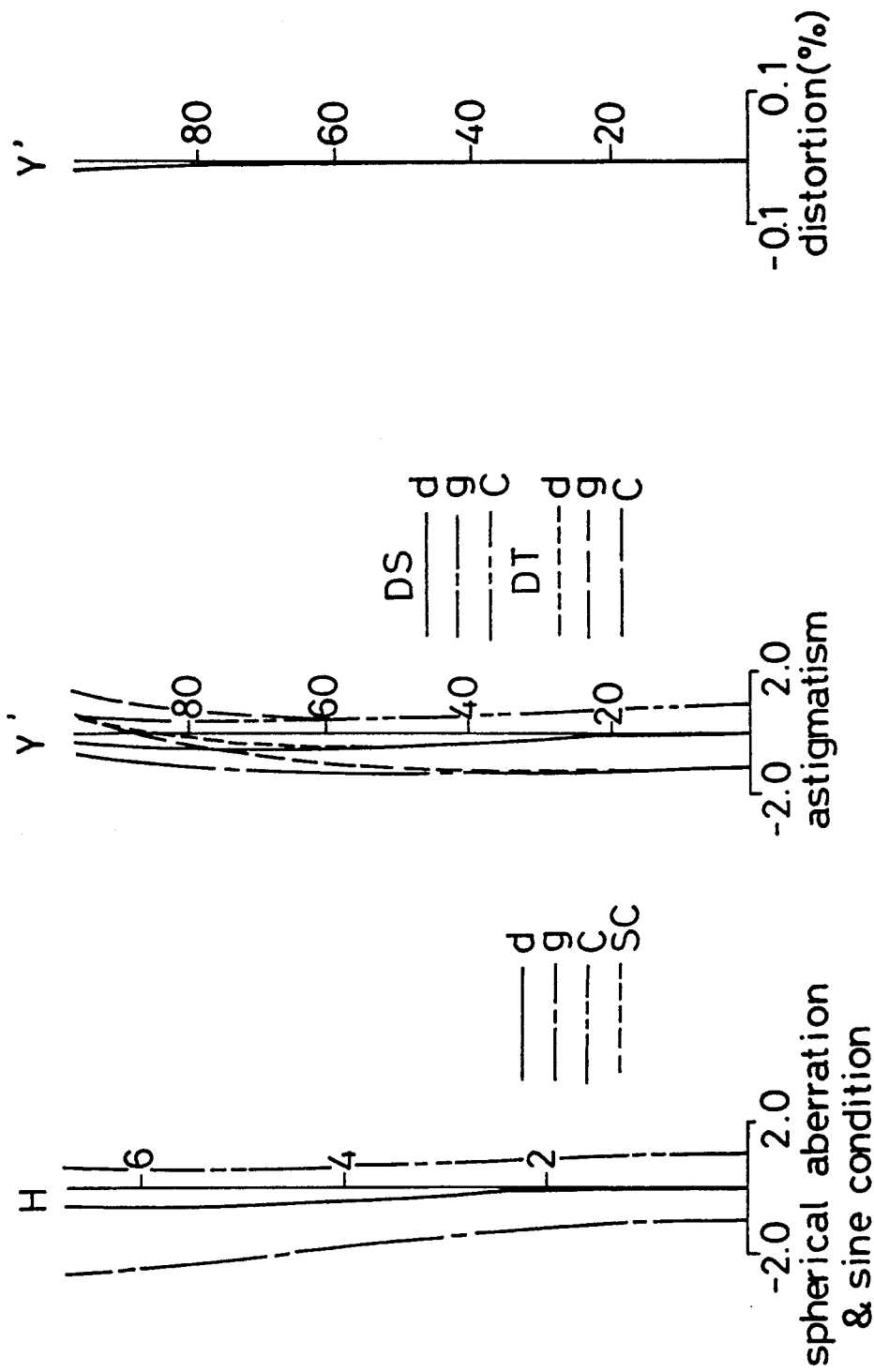

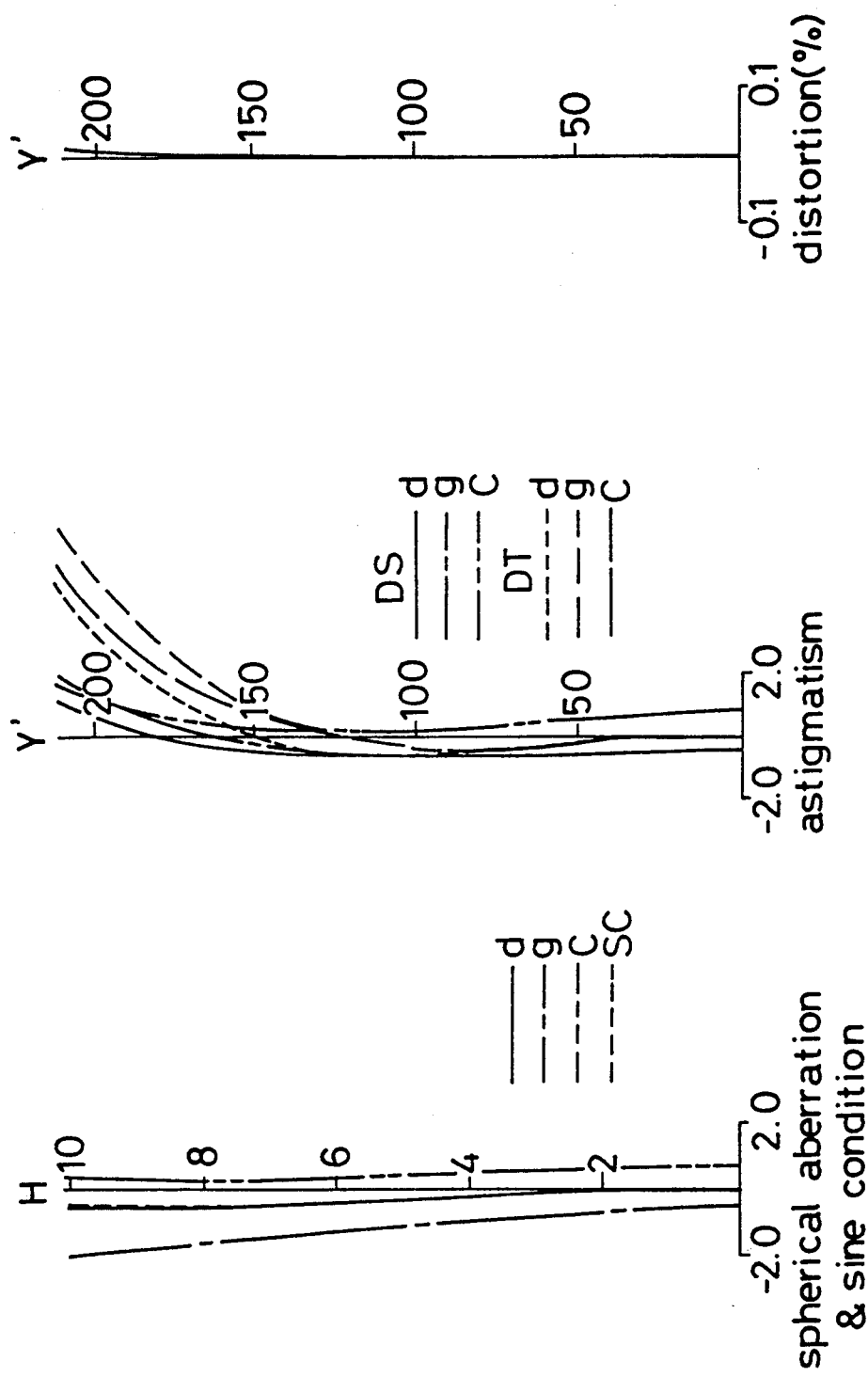

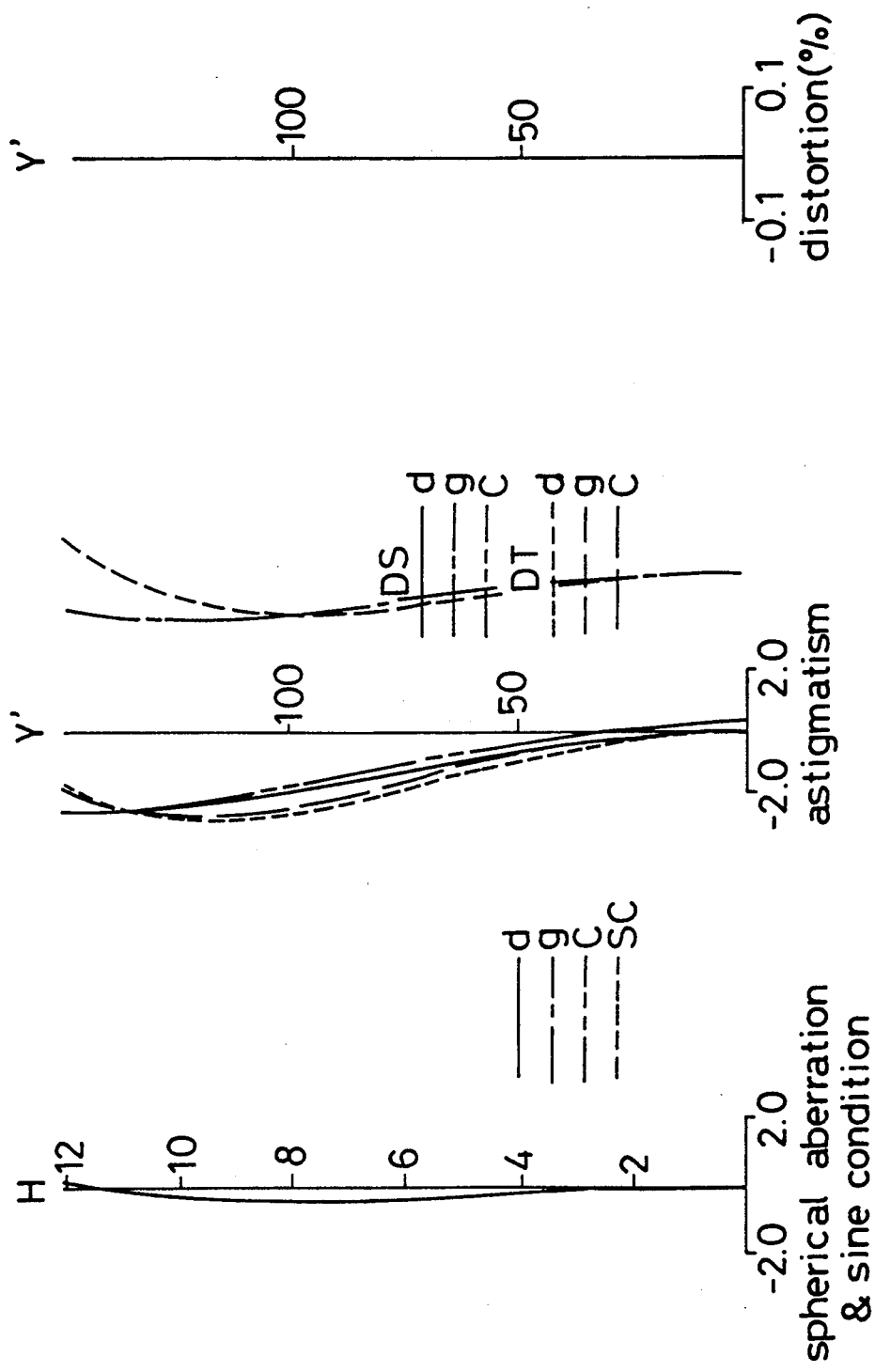

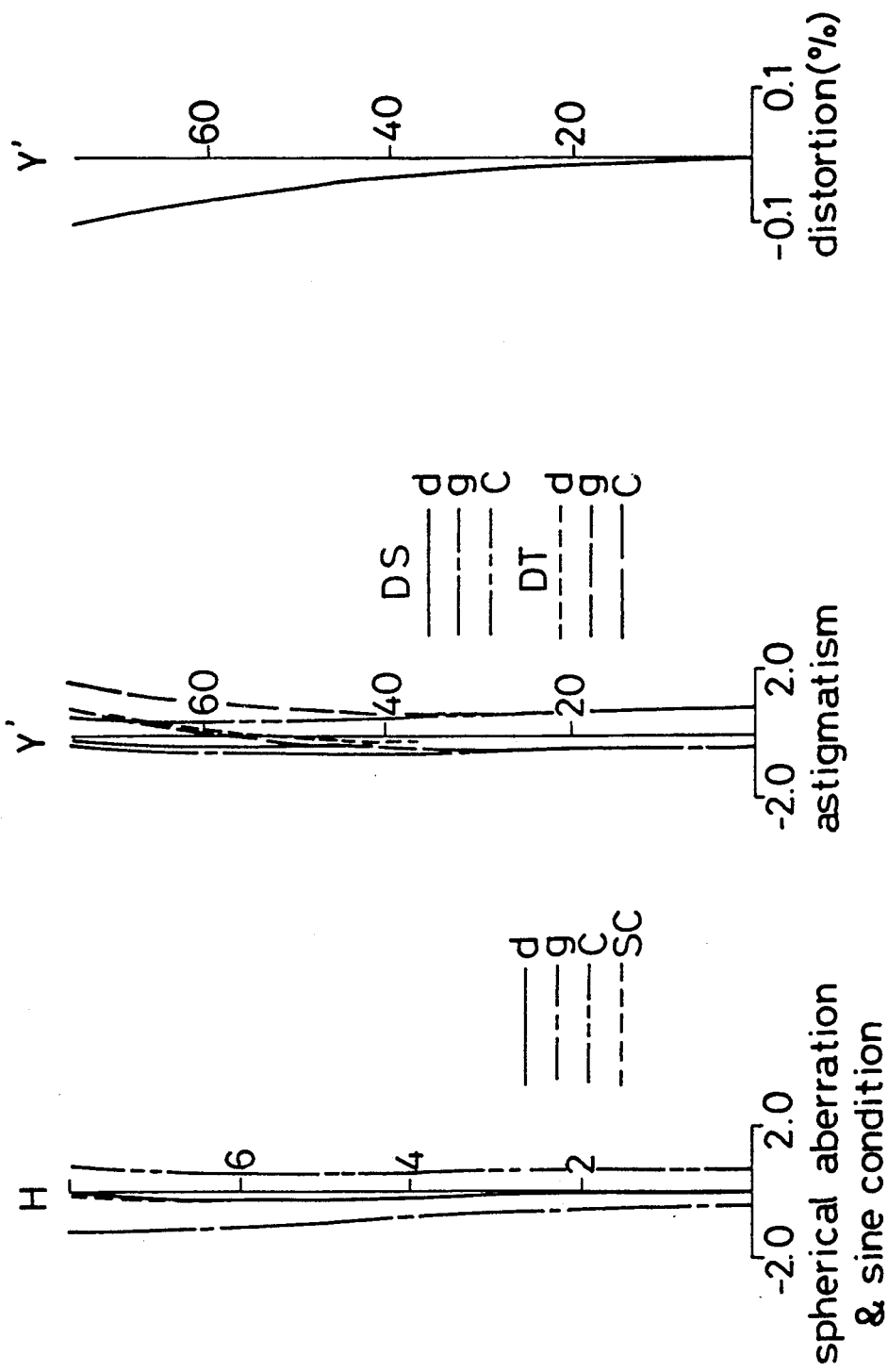

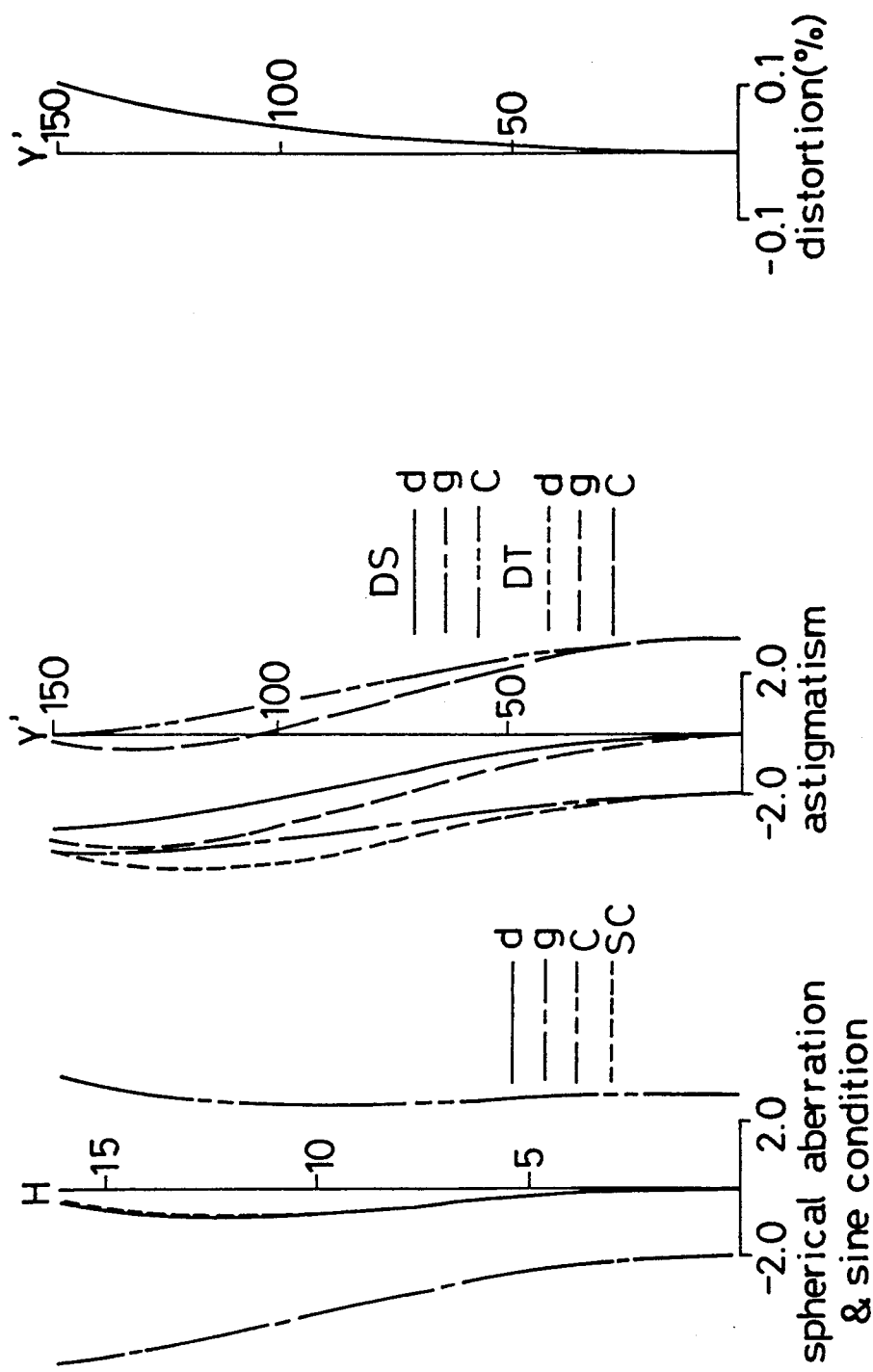

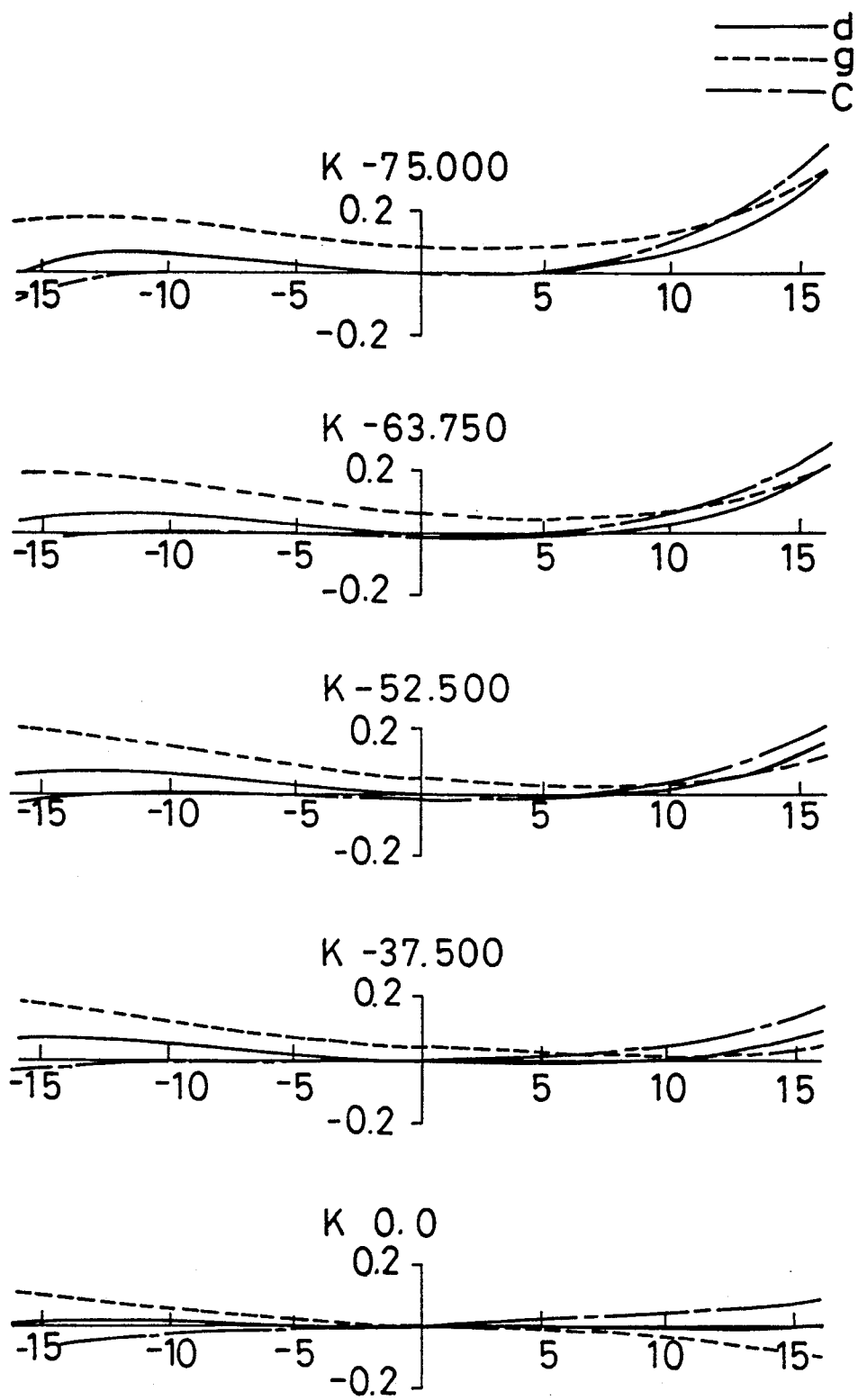

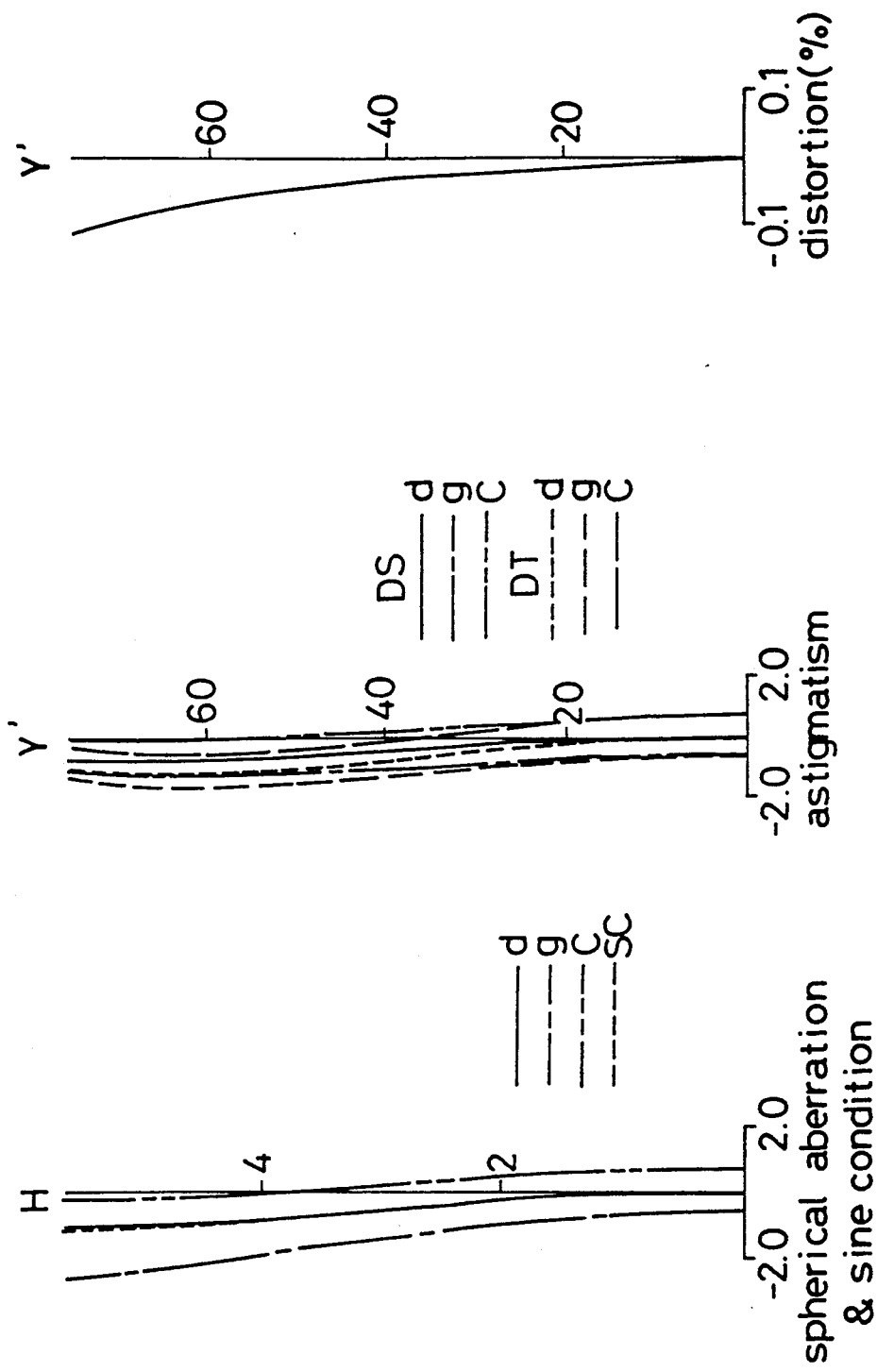

Fig. 83B
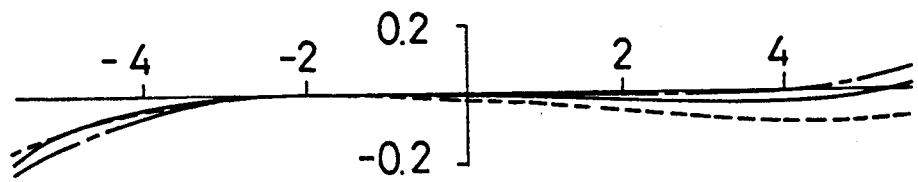
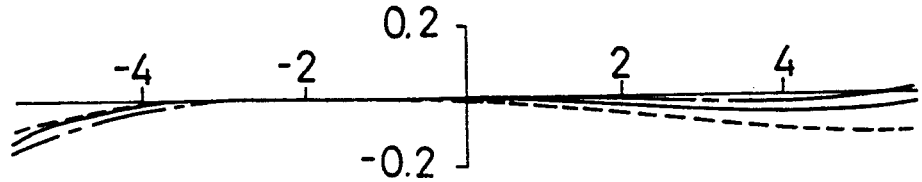
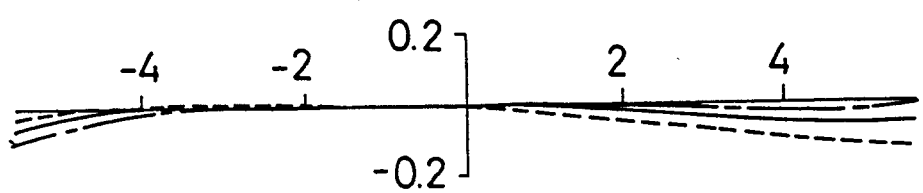
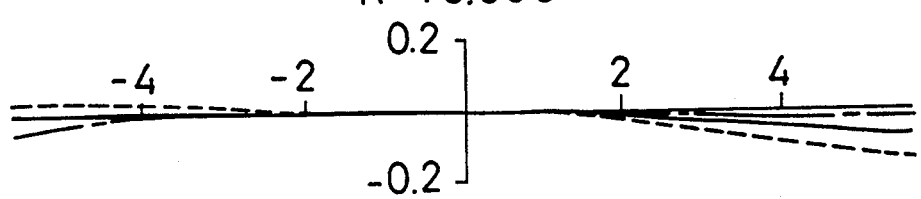
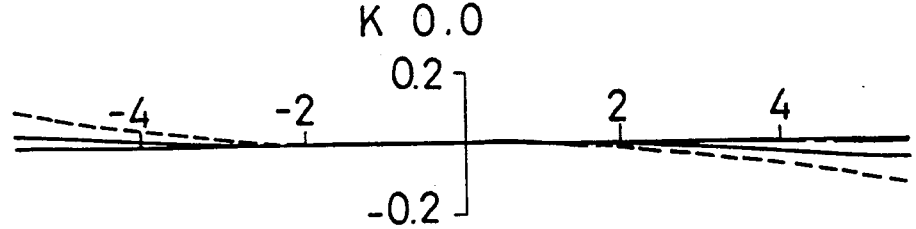

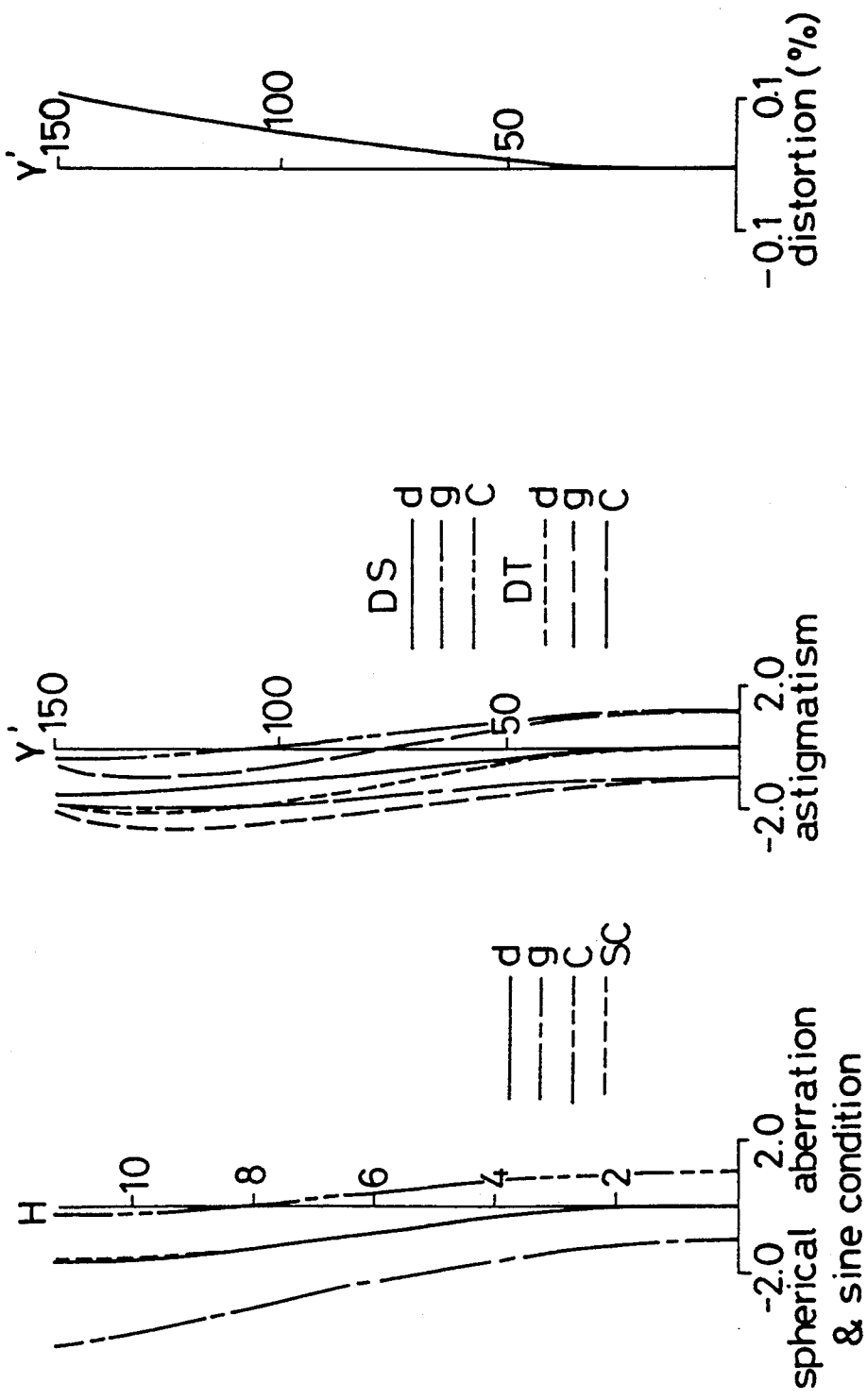

ZOOM LENS SYSTEM FOR USE IN COPYING APPARATUS

BACKGROUND OF THE INVENTION

1. Field of the Invention

The present invention relates to a zoom lens system, and more particularly, to a zoom lens system, for use in a copying apparatus, where zooming is performed with a constant conjugate distance.

2. Description of the Prior Art

In a conventionally-used copying apparatus, in order to vary the magnification, the conjugate distance is varied by moving a mirror as a projecting lens moves. For such a copying apparatus, since the mirror is moved in order to vary the conjugate distance, a mechanism for moving the mirror is required. For this reason, the copying apparatus is disadvantageous in reducing size and cost.

In resent years, zoom lens systems have been proposed which are used for varying the magnification in a copying apparatus.

For example, Japanese laid-open Patent Application No. S59-67512 discloses an orthometa-type zoom lens system for use in a copying apparatus which lens system is arranged symmetrically with respect to an aperture stop and includes six lens elements grouped into four units. In the lens system, the most object side lens element and the most image side lens element are negative lenses. The half view angle thereof is 14° to 18°.

U.S. Pat. No. 4,813,773 discloses a zoom lens system for use in a copying apparatus which lens system is arranged symmetrically with respect to an aperture stop and includes four lens elements grouped into four units. In the lens system, the most object side lens element and the most image side lens element are negative lenses. The half view angle thereof is 17° to 21°.

SUMMARY OF THE INVENTION

A principal object of the present invention is to provide a zoom lens system where aberrations are excellently corrected in a larger zoom range compared to conventional zoom lens systems.

Another object of the present invention is to provide a zoom lens system where aberrations are excellently corrected at a wider angle of view compared to conventional zoom lens systems.

Still another object of the present invention is to provide a compacter zoom lens system.

BRIEF DESCRIPTION OF THE DRAWINGS

These and other objects and features of this invention will become clear from the following description taken in conjunction with the preferred embodiments with reference to the accompanied drawings in which:

FIGS. 6A and 6B are graphic representations of spherical aberration, astigmatism, distortion and lateral aberration of the first embodiment at a magnification smaller than unity;

FIGS. 8A and 8B are graphic representations of spherical aberration, astigmatism, distortion and lateral aberration of the second embodiment at unity magnification;

FIGS. 9A and 9B are graphic representations of spherical aberration, astigmatism, distortion and lateral aberration of the second embodiment at a magnification larger than unity;

FIGS. 10A and 10B are graphic representations of spherical aberration, astigmatism, distortion and lateral aberration of the second embodiment at a magnification smaller than unity;

FIGS. 14A and 14B are graphic representations of spherical aberration, astigmatism, distortion and lateral aberration of the third embodiment at a magnification smaller than unity;

FIGS. 16A and 16B are graphic representations of spherical aberration, astigmatism, distortion and lateral aberration of the fourth embodiment at unity magnification;

FIGS. 32A and 32B are graphic representations of spherical aberration, astigmatism, distortion and lateral aberration of the seventh embodiment at a magnification smaller than unity;

FIGS. 35A and 35B are graphic representations of spherical aberration, astigmatism, distortion and lateral aberration of the eighth embodiment at a magnification larger than unity;

FIGS. 38A and 38B are graphic representations of spherical aberration, astigmatism, distortion and lateral aberration of the ninth embodiment at unity magnification;

FIGS. 39A and 39B are graphic representations of spherical aberration, astigmatism, distortion and lateral aberration of the ninth embodiment at a magnification larger than unity;

FIGS. 40A and 40B are graphic representations of spherical aberration, astigmatism, distortion and lateral aberration of the ninth embodiment at a magnification smaller than unity;

FIGS. 42A and 42B are graphic representations of spherical aberration, astigmatism, distortion and lateral aberration of the tenth embodiment at unity magnification;

FIGS. 43A and 43B are graphic representations of spherical aberration, astigmatism, distortion and lateral aberration of the tenth embodiment at a magnification larger than unity;

FIGS. 44A and 44B are graphic representations of spherical aberration, astigmatism, distortion and lateral aberration of the tenth embodiment at a magnification smaller than unity;

FIGS. 46A and 46B are graphic representations of spherical aberration, astigmatism, distortion and lateral aberration of the eleventh embodiment at unity magnification;

FIGS. 47A and 47B are graphic representations of spherical aberration, astigmatism, distortion and lateral aberration of the eleventh embodiment at a magnification larger than unity;

FIGS. 48A and 48B are graphic representations of spherical aberration, astigmatism, distortion and lateral aberration of the eleventh embodiment at a magnification smaller than unity;

FIGS. 50A and 50B are graphic representations of spherical aberration, astigmatism, distortion and lateral aberration of the twelfth embodiment at unity magnification;

FIGS. 51A and 51B are graphic representations of spherical aberration, astigmatism, distortion and lateral aberration of the twelfth embodiment at a magnification larger than unity;

FIGS. 52A and 52B are graphic representations of spherical aberration, astigmatism, distortion and lateral aberration of the twelfth embodiment at a magnification smaller than unity;

FIGS. 55A and 55B are graphic representations of spherical aberration, astigmatism, distortion and lateral aberration of the thirteenth embodiment at a magnification larger than unity;

FIGS. 56A and 56B are graphic representations of spherical aberration, astigmatism, distortion and lateral aberration of the thirteenth embodiment at a magnification smaller than unity;

FIGS. 59A and 59B are graphic representations of spherical aberration, astigmatism, distortion and lateral aberration of the fourteenth embodiment at a magnification larger than unity;

FIGS. 60A and 60B are graphic representations of spherical aberration, astigmatism, distortion and lateral aberration of the fourteenth embodiment at a magnification smaller than unity;

FIGS. 62A and 62B are graphic representations of spherical aberration, astigmatism, distortion and lateral aberration of the fifteenth embodiment at unity magnification;

FIGS. 63A and 63B are graphic representations of spherical aberration, astigmatism, distortion and lateral aberration of the fifteenth embodiment at a magnification larger than unity;

FIGS. 64A and 64B are graphic representations of spherical aberration, astigmatism, distortion and lateral aberration of the fifteenth embodiment at a magnification smaller than unity;

FIGS. 66A and 66B are graphic representations of spherical aberration, astigmatism, distortion and lateral aberration of the sixteenth embodiment at unity magnification;

FIGS. 67A and 67B are graphic representations of spherical aberration, astigmatism, distortion and lateral aberration of the sixteenth embodiment at a magnification larger than unity;

FIGS. 70A and 70B are graphic representations of spherical aberration, astigmatism, distortion and lateral aberration of the seventeenth embodiment at unity magnification;

FIGS. 72A and 72B are graphic representations of spherical aberration, astigmatism, distortion and lateral aberration of the seventeenth embodiment at a magnification smaller than unity;

FIGS. 74A and 74B are graphic representations of spherical aberration, astigmatism, distortion and lateral aberration of the eighteenth embodiment at unity magnification;

FIGS. 75A and 75B are graphic representations of spherical aberration, astigmatism, distortion and lateral aberration of the eighteenth embodiment at a magnifications larger than unity;

FIGS. 76A and 76B are graphic representations of spherical aberration, astigmatism, distortion and lateral aberration of the eighteenth embodiment at a magnification smaller than unity;

FIGS. 78A and 78B are graphic representations of spherical aberration, astigmatism, distortion and lateral aberration of the nineteenth embodiment at unity magnification;

FIGS. 79A and 79B are graphic representations of spherical aberration, astigmatism, distortion and lateral aberration of the nineteenth embodiment at a magnification larger than unity;

FIGS. 80A and 80B are graphic representations of spherical aberration, astigmatism, distortion and lateral aberration of the nineteenth embodiment at a magnification smaller than unity;

FIGS. 83A and 83B are graphic representations of spherical aberration, astigmatism, distortion and lateral aberration of the twentieth embodiment at a magnification larger than unity; and FIGS. 84A and 84B are graphic representations of spherical aberration, astigmatism, distortion and lateral aberration of the twentieth embodiment at a magnification smaller than unity.

DESCRIPTION OF THE PREFERRED EMBODIMENTS

Embodiments of the present invention will hereinafter be described with reference to the drawings.

Figure 1:
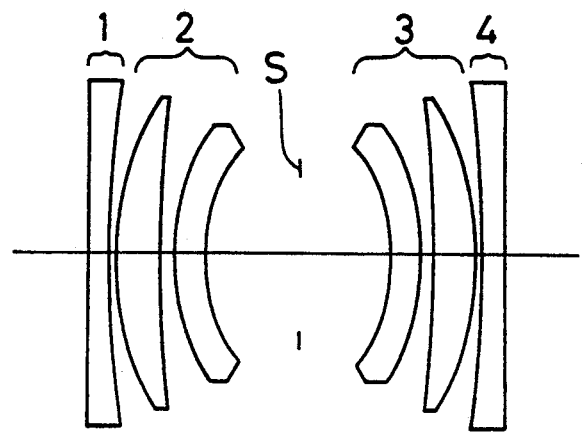
FIG. 1 is a cross-sectional view of the lens arrangement of a zoom lens system according to a first implementation of the present invention.
Figure 2:
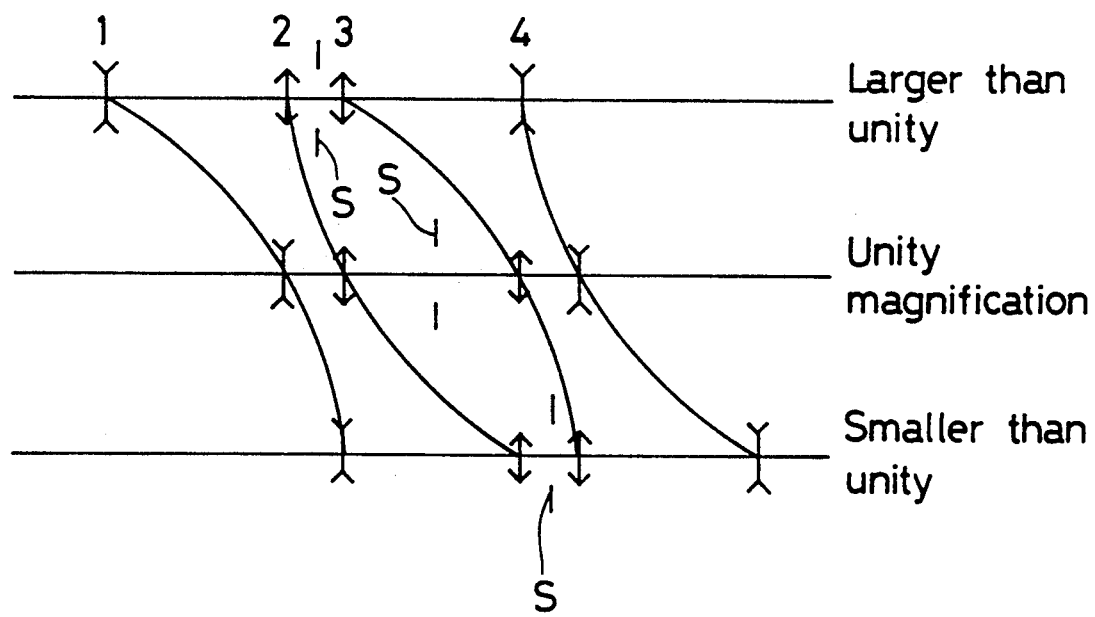
FIG. 2 is a diagram showing movements of lens units from a magnification larger than unity to a magnification smaller than unity.

As shown in FIG. 1, a first implementation of the present invention comprises from the object side: a first lens unit 1 including at least one lens element and having a negative overall focal length; a second lens unit 2 including a positive lens element and a negative meniscus lens element strongly concave to the aperture stop side and having a positive overall focal length; an aperture stop S; a third lens unit 3 arranged symmetrically with the second lens unit 2 with respect to the aperture stop S; and a fourth lens unit 4 arranged symmetrically with the first lens unit 1 with respect to the aperture stop S. In order to always maintain constant an object-image distance from a magnification larger than unity to a magnification smaller than unity regardless of magnification as shown in FIG. 2, the power of the lens system is minimum at unity magnification. Moreover, in order to provide a symmetrical configuration to the lens system during zooming, the second and the fourth lens units 2 and 4 are integrally moved by a same amount during zooming so that the total length of the lens system increases, and the aperture stop S is also moved so as to be located in the middle of the second and the third lens units 2 and 3.

Such an arrangement is advantageous in correcting distortion, magnification chromatic aberration and coma can be corrected while maintaining the symmetry of the entire lens system regardless of magnification.

Moreover, at unity magnification, the power of the entire lens system can be made minimum and the total length of the lens system can be made minimum by causing the distance between the first and the second lens units 1 and 2 and the distance between the third and the fourth lens units 3 and 4 to be minimum and by increasing the distance between the second and the third lens units 2 and 3.

According to the first implementation, a zoom lens system is symmetrically arranged, which is advantageous in performance as a limited distance zoom lens system including unity magnification. Moreover, in order to realize compactness, the zoom lens system is provided with four lens units of negative, positive, positive and negative configuration. Further, the zoom lens system can be arranged with six lens elements grouped into four units at a minimum, and since the second lens unit 2 of a positive power and the third lens unit 3 of a positive power are of Gaussian type, the power of each lens can be increased, so that a less lens movement amount is required during zooming.

In a Gaussian-type lens system which is of symmetrical configuration, it is easy to correct spherical aberration and chromatic aberration, and correction performance of spherical aberration and chromatic aberration barely deteriorates even if the power of each lens is increased in order to decrease the total length. This facilitates realization of a compact zoom lens system.

Moreover, with such an arrangement, a lens system is realized which has a total length Σd/f of approximately 0.3 and is as compact as a normal fixed focus lens system.

Further, the most object side and the most image side negative lens elements cause an off-axial light beam to be incident on the succeeding lens elements at a shallow angle. Because of this, variation in aberration caused by an angle of view of the lens system is decreased. For this reason, the arrangement is suitable for a wide-angle lens system.

Subsequently, specific embodiments according to the first implementation will be described with reference to the drawings.

Figure 3:
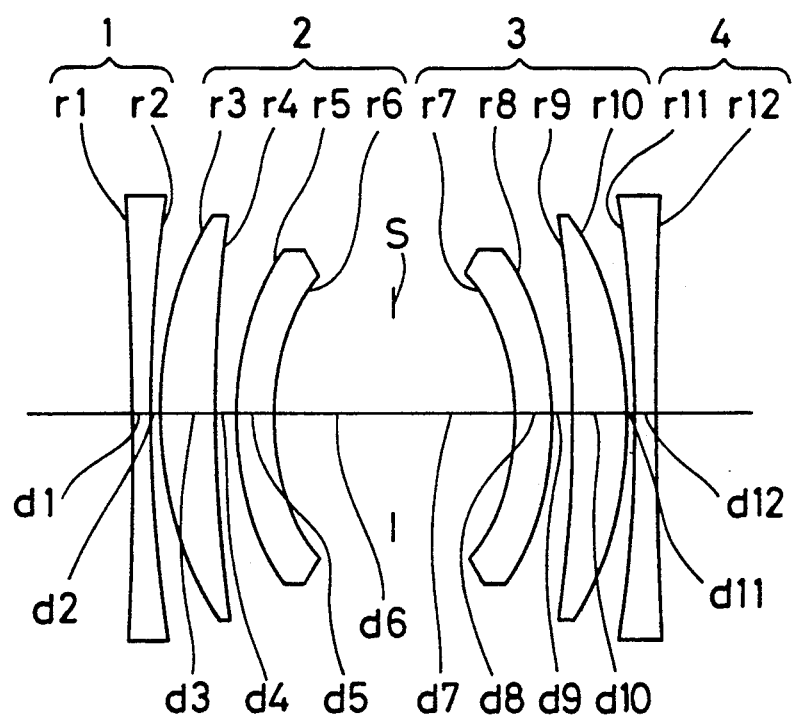
FIG. 3 is a cross-sectional view of the lens arrangement of a first embodiment of the present invention.
Figure 4A:
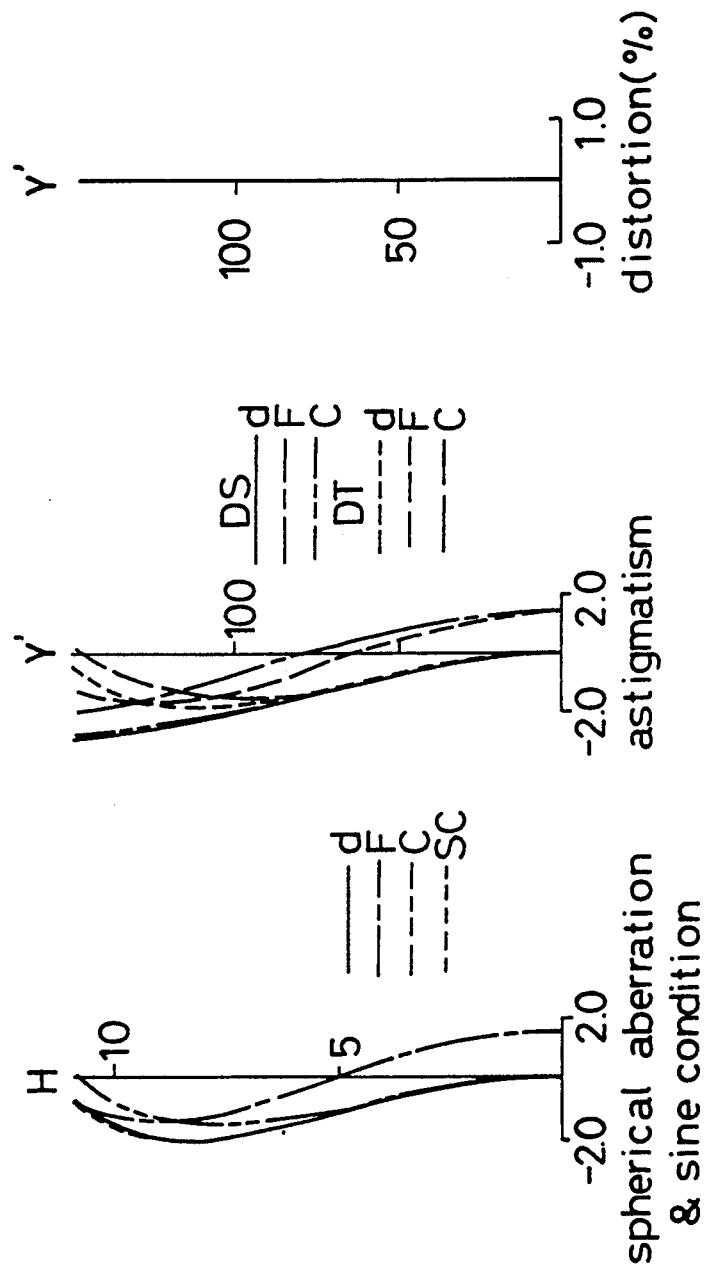
FIGS. 4A and 4B are graphic representations of spherical aberration, astigmatism, distortion and lateral aberration of the first embodiment at unity magnification.
Figure 4B:
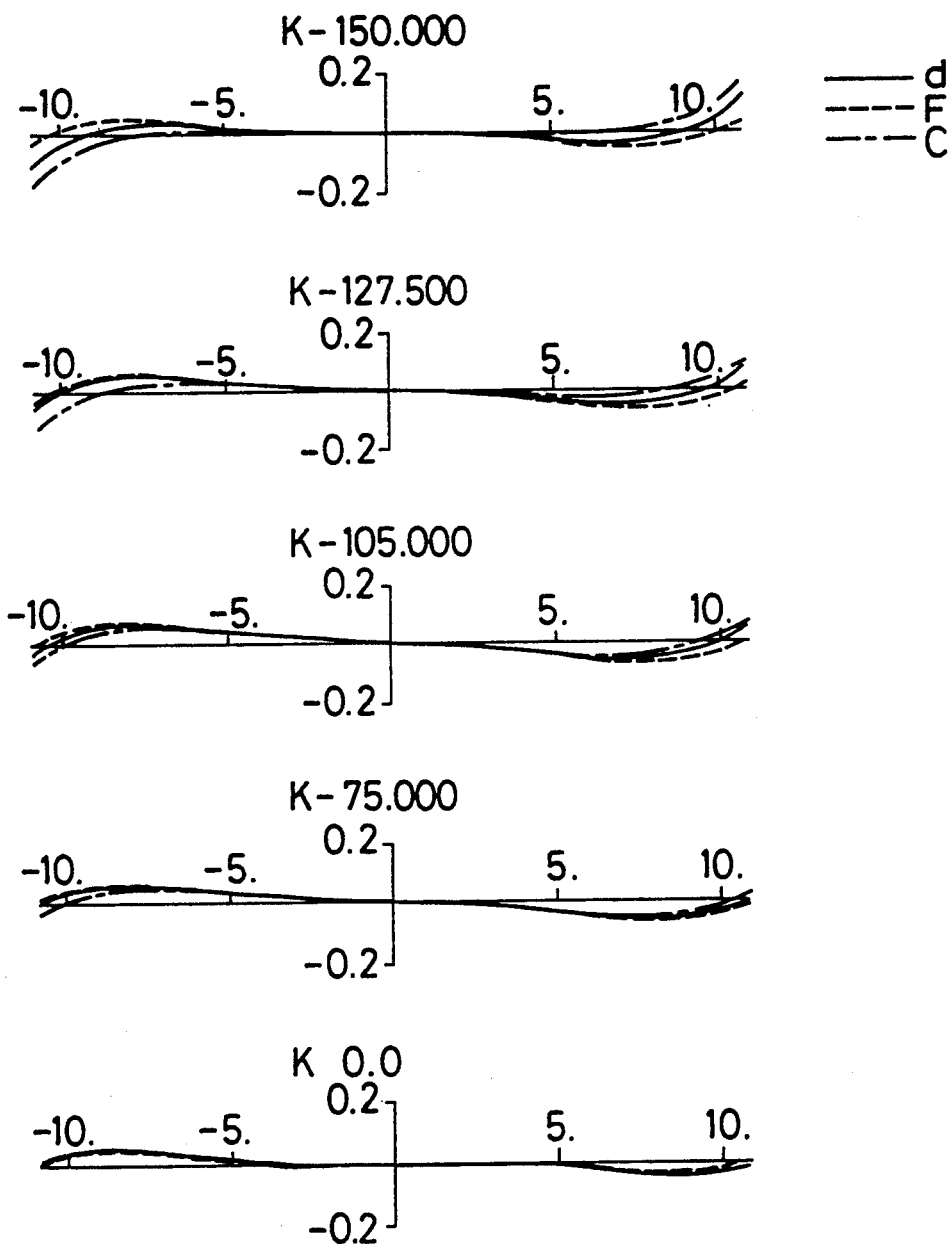
Figure 5A:
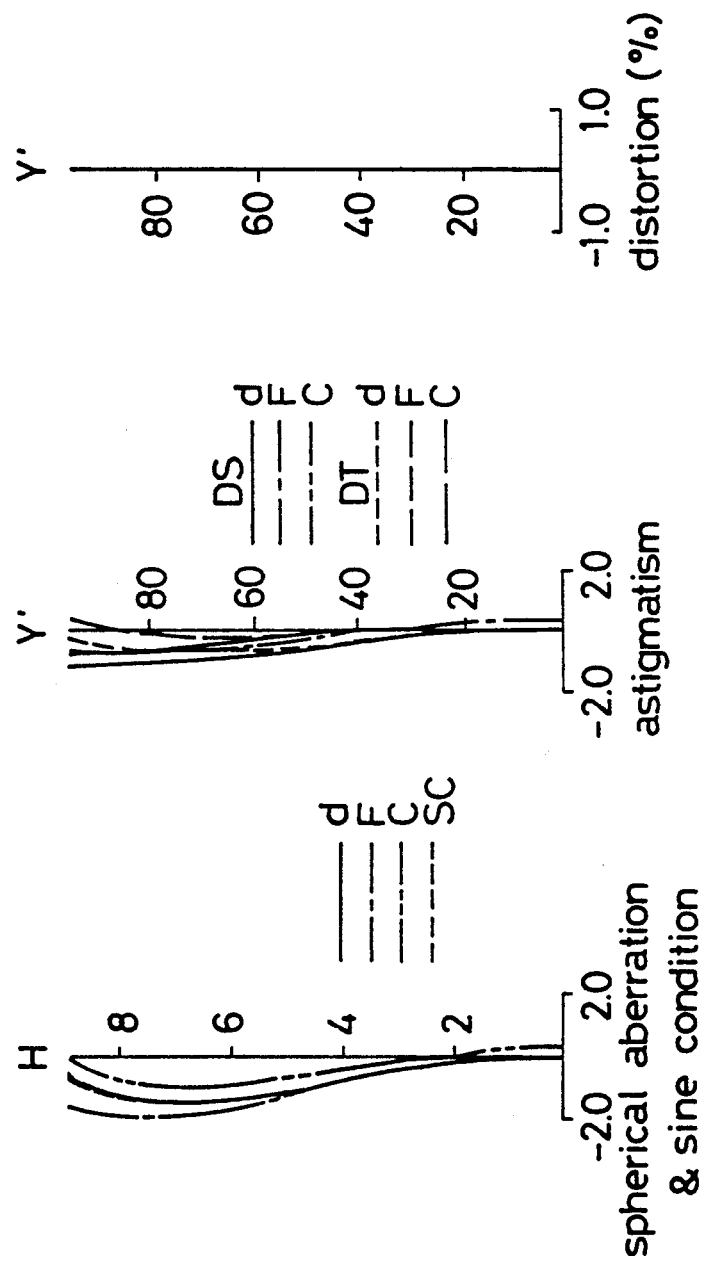
FIGS. 5A and 5B are graphic representations of spherical aberration, astigmatism, distortion and lateral aberration of the first embodiment at a magnification larger than unity.
Figure 5B:
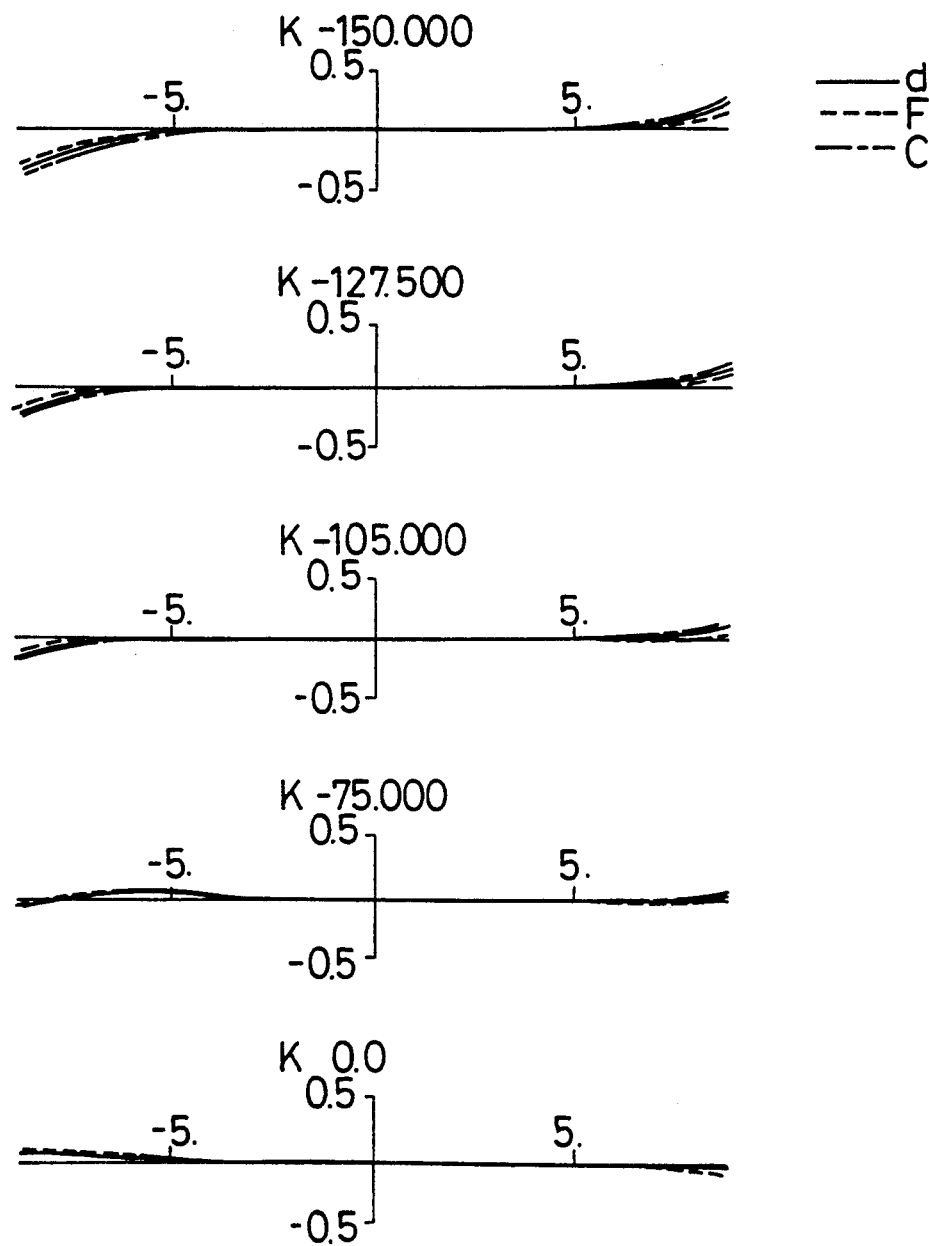
Figure 6B:
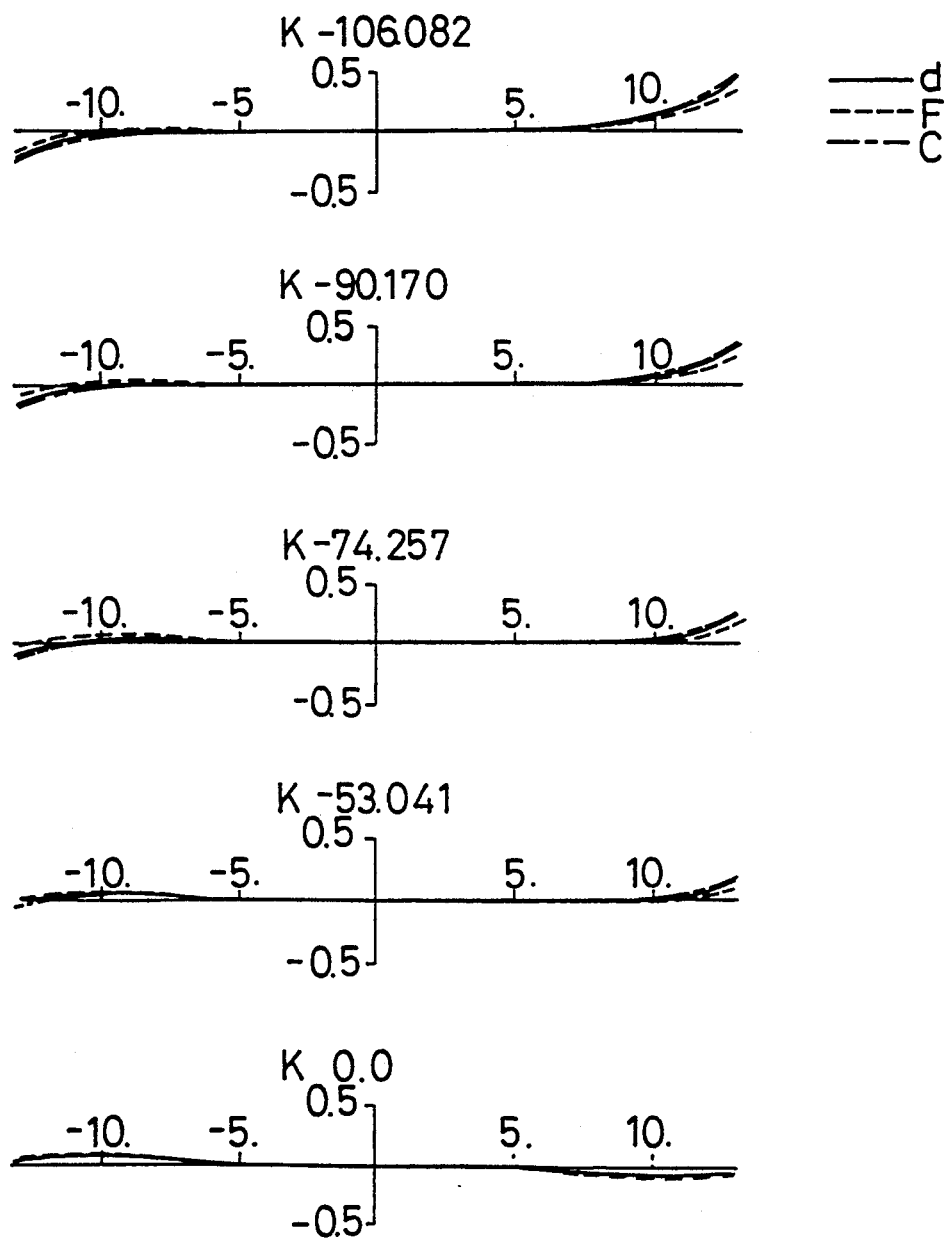

FIG. 3 is a cross-sectional view of the lens arrangement of a first embodiment of the present invention. The first embodiment comprises from the object side: a first lens unit 1 including a negative first lens element; a second lens unit 2 including a positive second lens element and a third lens element which is a negative meniscus lens element strongly concave to the aperture stop side and having a positive overall focal length; an aperture stop S; a third lens unit 3 arranged symmetrically with the second lens unit 2 with respect to the aperture stop S; and a fourth lens unit 4 arranged symmetrically with the first lens unit 1 with respect to the aperture stop S.

Table 1 shows data with respect to each surface of the first embodiment. In the table, $r_1$ to $r_{12}$ show radii of curvature, $d_1$ to $d_{12}$ show axial distances, $N_1$ to $N_6$ and $v_1$ to $v_6$ show refractive indices and Abbe numbers, to the d-line, of each surface, respectively. Axial distances $d_2$, $d_6$, $d_7$ and $d_{11}$ are variable during zooming. Values thereof at a magnification of $-1.414$, at unity magnification and a magnification of $-0.640$ are shown in Table 2.

FIGS. 4A and 4B to 6A and 6B show graphic representations of spherical aberration, astigmatism, distortion and lateral aberration of the first embodiment at unity magnification, at a magnification larger than unity and a magnification smaller than unity, respectively.

the first embodiment is a compact zoom lens system for use in a copying apparatus which lens system includes six lens elements grouped into four units. Moreover, in the zoom lens system, aberrations are excellently corrected at each magnification at a wide angle of view, and a focal length can be reduced. Thereby, an optical system for use in a copying apparatus can be reduced in size, and a large zoom ratio is available.

Figure 7:
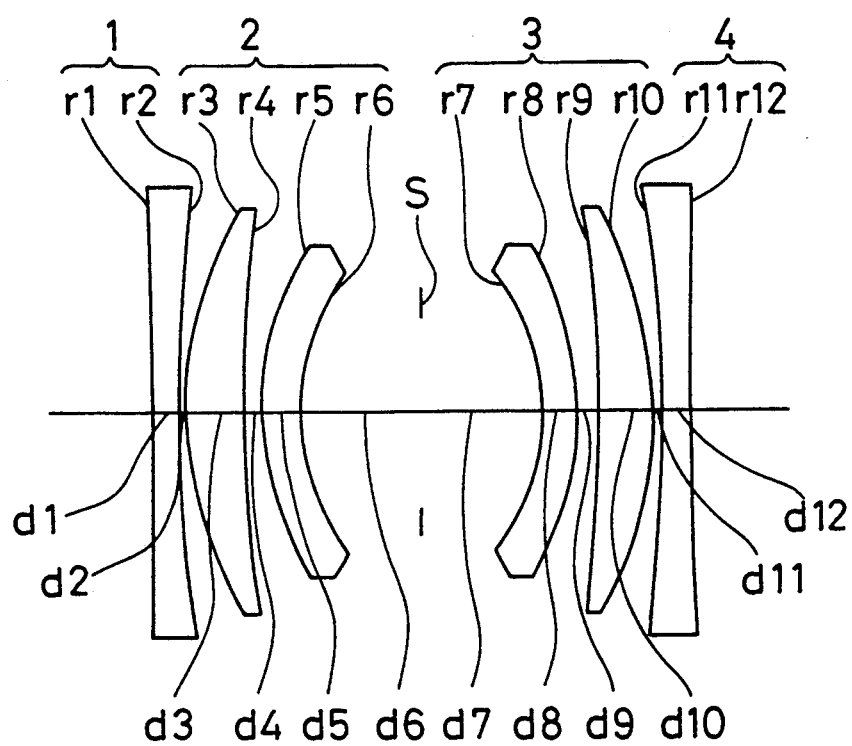
FIG. 7 is a cross-sectional view of the lens arrangement of a second embodiment of the present invention.
Figure 8B:
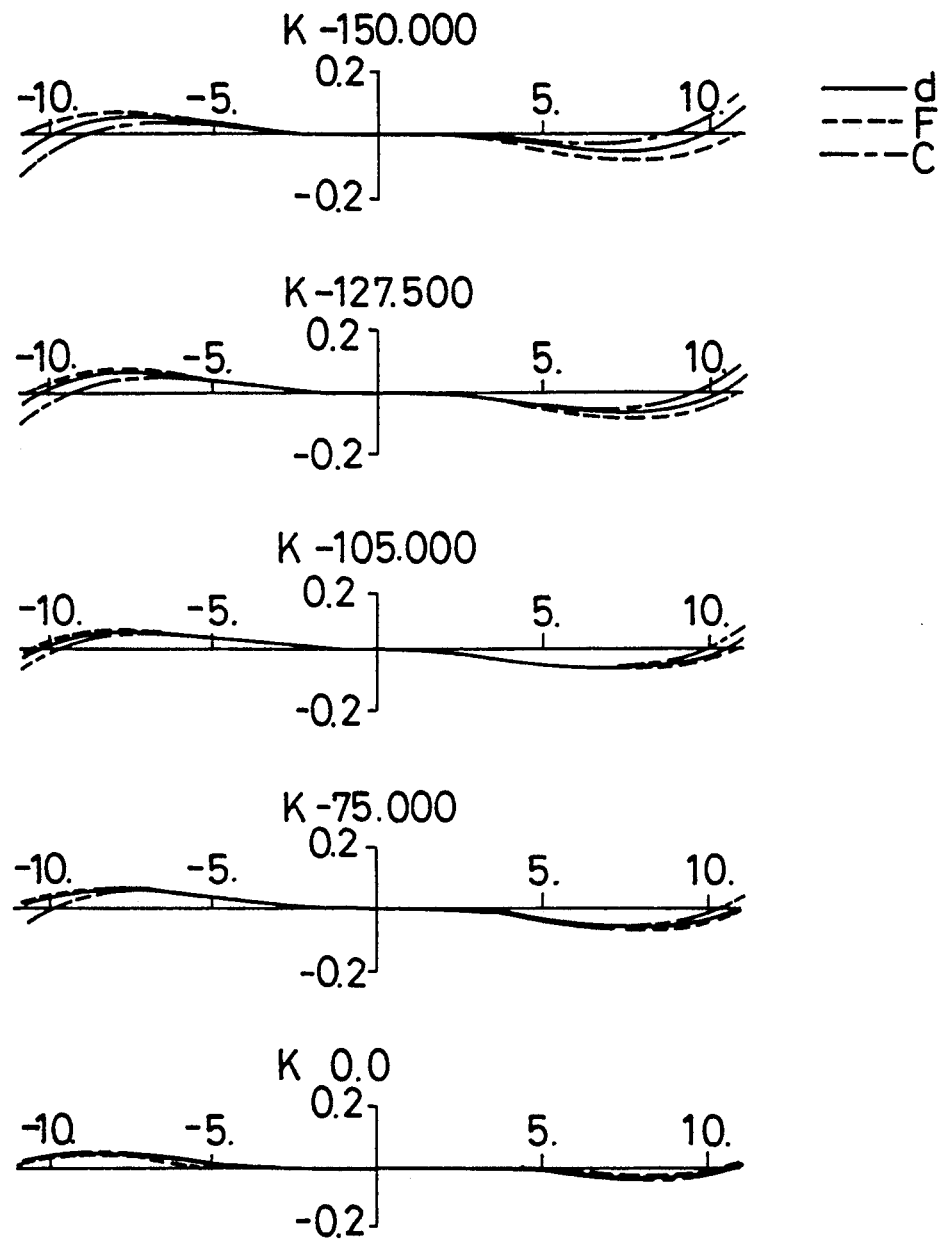
Figure 9B:
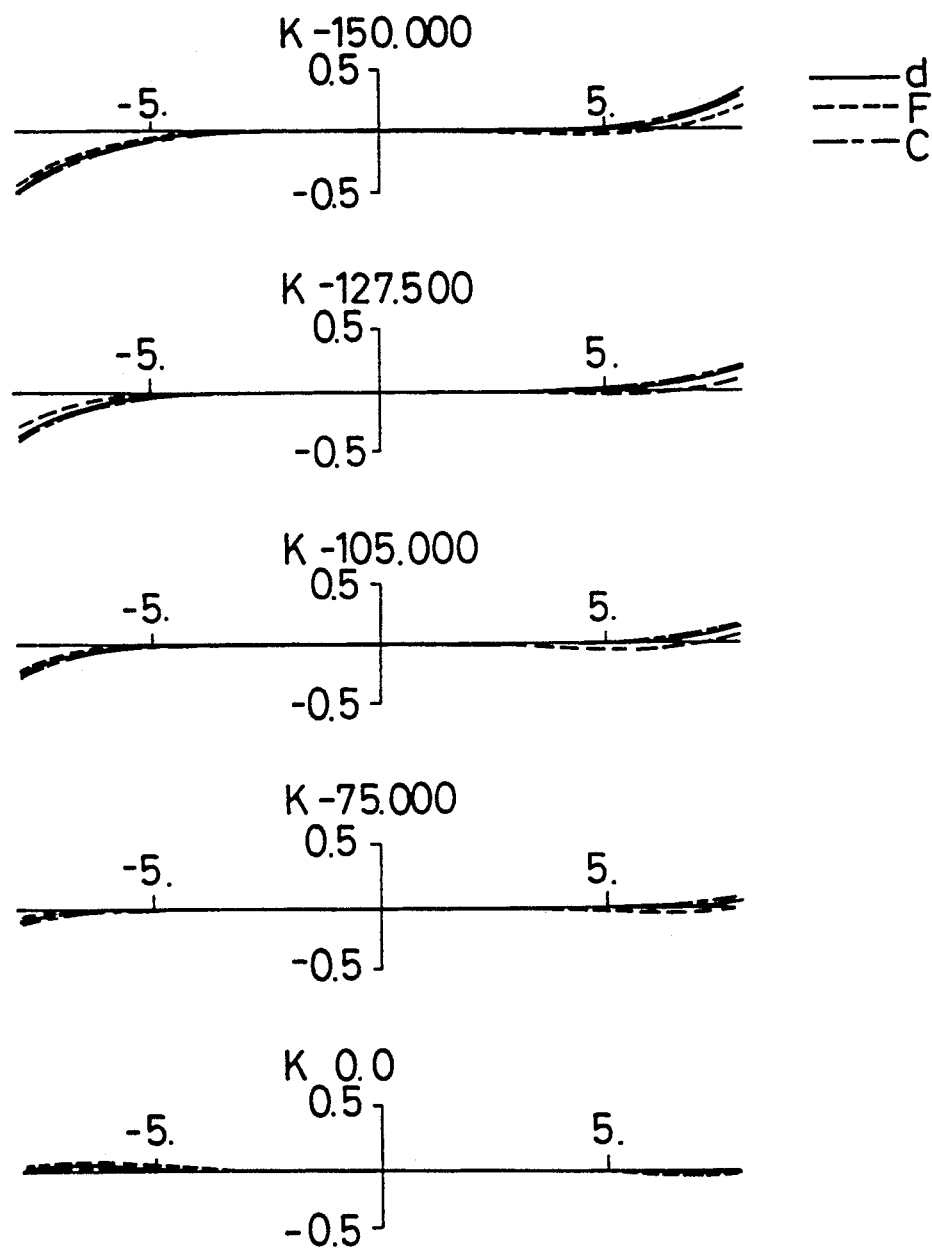
Figure 10B:
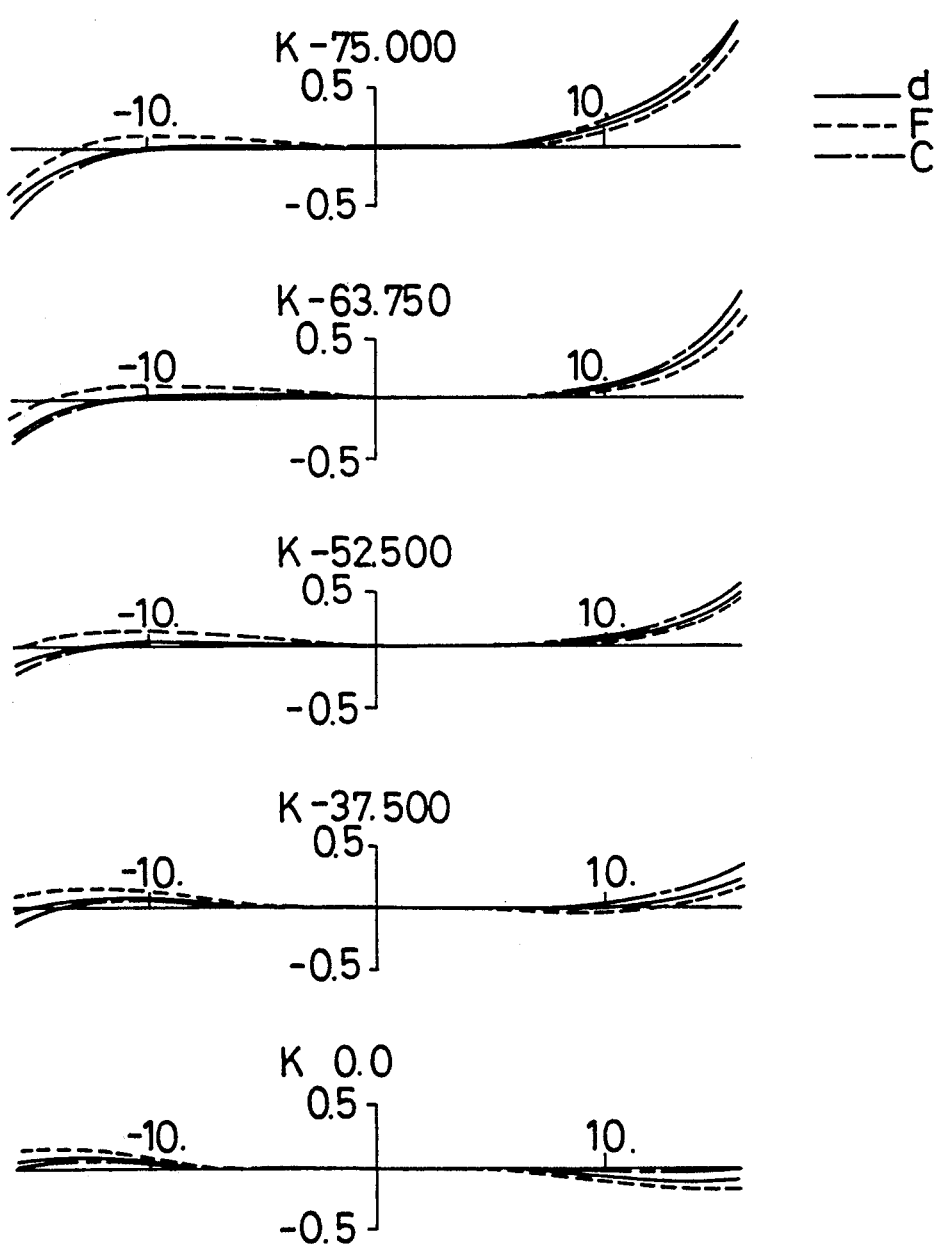
Figure 11:
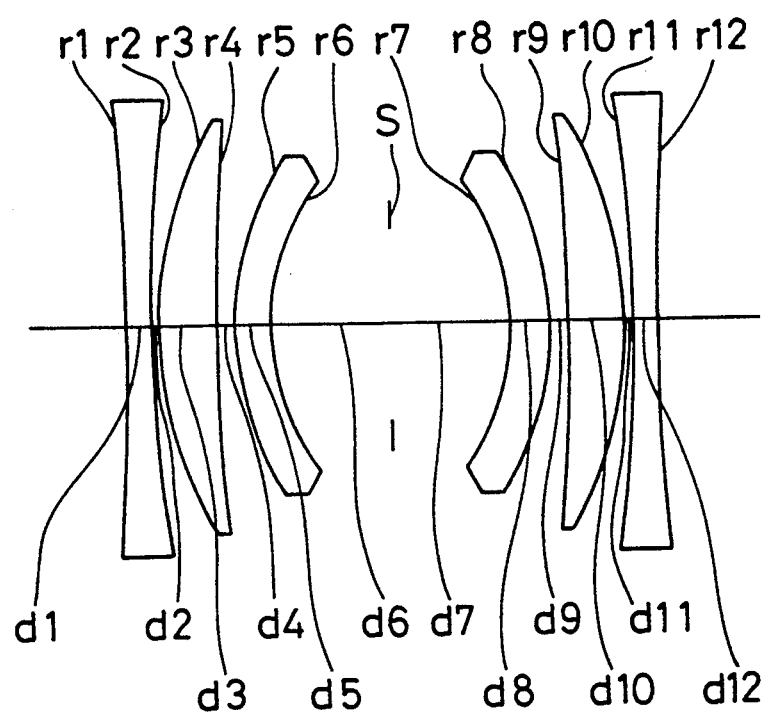
FIG. 11 is a cross-sectional view of the lens arrangement of a third embodiment of the present invention.
Figure 12A:
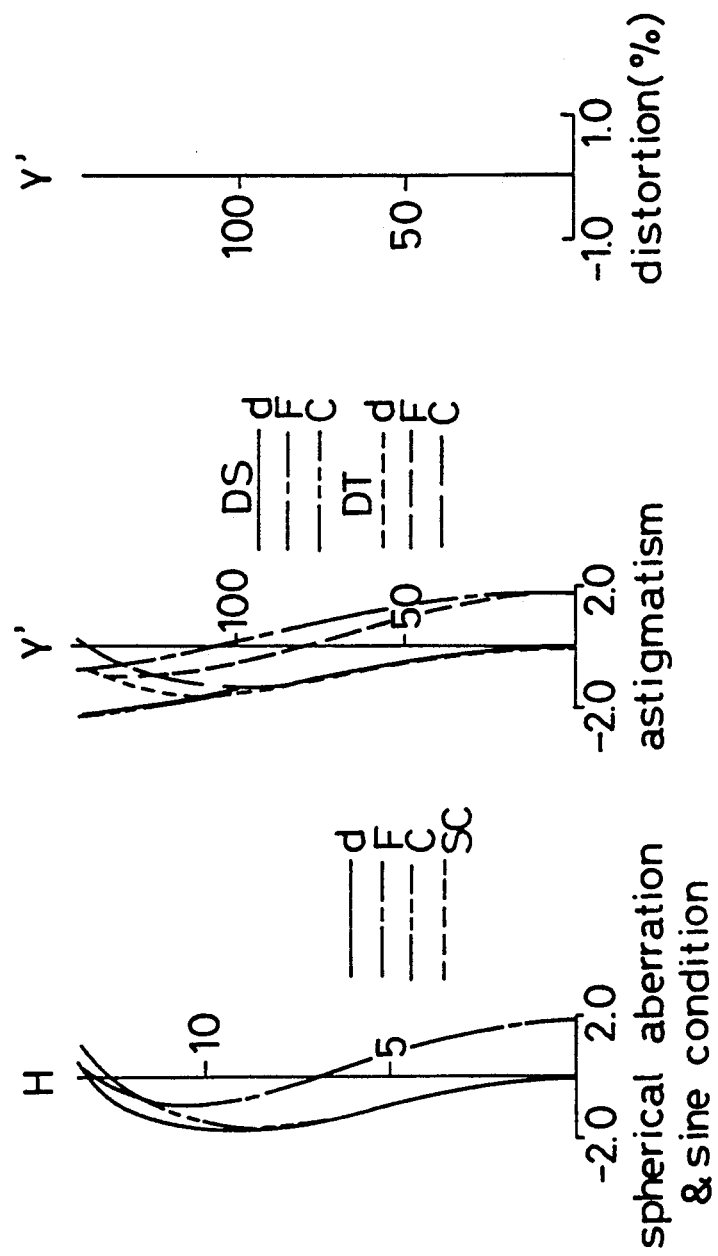
FIGS. 12A and 12B are graphic representations of spherical aberration, astigmatism, distortion and lateral aberration of the third embodiment at unity magnification.
Figure 12B:
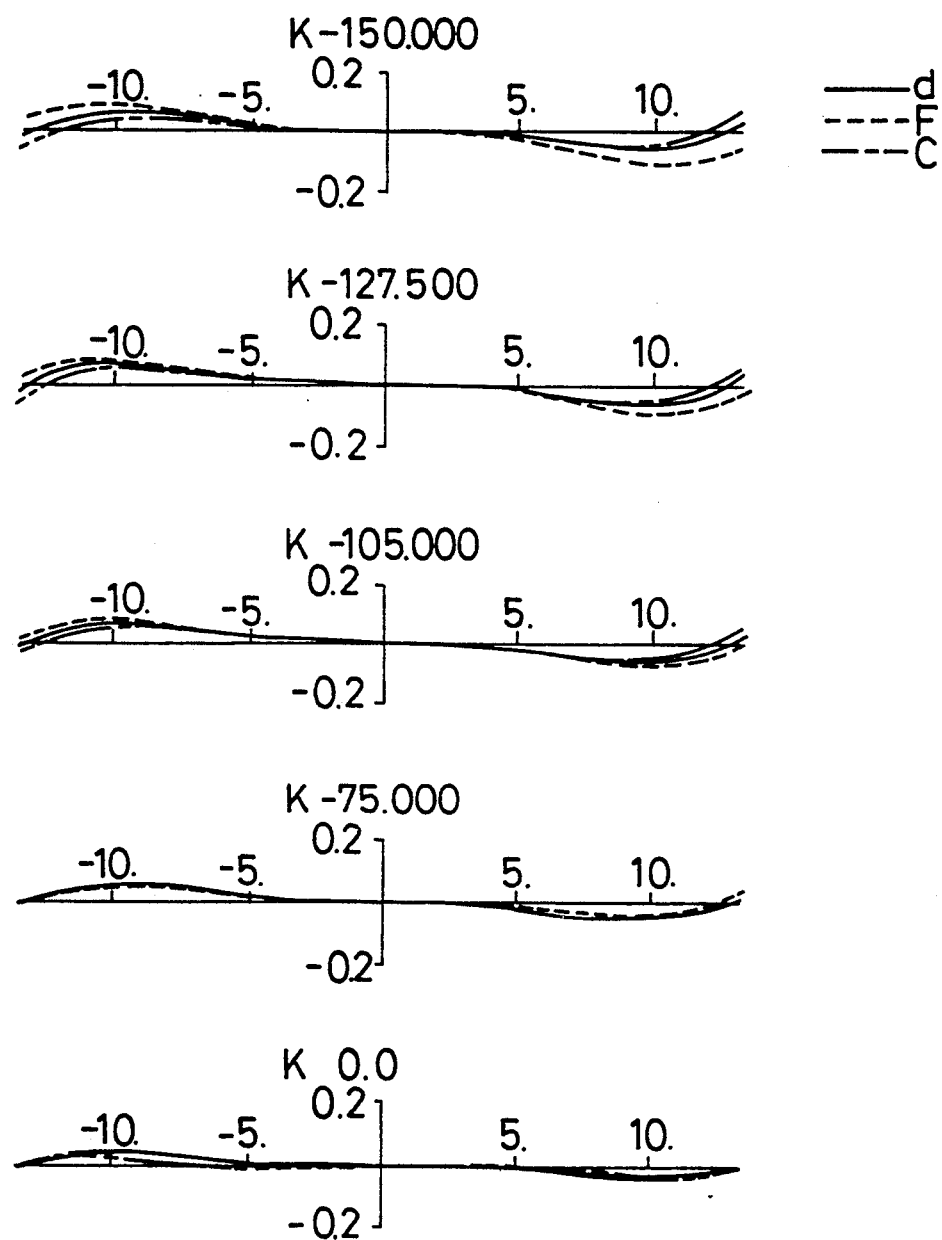
Figure 13A:
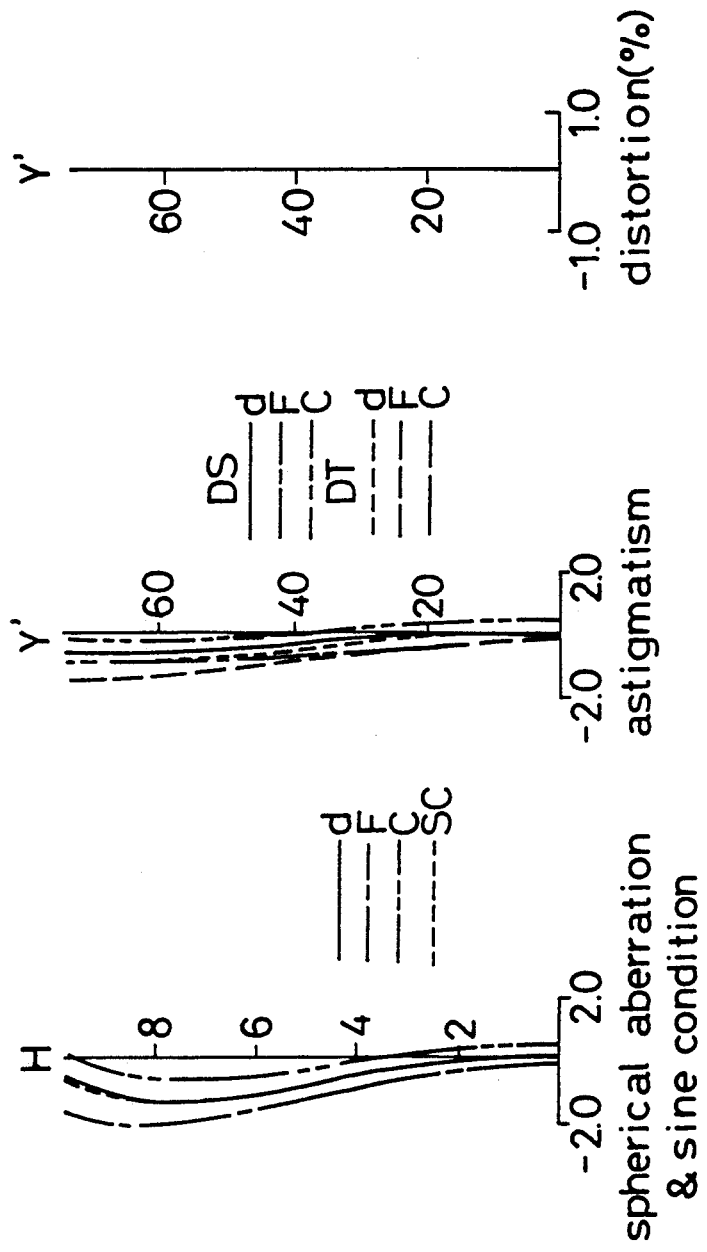
FIGS. 13A and 13B are graphic representations of spherical aberration, astigmatism, distortion and lateral aberration of the third embodiment at a magnification larger than unity.
Figure 13B:
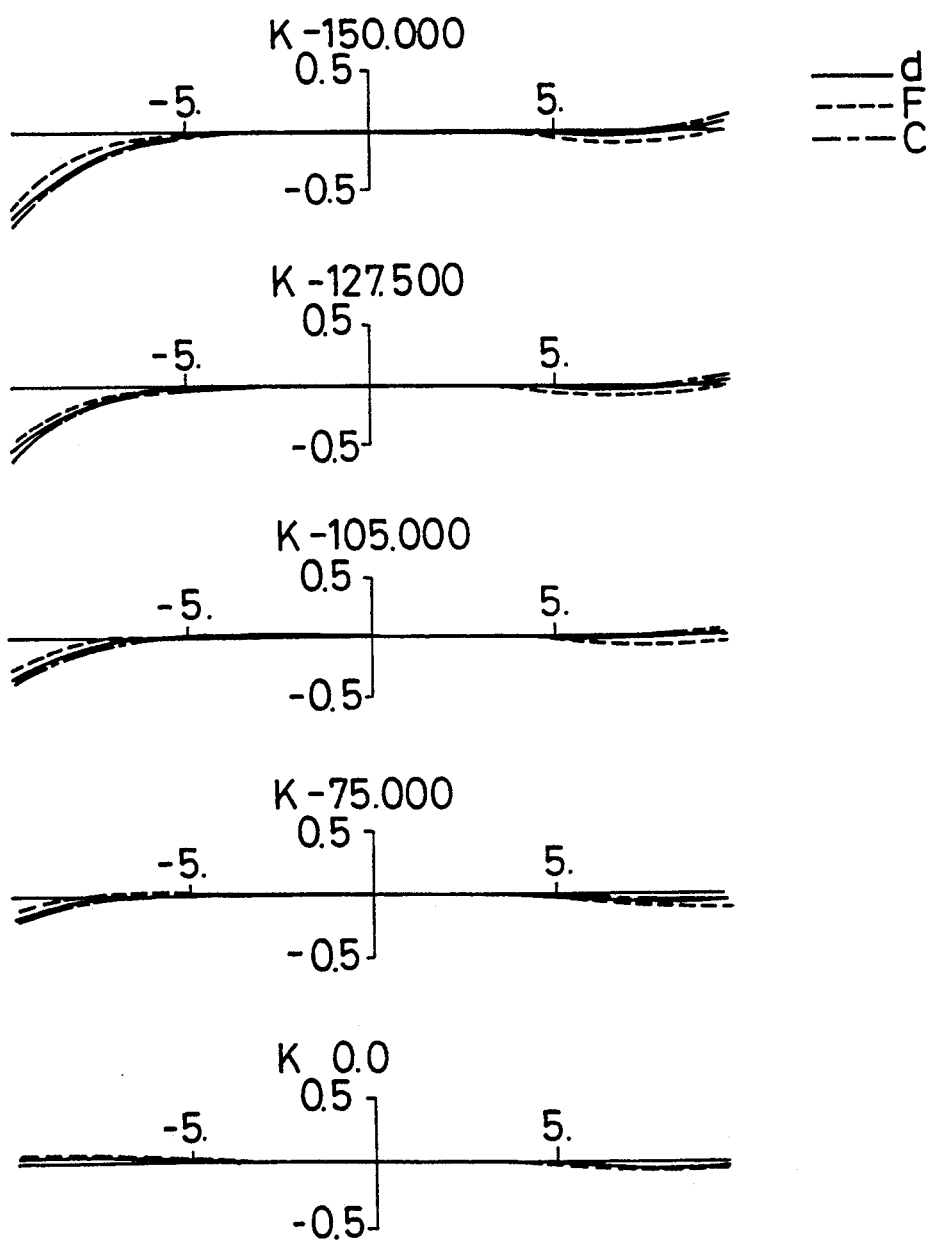
Figure 14B:
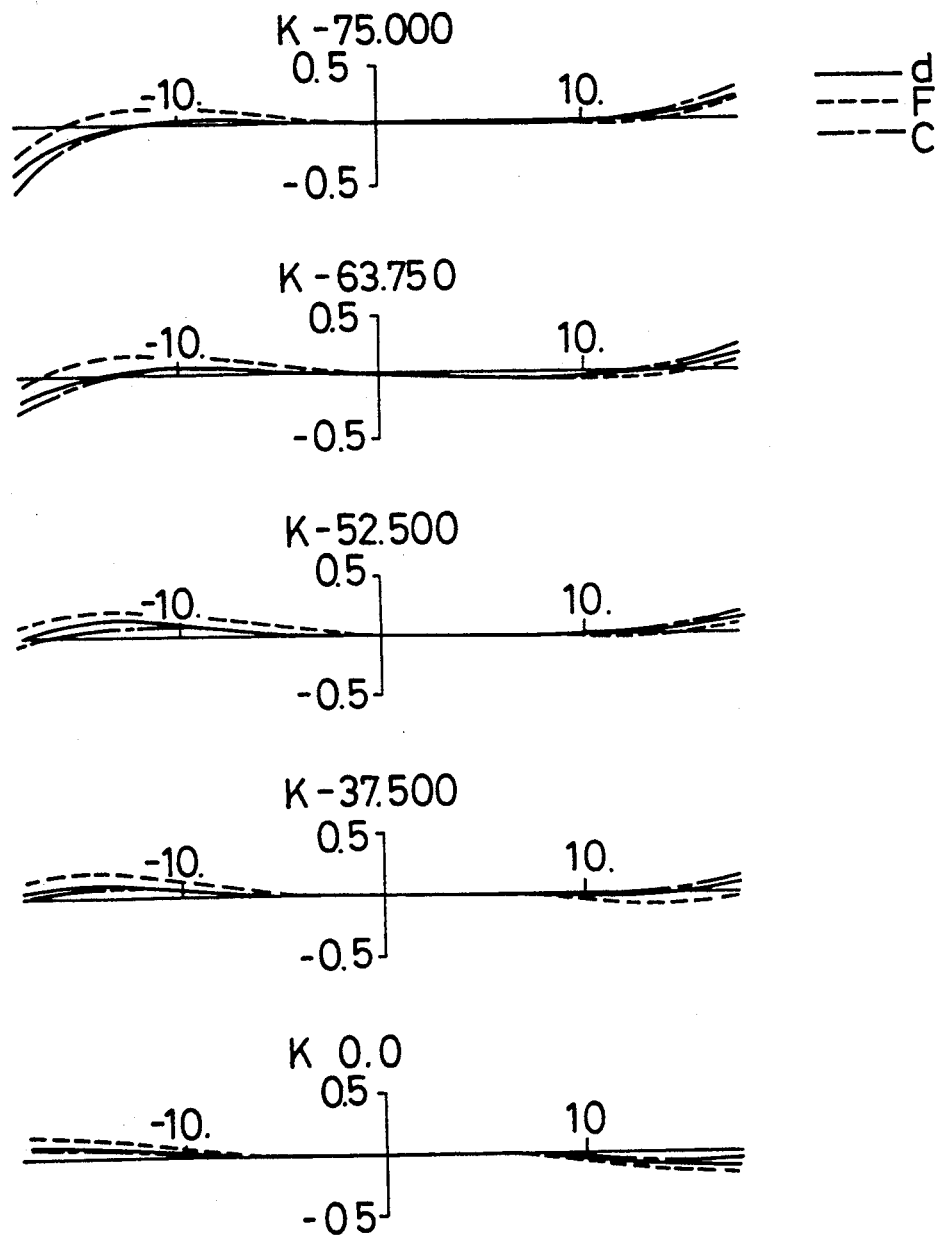
Figure 15:
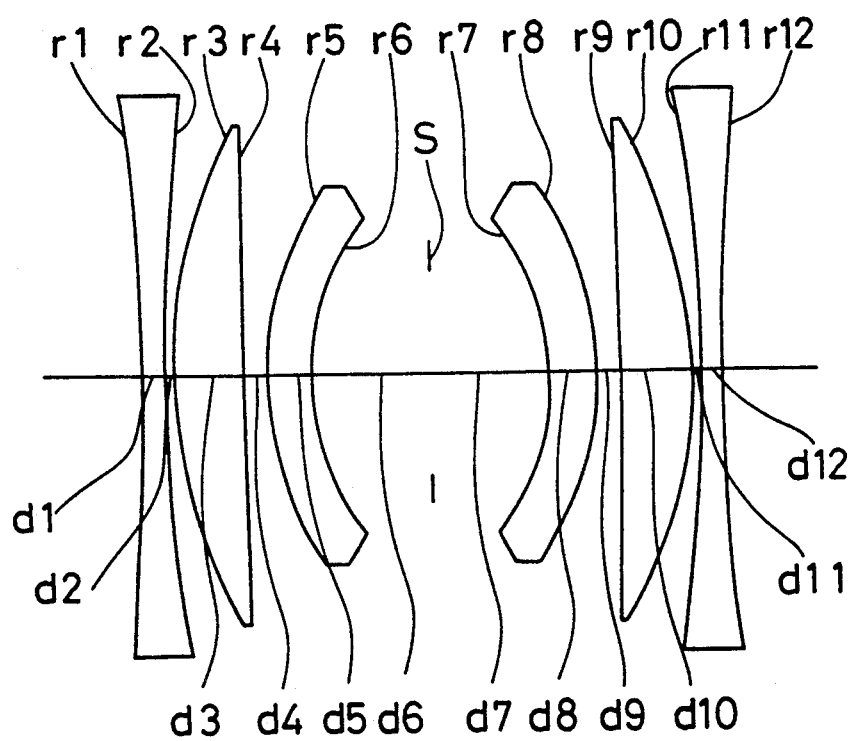
FIG. 15 is a cross-sectional view of the lens arrangement of a fourth embodiment of the present invention.
Figure 16B:
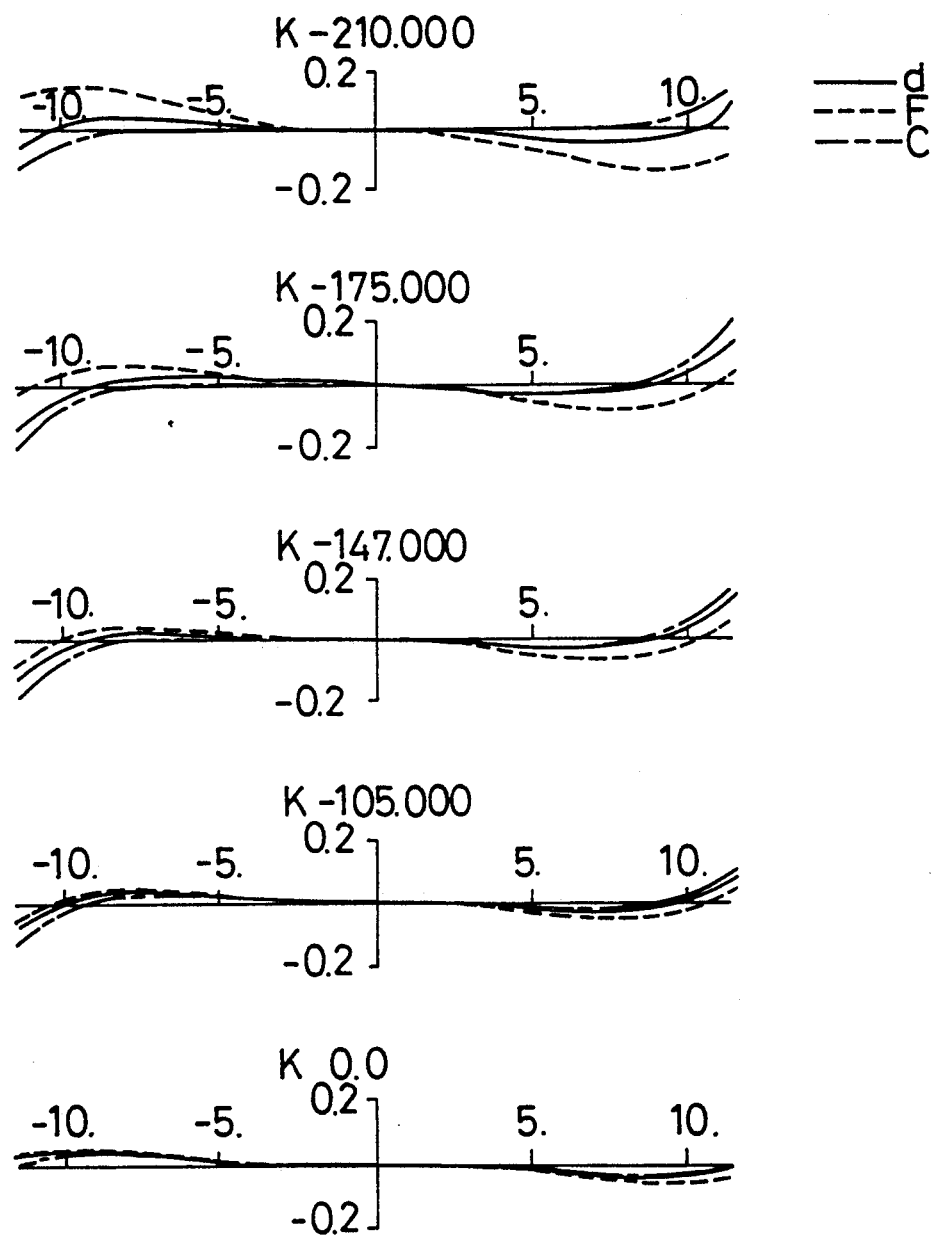
Figure 17A:
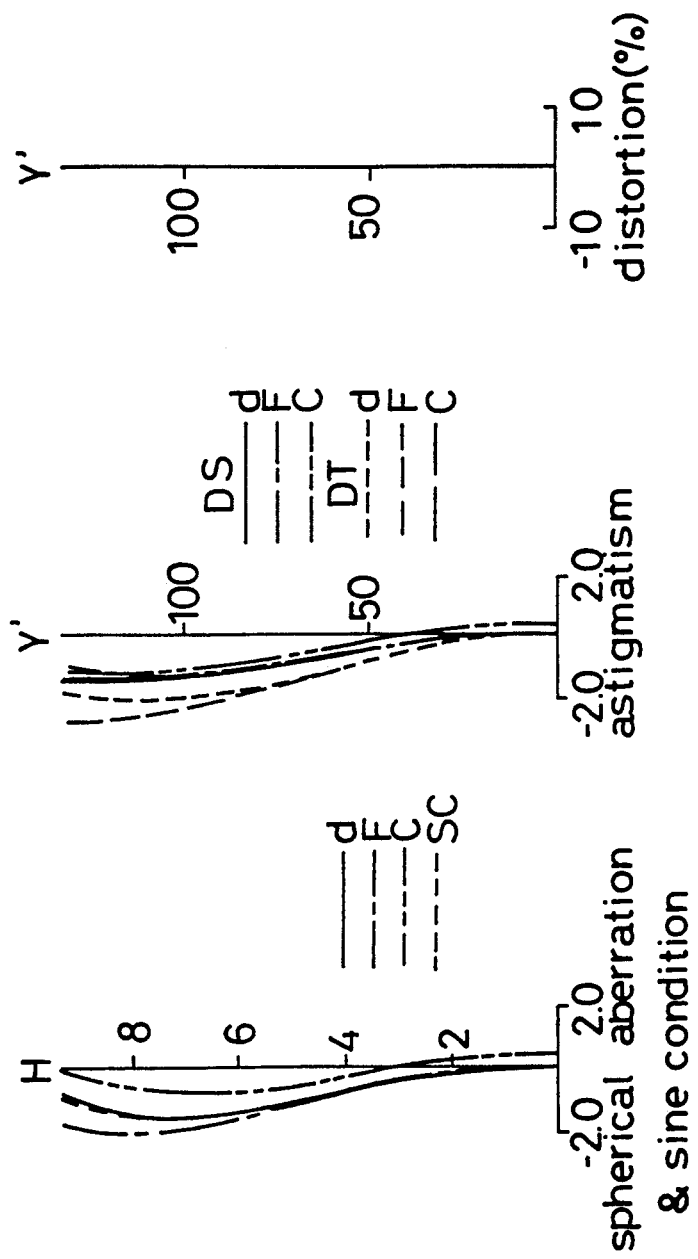
FIGS. 17A and 17B are graphic representations of spherical aberration, astigmatism, distortion and lateral aberration of the fourth embodiment at a magnification larger than unity.
Figure 17B:
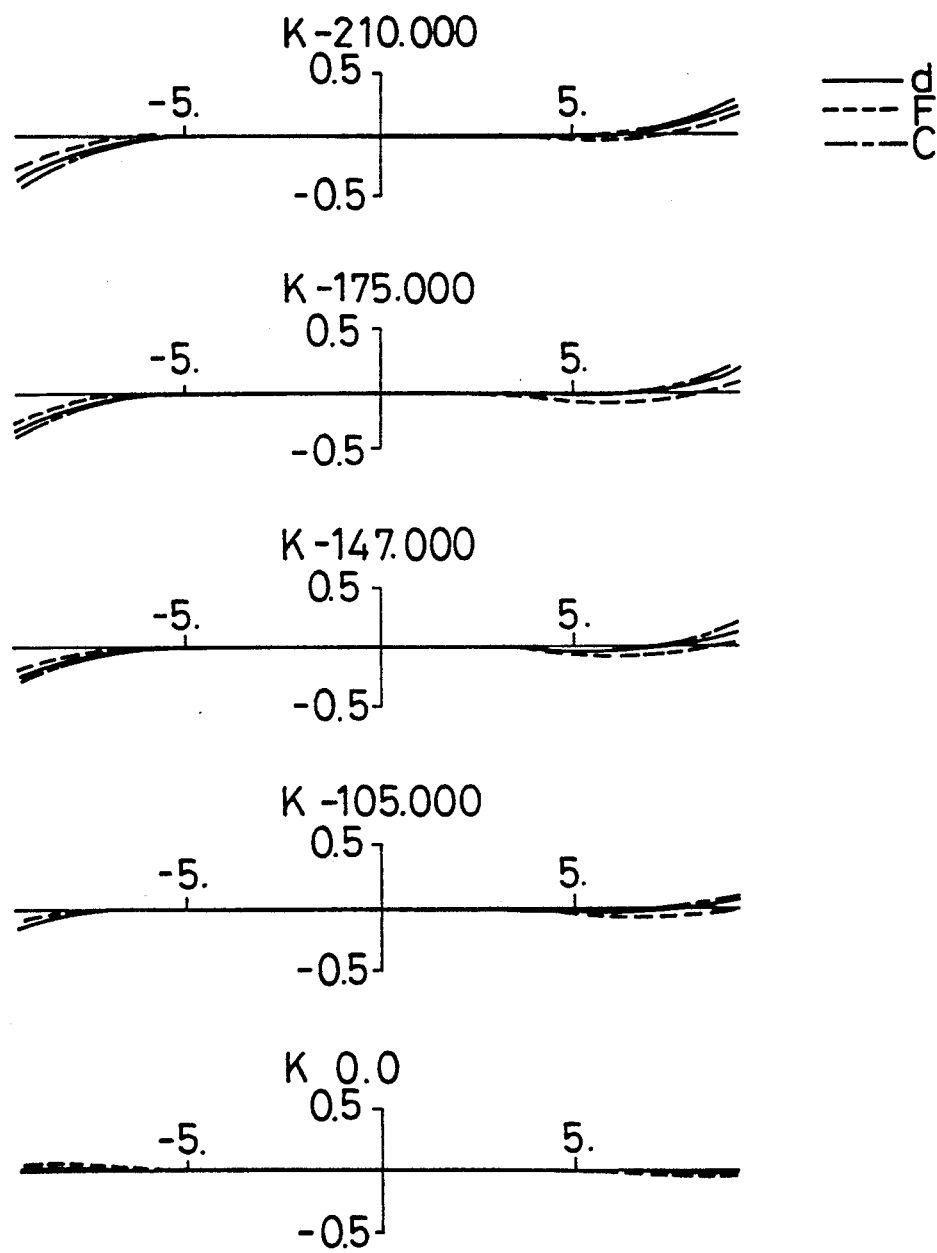
Figure 18B:
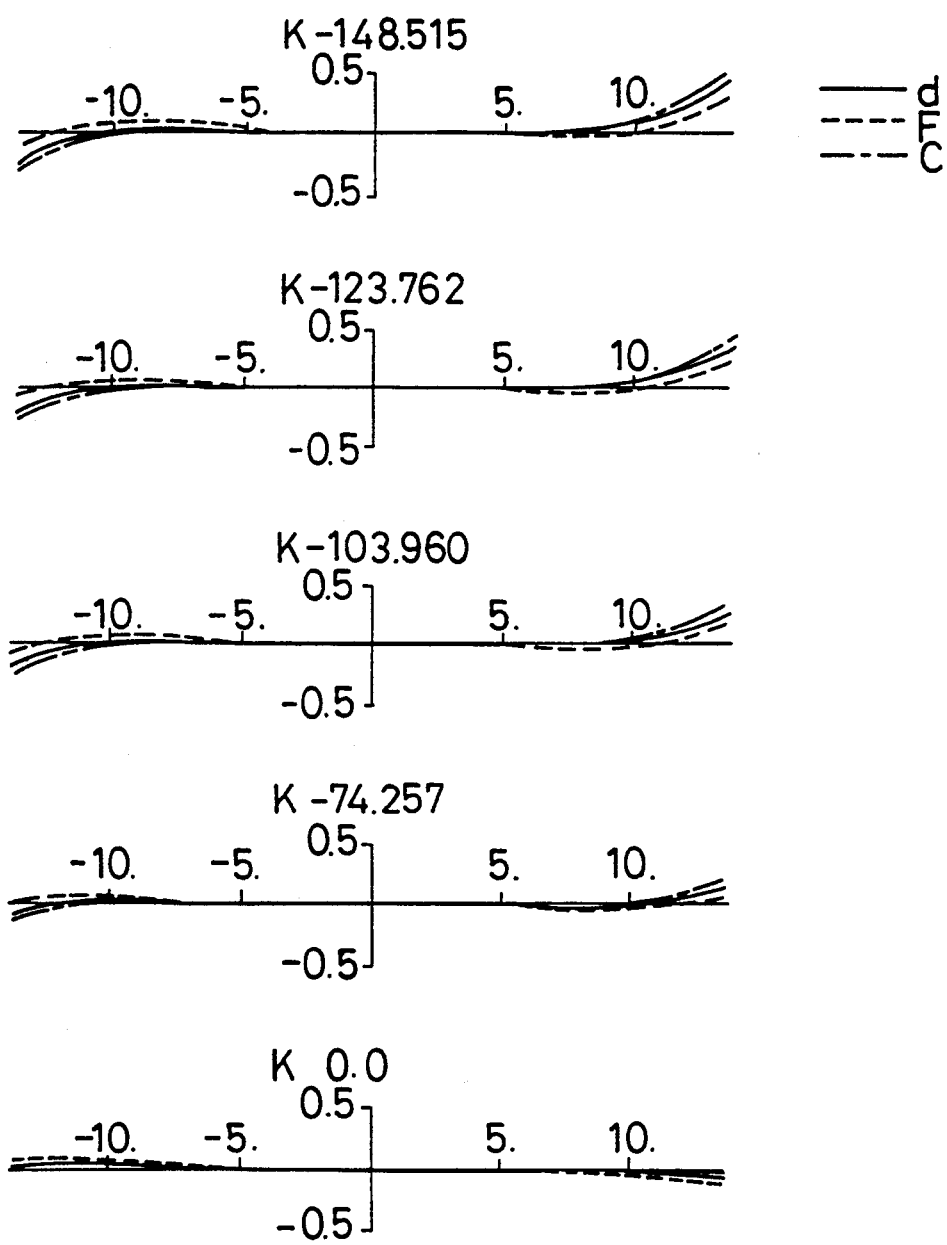
FIGS. 18A and 18B are graphic representations of spherical aberration, astigmatism, distortion and lateral aberration of the fourth embodiment at a magnification smaller than unity.
Figure 18A:
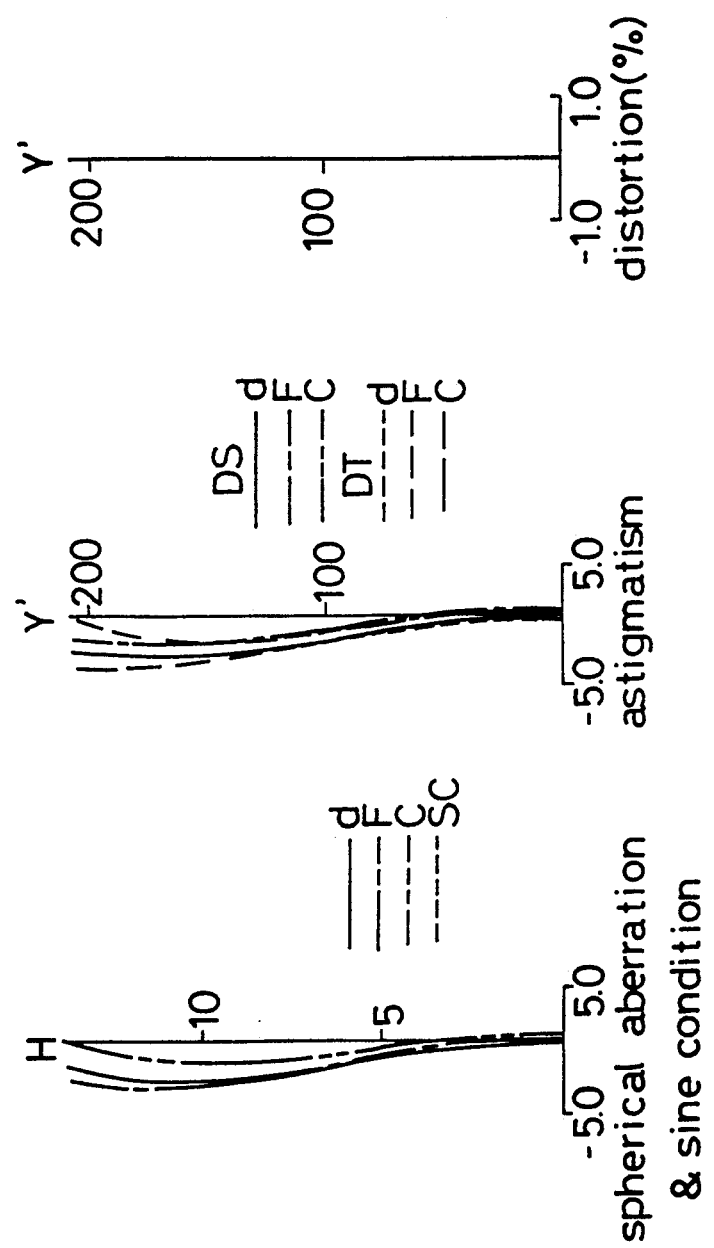
Figure 19:
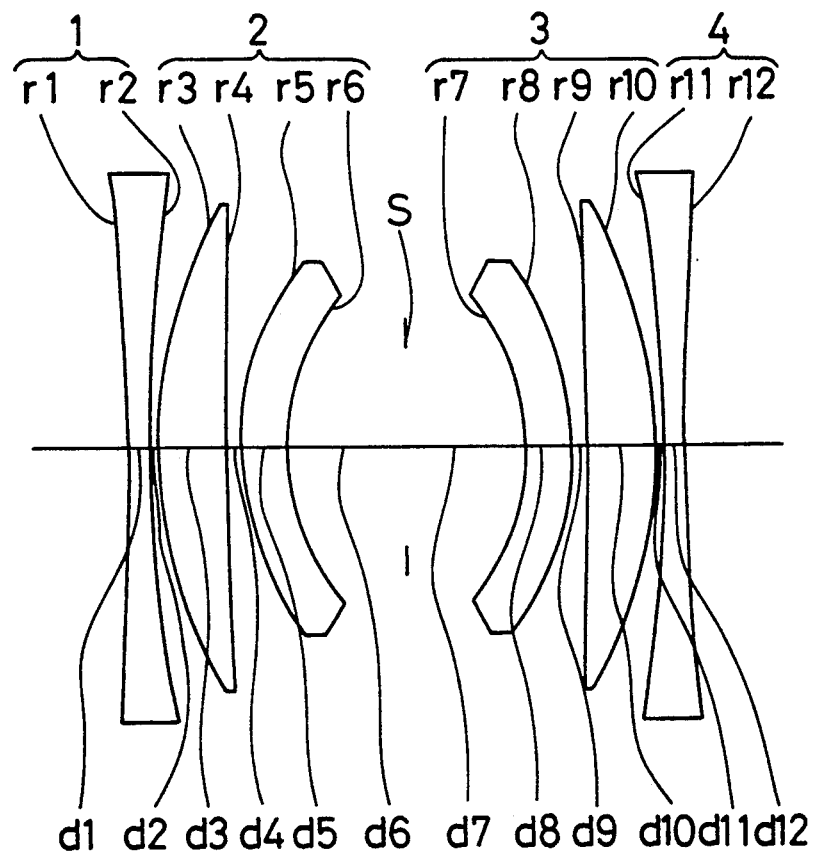
FIG. 19 is a cross-sectional view of the lens arrangement of a fifth embodiment of the present invention.
Figure 20A:
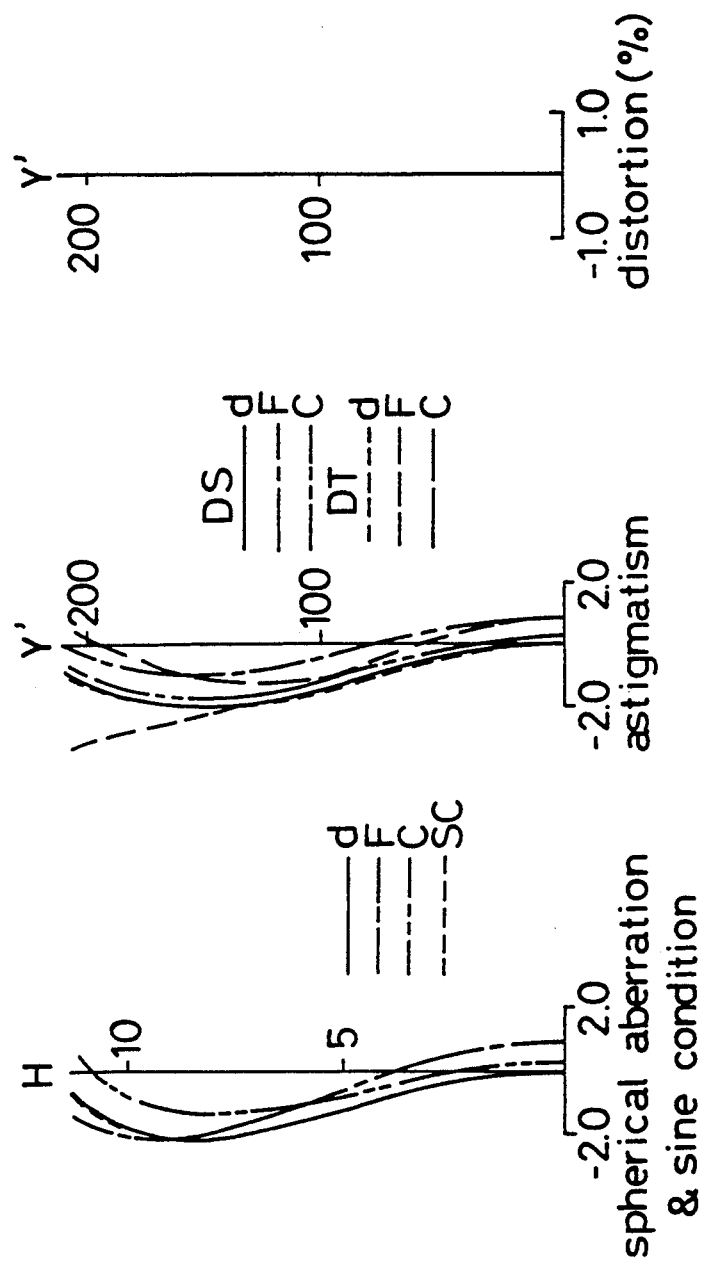
FIGS. 20A and 20B are graphic representations of spherical aberration, astigmatism, distortion and lateral aberration of the fifth embodiment at unity magnification.
Figure 20B:
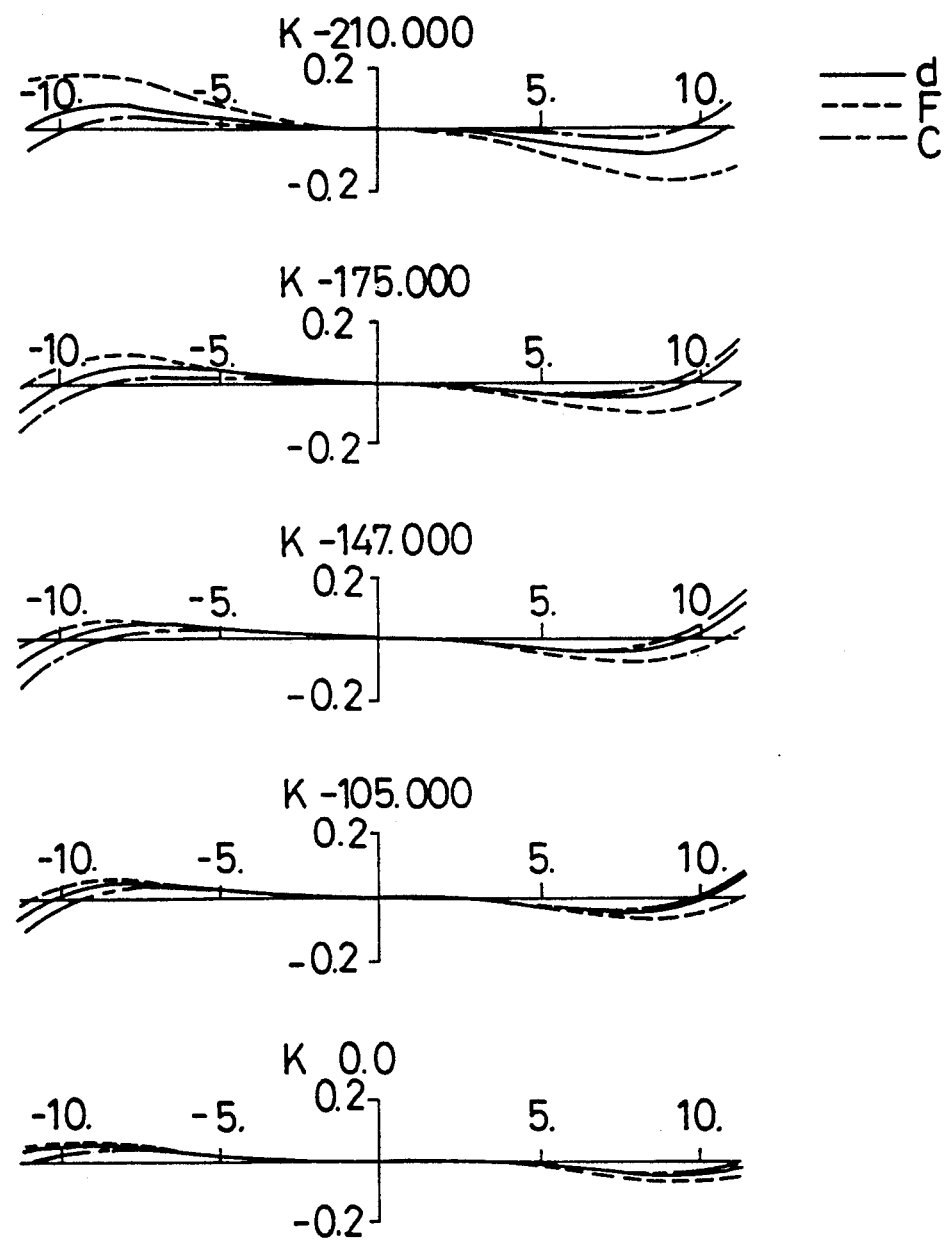
Figure 21A:
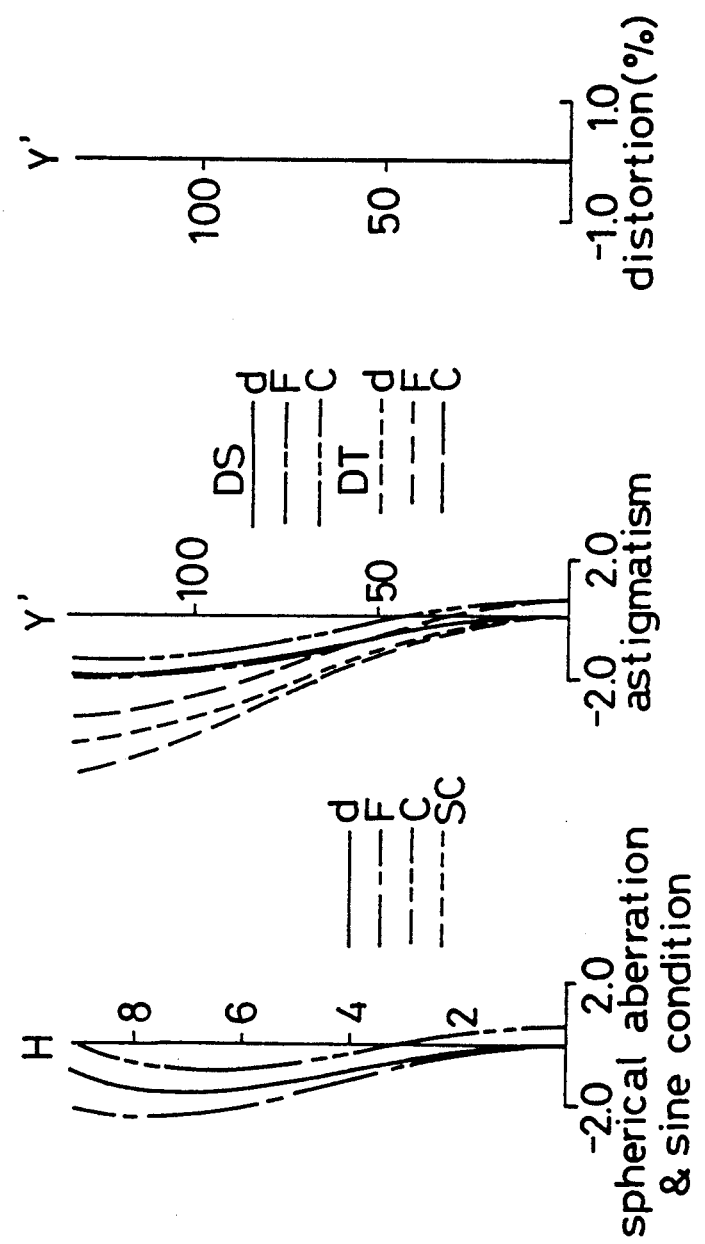
FIGS. 21A and 21B are graphic representations of spherical aberration, astigmatism, distortion and lateral aberration of the fifth embodiment at a magnification larger than unity.
Figure 21B:
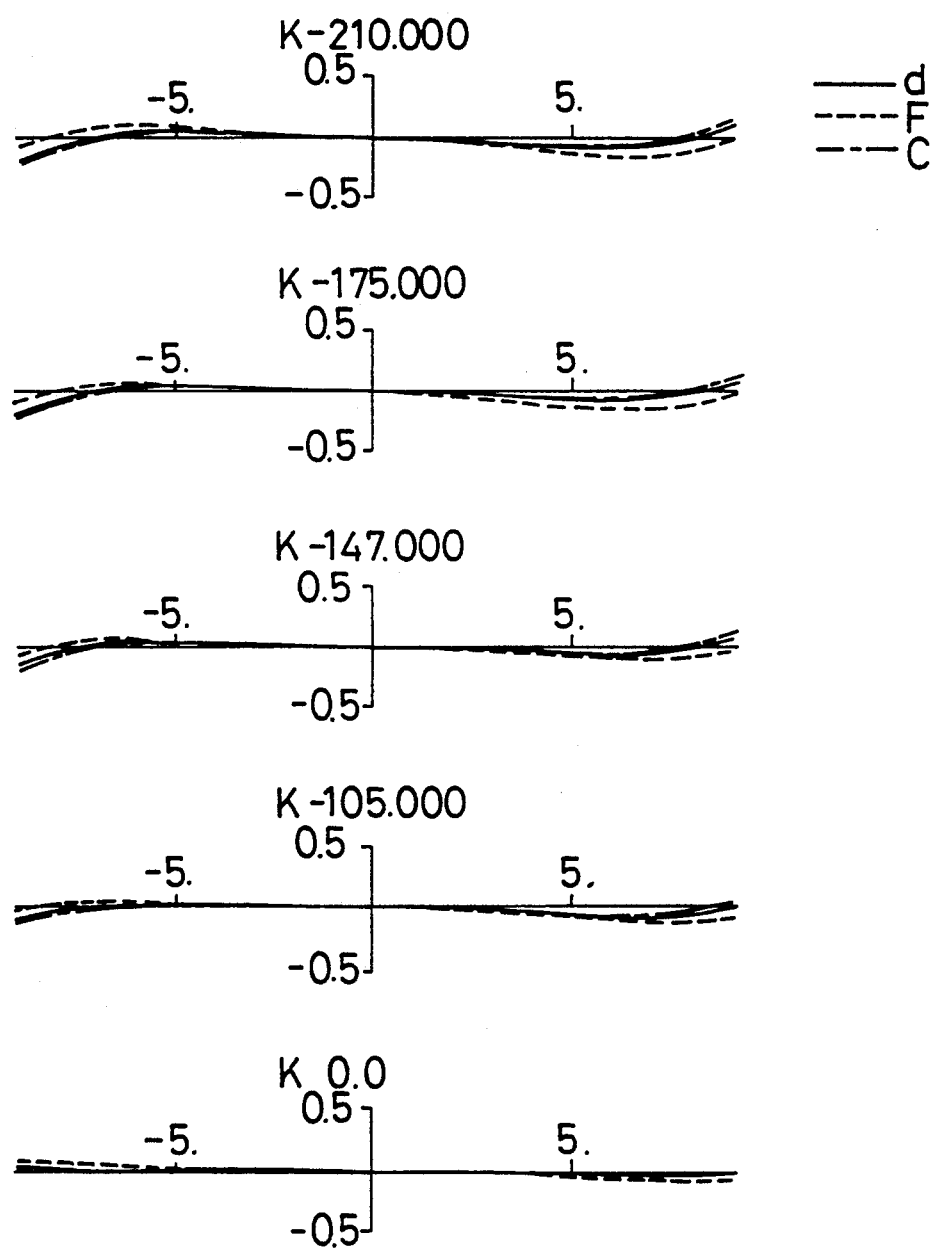
Figure 22A:
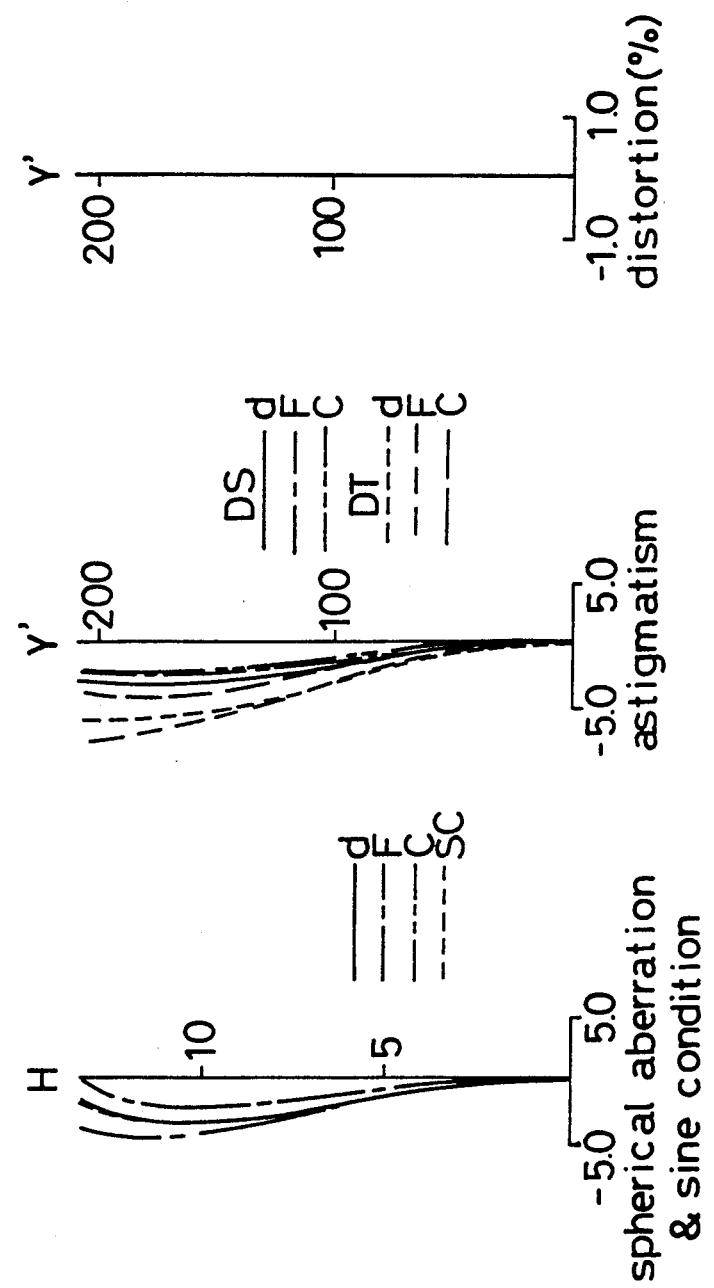
FIGS. 22A and 22B are graphic representations of spherical aberration, astigmatism, distortion and lateral aberration of the fifth embodiment at a magnification smaller than unity.
Figure 22B:
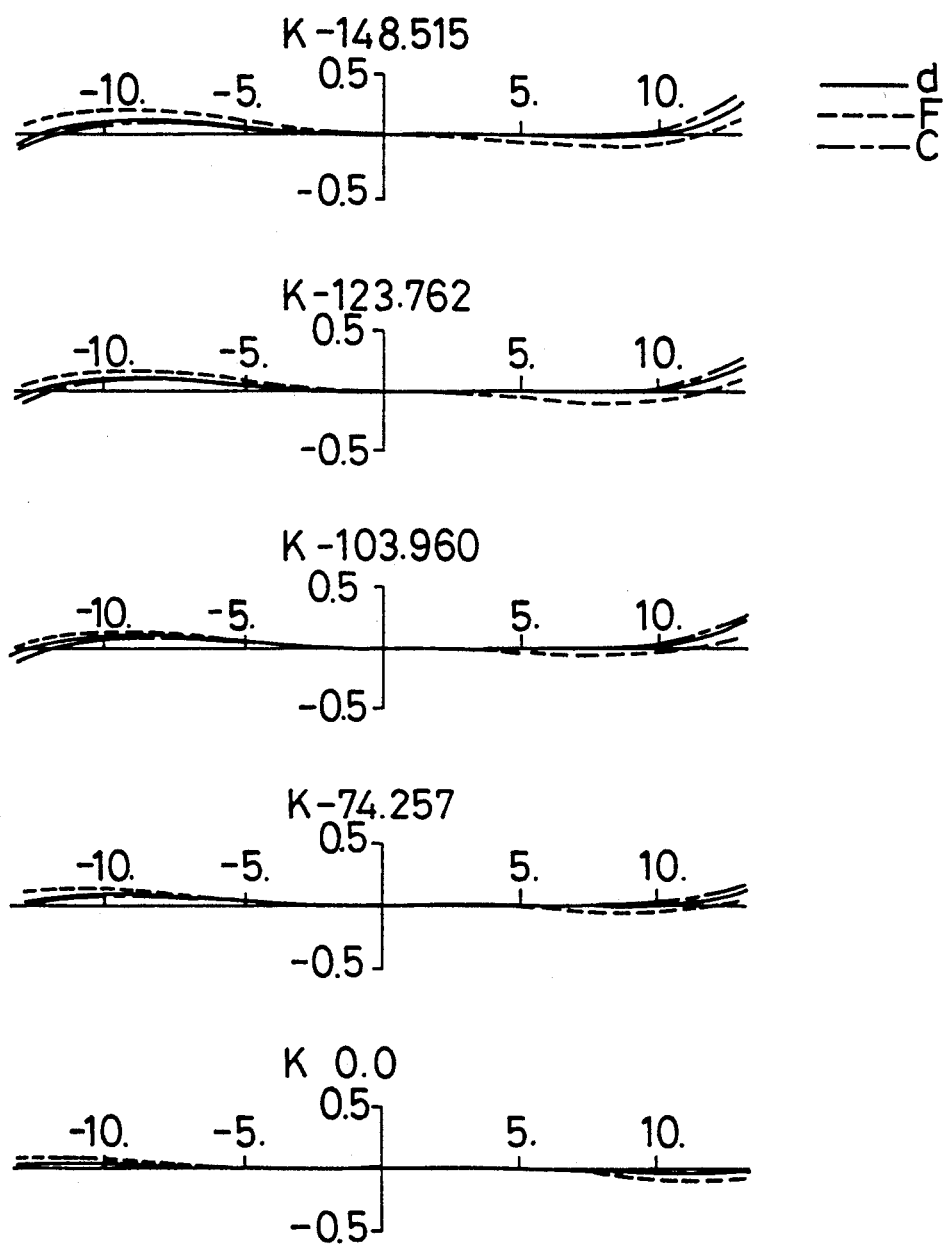

FIG. 7 and FIG. 11 show the lens arrangements of a second and a third embodiments of the present invention, respectively. The second and the third lens embodiments comprise from the object side: a first lens unit 1 including a negative first lens element; a second lens unit 2 including a positive second lens element and a third lens element which is a negative meniscus lens element strongly concave to the aperture stop side and having a positive overall focal length; an aperture stop S; a third lens unit 3 arranged symmetrically with the second lens unit 2 with respect to the aperture stop S; and a fourth lens unit 4 arranged symmetrically with the first lens unit 1 with respect to the aperture stop S.

Moreover, the following conditions (1) to (4) are fulfilled:

$$-1.3 < f_1/f_M < -0.7 \quad (1)$$

$$0.5 < f_2/f_M < 0.7 \quad (2)$$

$$0 < r_3/r_4, r_{10}/r_9 < 0.3 \quad (3)$$

$$1.2 < r_3/r_5, r_{10}/r_8 < 1.8 \quad (4)$$

where $f_M$ is a focal length of the entire lens system at unity magnification, $f_1$ is a focal length of the first lens unit 1, $f_2$ is a focal length of the second lens unit 2, and ri is a radius of curvature of an ith surface counted from the object side.

Tables 3 and 5 show data with respect to each surface of the second and the third embodiments, respectively. The axial distances $d_2$, $d_6$, $d_7$ and $d_{11}$ are variable during zooming. Values thereof at a magnification of $-2.000$, at unity magnification of $-1.000$ and at a magnification of $-0.500$ are shown in Tables 4 and 6.

The condition (1) relates to the power of the first lens unit 1 of a negative power and the power of the fourth lens unit 4 of a negative power. By providing appropriate power to these lens units, aberrations can excellently be corrected by associating these lens with the second lens unit 2 of a positive power and the third lens unit 3 of a positive power. When the upper limit of the condition (1) is exceeded, the power of the second lens unit 2 and the power of the third lens unit 3 increase, so that astigmatism is over-corrected. When the lower limit of the condition (1) is exceeded, astigmatism and distortion are not sufficiently corrected.

The condition (2) relates to the power of the second lens unit 2 and the power of the third lens unit 3, and defines aberration correction and realization of a compact zoom lens system. When the upper limit of the condition (2) is exceeded, the power of the second lens unit 2 and the power of the third lens unit 3 decrease. Although this is advantageous in correcting aberrations, a more lens movement amount is required during zooming. Thereby, the total lens length increases at unity magnification. On the other hand, when the lower limit of the condition (2) is exceeded, the power of the second lens unit 2 and the power of the third lens unit 3 increase, so that more aberrations are generated and error sensitivity increases. As described above, a large magnification range is not available in both cases.

The condition (3) defines the configurations of the second and the fifth lens elements and relates to aberration correction ability. That is, when the range of the condition (3) is exceeded, the diameter of the lens decreases, so that sufficient brightness cannot be secured. Moreover, the power of the second lens element and the power of the fifth lens element decrease, so that spherical aberration, distortion and coma cannot sufficiently be corrected.

The condition (4) defines a ratio of radius of curvature of a externally convex surface convex to the external side in the second and the third lens units 2 and 3, and relates to aberration correction ability. When the upper limit of the condition (4) is exceeded, astigmatism and coma cannot completely be corrected. Moreover, when the lower limit thereof is exceeded, coma is not sufficiently corrected.

FIGS. 8A and 8B to 10A and 10B, and FIGS. 12A and 12B to 14A and 14B show graphic representations of spherical aberration, astigmatism, distortion and lateral aberration of the second and the third embodiments, respectively, at unity magnification, at a magnification larger than unity and at a magnification smaller than unity.

Both the second and the third embodiments are compact zoom lens systems for use in a copying apparatus which lens systems include six lens elements grouped into four units. Moreover, in the zoom lens systems, aberrations are excellently corrected at a wide angle of view, and a focal length can be reduced. Thereby, an optical system in a copying apparatus can be reduced in size, and it is possible to employ a large zoom ratio between $-0.5\times$ and $-2.0\times$ is available.

Subsequently, a fourth and a fifth embodiments of the present invention will be described.

The fourth and the fifth embodiments comprise from the object side: a first lens unit 1 including a negative first lens element; a second lens unit 2 including a positive second lens element and a third lens which is a negative meniscus lens element strongly concave to the aperture stop side and having a positive overall focal length; an aperture stop S; a third lens unit 3 arranged symmetrically with the second lens unit 2 with respect to the aperture stop S; and a fourth lens unit 4 arranged symmetrically with the first lens unit 1 with respect to the aperture stop S.

Moreover, the following conditions (1)' to (4)' are fulfilled:

$$-1.0 < f_1/f_M < -0.55 \quad (1)'$$

$$0.4 < f_2/f_M < 0.7 \quad (2)'$$

$$0 < r_3/r_4, r_{10}/r_9 < 0.3 \quad (3)'$$

$$1.2 < r_3/r_5, r_{10}/r_8 < 1.8 \quad (4)'$$

Description of the conditions (1)' to (4)' will be omitted, since it has already been given with respect to the conditions (1) to (4) of the first embodiment.

Tables 7 and 9 show data with respect to each surface of the fourth and the fifth embodiments. The axial distances $d_2$, $d_6$, $d_7$ and $d_{11}$ are variable during zooming. Values thereof at a magnification of $-1.414\times$, at unity magnification of $-1.000$ and at a magnification of $-0.640\times$ are shown in Tables 8 and 10.

FIGS. 16A and 16B to 18A and 18B, and FIGS. 20A and 20B to 22A and 22B show graphic representations of spherical aberration, astigmatism, distortion and lateral aberration of the fourth and the fifth embodiments at unity magnification, at a magnification larger than unity and at a magnification smaller than unity, respectively.

Both fourth and fifth embodiments are compact zoom lens systems for use in a copying apparatus which lens systems include six lens elements grouped into four units. In the lens systems, aberrations are excellently corrected at a wide angle of view of up to approximately 30° and a focal length can be reduced. Thereby, it is possible to reduce the size of an optical system in a copying apparatus.

The second and the third embodiments are arranged so that a large zoom range (between $-0.5\times$ and $-2.0\times$) is obtained, and fulfill the conditions (1) to (4) in order to excellently correct aberrations in the large zoom range. On the other hand, the fourth and the fifth embodiments are arranged so that a wide angle of view of nearly 30° is obtained, and fulfill the conditions (1)' to (4)' in order to excellently correct aberrations in the wide angle of view.

Subsequently, a second implementation of the present invention will be described.

Figure 23:
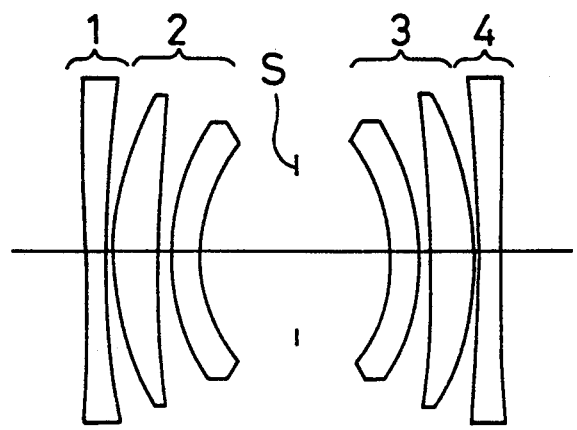
FIG. 23 is a cross-sectional view of the lens arrangement of a zoom lens system according to a second implementation of the present invention.

As shown in FIG. 23, the second implementation comprises from the object side: a first lens unit 1 including at least one lens element and having a negative overall focal length; a second lens unit 2 including a positive lens element and a negative meniscus lens element strongly concave to the aperture stop side and having a positive overall focal length; an aperture stop S; a third lens unit 3 arranged symmetrically with the second lens unit 2 with respect to the aperture stop S; and a fourth lens unit 4 arranged symmetrically with the first lens unit 1 with respect to the aperture stop S. The four lens units are symmetrically arranged, and moved as subsequently described.

Figure 24:
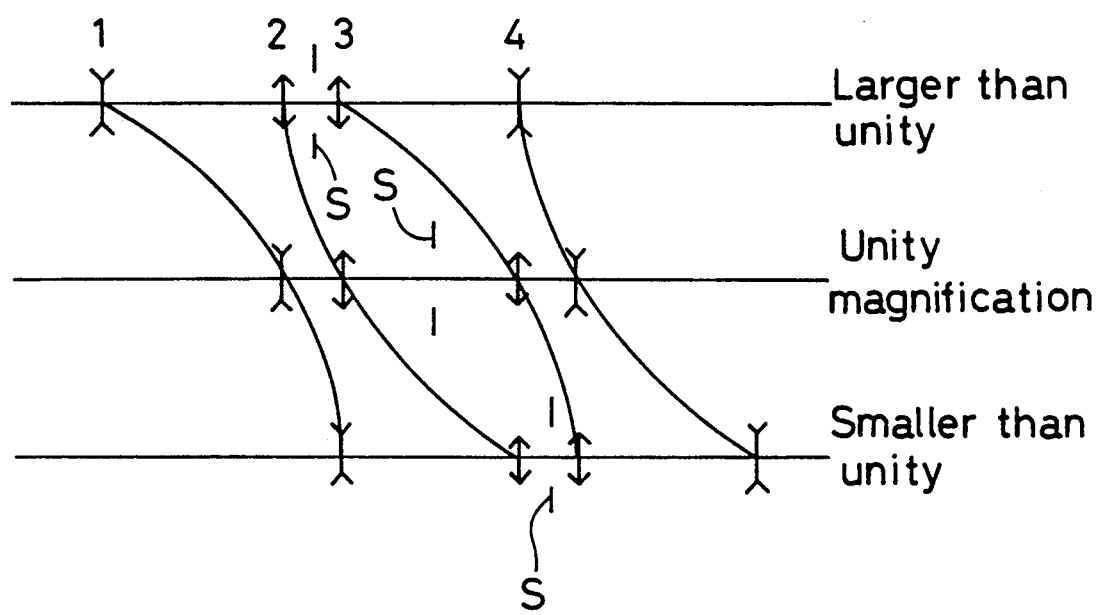
FIG. 24 is a diagram showing movements of lens units from a magnification larger than unity to a magnification smaller than unity.

In order to always maintain the object-image distance constant regardless of magnification as shown in FIG. 24, the power of the entire lens system is minimum at unity magnification. Moreover, during zooming, the second and the fourth lens units 2 and 4 are integrally moved by a same amount so that the total length of the lens system increases, and the aperture stop S is relatively fixed with respect to the moving lens units or the stationary lens units. Thereby, it is possible to group the lens elements of the lens system into two main blocks, so that the lens barrel arrangement can largely be simplified. Moreover, the power of the entire lens system and the total length of the lens system can be made minimum by arranging the lens system so that, at unity magnification, the distance between the first and the second lens units 1 and 2 and the distance between the third and the fourth lens units 3 and 4 are minimum and that the distance between the second and the third lens units 2 and 3 increases.

According to the second implementation, a zoom lens system is symmetrically arranged, which is advantageous in performance as a limited zoom lens system including unity magnification. Moreover, in order to realize a compact zoom lens system, the zoom lens system is provided with four lens units of negative, positive, positive and negative configuration. Further, the zoom lens system can be arranged with six lens elements grouped into four lens units at a minimum, and since the second lens unit 2 of a positive power and the third lens unit 3 of a positive power are of Gaussian type, the power of each lens unit can be increased, so that a less lens movement amount is required during zooming. Moreover, in the lens system, since the lens system is asymmetrical in front and in rear of the aperture stop S during zooming, generation of coma can be restrained at a magnification larger than unity. Further, with the above-described arrangement of the second implementation, a lens system is realized which has a total length $\Sigma d/f$ of approximately 0.3 and is as compact as a normal fixed focus lens system.

A zoom lens system according to the second implementation fulfills the following conditions (1)", (2)", (5), (4)" and (6):

$$-1.3 < f_1/f_M < -0.8 \quad (1)''$$

$$0.5 < f_2/f_M < 0.7 \quad (2)''$$

$$|r_3/r_4|, |r_{10}/r_9| < 0.5 \quad (5)$$

$$1.2 < r_3/r_5, r_{10}/r_8 < 2.2 \quad (4)''$$

$$|n_1 - n_2| < 0.1 \quad (6)$$

where $n_1$ is a refractive index of a negative lens element of the first lens unit 1 and $n_2$ is a refractive index of the positive lens element of the second lens unit 2.

Description of the conditions (1)", (2)" and (4)" will be omitted here, since it has already been given with respect to the conditions (1), (2) and (4) of the first implementation.

The condition (5) defines the configurations of the second and the fifth lens elements, and relates to aberration correction performance. When the range defined by the condition (5) is exceeded, the diameter of the lens elements decrease, so that sufficient brightness cannot be secured. Moreover, the power of each lens element decreases, so that spherical aberration, astigmatism and coma cannot sufficiently be corrected.

The condition (6) relates to the refractive indices of the first and the second lens units 1 and 2, and is a condition for limiting aberration correction condition. When the range defined by the condition (6) is exceeded, generation of spherical aberration and astigmatism increases, so that it is impossible to completely correct them.

Subsequently, specific embodiments according to the second implementation will be described with reference to the drawings.

Figure 25:
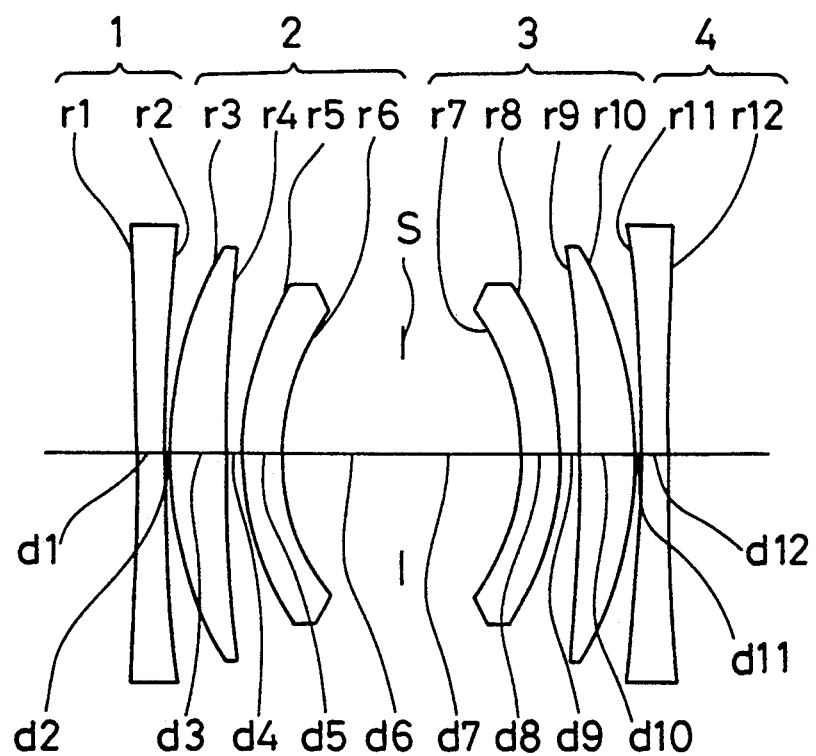
FIG. 25 is a cross-sectional view of the lens arrangement of a sixth embodiment of the present invention.
Figure 26A:
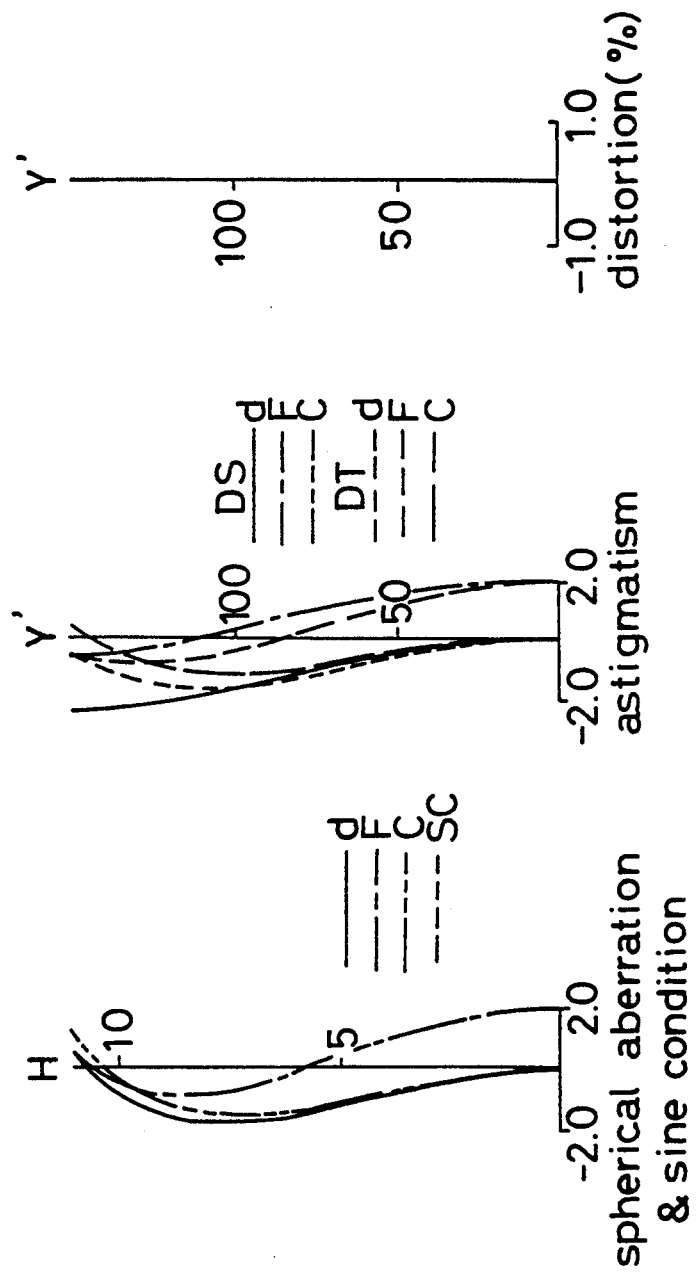
FIGS. 26A and 26B are graphic representations of spherical aberration, astigmatism, distortion and lateral aberration of the sixth embodiment at unity magnification.
Figure 26B:
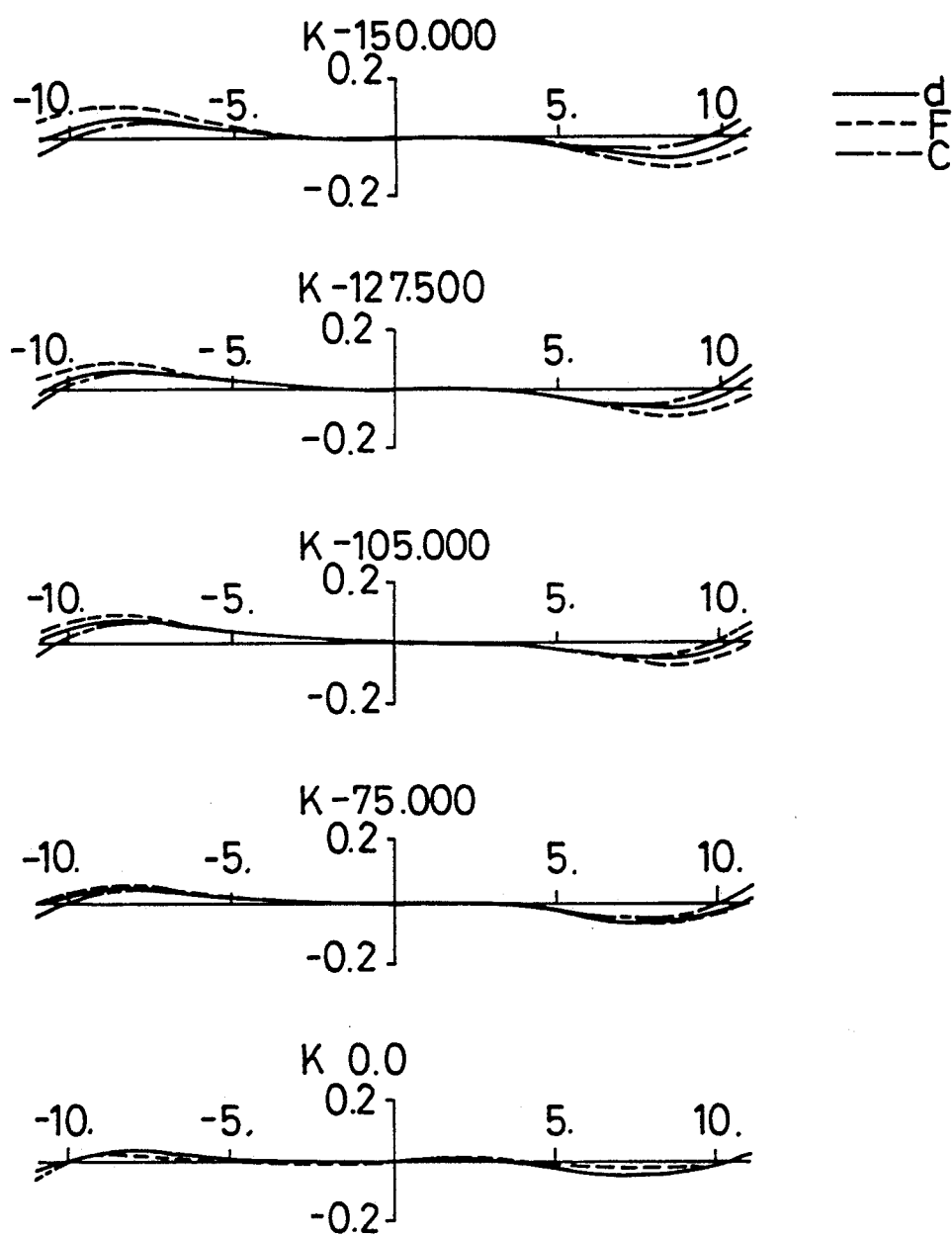
Figure 27A:
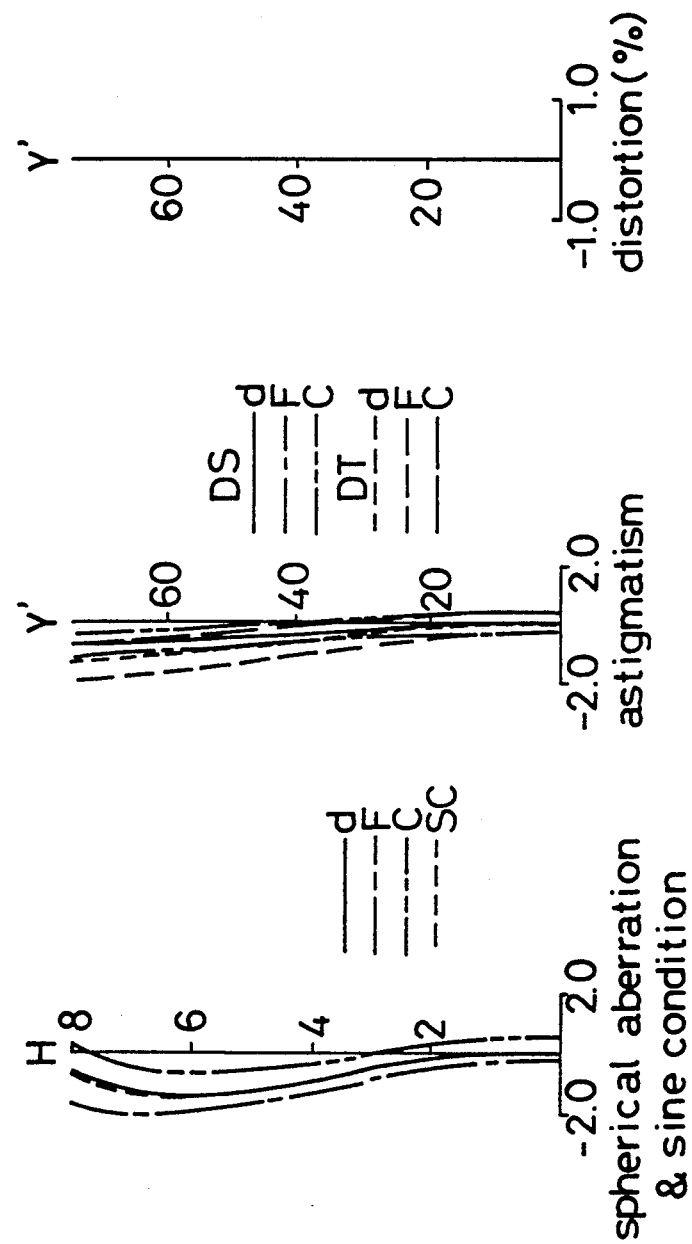
FIGS. 27A and 27B are graphic representations of spherical aberration, astigmatism, distortion and lateral aberration of the sixth embodiment at a magnification larger than unity.
Figure 27B:
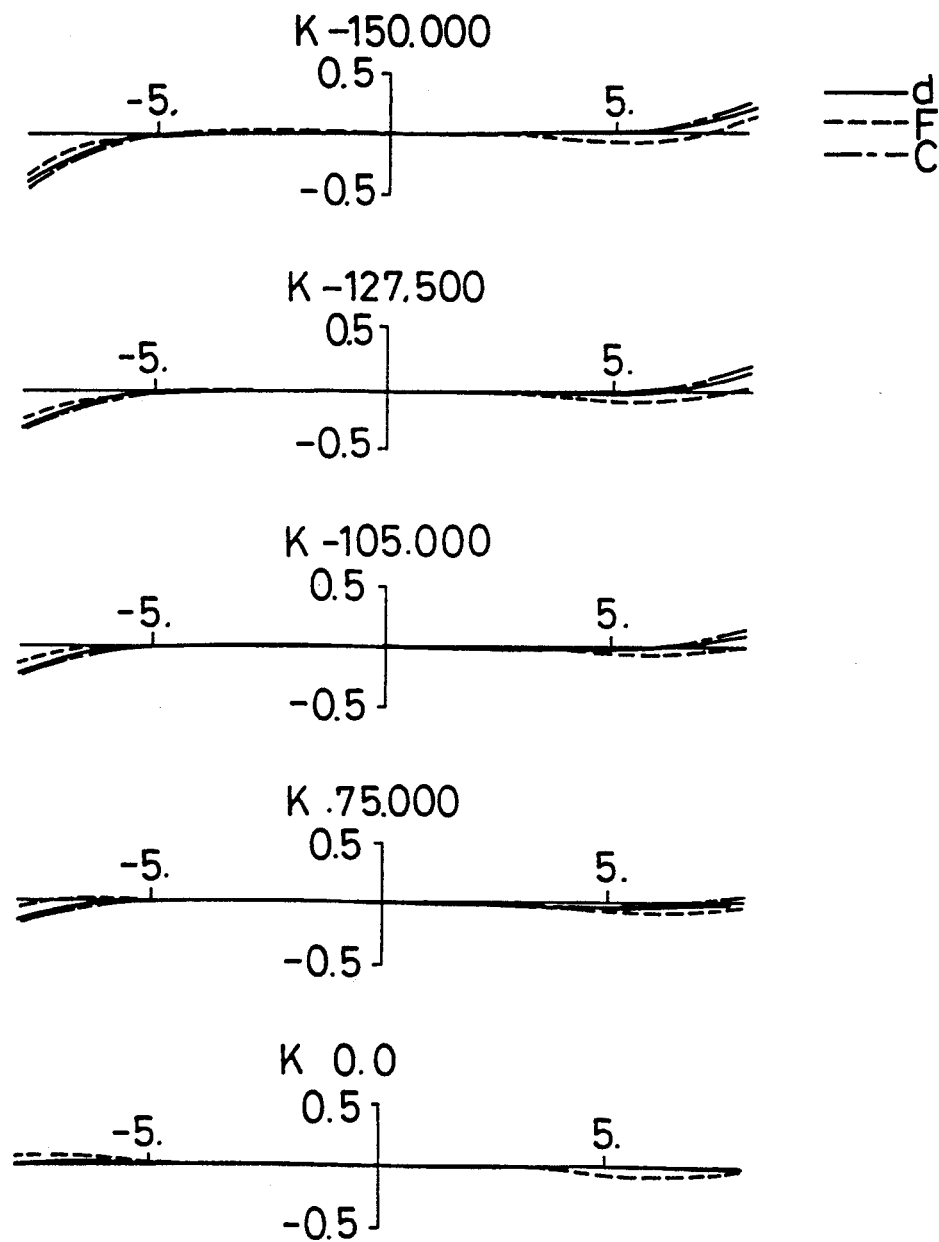
Figure 28A:
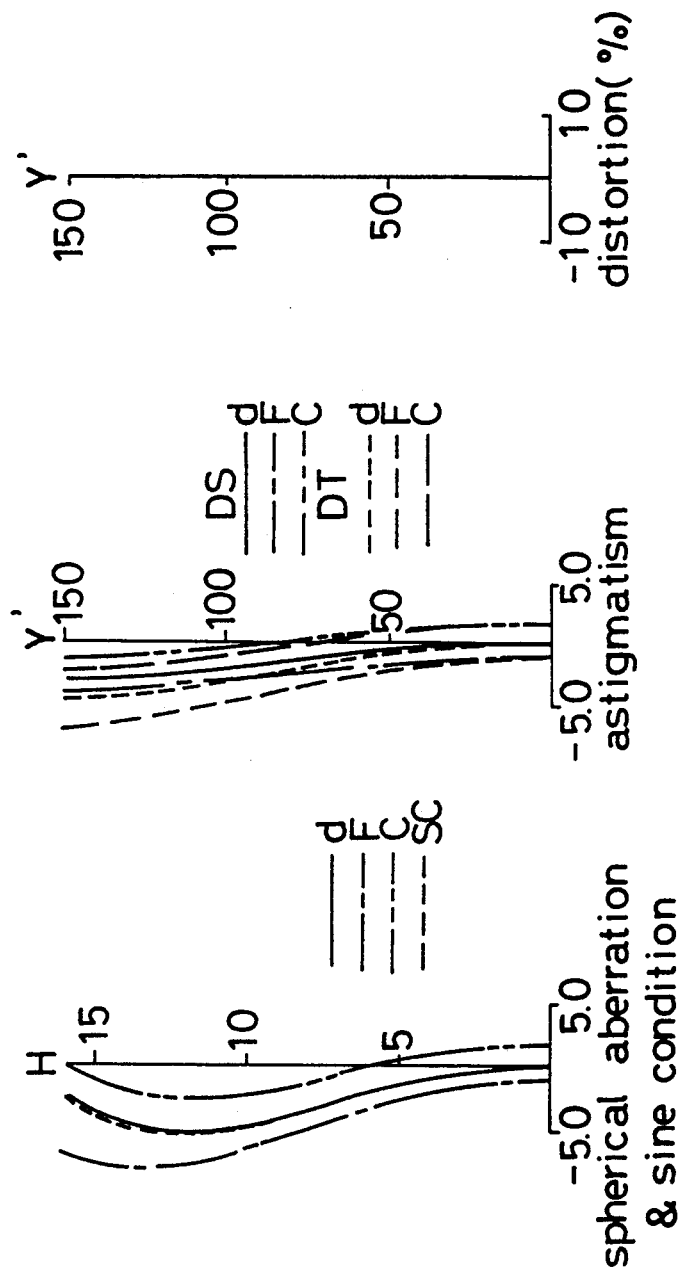
FIGS. 28A and 28B are graphic representations of spherical aberration, astigmatism, distortion and lateral aberration of the sixth embodiment at a magnification smaller than unity.
Figure 28B:
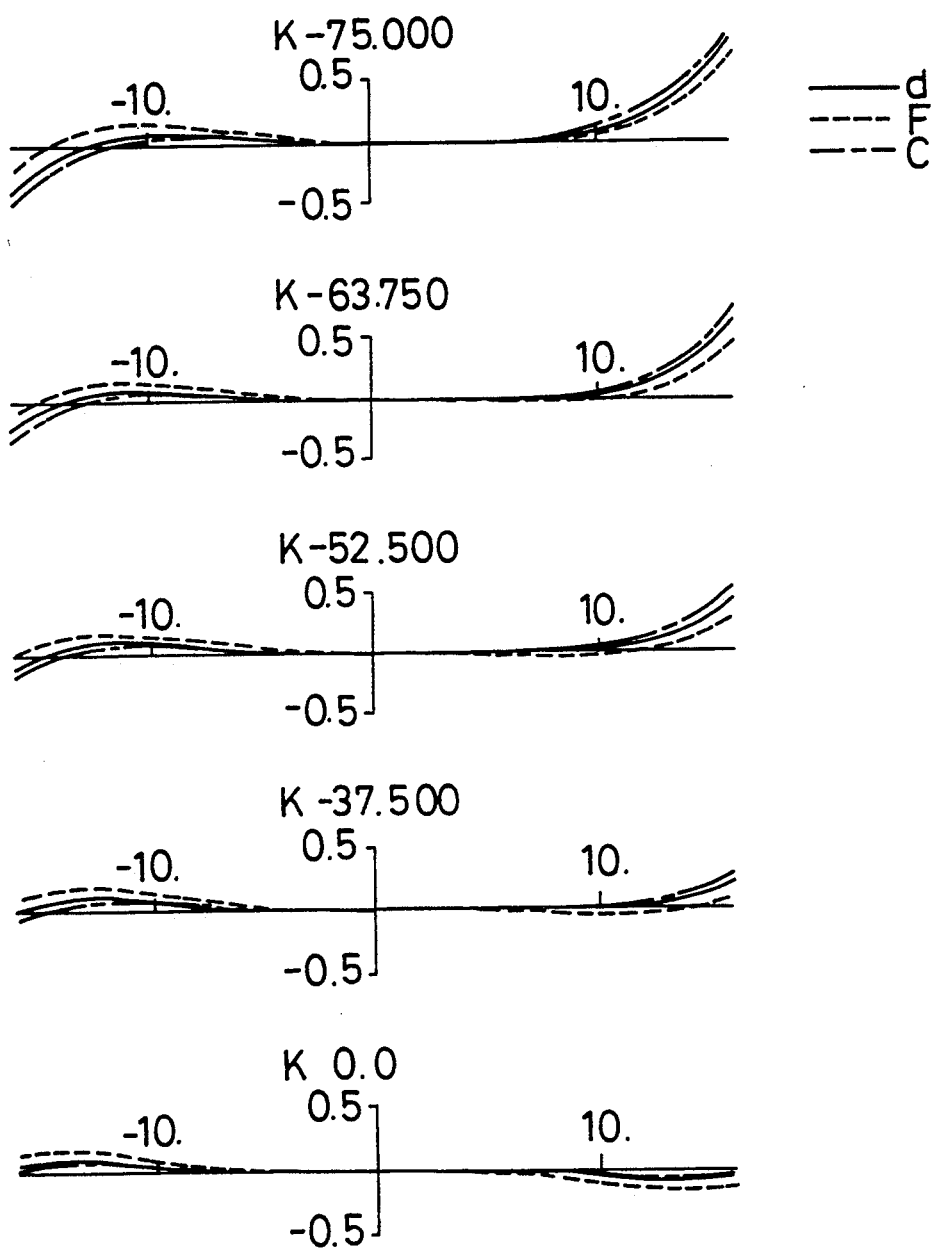
Figure 29:
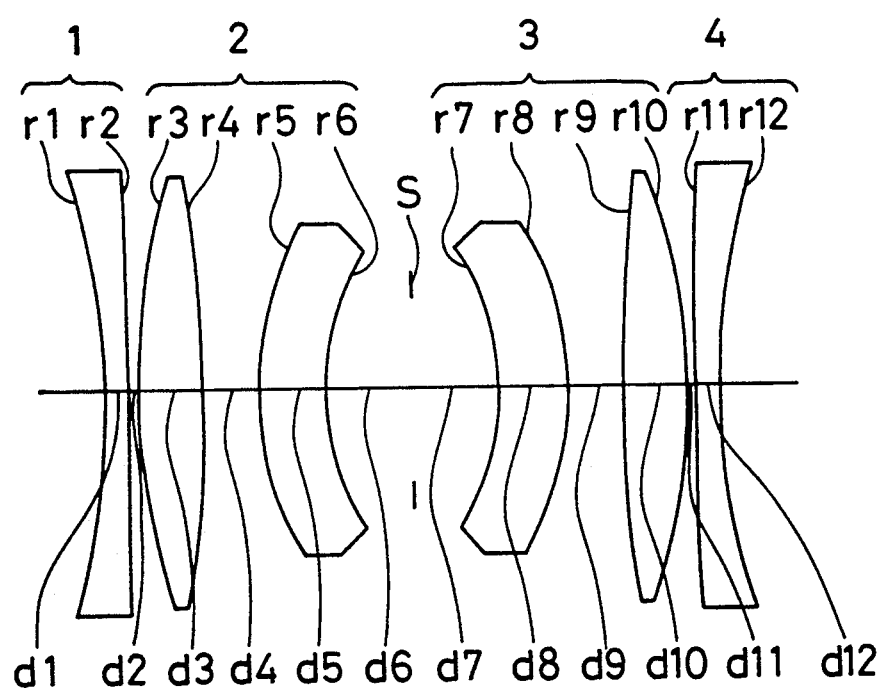
FIG. 29 is a cross-sectional view of the lens arrangement of a seventh embodiment of the present invention.
Figure 30A:
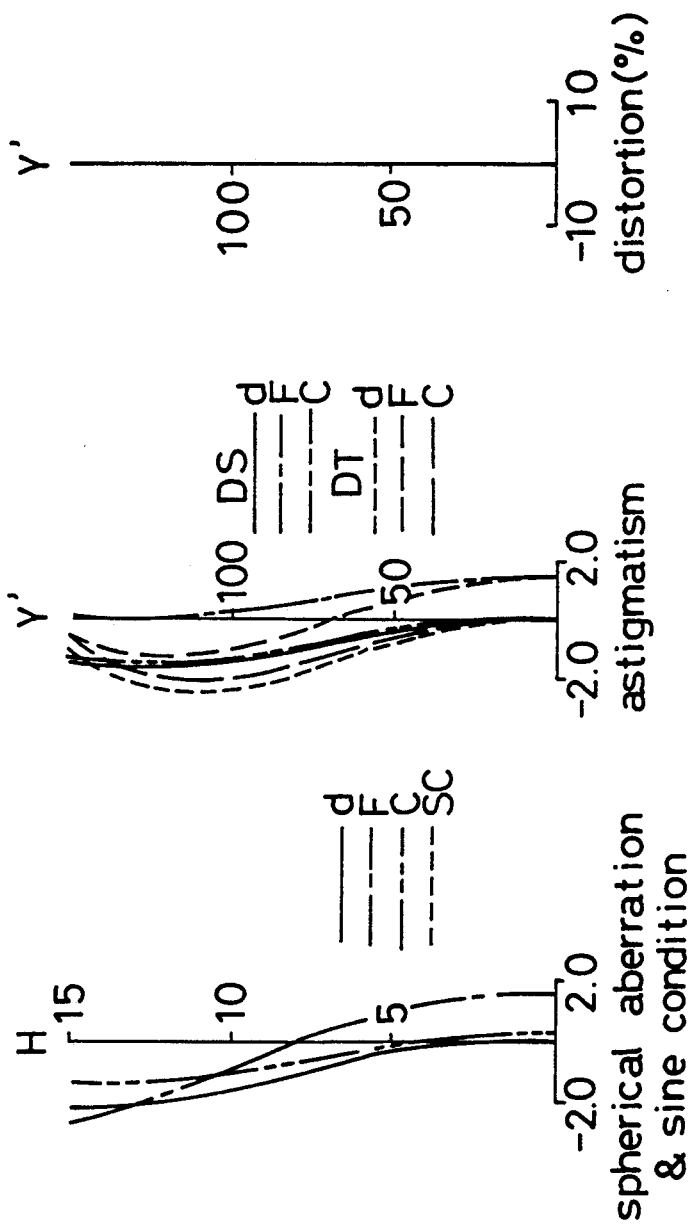
FIGS. 30A and 30B are graphic representations of spherical aberration, astigmatism, distortion and lateral aberration of the seventh embodiment at unity magnification.
Figure 30B:
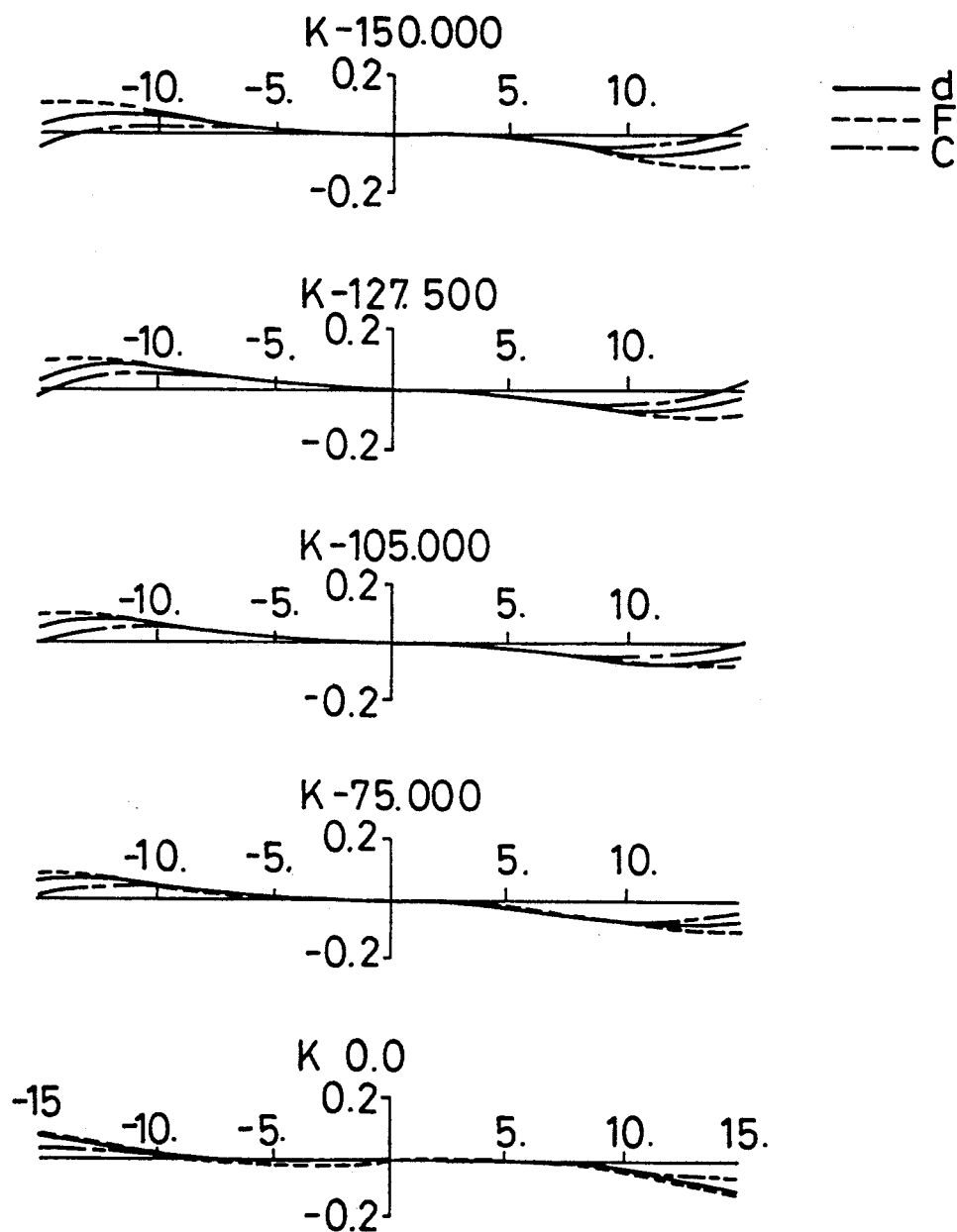
Figure 31A:
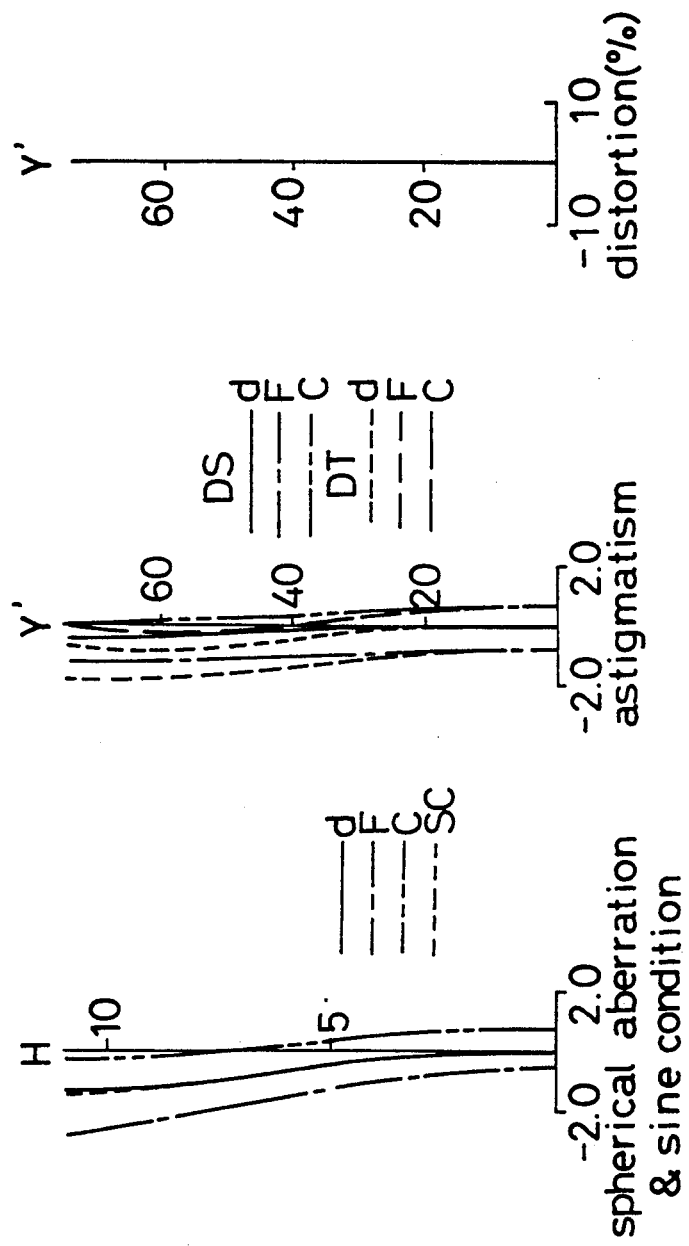
FIGS. 31A and 31B are graphic representations of spherical aberration, astigmatism, distortion and lateral aberration of the seventh embodiment at a magnification larger than unity.
Figure 31B:
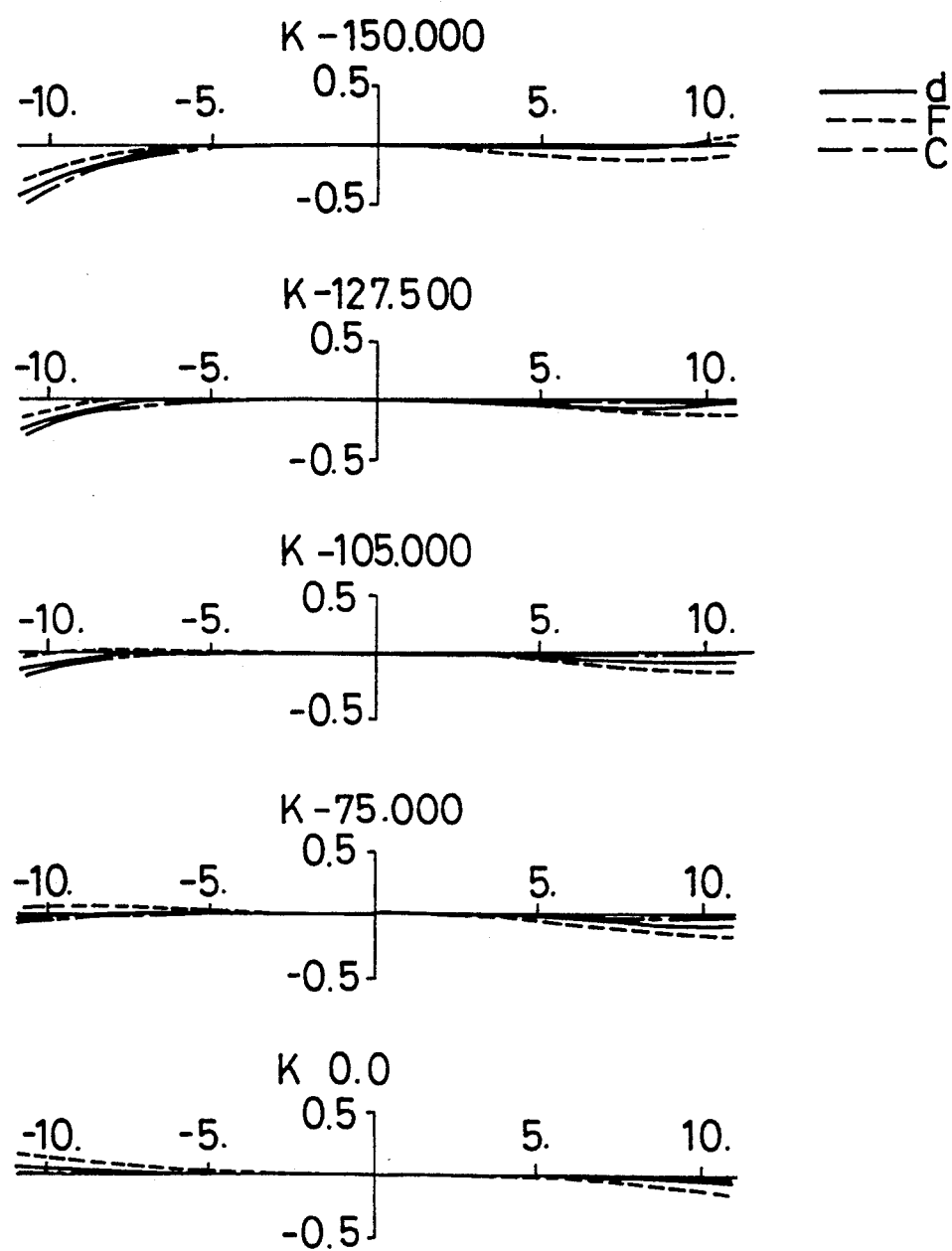
Figure 32B:
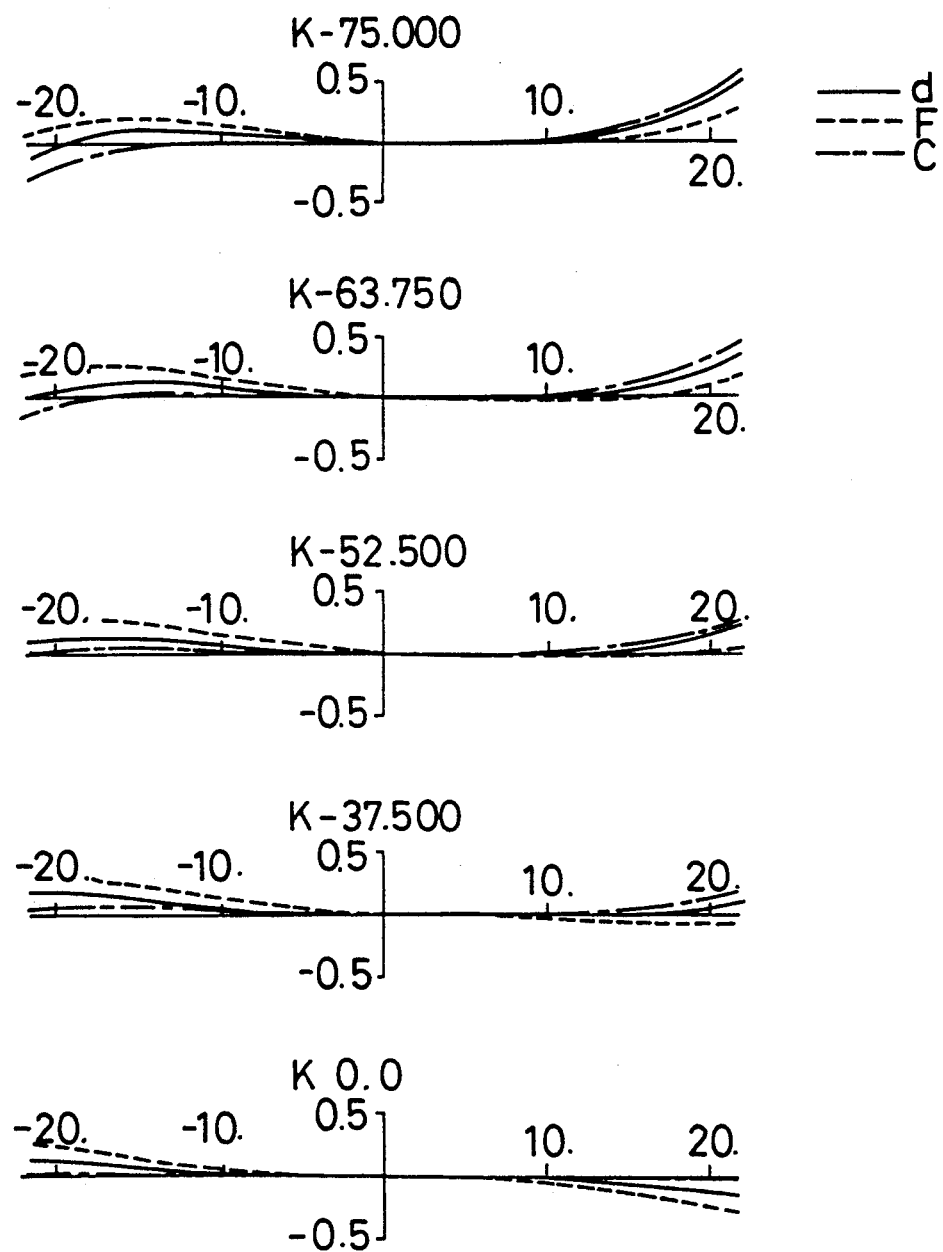
Figure 33:
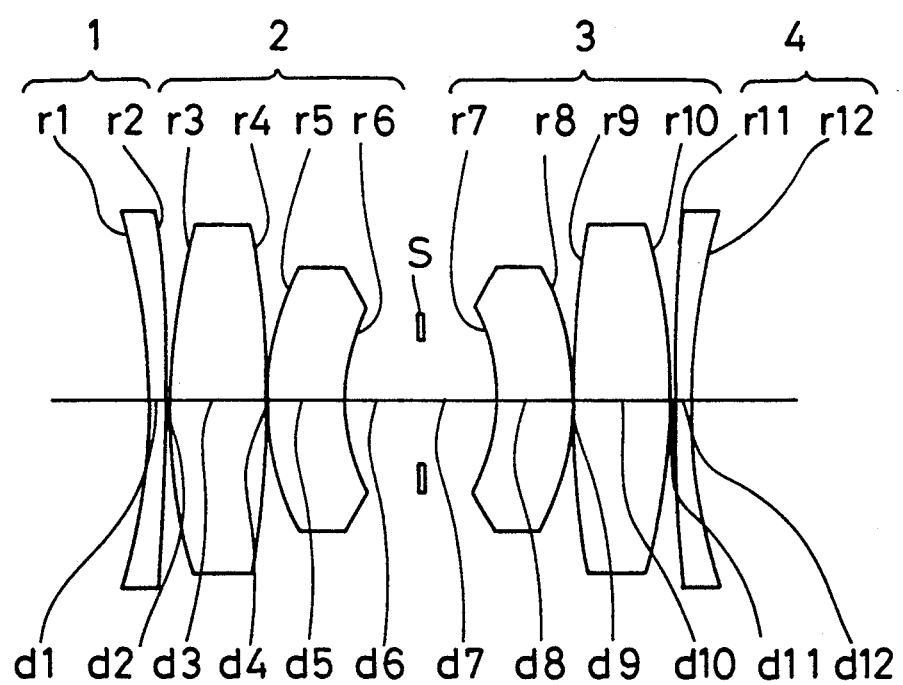
FIG. 33 is a cross-sectional view of the lens arrangement of an eighth embodiment of the present invention.
Figure 34A:
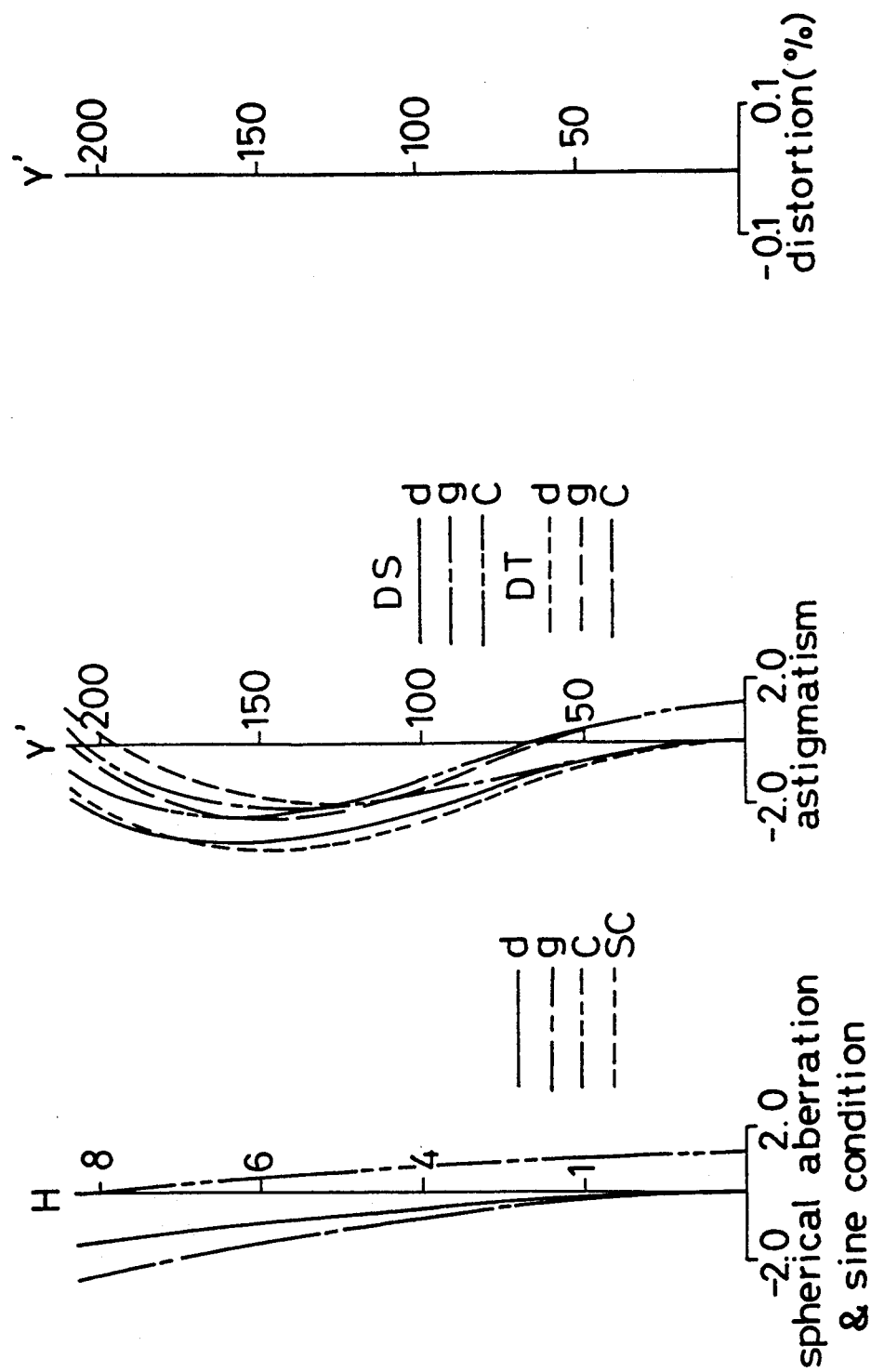
FIGS. 34A and 34B are graphic representations of spherical aberration, astigmatism, distortion and lateral aberration of the eighth embodiment at unity magnification.
Figure 34B:
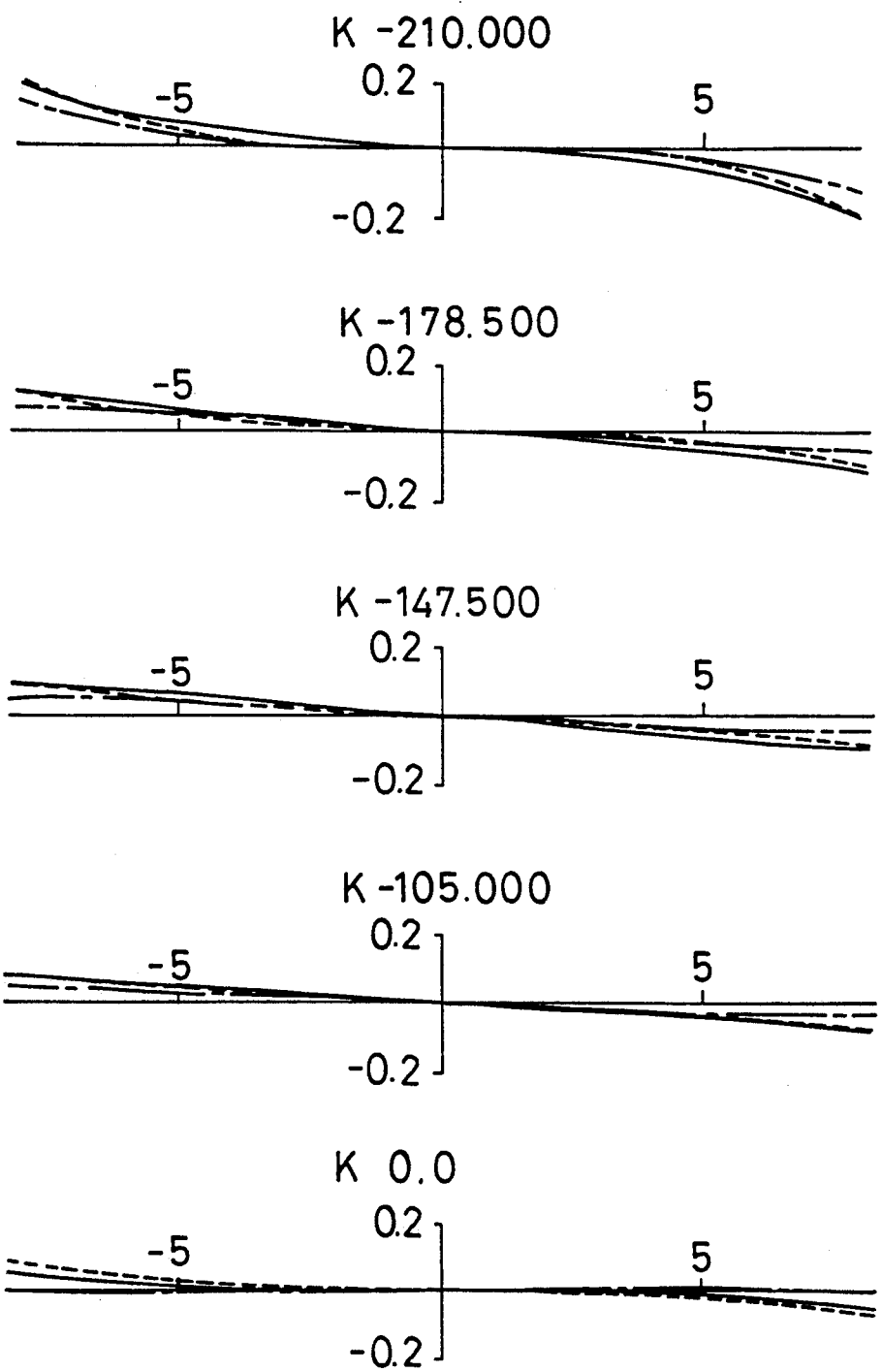
Figure 35B:
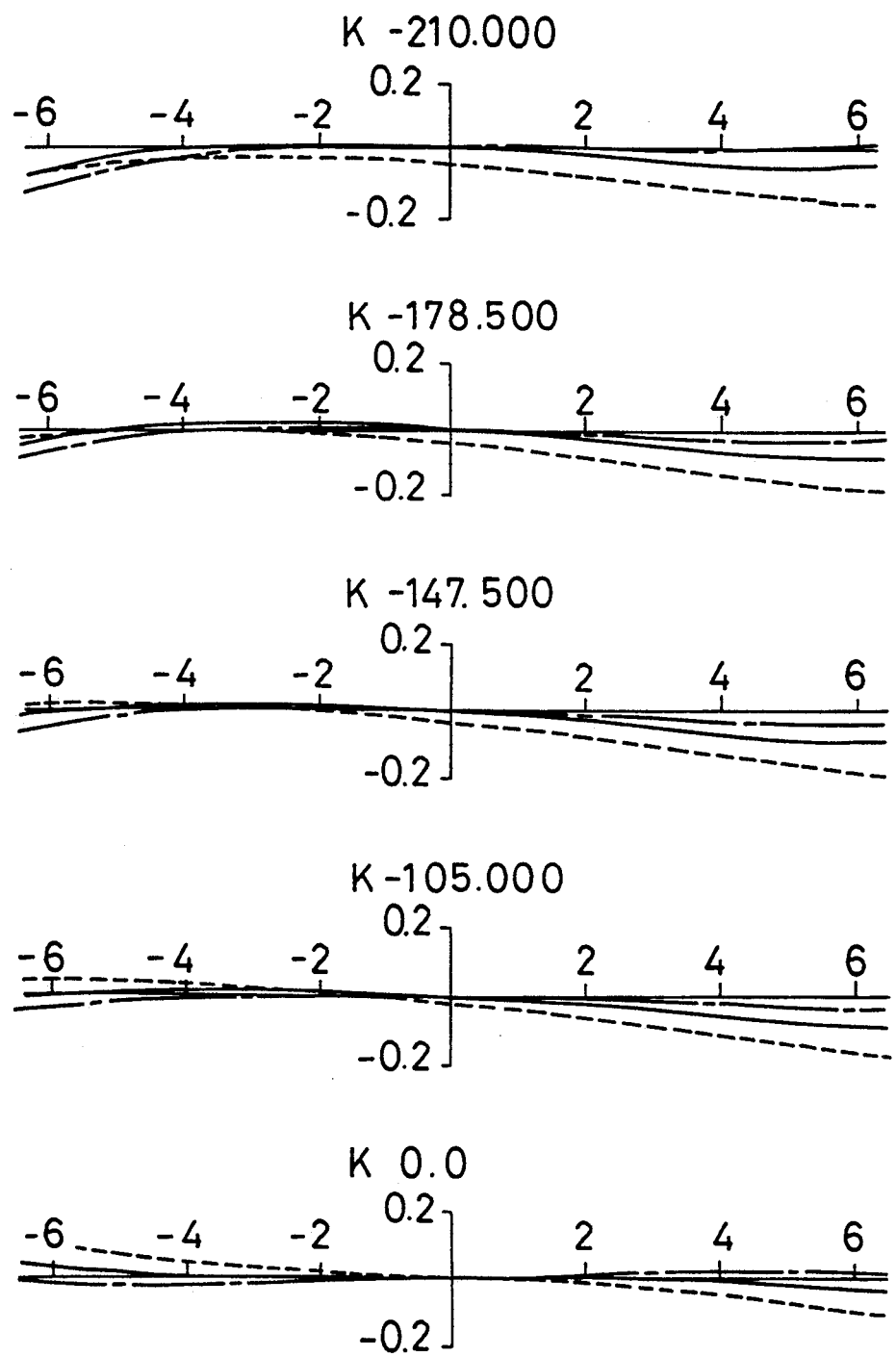
Figure 36A:
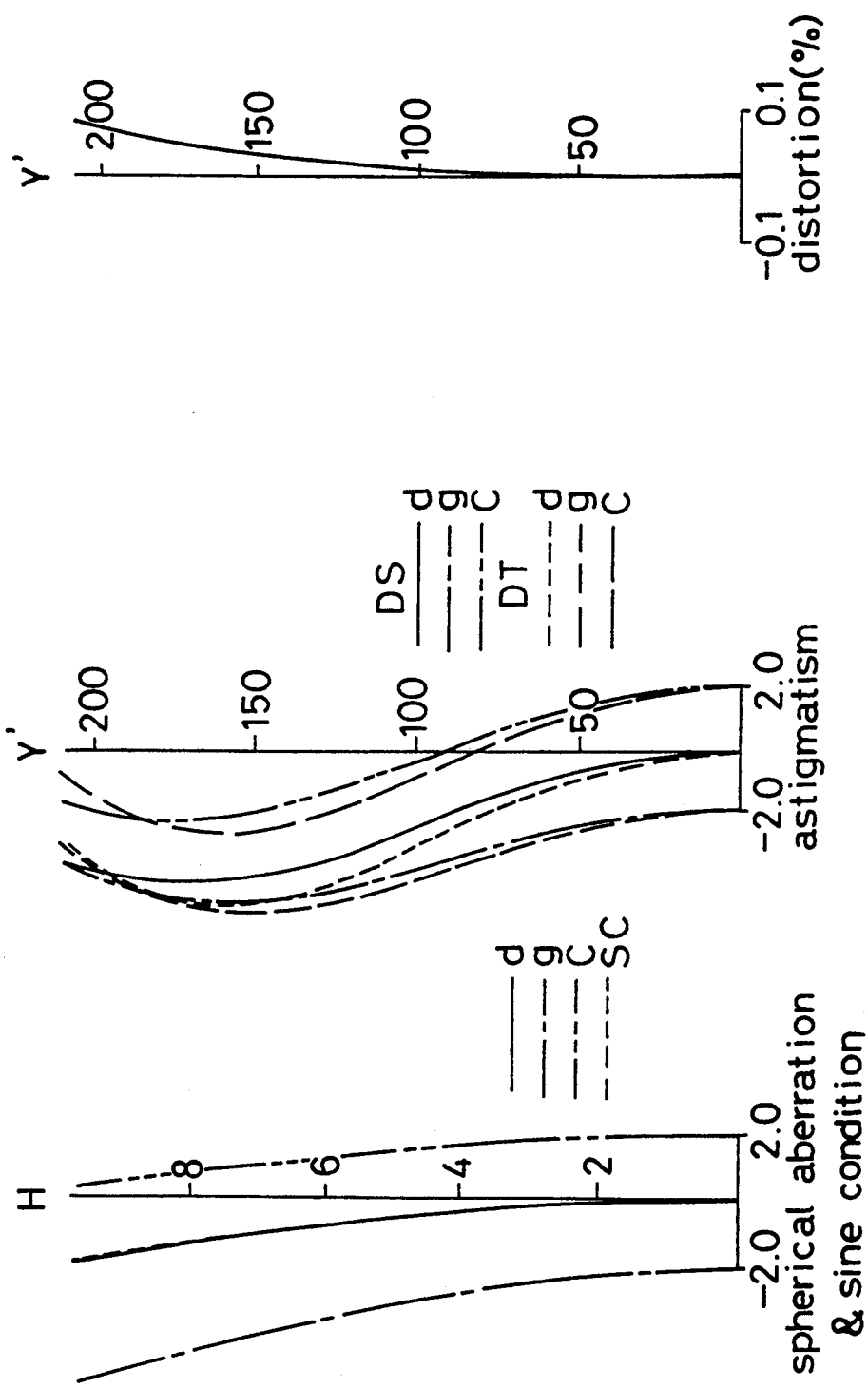
FIGS. 36A and 36B are graphic representations of spherical aberration, astigmatism, distortion and lateral aberration of the eighth embodiment at a magnification smaller than unity.
Figure 36B:
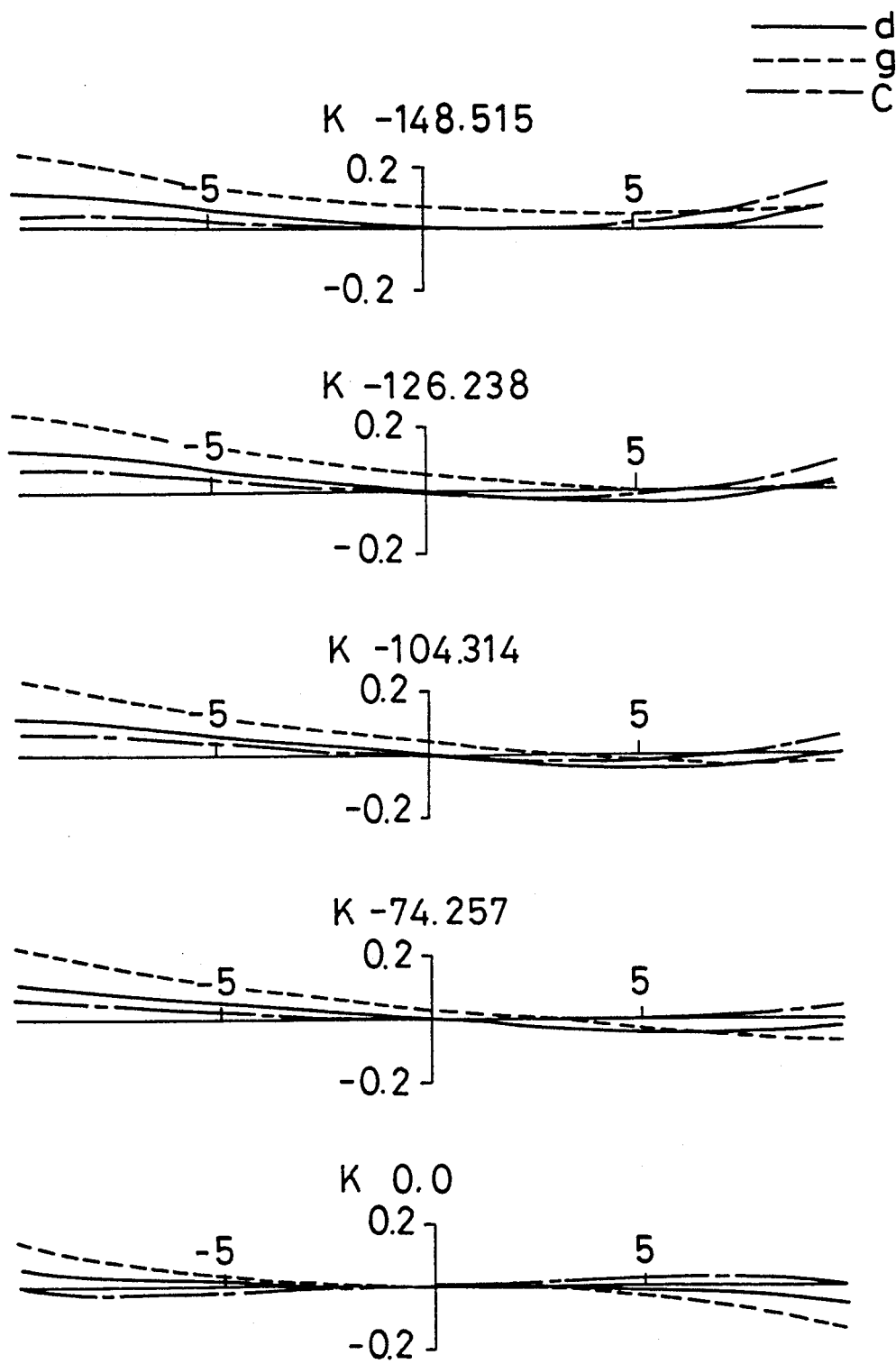
Figure 37:
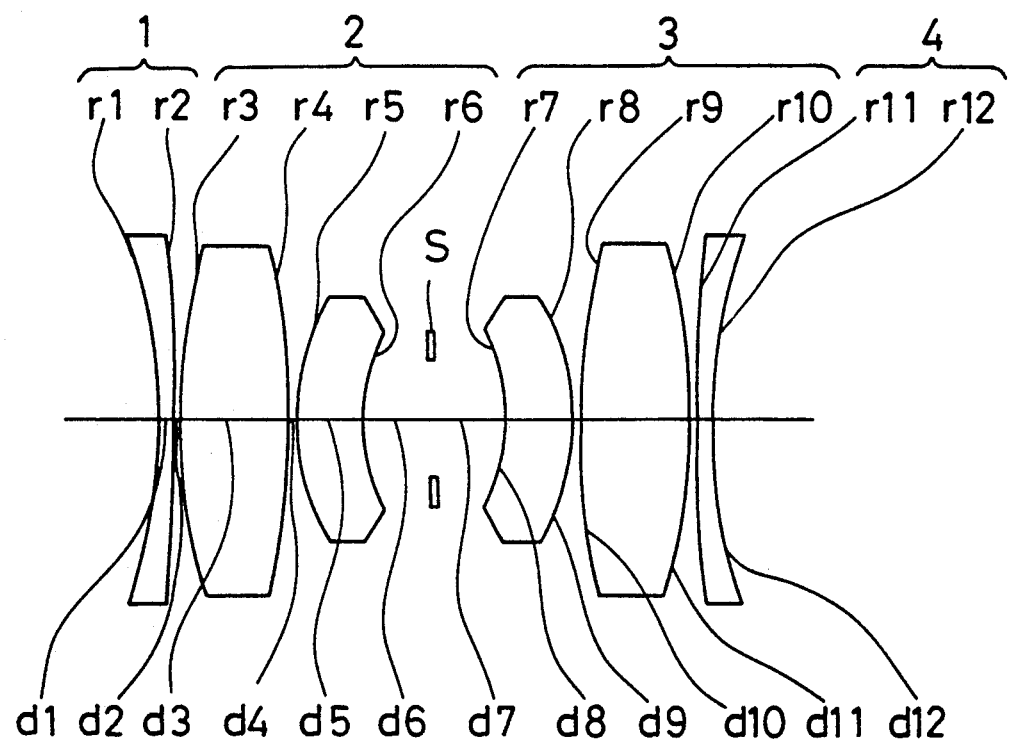
FIG. 37 is a cross-sectional view of the lens arrangement of a ninth embodiment of the present invention.
Figure 38B:
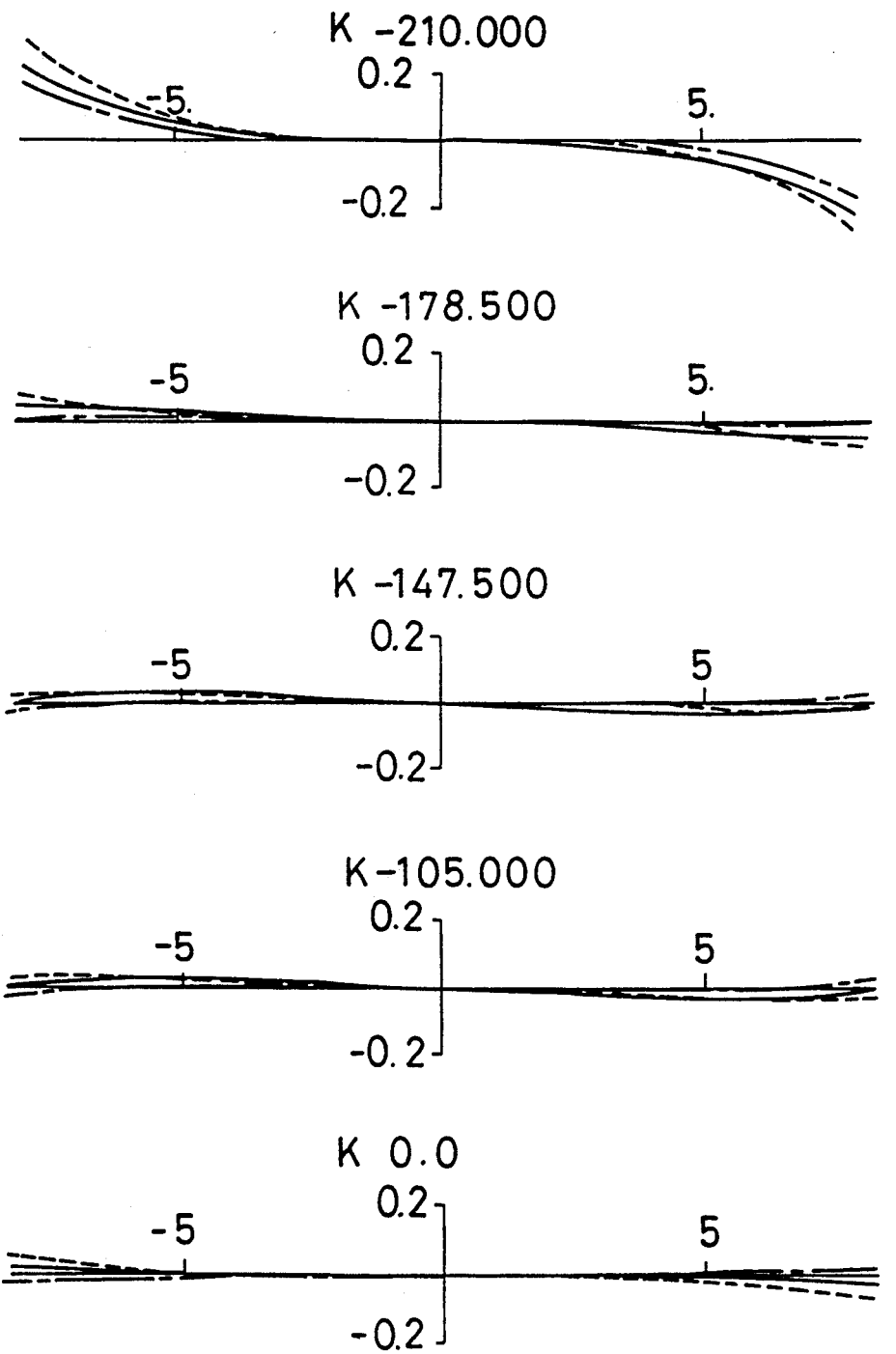
Figure 39B:
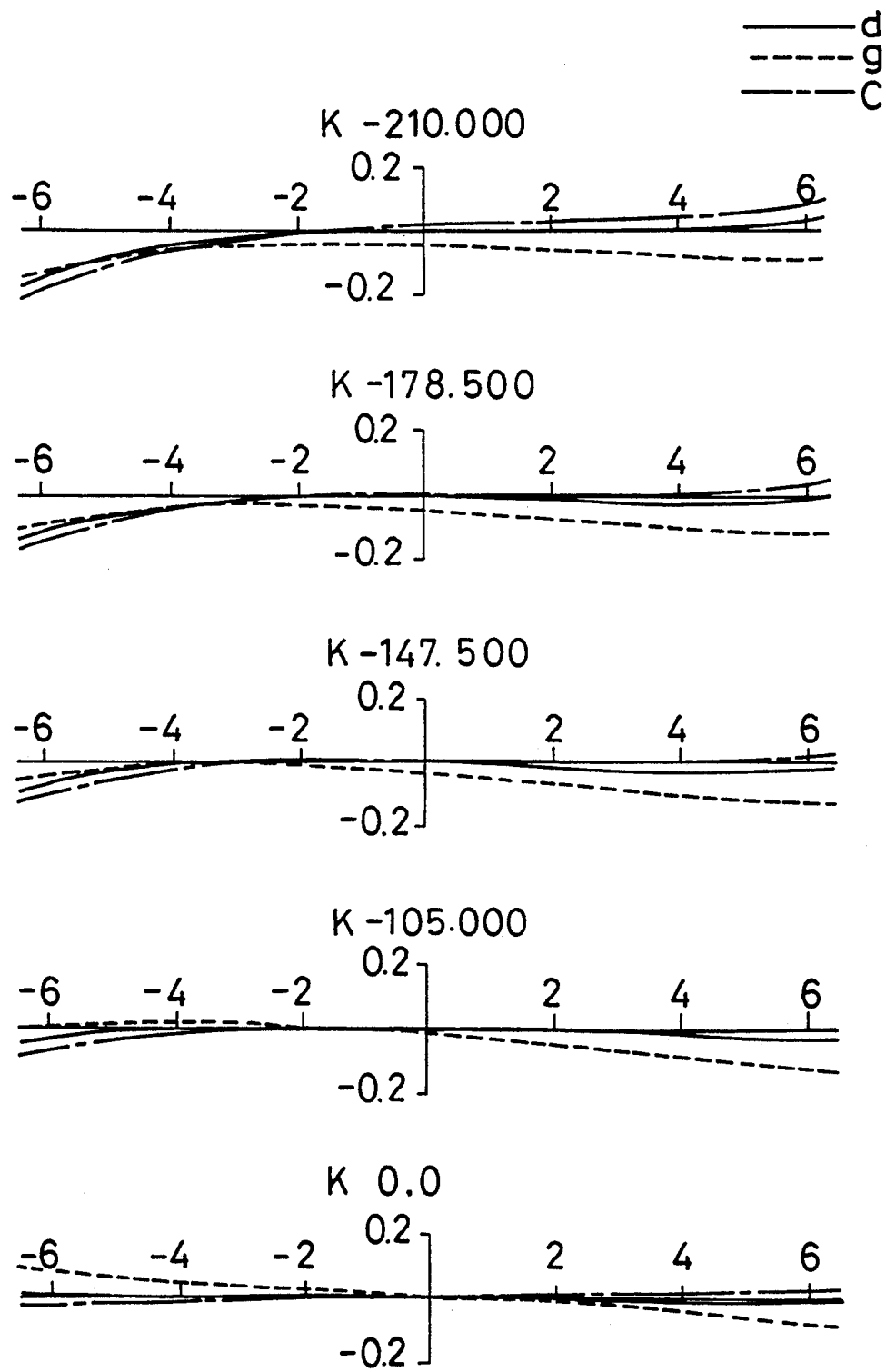
Figure 41:
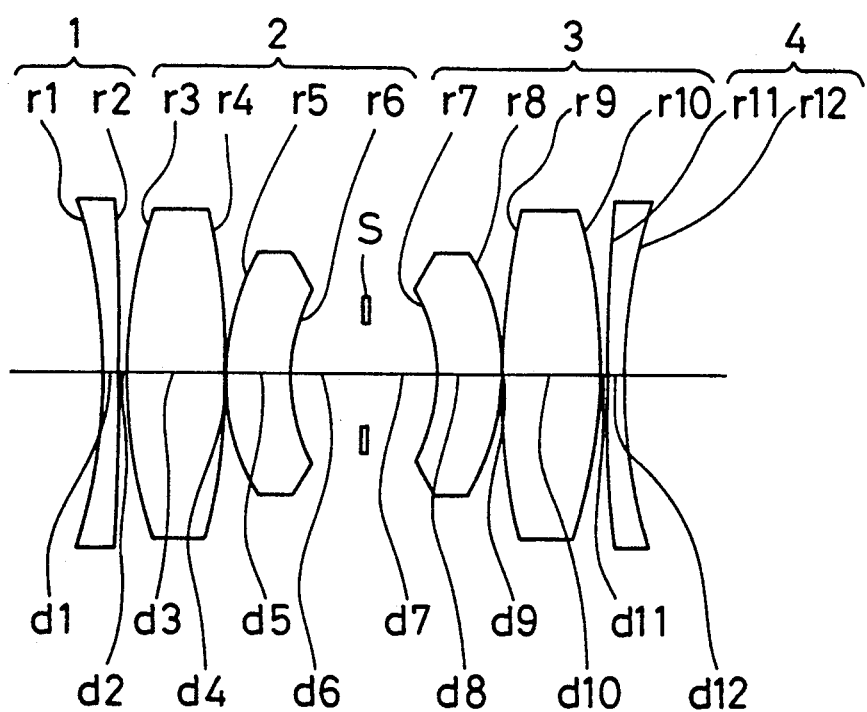
FIG. 41 is a cross-sectional view of the lens arrangement of a tenth embodiment of the present invention.
Figure 43A:
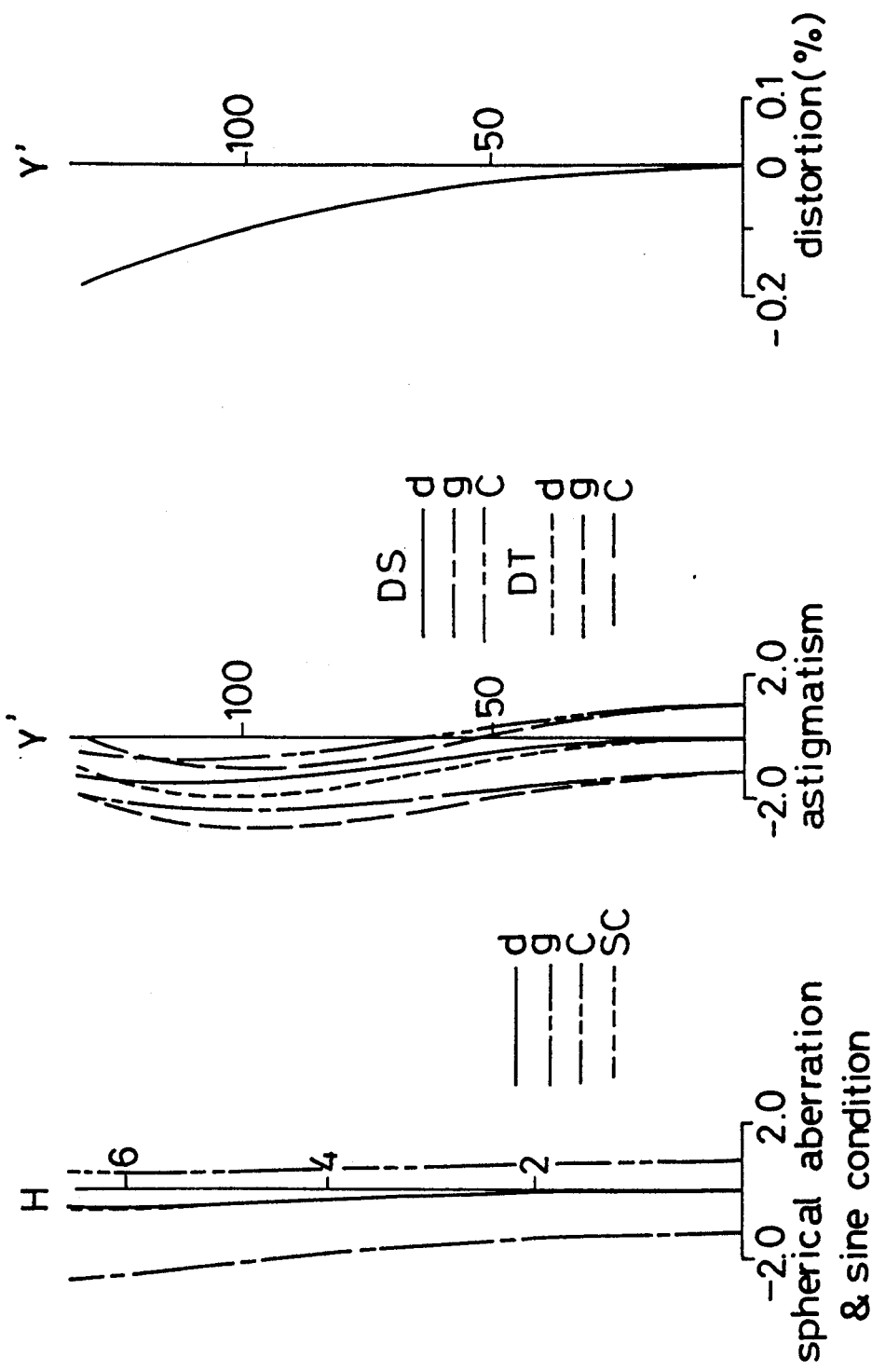
Figure 45:
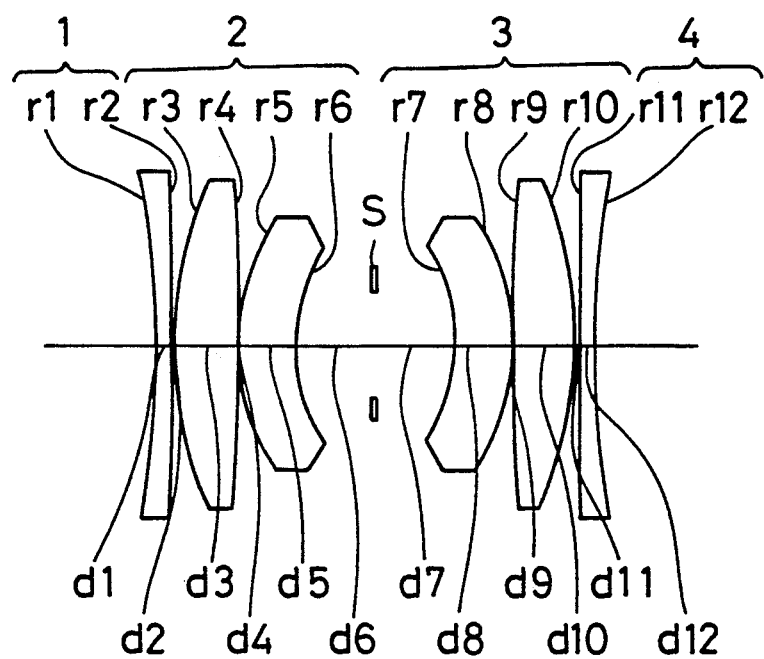
FIG. 45 is a cross-sectional view of the lens arrangement of an eleventh embodiment of the present invention.
Figure 46A:
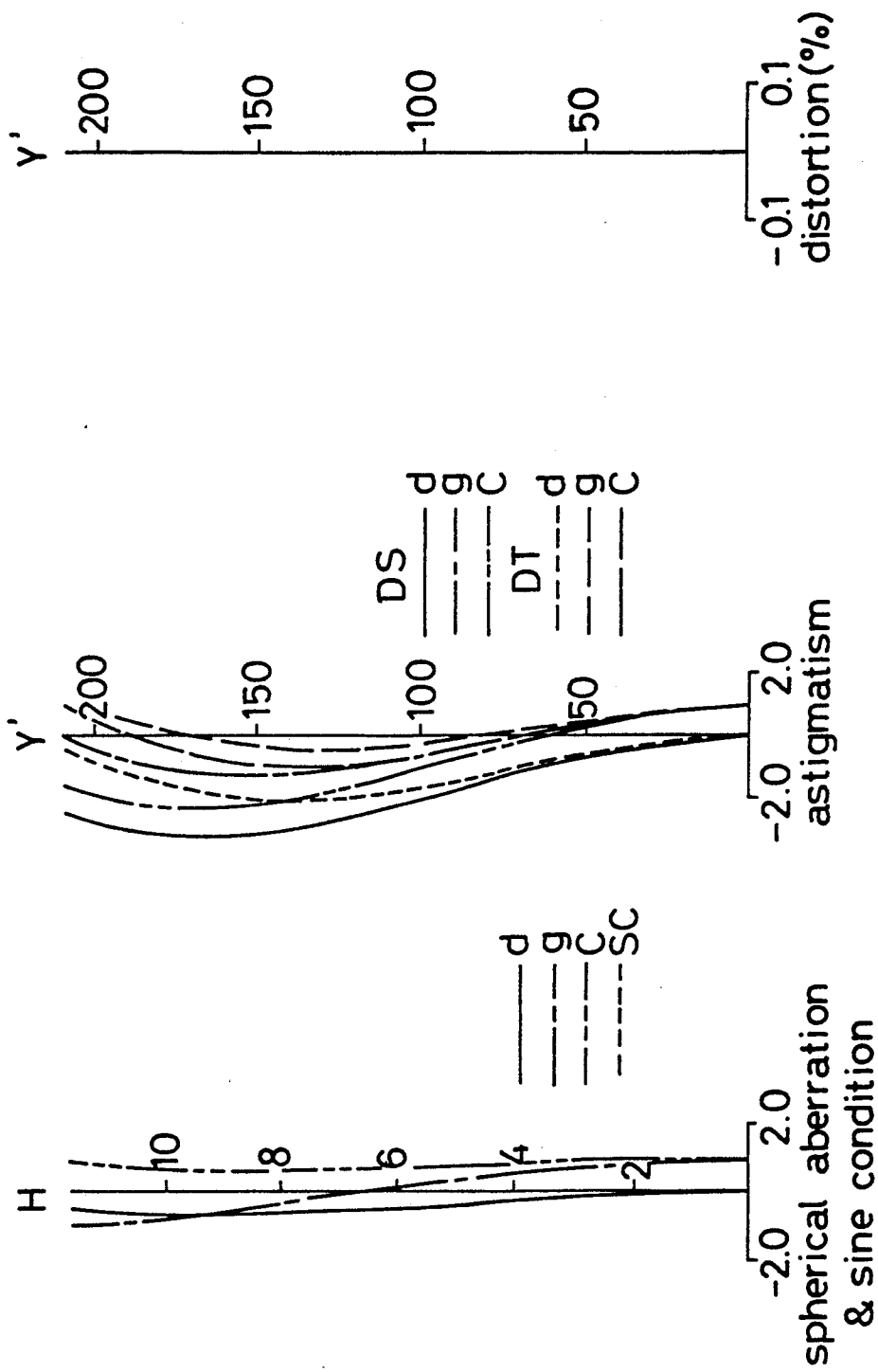
Figure 49:
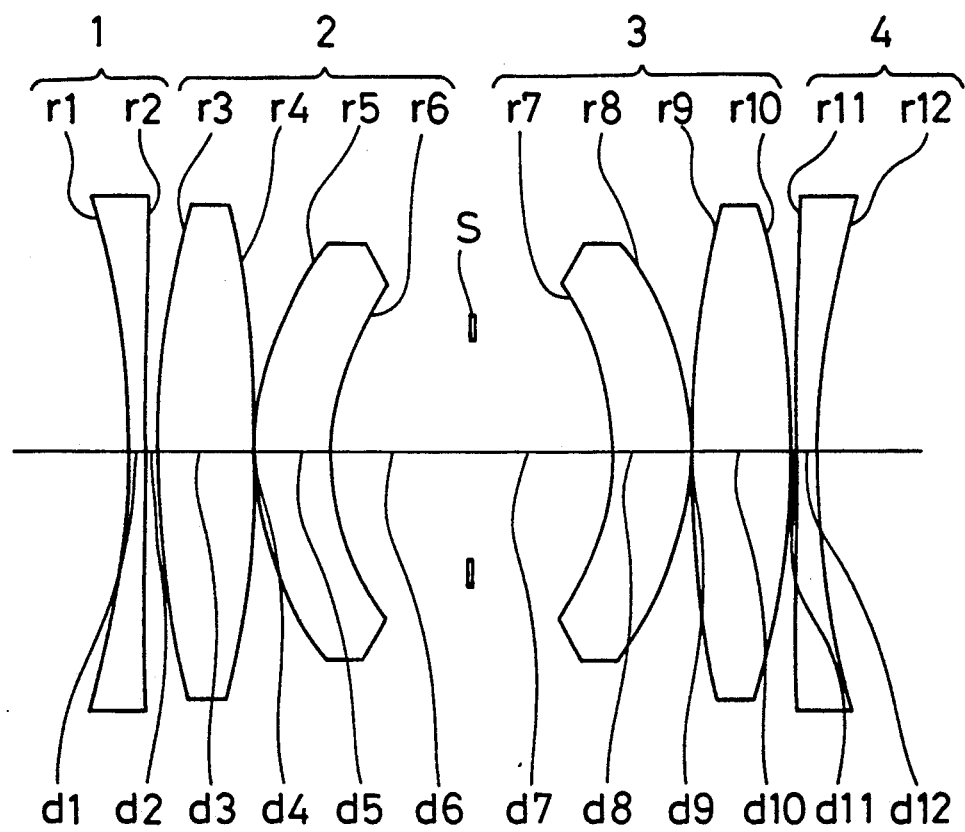
FIG. 49 is a cross-sectional view of the lens arrangement of a twelfth embodiment of the present invention.
Figure 50B:
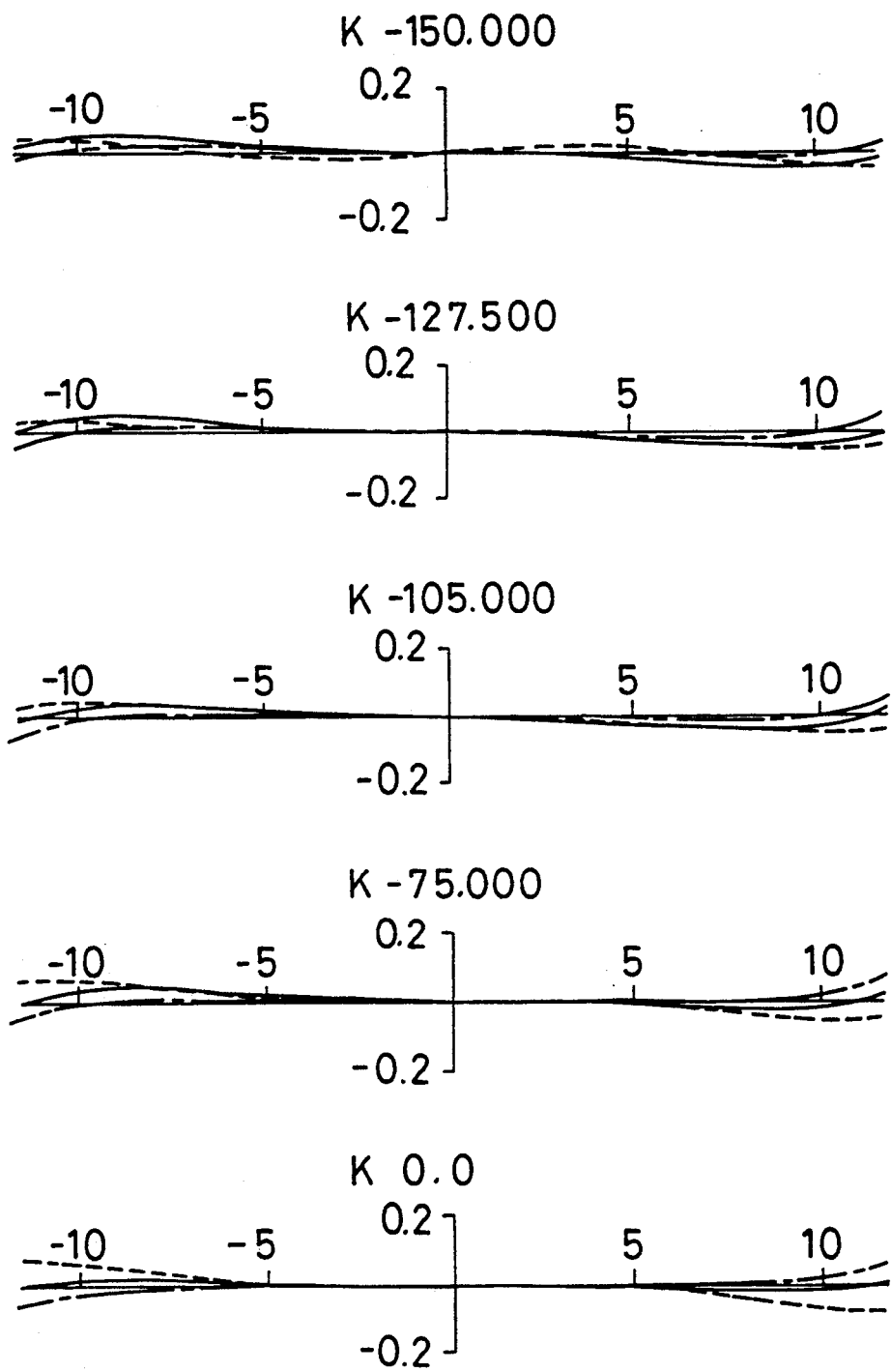
Figure 51B:
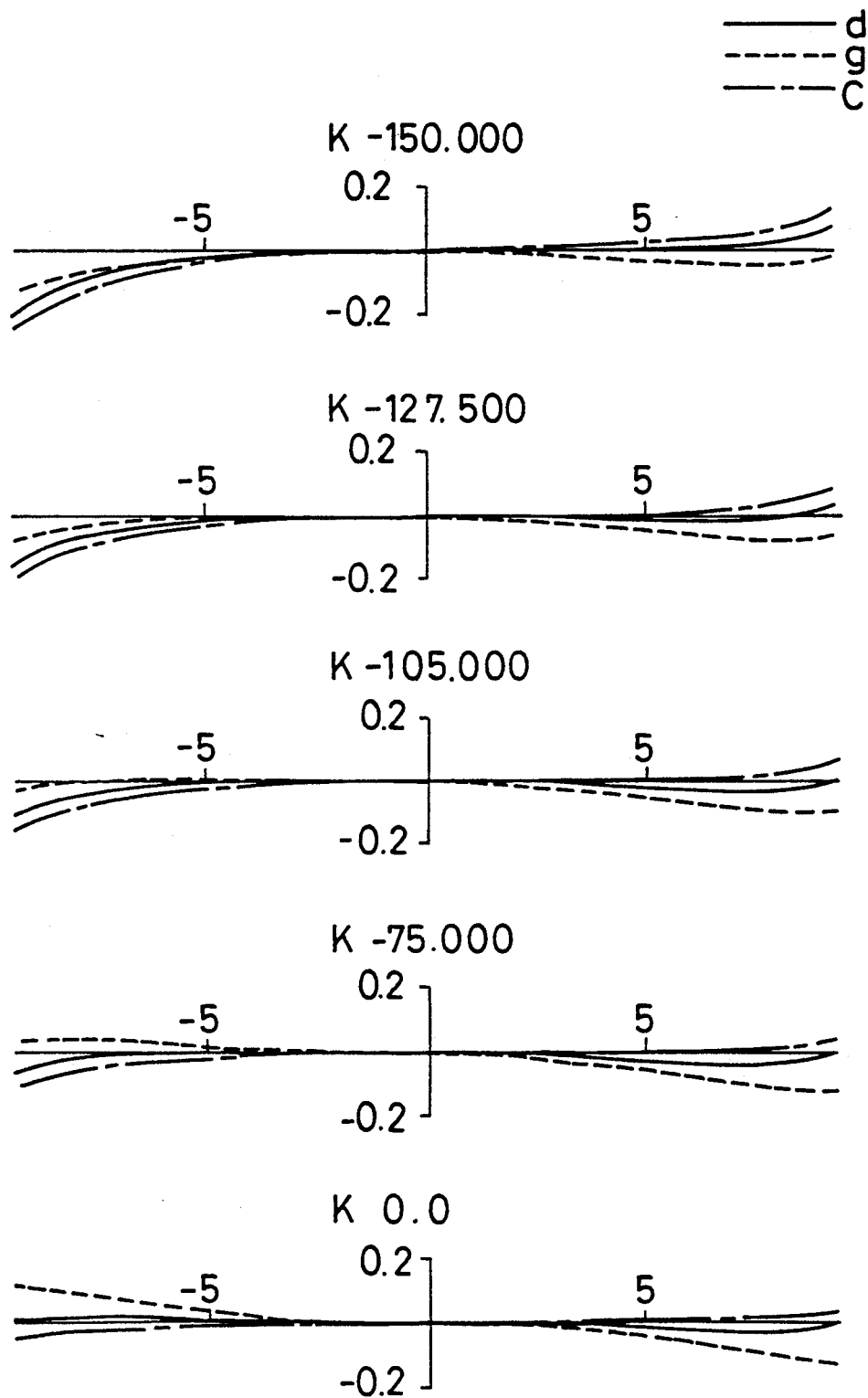
Figure 53:
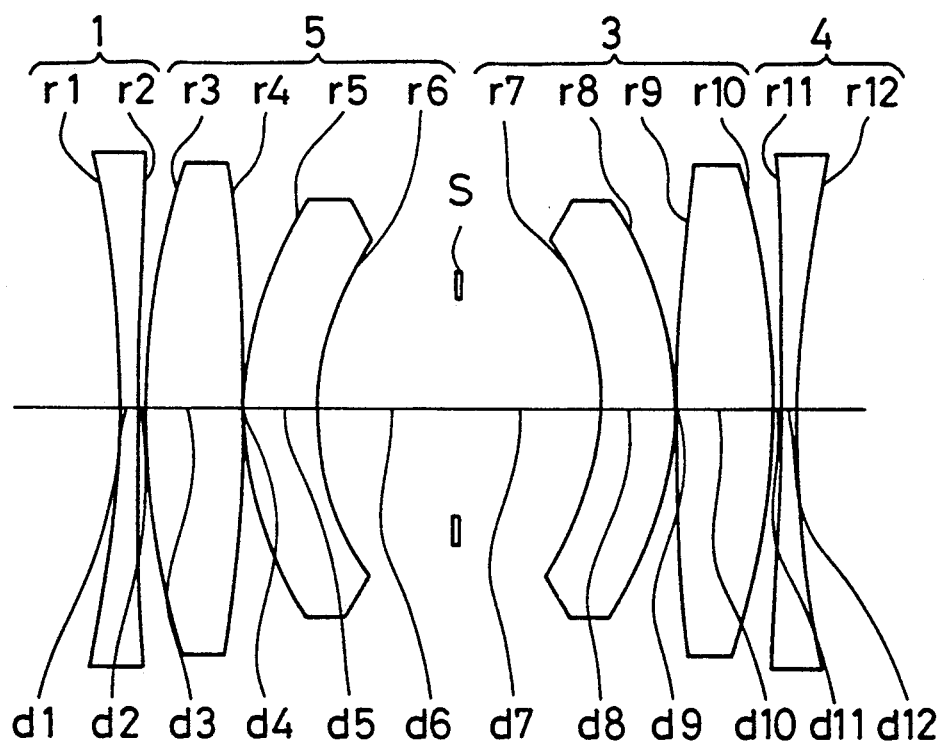
FIG. 53 is a cross-sectional view of the lens arrangement of a thirteenth embodiment of the present invention.
Figure 54A:
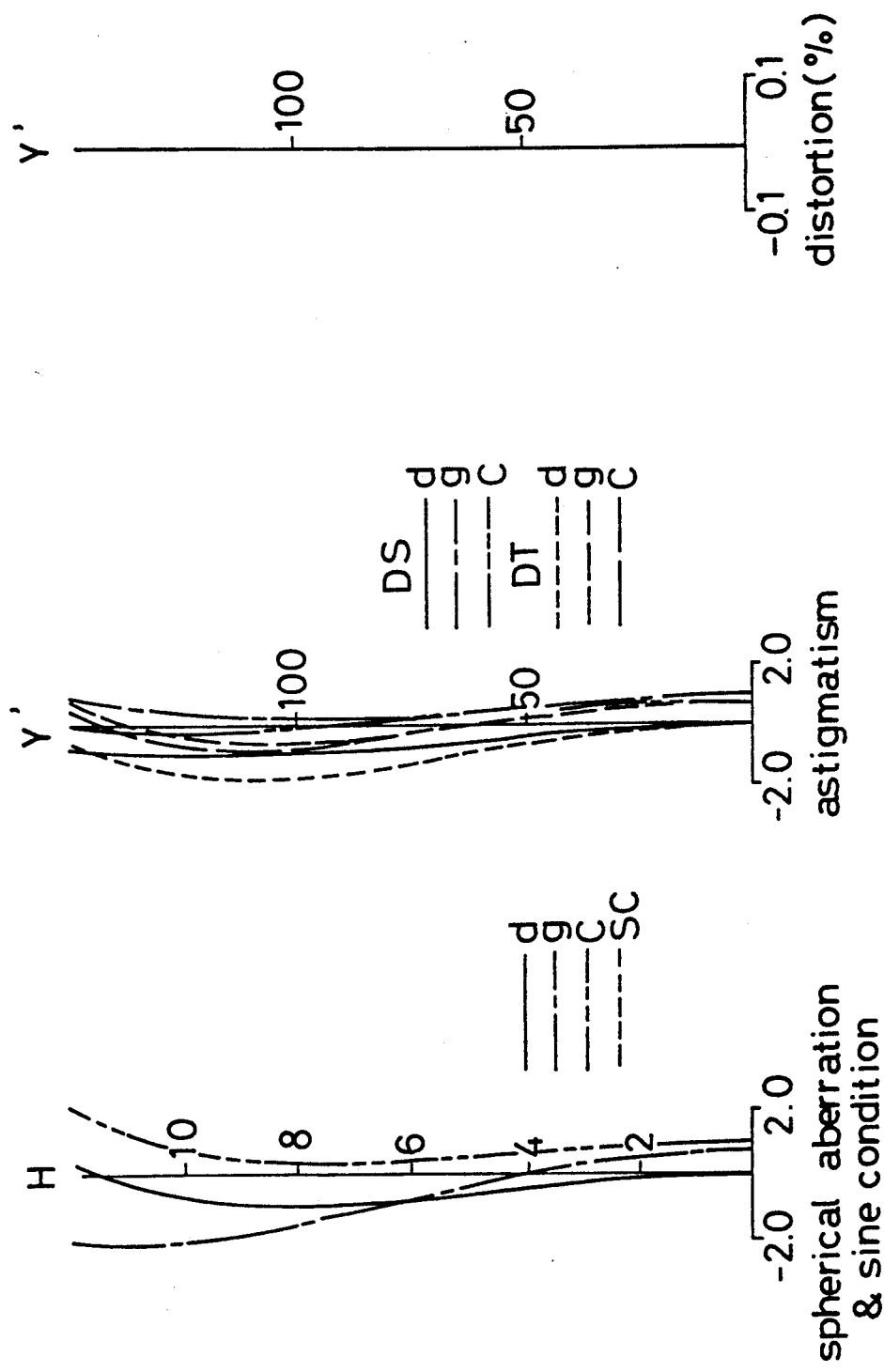
FIGS. 54A and 54B are graphic representations of spherical aberration, astigmatism, distortion and lateral aberration of the thirteenth embodiment at unity magnification.
Figure 54B:
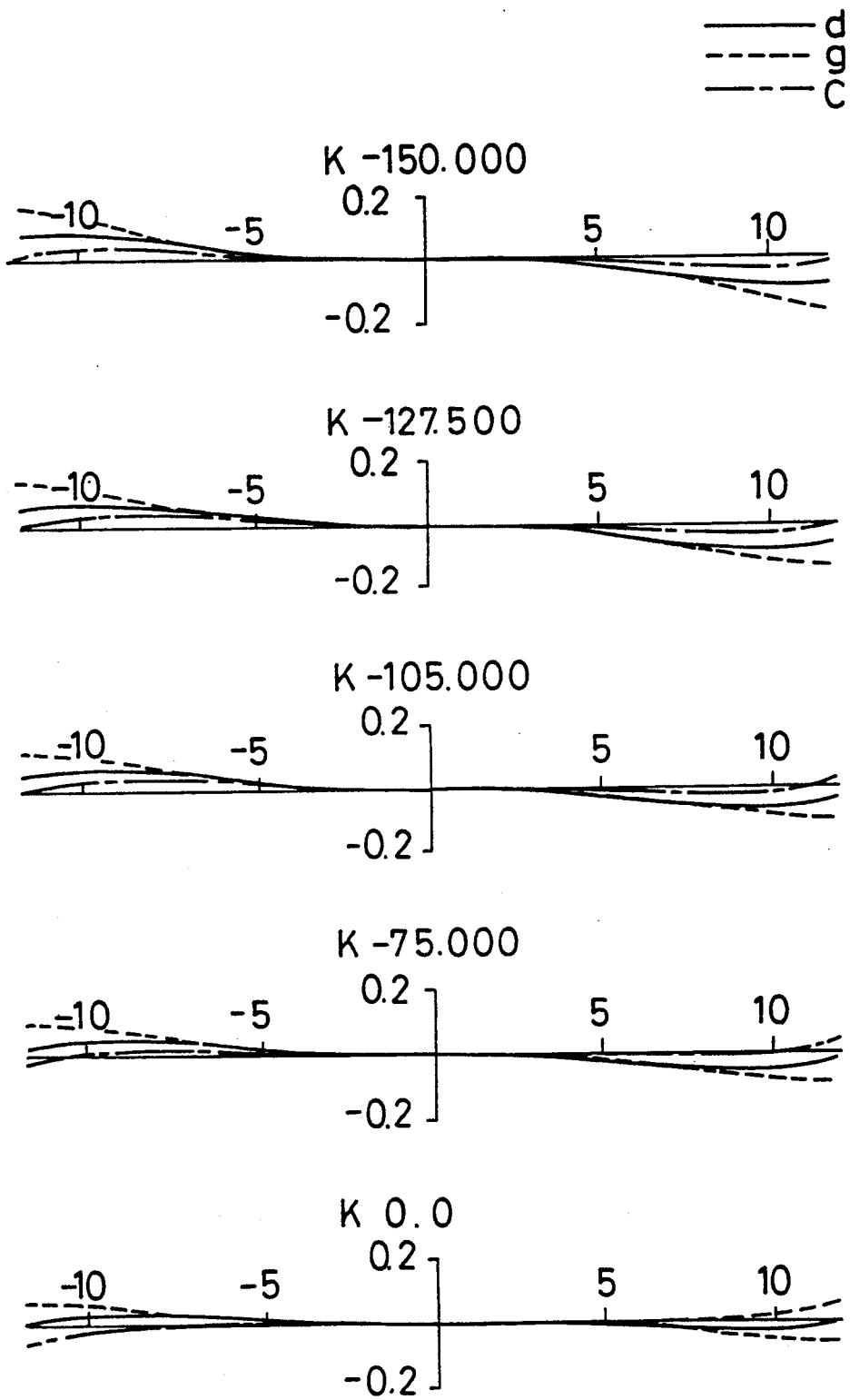
Figure 56A:
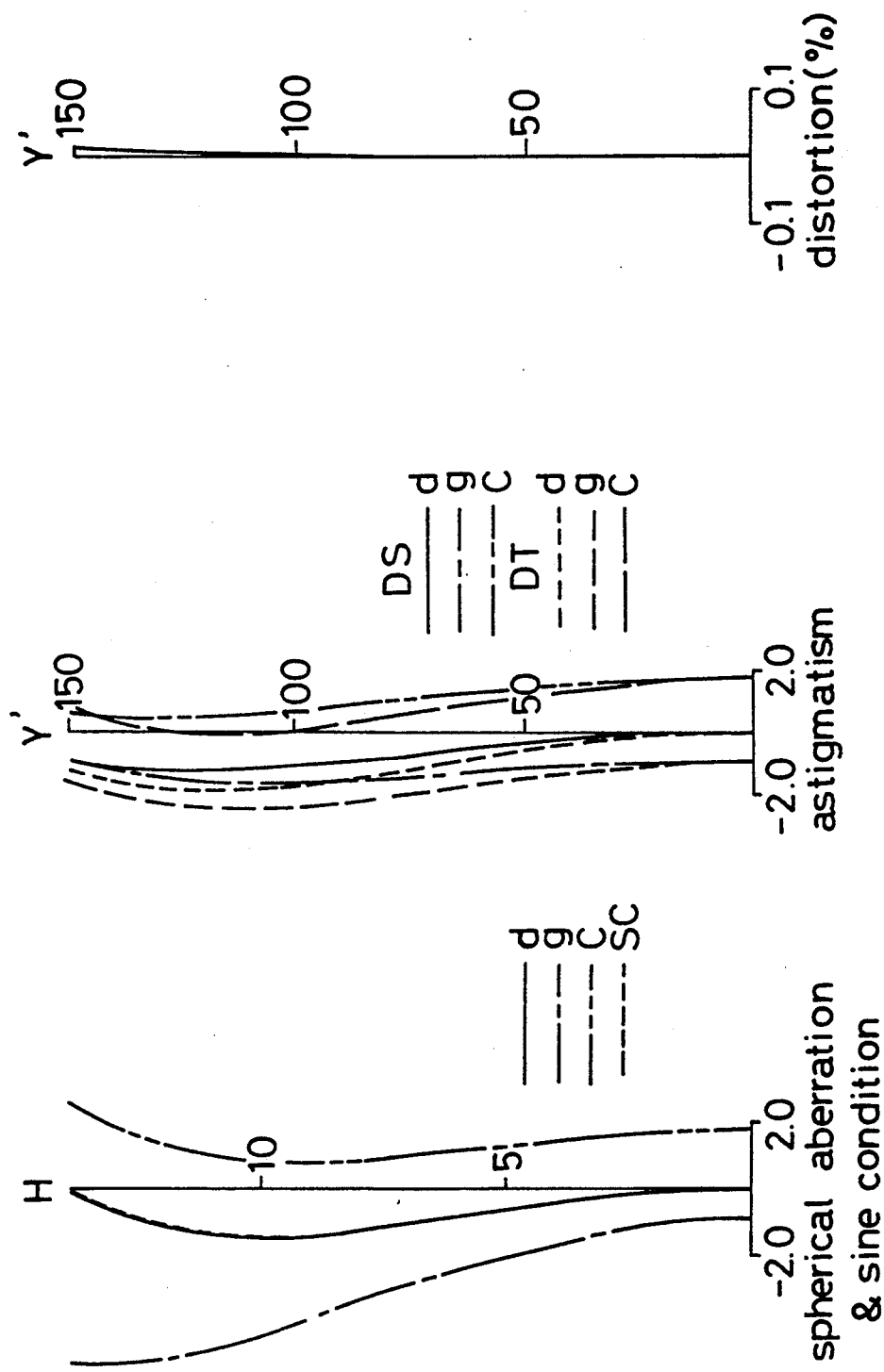
Figure 57:
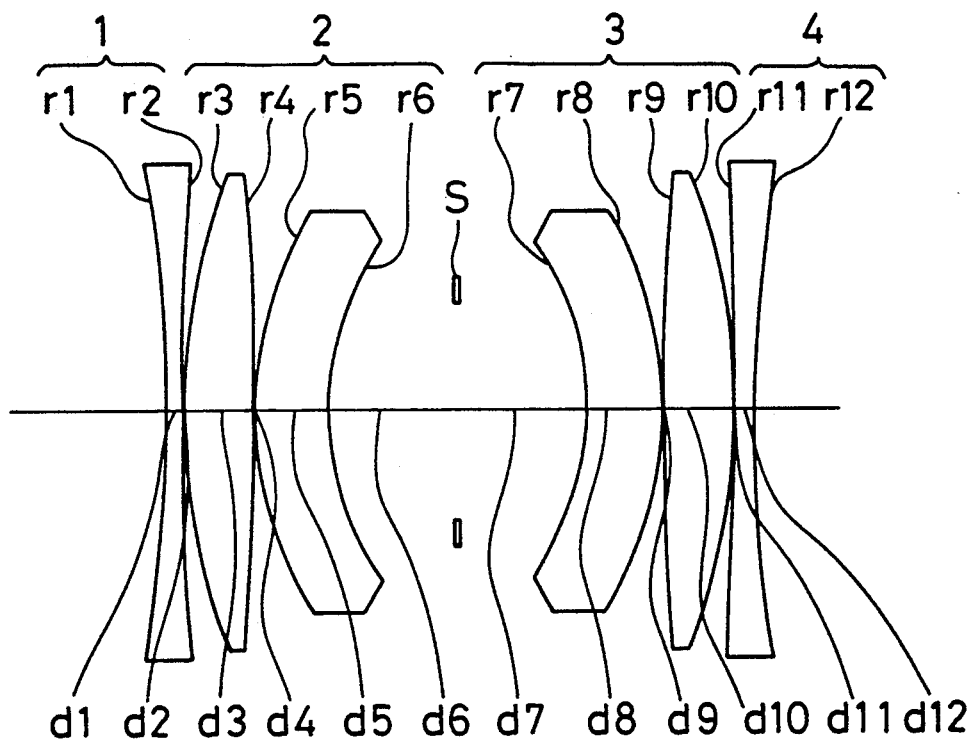
FIG. 57 is a cross-sectional view of the lens arrangement of a fourteenth embodiment of the present invention.
Figure 58A:
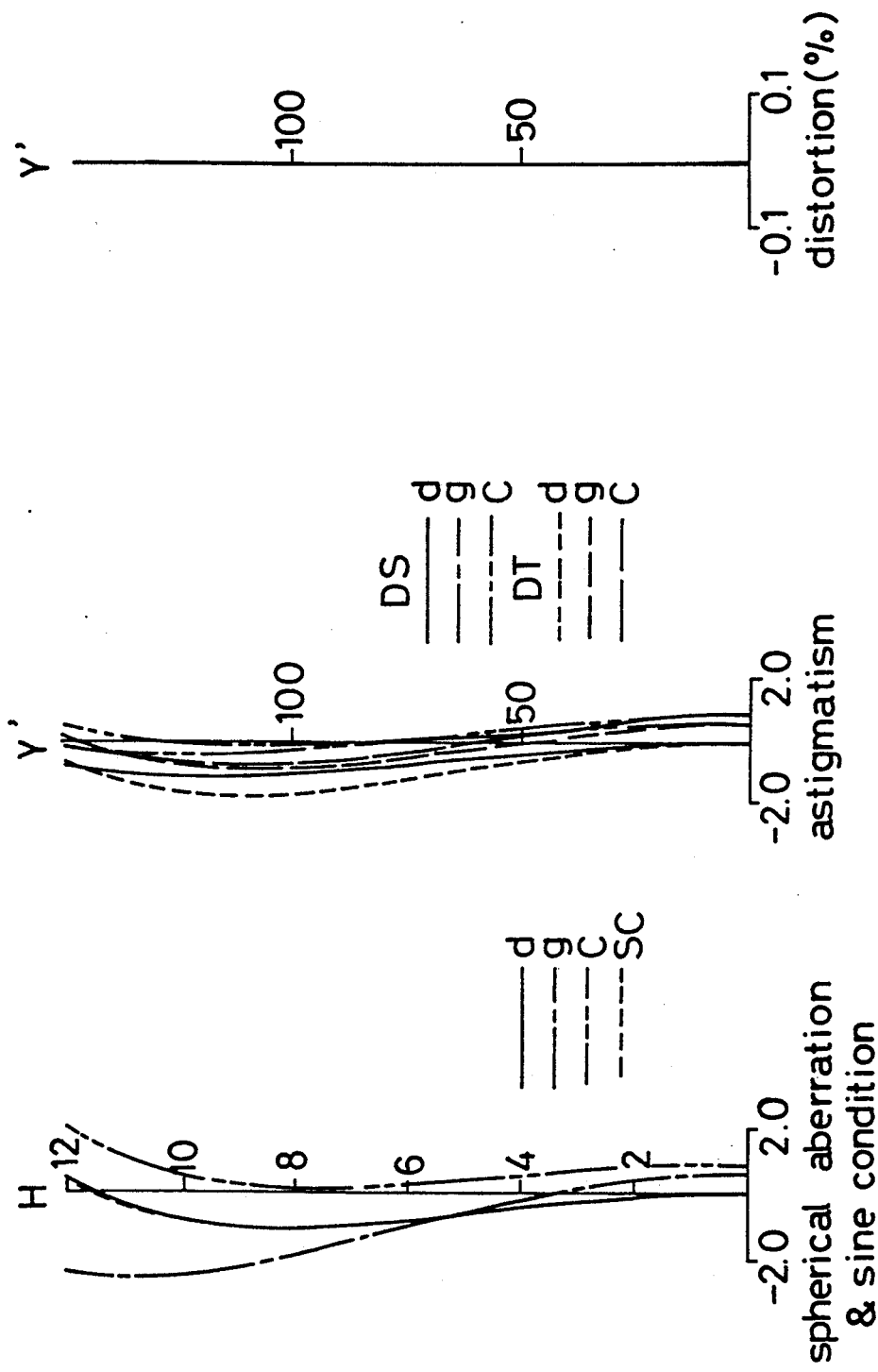
FIGS. 58A and 58B are graphic representations of spherical aberration, astigmatism, distortion and lateral aberration of the fourteenth embodiment at unity magnification.
Figure 58B:
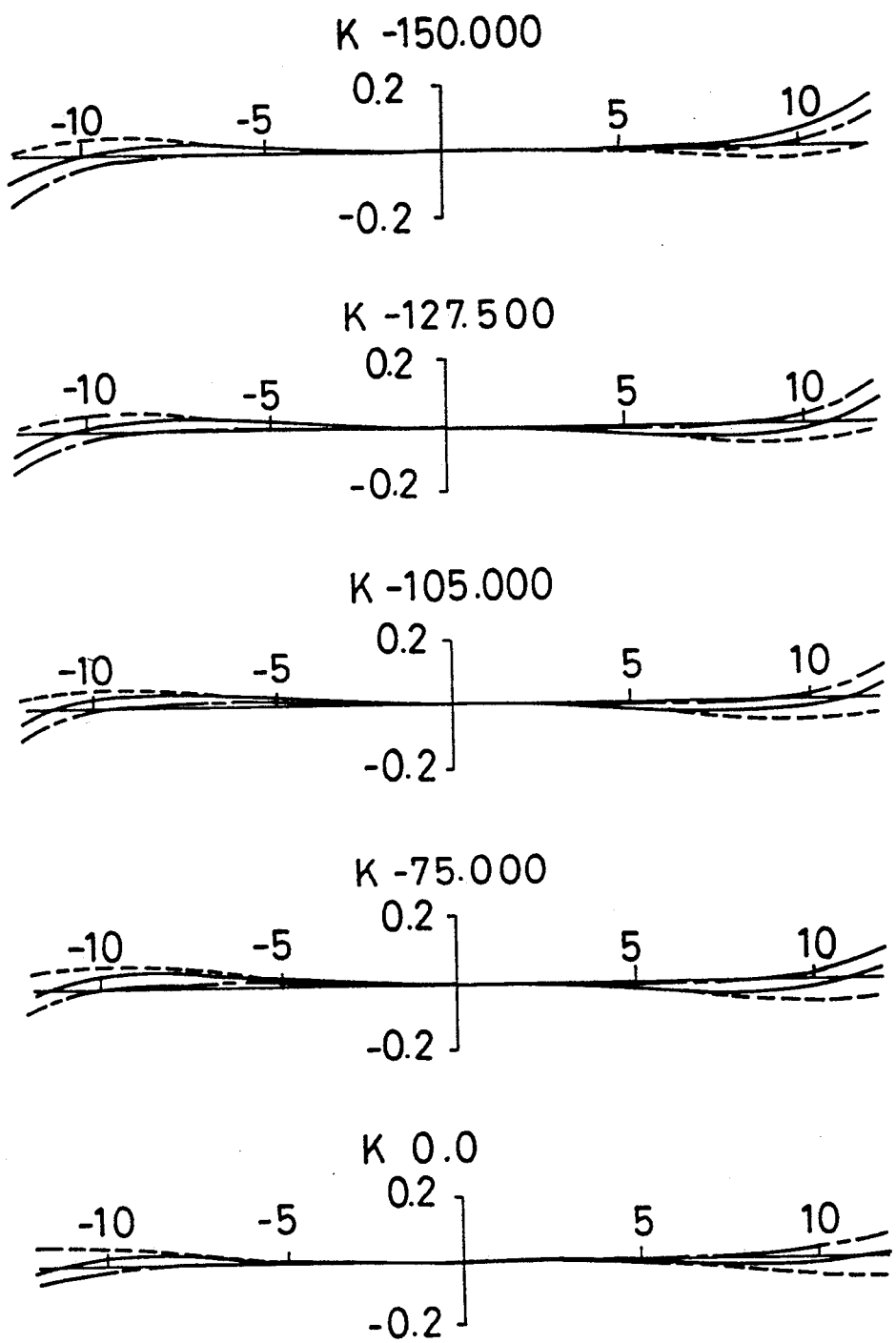
Figure 59B:
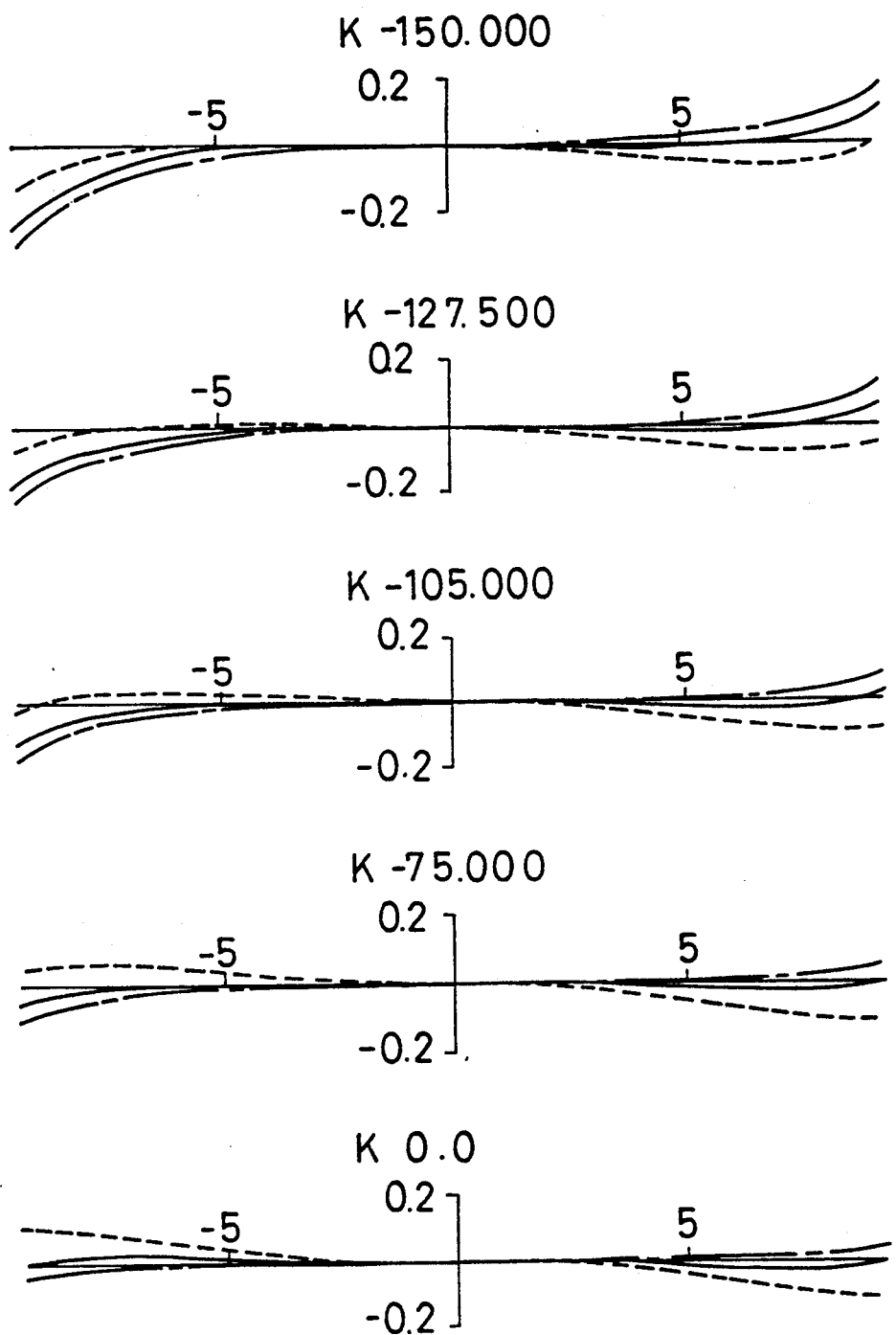
Figure 60B:
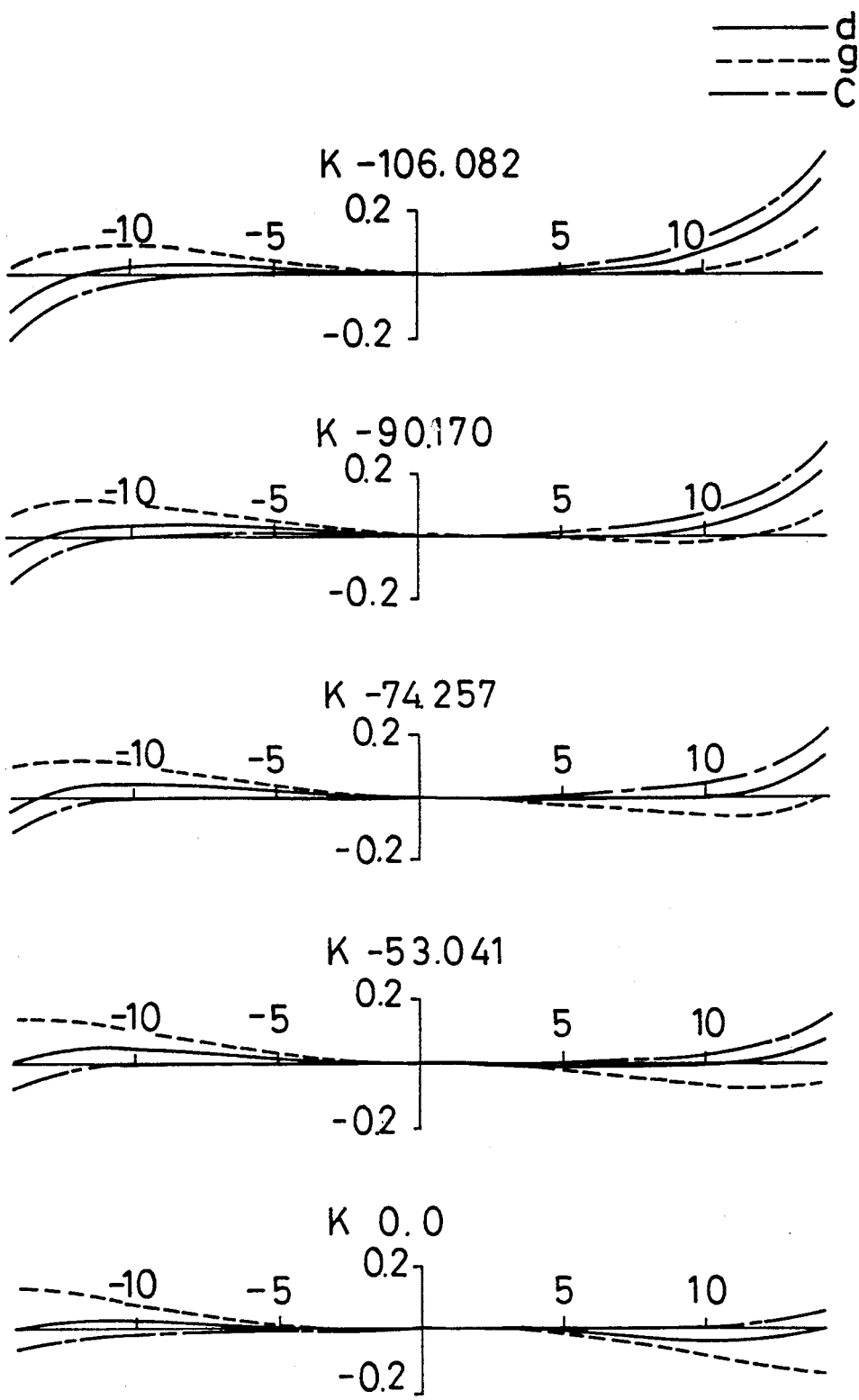
Figure 61:
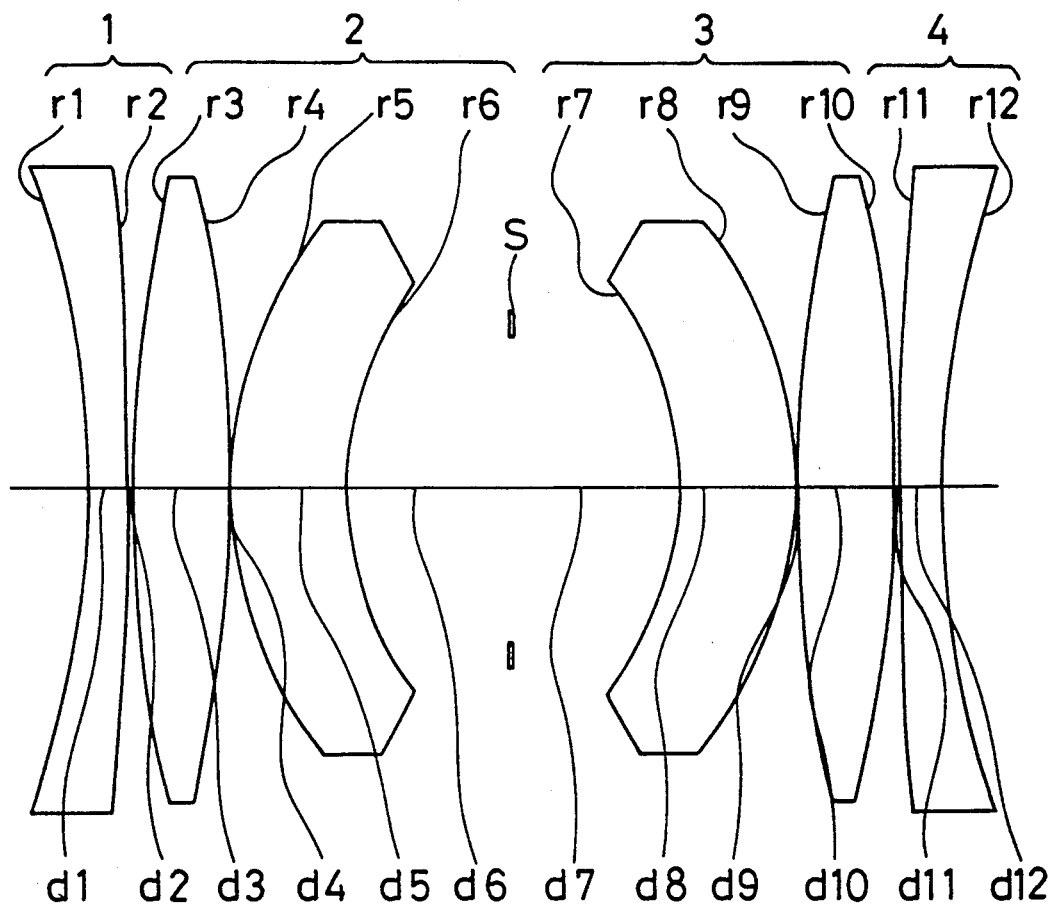
FIG. 61 is a cross-sectional view of the lens arrangement of a fifteenth embodiment of the present invention.
Figure 62B:
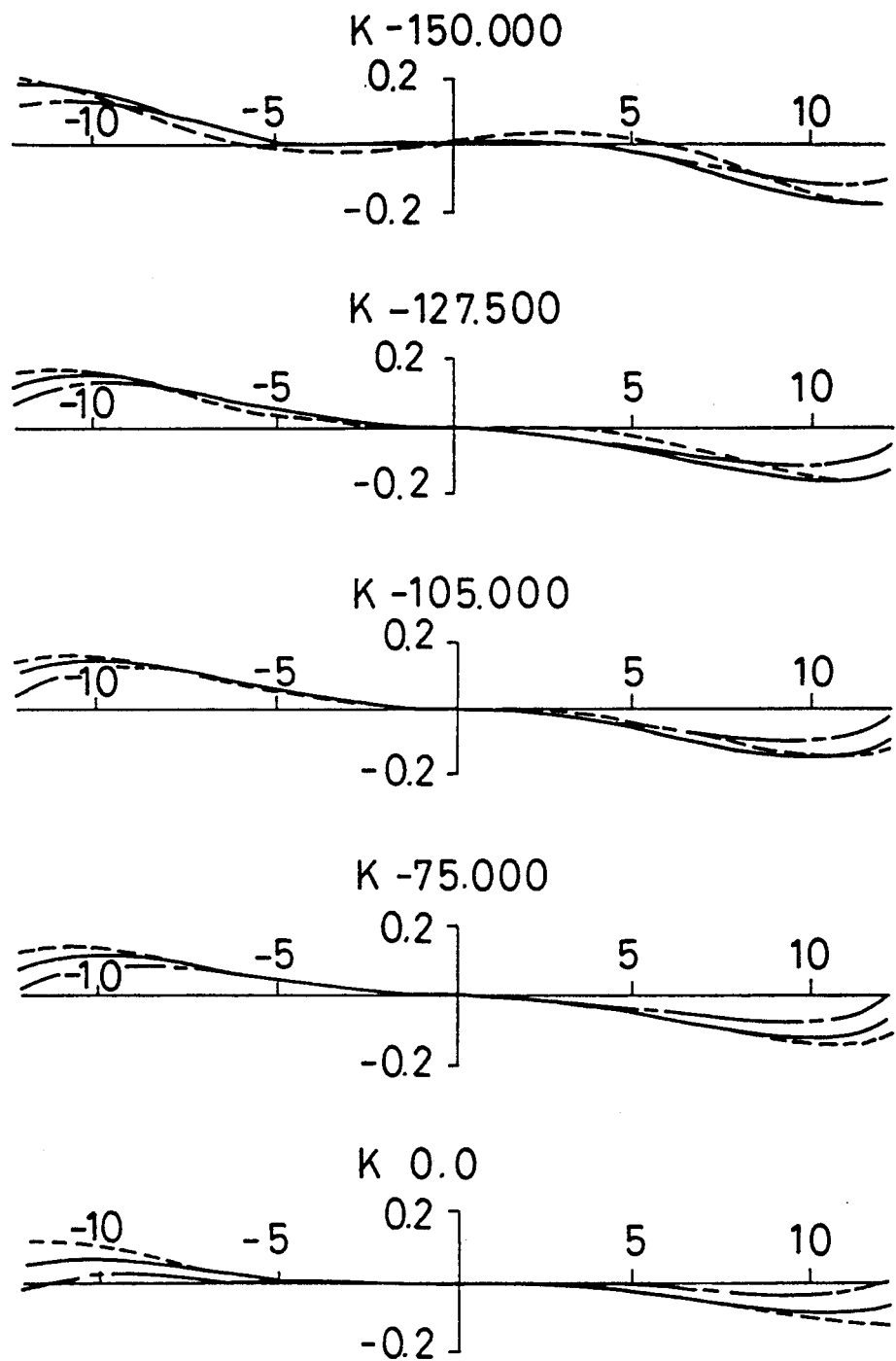
Figure 65:
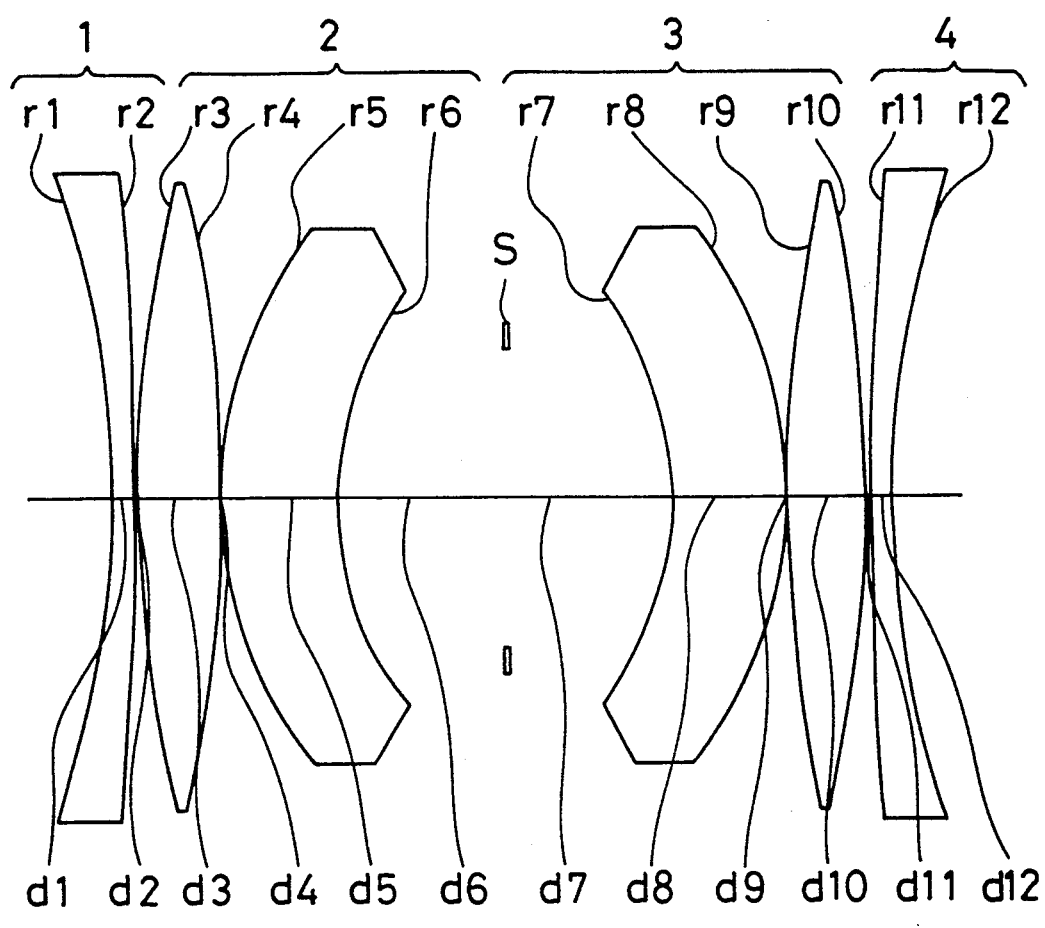
FIG. 65 is a cross-sectional view of the lens arrangement of a sixteenth embodiment of the present invention.
Figure 67B:
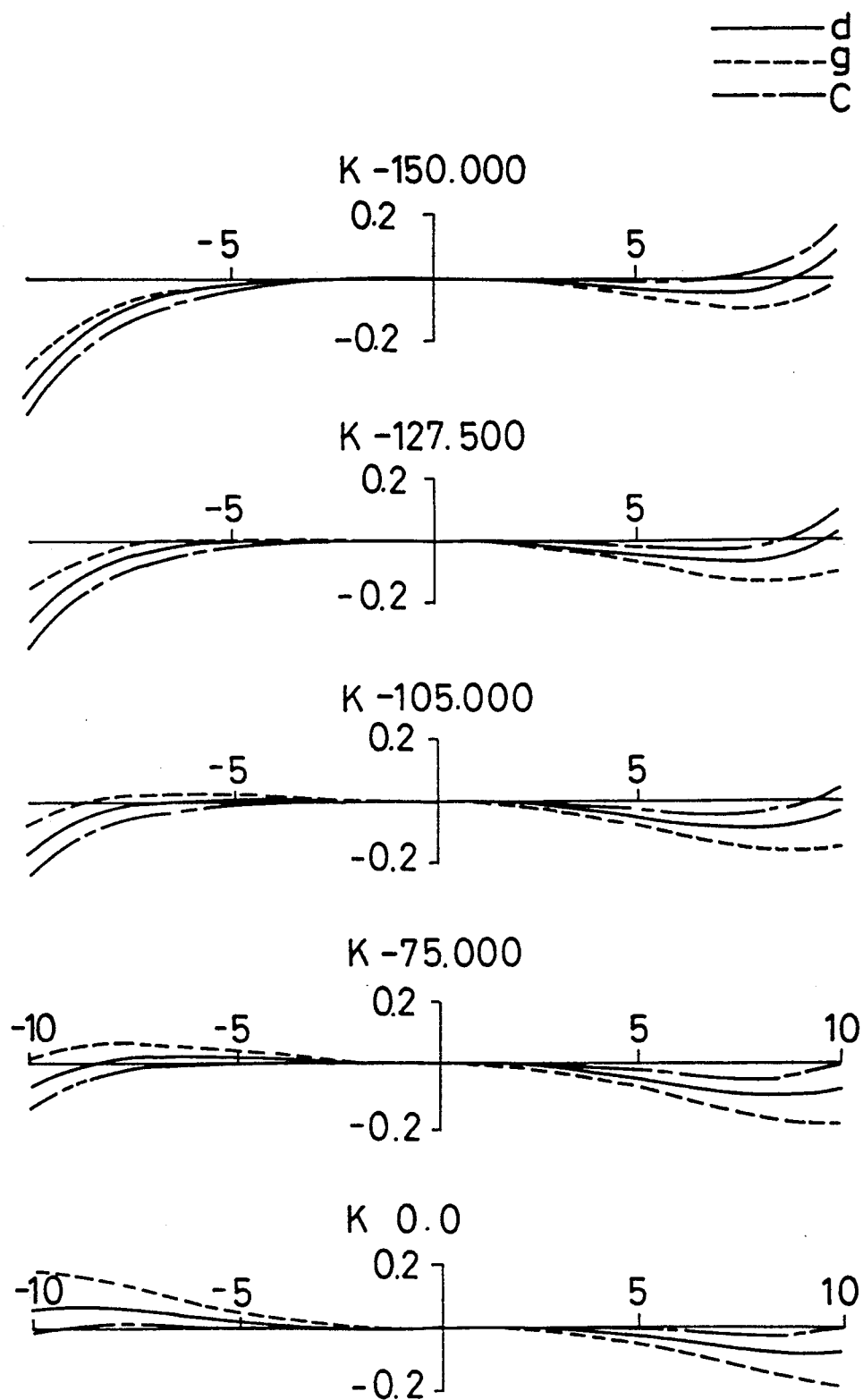
Figure 68A:
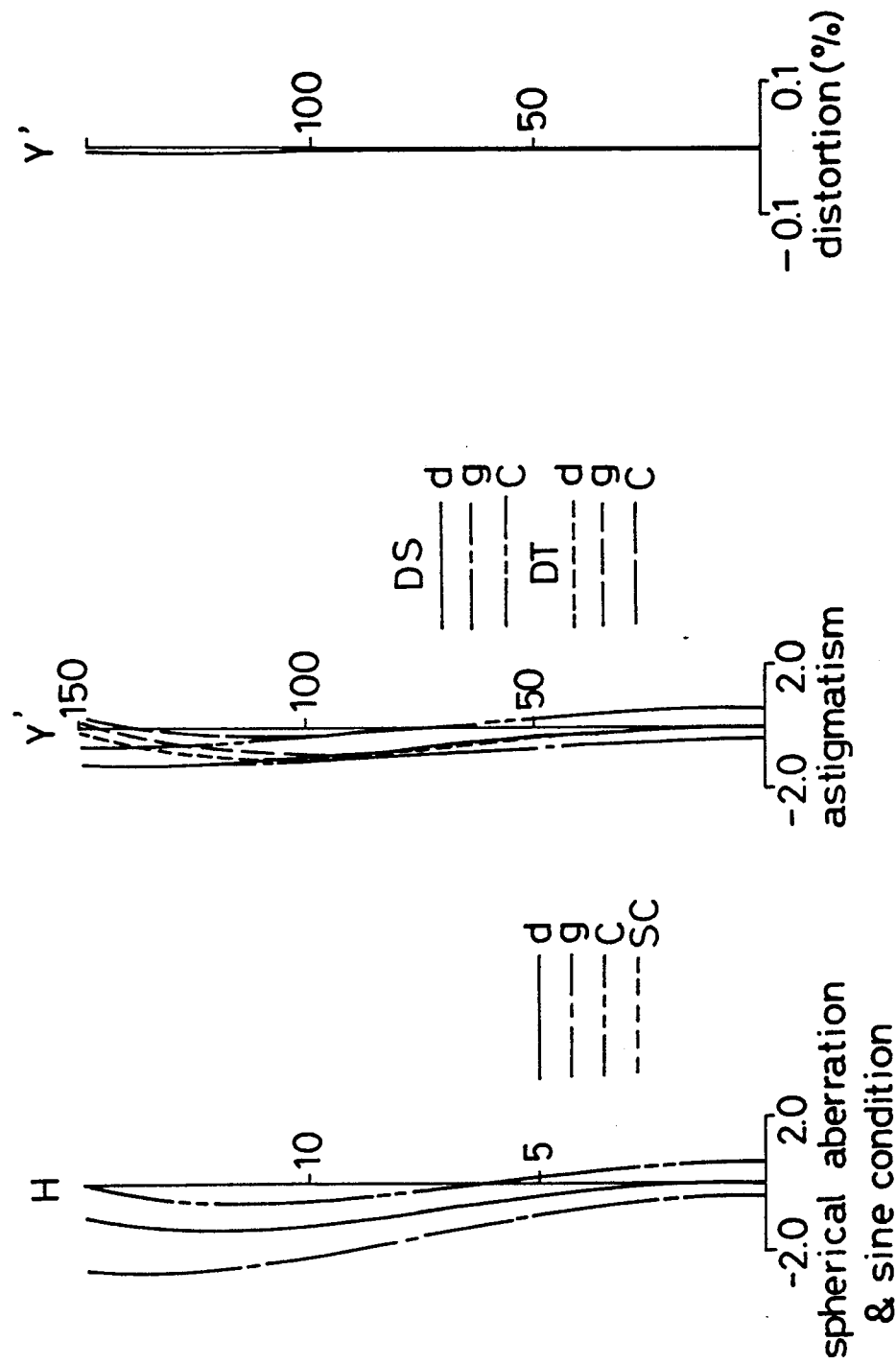
FIGS. 68A and 68B are graphic representations of spherical aberration, astigmatism, distortion and lateral aberration of the sixteenth embodiment at a magnification smaller than unity.
Figure 68B:
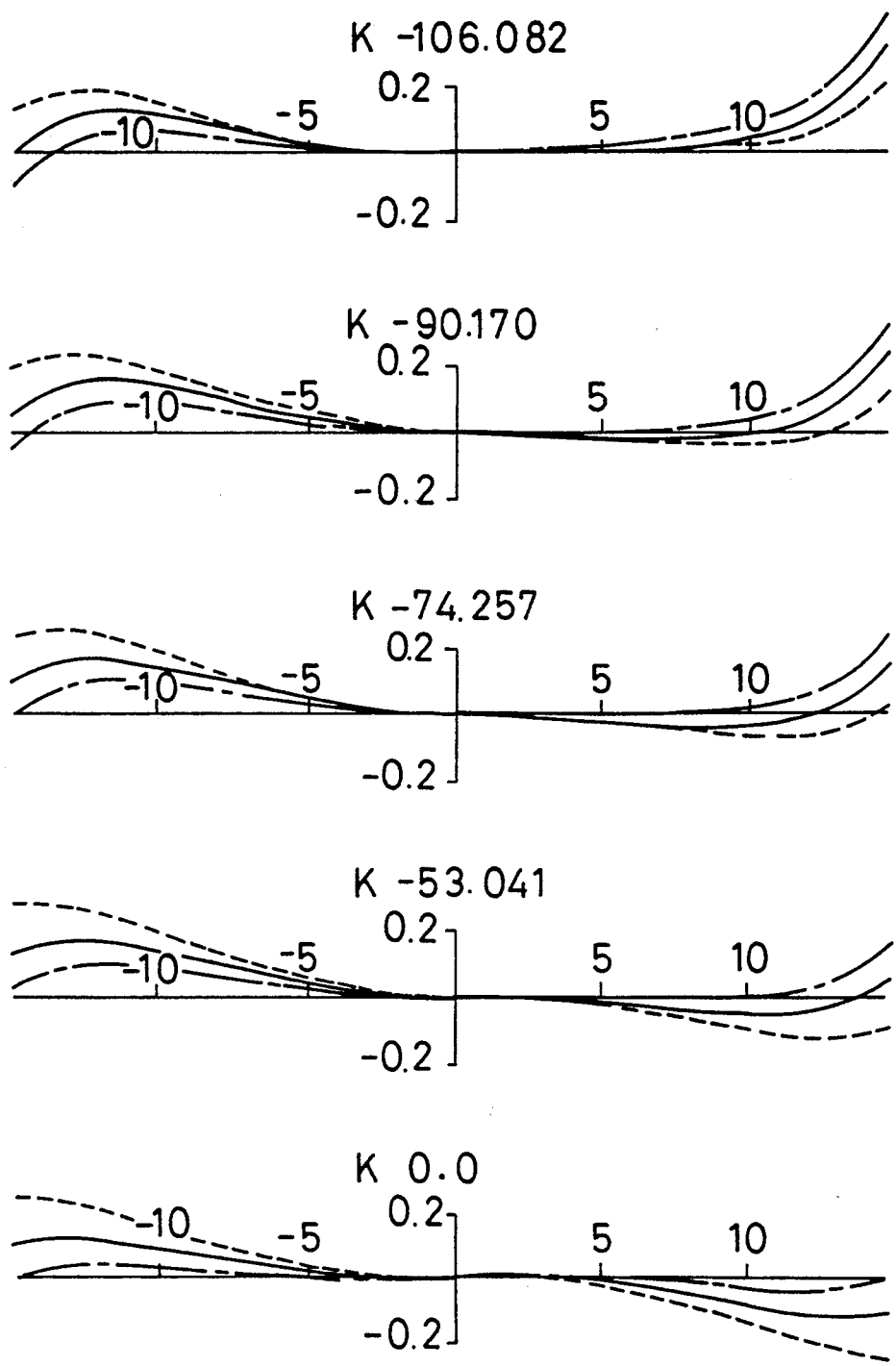
Figure 69:
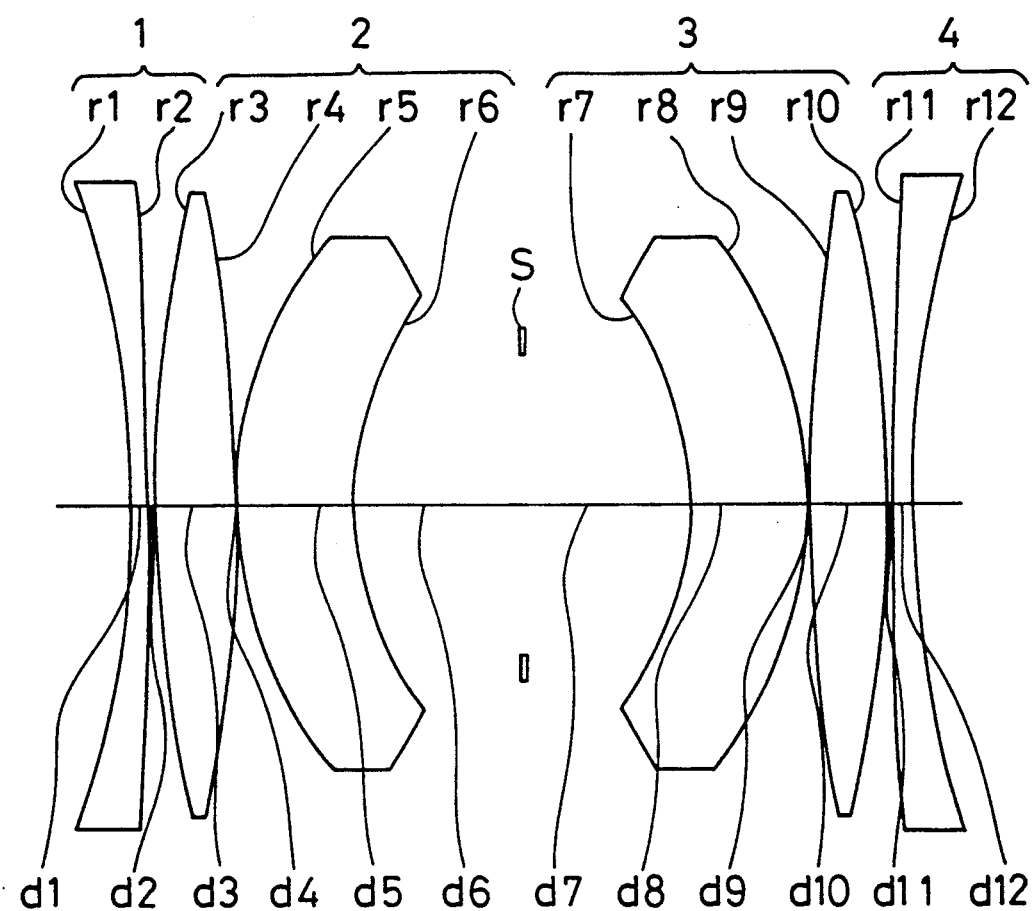
FIG. 69 is a cross-sectional view of the lens arrangement of a seventeenth embodiment of the present invention.
Figure 71A:
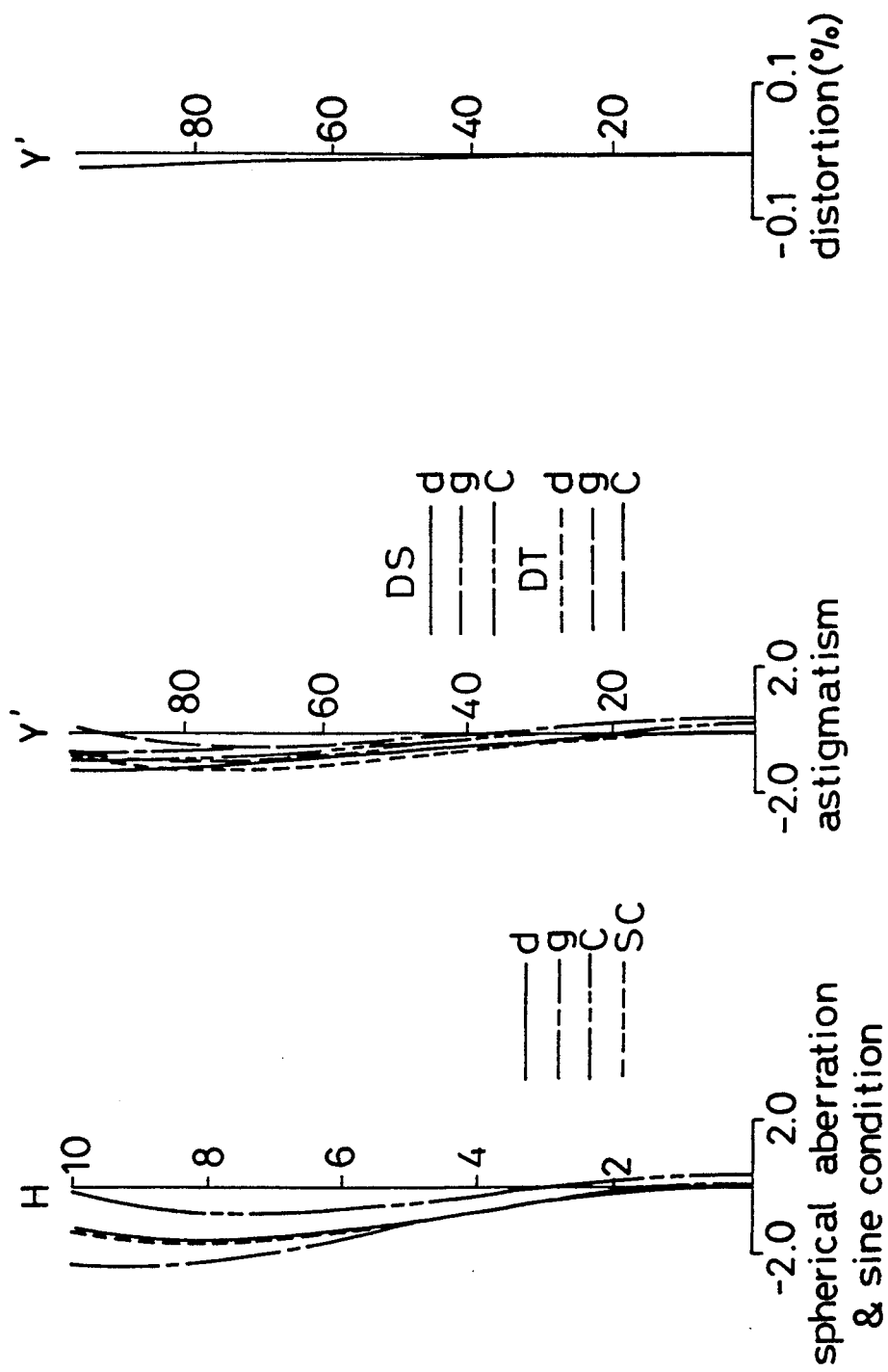
FIGS. 71A and 71B are graphic representations of spherical aberration, astigmatism, distortion and lateral aberration of the seventeenth embodiment at a magnification larger than unity.
Figure 71B:
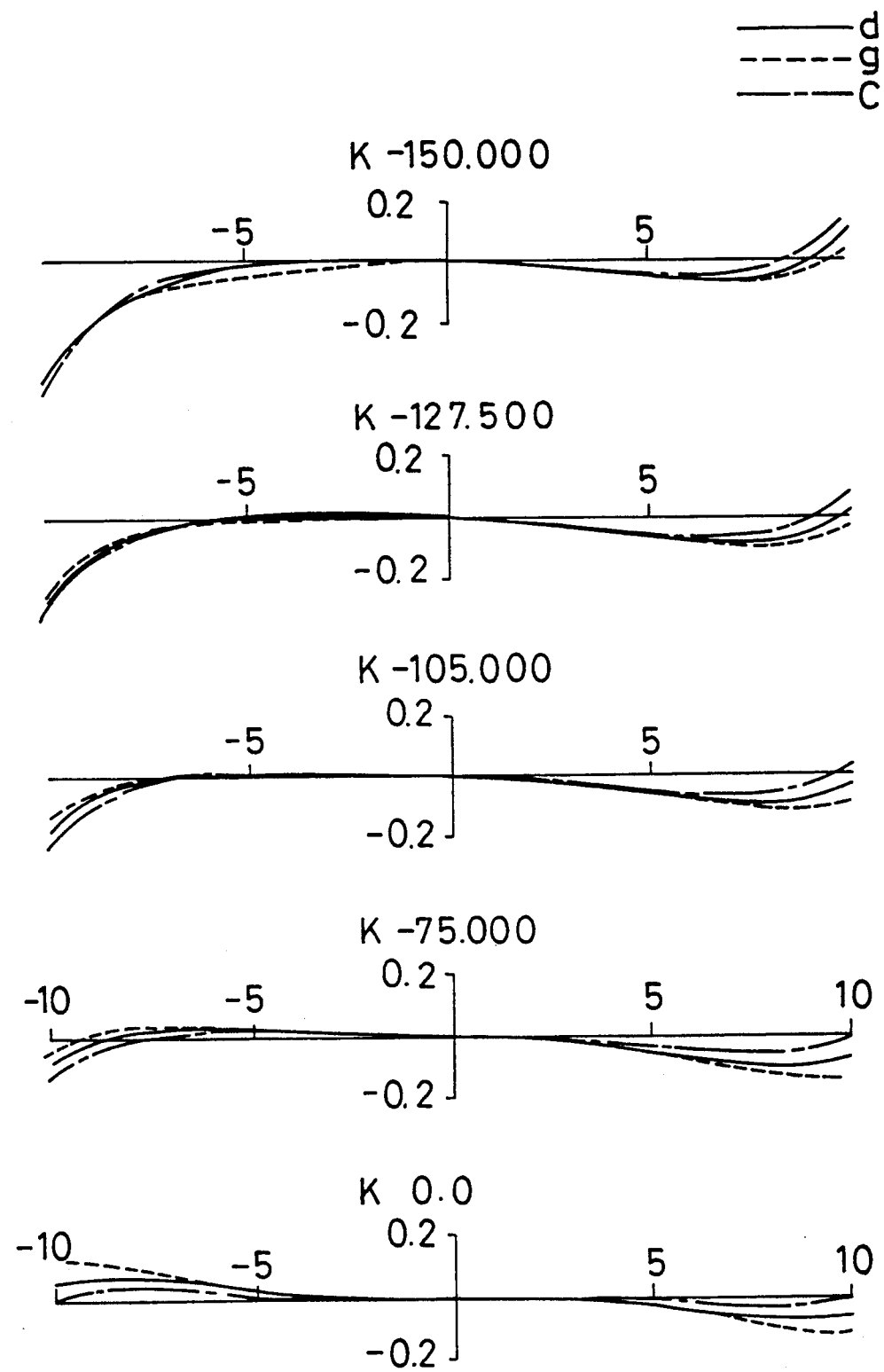
Figure 73:
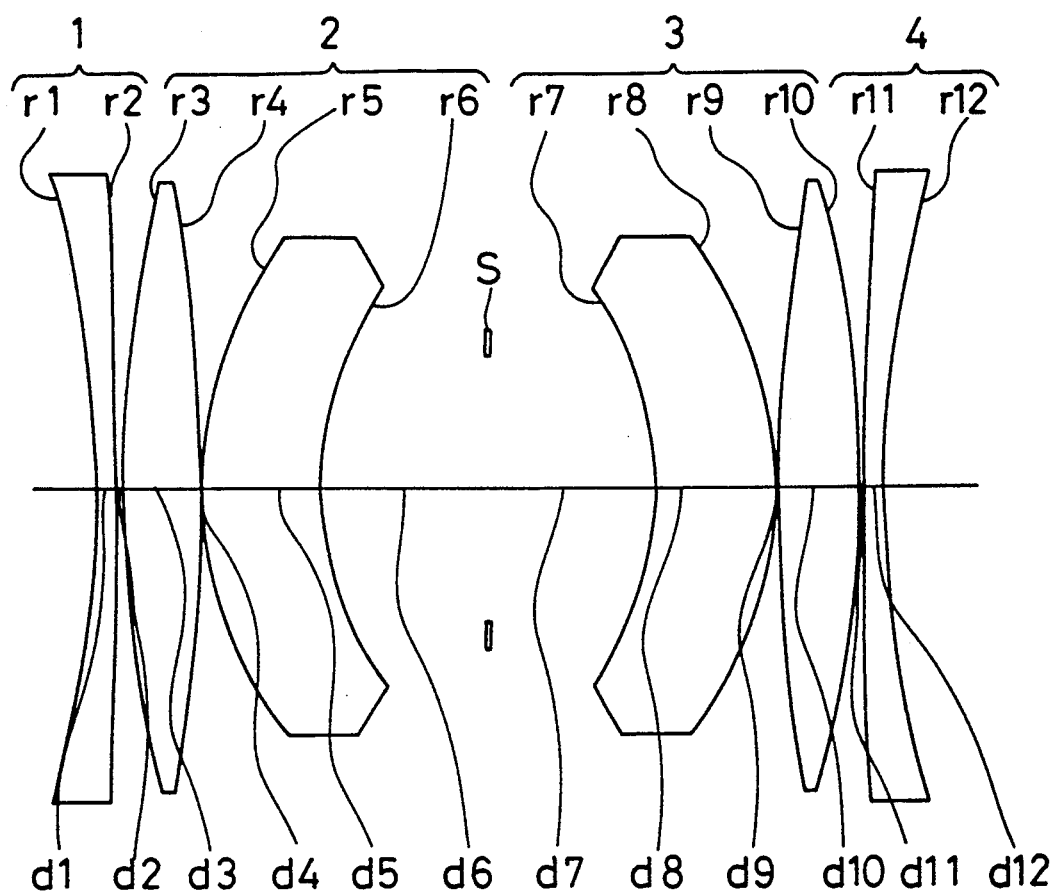
FIG. 73 is a cross-sectional view of the lens arrangement of an eighteenth embodiment of the present invention.
Figure 75B:
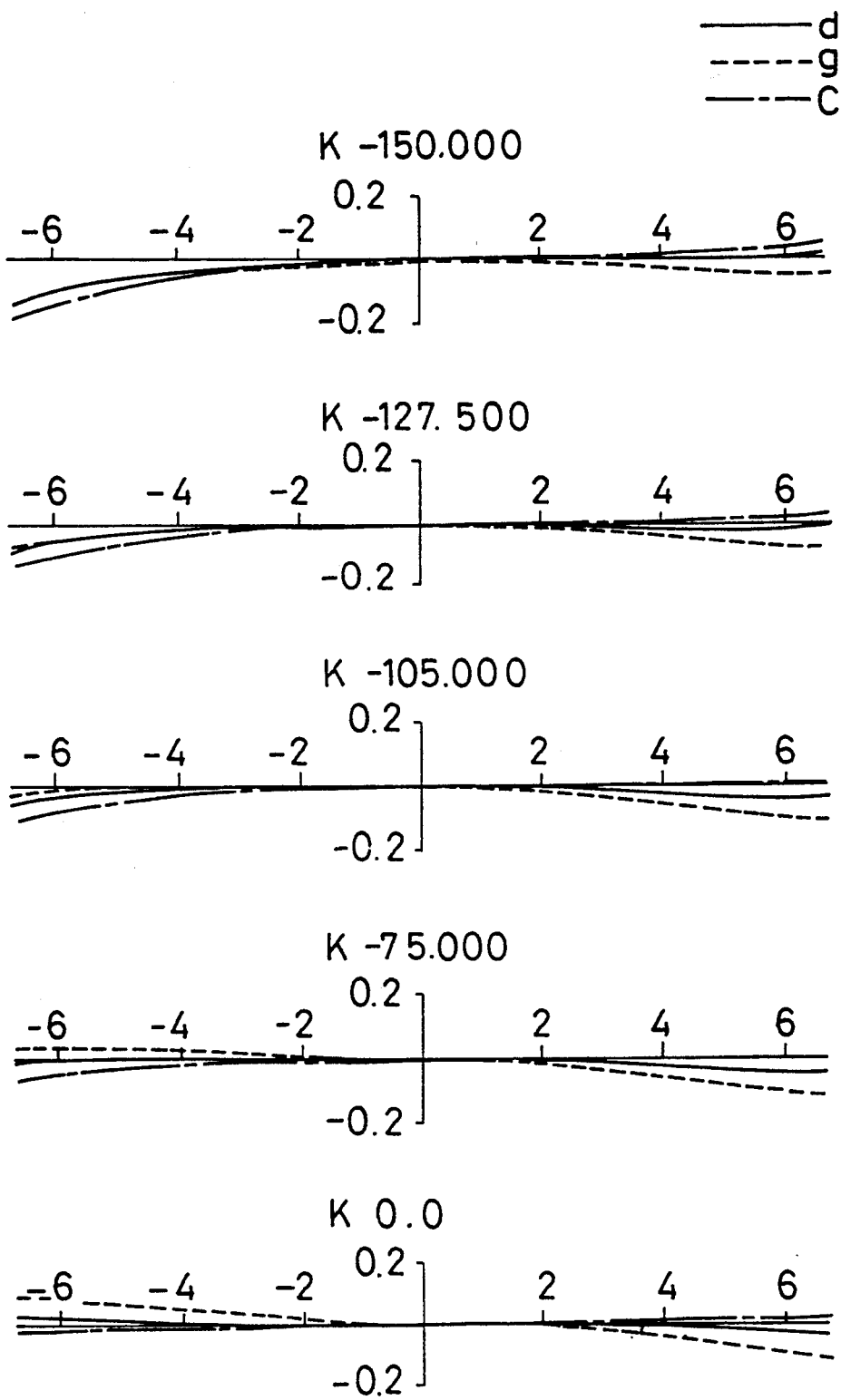
Figure 76B:
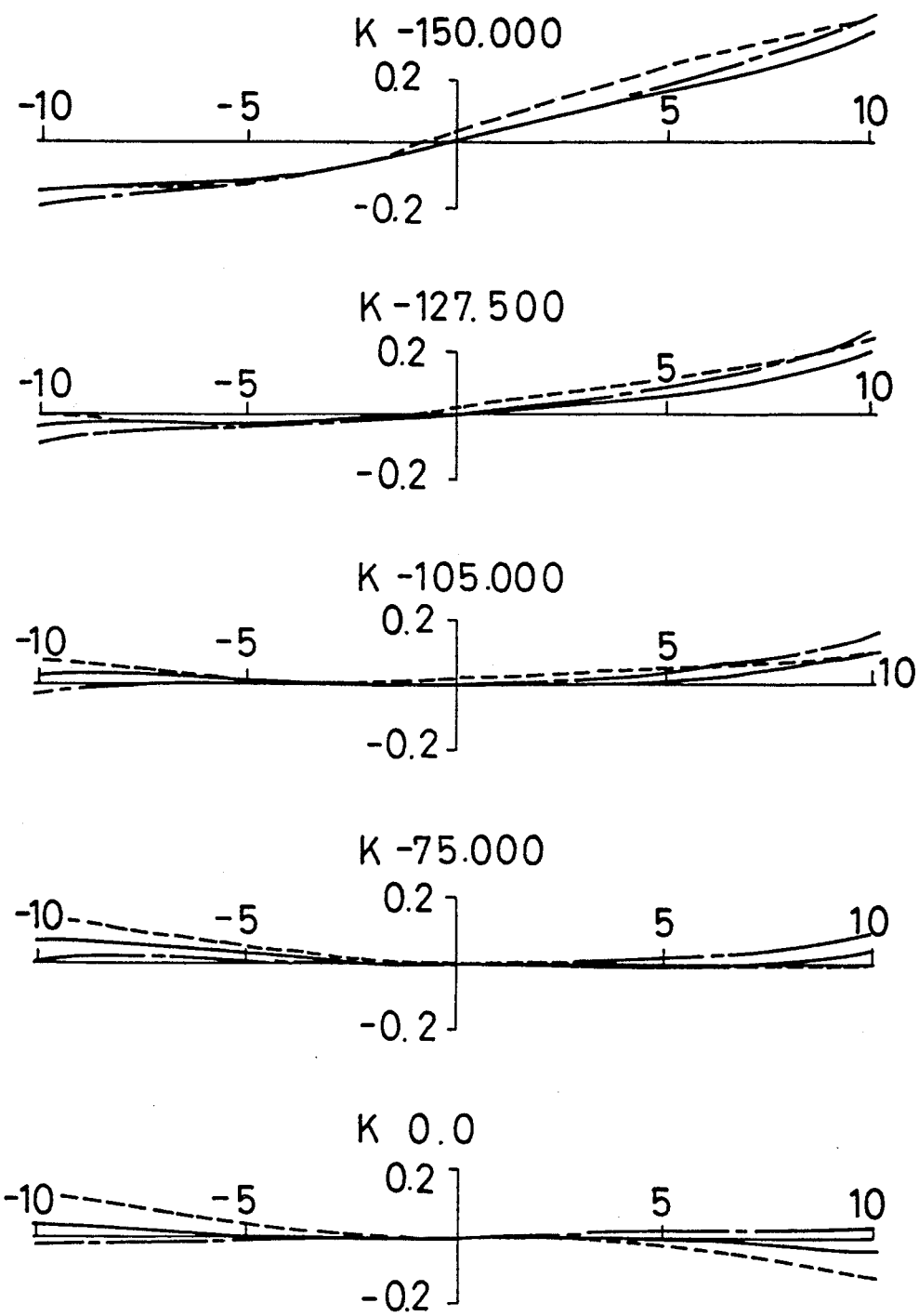
Figure 77:
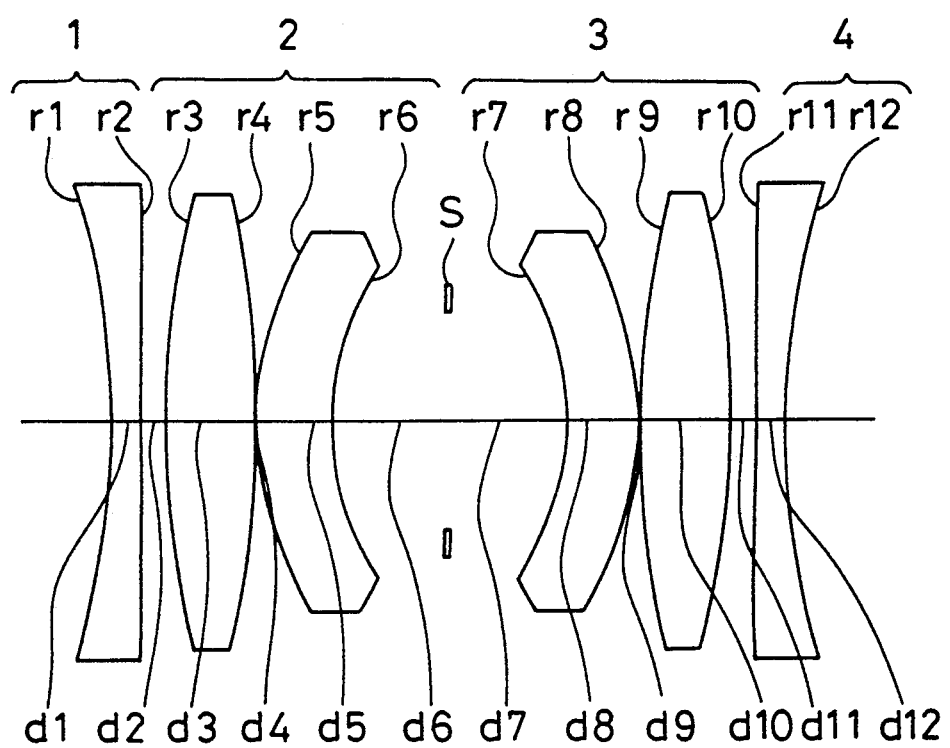
FIG. 77 is a cross-sectional view of the lens arrangement of a nineteenth embodiment of the present invention.
Figure 78B:
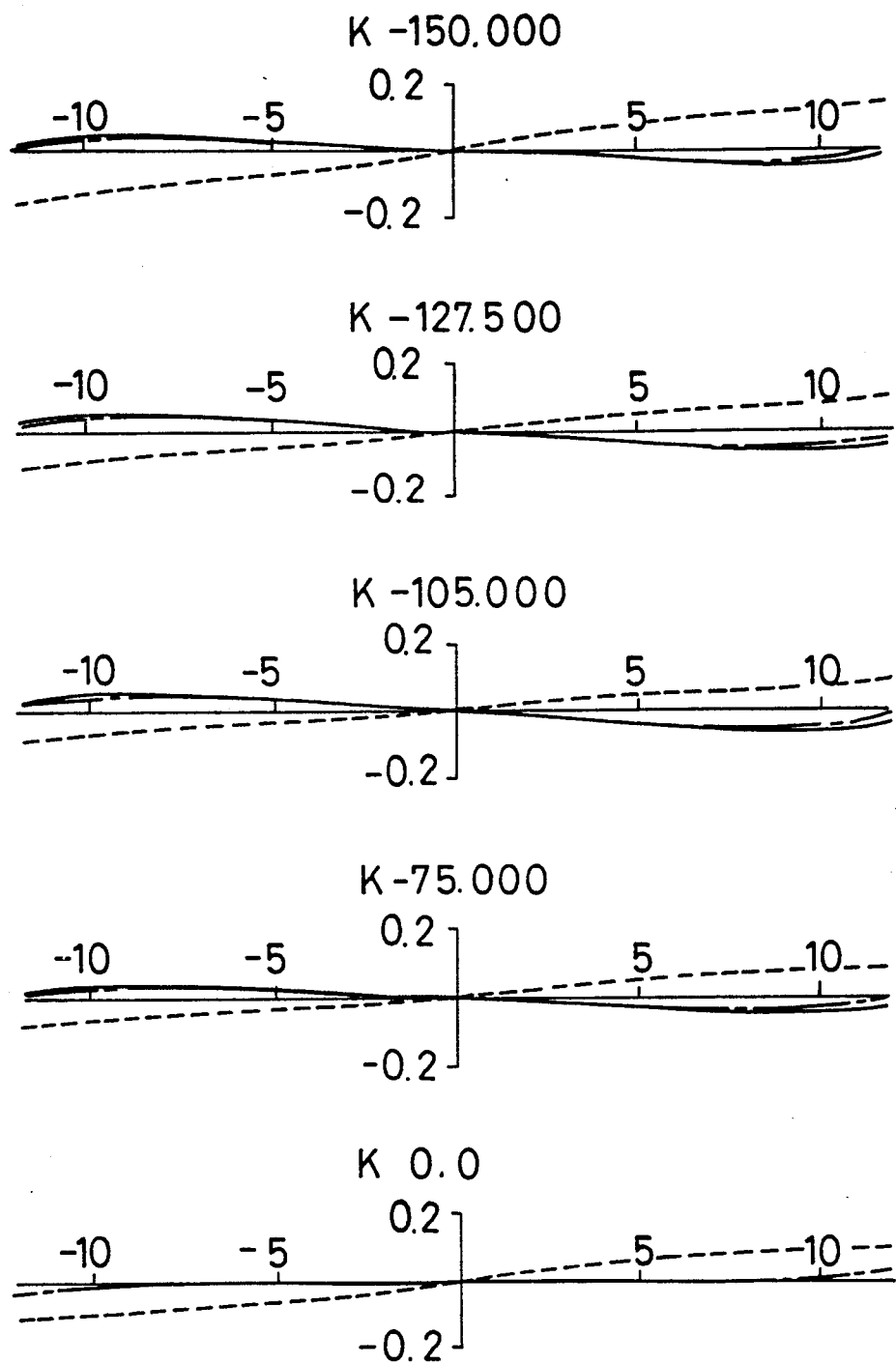
Figure 79B:
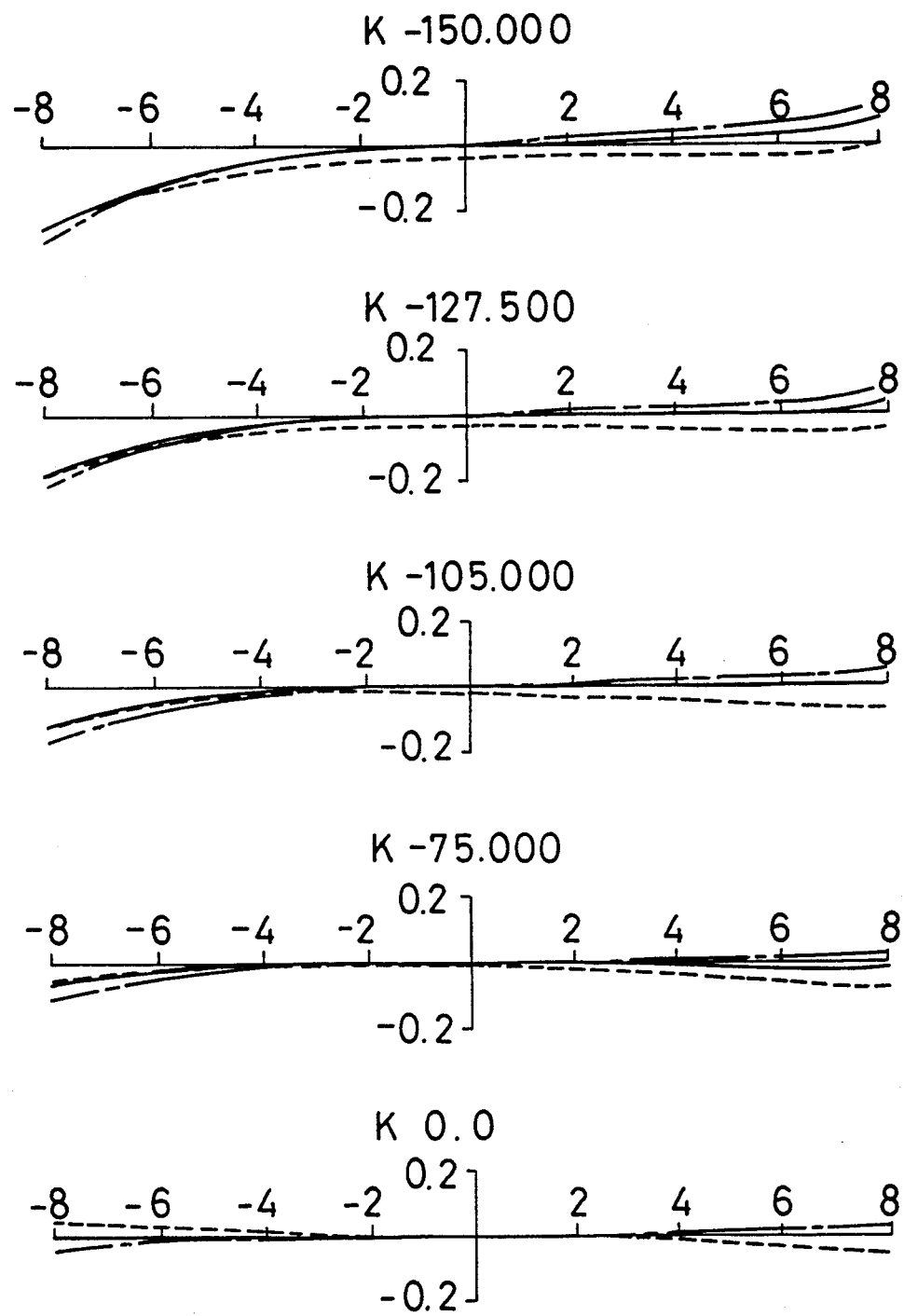
Figure 81:
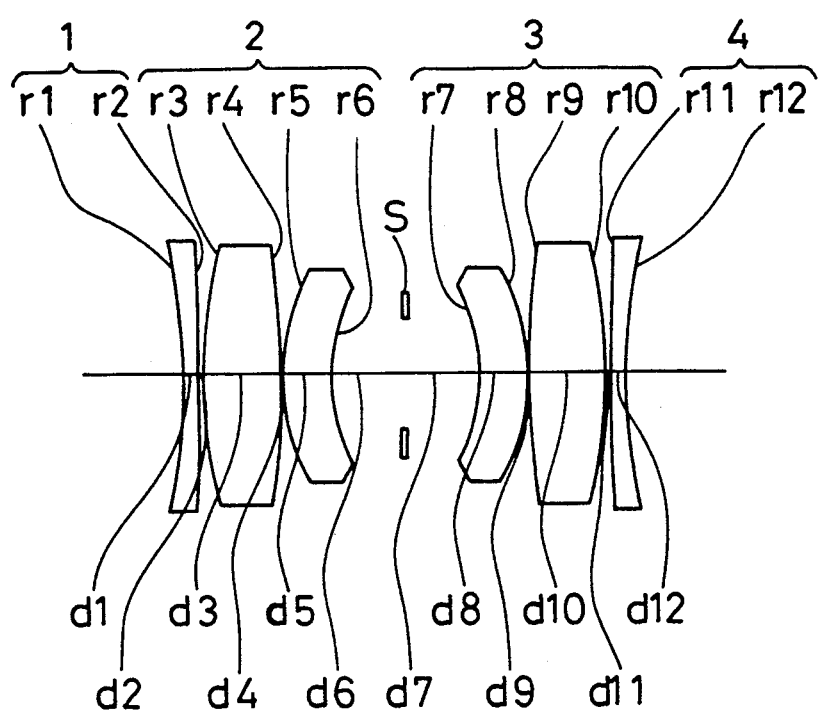
FIG. 81 is a cross-sectional view of the lens arrangement of a twentieth embodiment of the present invention.
Figure 82A:
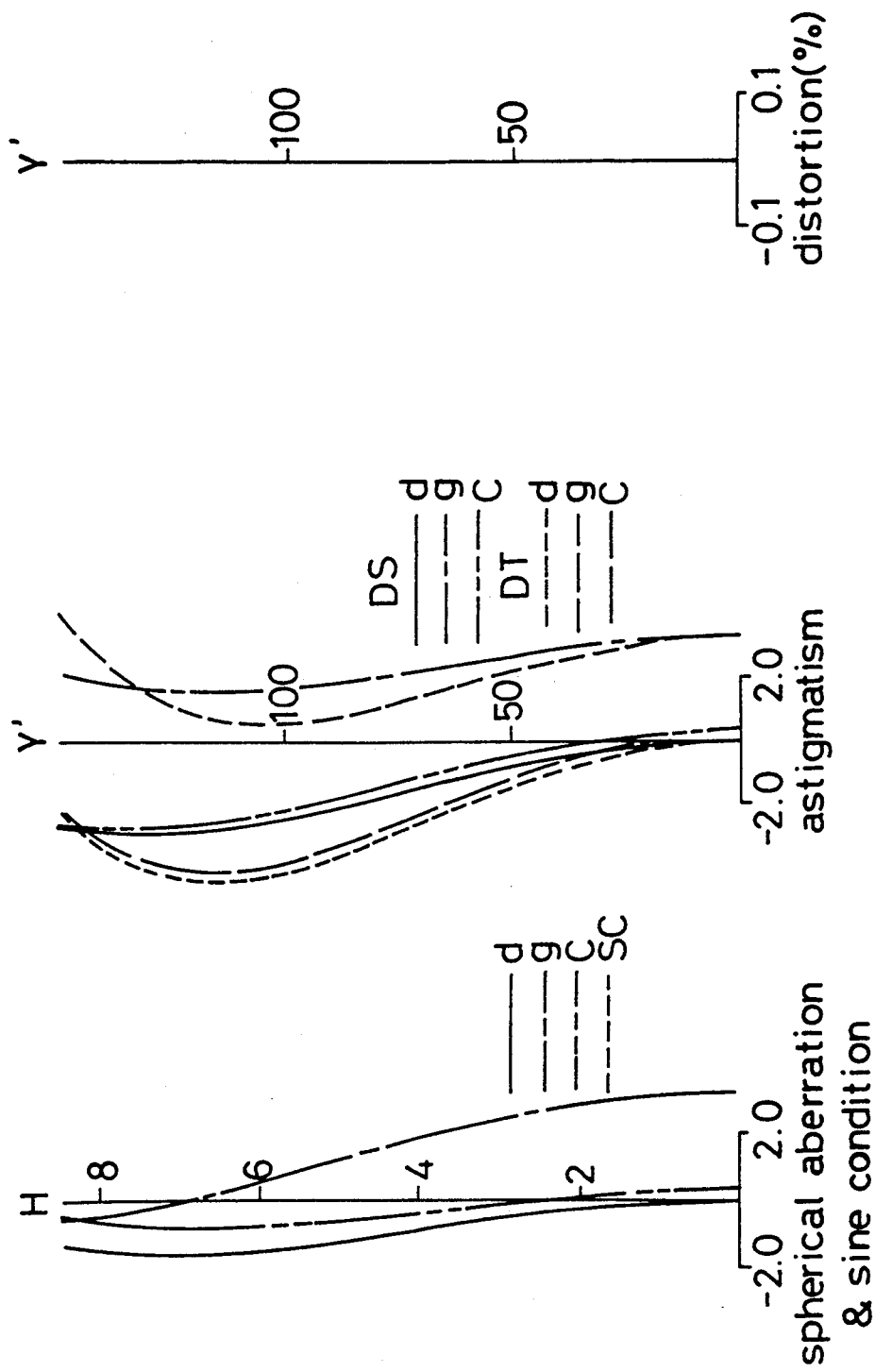
FIGS. 82A and 82B are graphic representations of spherical aberration, astigmatism, distortion and lateral aberration of the twentieth embodiment at unity magnification.
Figure 82B:
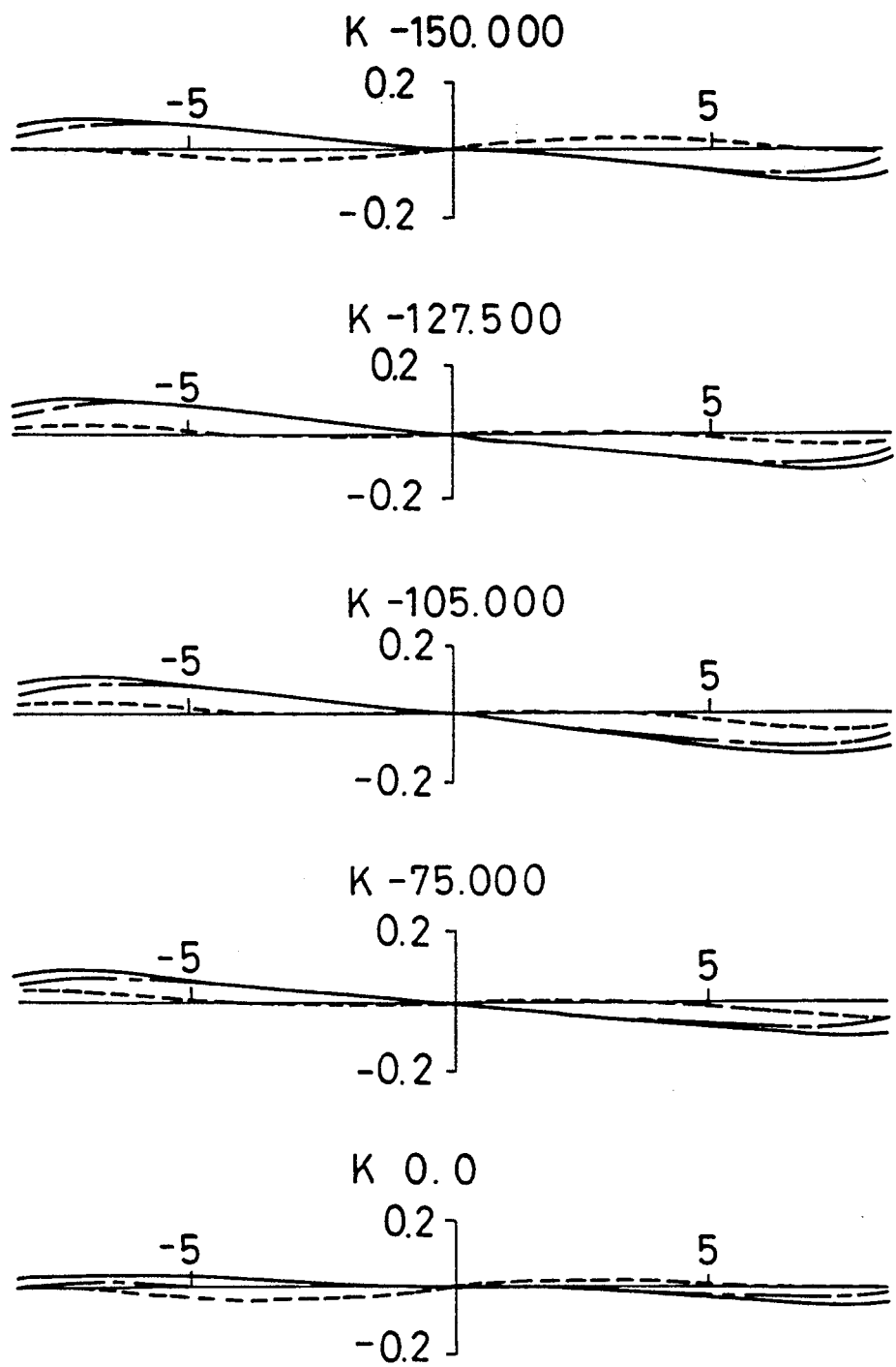
Figure 84B:
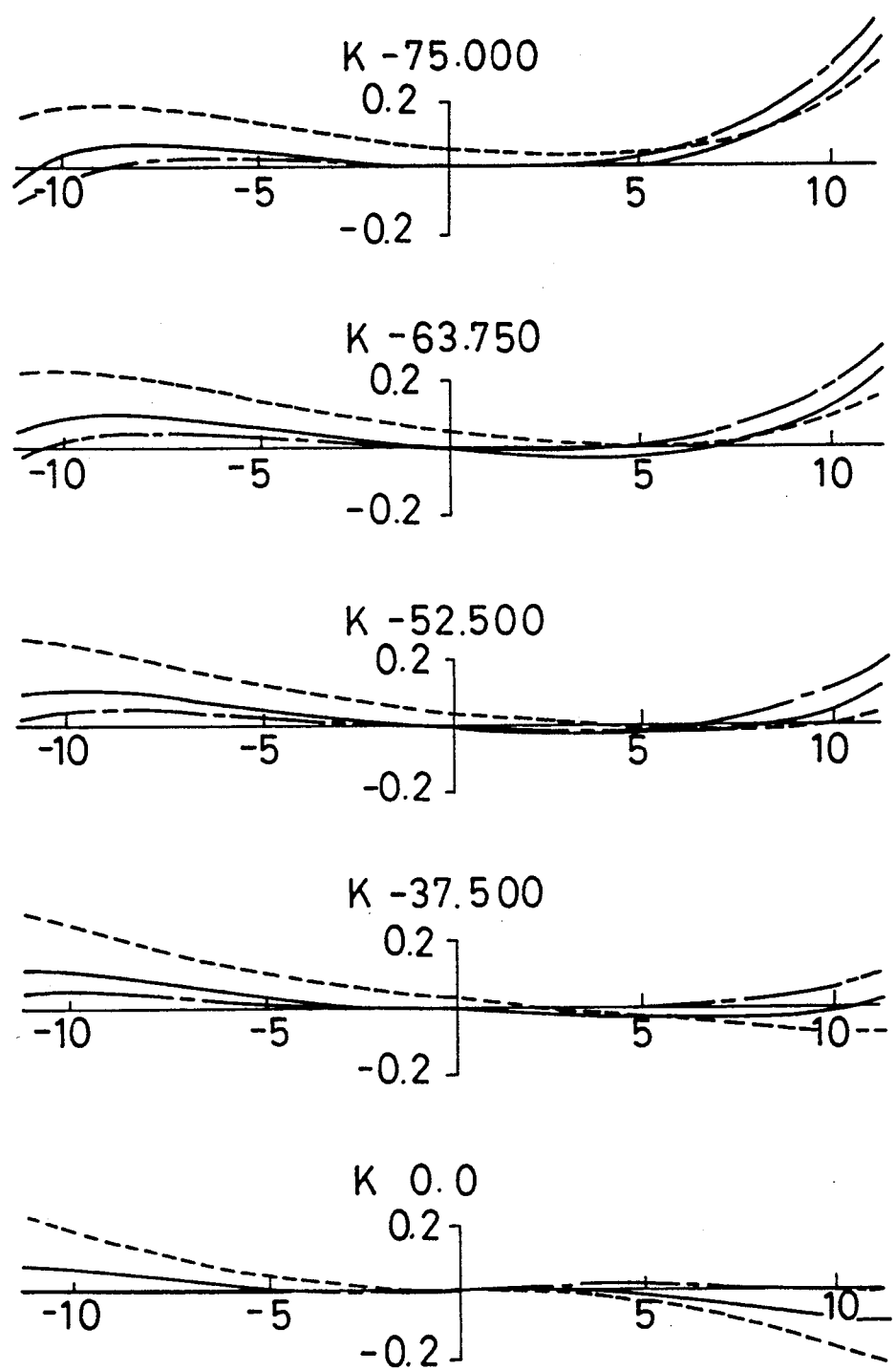

FIGS. 25 and 29 show the lens arrangements of a sixth and a seventh embodiments of the present invention. The sixth and the seventh embodiments comprise from the object side: a first lens unit 1 including at least one lens element and having a negative overall focal length; a second lens unit 2 including a positive lens element and a negative meniscus lens element strongly concave to the aperture stop side and having a positive overall focal length; an aperture stop S; a third lens unit 3 arranged symmetrically with the second lens unit 2 with respect to the aperture stop S; and a fourth unit 4 arranged symmetrically with the first lens unit 1 with respect to the aperture stop S. The sixth and the seventh embodiments are zoom lens systems, for use in a copying apparatus, where the second and the fourth lens units 2 and 4 are moved in a same direction in association with each other so that the total lens length is minimum at unity magnification and where zooming is performed while the object-image distance is maintained constant. At unity magnification, the lens units are symmetrical. That is, the distance between the first and the second lens units 1 and 2 is equal to the distance between the third and the fourth lens units 3 and 4, and the distance between the second lens unit 2 and the aperture stop S is equal to the distance between the third lens unit 3 and the aperture stop S. Except at unity magnification, the distance between the second lens unit 2 and the aperture stop S is not equal to the distance between the third lens unit 3 and the aperture stop S. This means that the zoom lens system is asymmetrical at a magnification other than unity magnification.

Tables 11 and 13 show data with respect to each surface of the sixth and the seventh embodiments. The axial distances $d_2$, $d_6$, $d_7$ and $d_{11}$ are variable during zooming. Values thereof at a magnification of $-2.000\times$, at unity magnification and at a magnification of $-0.500\times$ are shown in Tables 12 and 14.

FIGS. 26A and 26B to 28A and 28B and FIGS. 30A and 30B to 32A to 32B show graphic representations of spherical aberration, astigmatism, distortion and lateral aberration of the sixth and the seventh embodiments at unity magnification, at a magnification larger than unity and at a magnification smaller than unit, respectively.

The zoom lens systems for use in a copying apparatus are compact lens systems of four-unit, six-element configuration. Moreover, in the lens systems, aberrations are excellently corrected at each magnification at a wide angle of view, and the focal length can be reduced. Thereby, an optical system for use in a copying apparatus can be reduced in size, and a large zoom ratio is available.

Subsequently, a third implementation of the present invention will be described.

The third implementation is a zoom lens system, for use in a copying apparatus, where magnification is varied by moving the entire lens system while the focal length is varied by moving a part of the lens system. A zoom lens system according to the third implementation comprises from the object side: a first lens unit 1 including a negative lens element; a second lens unit 2 including a bi-convex lens element and a negative meniscus lens element strongly concave to the aperture stop side; an aperture stop S; a third lens unit 3 arranged substantially symmetrically with the second lens unit 2 with respect to the aperture stop S; and a fourth lens unit 4 arranged substantially symmetrically with the first lens unit 1 with respect to the aperture stop S. During zooming, the second and the third lens units 2 and 3 are moved substantially symmetrically with respect to the aperture stop S to vary the focal length. At this time, since the first and the fourth lens units 1 and 4 are fixed with respect to the aperture stop S, the total length of the lens system does not vary. Thereby, designing of a copying apparatus is greatly facilitated. Moreover, since the focal length is varied by moving the second and the third lens units 2 and 3 which have a strong power, the movement amounts of the second and the third lens units 2 and 3 can be reduced. Thereby, a compact zoom lens system can be realized. Moreover, since the lens system is substantially symmetrical with respect to the aperture stop S, high image forming performance is realized at unity magnification, which is most important for a zoom lens system for use in a copying apparatus. Further, the zoom lens system according to the third implementation has a wide angle of view (the half view angle is 26°), and can cope with a half view angle of up to approximately 30°.

A zoom lens systems according to the third implementation fulfills the following condition (1)''', (2)'' (7) and (8):

$$-1.3 < f_1/f_M < -0.6 \quad (1)'''$$

$$0.4 < f_2/f_M < 0.7 \quad (2)''$$

$$-3.0 < (1/r_2 - 1/r_3)f_M < -1.5 \quad (7)$$

$$|(r_5 - r_6 - d_5)/f_M| < 0.02 \quad (8)$$

Description of the conditions (1)''' and (2)'' will be omitted here, since it has already been given with respect to the conditions (1) and (2) of the first implementation.

The conditions (7) and (8) are conditions for limiting the configurations of the third lens element (of second lens unit 2) and the fourth lens element (of third lens unit 3) which are arranged close to the aperture stop S. When the range defined by the condition (7) is exceeded, it is difficult to correct astigmatism. When the condition (8) is not fulfilled, it is difficult to correct coma.

Subsequently, specific embodiments according to the third implementation will be described with reference to the drawings, FIGS. 33, 37, 41, 45, 49, 53, 57, 61, 65, 69, 73, 77 and 81 show the lens arrangements of an eighth to a twentieth embodiments of the present invention, respectively. The eighth to twentieth embodiments comprise from the object side: a first lens unit 1 including a negative lens element; a second lens unit 2 including a bi-convex lens element and a negative meniscus lens element strongly concave to the aperture stop side; an aperture stop S; a third lens unit 3 arranged substantially symmetrically with the second lens unit 2 with respect to the aperture stop S; and a fourth lens unit 4 arranged substantially symmetrically with the first lens unit 1 with respect to the first lens unit 1. During zooming, the first and the fourth lens units 1 and 4 are fixed, and the second and the third lens units 2 and 3 are moved substantially symmetrically with respect to the aperture stop S.

Tables 15, 17, 19, 21, 23, 25, 27, 29, 31, 33, 35, 37 and 39 show data with respect to each surface of the eighth to the twentieth embodiments, respectively. The axial distances $d_2$, $d_6$, $d_7$ and $d_{11}$ are variable during zooming. Values thereof at a magnification of $-1.414$, at unity magnification of $-1.000$ and at a magnification of $-0.640$ are shown in Tables 16, 18, 20, 22, 24, 26, 28, 30, 32, 34 and 36. Values thereof at a magnification of $-2.000$, at unity magnification of $-1.000$ and at a magnification of $-0.500$ are shown in Tables 38 and 40.

FIGS. 34A and 34B to 36A and 36B, FIGS. 38A and 38B to 40A and 40B, FIGS. 42A and 42B to 44A and 44B, FIGS. 46A and 46B to 48A and 48B, FIGS. 50A and 50B to 52A and 52B, FIGS. 54A and 54B to 56A and 56B, FIGS. 58A and 58B to 60A and 60B, FIGS. 62A and 62B to 64A and 64B, FIGS. 66A and 66B to 68A and 68B, FIGS. 70A and 70B to 72A and 72B, FIGS. 74A and 74B to 76A and 76B, FIGS. 78A and 78B to 80A and 80B and FIGS. 82A and 82B to 84A and 84B show graphic representations of spherical aberration, astigmatism, distortion and lateral aberration of the eighth to twentieth embodiments at unity magnification, at a magnification larger than unity and at a magnification smaller than unity, respectively.

The zoom lens systems for use in a copying apparatus are compact lens systems of four-unit, six-element configuration. Moreover, in the lens systems, aberrations are excellently corrected at each magnification at a wide angle of view, and the focal length can be reduced. Thereby, an optical system for use in a copying apparatus can be reduced in size, and a large zoom ratio is available.

TABLE 1

(Embodiment 1)

$f = 190.143$ to $180.353$   $F_{NO} = 8.0$
$f_1/f_M = -1.173$   $f_2/f_M = 0.648$
$r_3/r_4 = r_{10}/r_9 = 0.262$   $r_3/r_5 = r_{10}/r_8 = 1.277$

| | Radius of Curvature | | Axial Distance | | Refractive Index | | Abbe Number |
|---|---|---|---|---|---|---|---|
| $r_1$ | −598.77 | | | | | | |
| | | $d_1$ | 2.50 | $N_1$ | 1.6129 | $v_1$ | 37.0 |
| $r_2$ | 177.46 | | | | | | |
| | | $d_2$ | Variable | | | | |
| $r_3$ | 40.74 | | | | | | |
| | | $d_3$ | 6.00 | $N_2$ | 1.6779 | $v_2$ | 53.4 |
| $r_4$ | 155.61 | | | | | | |
| | | $d_4$ | 1.89 | | | | |
| $r_5$ | 31.92 | | | | | | |
| | | $d_5$ | 4.80 | $N_3$ | 1.6545 | $v_3$ | 33.9 |
| $r_6$ | 23.65 | | | | | | |
| | | $d_6$ | Variable | | | | |
| S | — | | | | | | |
| | | $d_7$ | Variable | | | | |
| $r_7$ | −23.65 | | | | | | |
| | | $d_8$ | 4.08 | $N_4$ | 1.6545 | $v_4$ | 33.9 |
| $r_8$ | −31.92 | | | | | | |
| | | $d_9$ | 1.89 | | | | |
| $r_9$ | −155.61 | | | | | | |
| | | $d_{10}$ | 6.00 | $N_5$ | 1.6779 | $v_5$ | 53.4 |
| $r_{10}$ | −40.74 | | | | | | |
| | | $d_{11}$ | Variable | | | | |
| $r_{11}$ | −177.46 | | | | | | |
| | | $d_{12}$ | 2.50 | $N_6$ | 1.6129 | $v_6$ | 37.0 |
| $r_{12}$ | 598.77 | | | | | | |

TABLE 2

(Embodiment 1)

| Magnification | −1.414 | −1.000 | −0.640 |
|---|---|---|---|
| Focal length | 184.16 | 109.14 | 189.35 |
| Half view angle($\omega$) | 18.6° | 21.5° | 18.0° |
| $d_2$ | 2.420 | 0.570 | 3.642 |
| $d_6$ | 11.865 | 12.790 | 11.254 |
| $d_7$ | 11.865 | 12.790 | 11.254 |
| $d_{11}$ | 2.420 | 0.570 | 8.642 |

TABLE 3

(Embodiment 2)

$f = 190.375$ to $167.913$   $F_{No.} = 8.0$
$f_1/f_M = -1.119$   $f_2/f_M = 0.631$
$r_3/r_4 = r_{10}/r_9 = 0.252$   $r_3/r_5 = r_{10}/r_8 = 1.301$

| | Radius of Curvature | | Axial Distance | | Refractive Index | | Abbe Number |
|---|---|---|---|---|---|---|---|
| $r_1$ | −548.33 | | | | | | |
| | | $d_1$ | 3.00 | $N_1$ | 1.6129 | $v_1$ | 37.0 |
| $r_2$ | 171.70 | | | | | | |
| | | $d_2$ | Variable | | | | |
| $r_3$ | 40.98 | | | | | | |
| | | $d_3$ | 6.00 | $N_2$ | 1.6779 | $v_2$ | 53.4 |
| $r_4$ | 162.91 | | | | | | |
| | | $d_4$ | 1.89 | | | | |
| $r_5$ | 31.49 | | | | | | |
| | | $d_5$ | 4.08 | $N_3$ | 1.6545 | $v_3$ | 33.9 |
| $r_6$ | 23.50 | | | | | | |
| | | $d_6$ | Variable | | | | |
| S | — | | | | | | |
| | | $d_7$ | Variable | | | | |
| $r_7$ | −23.50 | | | | | | |
| | | $d_8$ | 4.08 | $N_4$ | 1.6545 | $v_4$ | 33.9 |
| $r_8$ | −31.49 | | | | | | |
| | | $d_9$ | 1.89 | | | | |
| $r_9$ | −162.91 | | | | | | |
| | | $d_{10}$ | 6.00 | $N_5$ | 1.6779 | $v_5$ | 53.4 |
| $r_{10}$ | −40.98 | | | | | | |
| | | $d_{11}$ | Variable | | | | |
| $r_{11}$ | −171.70 | | | | | | |
| | | $d_{12}$ | 3.00 | $N_6$ | 1.6129 | $v_6$ | 37.0 |
| $r_{12}$ | 548.33 | | | | | | |

TABLE 4

(Embodiment 2)

| Magnification | −2.000 | −1.000 | −0.500 |
|---|---|---|---|
| Focal length | 167.91 | 190.38 | 167.91 |
| Half view angle ($\omega$) | 16.6° | 21.5° | 16.6° |
| $d_2$ | 7.555 | 0.570 | 7.555 |
| $d_6$ | 9.297 | 12.790 | 9.297 |
| $d_7$ | 9.297 | 12.790 | 9.297 |
| $d_{11}$ | 7.555 | 0.570 | 7.555 |

TABLE 5

(Embodiment 8)

$f = 190.467$ to $168.100$   $F_{NO} = 8.0$
$f_1/f_M = -1.014$   $f_2/f_M = 0.594$
$r_3/r_4 = r_{10}/r_9 = 0.227$   $r_3/r_4 = r_{10}/r_8 = 1.351$

| | Radius of Curvature | | Axial Distance | | Refractive Index | | Abbe Number |
|---|---|---|---|---|---|---|---|
| $r_1$ | −420.13 | | | | | | |
| | | $d_1$ | 3.00 | $N_1$ | 1.6129 | $\nu_1$ | 37.0 |
| $r_2$ | 165.29 | | | | | | |
| | | $d_2$ | Variable | | | | |
| $r_3$ | 41.23 | | | | | | |
| | | $d_3$ | 6.00 | $N_2$ | 1.6779 | $\nu_2$ | 53.4 |
| $r_4$ | 181.25 | | | | | | |
| | | $d_4$ | 1.89 | | | | |
| $r_5$ | 30.51 | | | | | | |
| | | $d_5$ | 4.80 | $N_3$ | 1.6545 | $\nu_3$ | 33.9 |
| $r_6$ | 23.05 | | | | | | |
| | | $d_6$ | Variable | | | | |
| S | — | | | | | | |
| | | $d_7$ | Variable | | | | |
| $r_7$ | −23.05 | | | | | | |
| | | $d_8$ | 4.08 | $N_4$ | 1.6545 | $\nu_4$ | 33.9 |
| $r_8$ | −30.51 | | | | | | |
| | | $d_9$ | 1.89 | | | | |
| $r_9$ | −181.25 | | | | | | |
| | | $d_{10}$ | 6.00 | $N_5$ | 1.6779 | $\nu_5$ | 53.4 |
| $r_{10}$ | −41.23 | | | | | | |
| | | $d_{11}$ | Variable | | | | |
| $r_{11}$ | −165.29 | | | | | | |
| | | $d_{12}$ | 3.00 | $N_6$ | 1.6129 | $\nu_6$ | 37.0 |
| $r_{12}$ | 420.13 | | | | | | |

TABLE 6

(Embodiment 3)

| Magnification | −2.000 | −1.000 | −0.500 |
|---|---|---|---|
| Focal length | 168.10 | 190.47 | 168.10 |
| Half view angle($\omega$) | 16.6° | 21.5° | 16.6° |
| $d_2$ | 6.696 | 0.570 | 6.696 |
| $d_6$ | 9.727 | 12.790 | 9.727 |
| $d_7$ | 9.727 | 12.790 | 9.727 |
| $d_{11}$ | 6.696 | 0.570 | 6.696 |

TABLE 7

(Embodiment 4)

$f = 200.048$ to $189.888$   $F_{NO} = 8.0$
$f_1/f_M = -0.888$   $f_2/f_M = 0.545$
$r_3/r_4 = r_{10}/r_9 = 0.090$   $r_3/r_5 = r_{10}/r_8 = 1.540$

| | Radius of Curvature | | Axial Distance | | Refractive Index | | Abbe Number |
|---|---|---|---|---|---|---|---|
| $r_1$ | −244.38 | | | | | | |
| | | $d_1$ | 2.56 | $N_1$ | 1.6129 | $\nu_1$ | 37.0 |
| $r_2$ | 197.07 | | | | | | |
| | | $d_2$ | Variable | | | | |
| $r_3$ | 51.53 | | | | | | |
| | | $d_3$ | 7.17 | $N_2$ | 1.6779 | $\nu_2$ | 53.4 |
| $r_4$ | 572.49 | | | | | | |
| | | $d_4$ | 2.54 | | | | |
| $r_5$ | 33.47 | | | | | | |
| | | $d_5$ | 5.16 | $N_3$ | 1.6545 | $\nu_3$ | 33.9 |
| $r_6$ | 25.89 | | | | | | |
| | | $d_6$ | Variable | | | | |
| S | — | | | | | | |

TABLE 7-continued (Embodiment 4)

$f = 200.048$ to $189.888$   $F_{NO} = 8.0$
$f_1/f_M = -0.888$   $f_2/f_M = 0.545$
$r_3/r_4 = r_{10}/r_9 = 0.090$   $r_3/r_5 = r_{10}/r_8 = 1.540$

| | Radius of Curvature | | Axial Distance | | Refractive Index | | Abbe Number |
|---|---|---|---|---|---|---|---|
| | | $d_7$ | Variable | | | | |
| $r_7$ | −25.89 | | | | | | |
| | | $d_8$ | 5.16 | $N_4$ | 1.6545 | $\nu_4$ | 33.9 |
| $r_8$ | −33.47 | | | | | | |
| | | $d_9$ | 2.54 | | | | |
| $r_9$ | −572.49 | | | | | | |
| | | $d_{10}$ | 7.17 | $N_5$ | 1.6779 | $\nu_5$ | 53.4 |
| $r_{10}$ | −51.53 | | | | | | |
| | | $d_{11}$ | Variable | | | | |
| $r_{11}$ | −197.07 | | | | | | |
| | | $d_{12}$ | 2.56 | $N_6$ | 1.6129 | $\nu_6$ | 37.0 |
| $r_{12}$ | 244.38 | | | | | | |

TABLE 8

(Embodiment 4)

| Magnification | −1.414 | −1.000 | −0.640 |
|---|---|---|---|
| Focal length | 193.84 | 200.05 | 189.89 |
| Half view angle ($\omega$) | 24.2° | 27.7° | 23.3° |
| $d_2$ | 1.914 | 0.584 | 2.796 |
| $d_6$ | 11.884 | 12.549 | 11.443 |
| $d_7$ | 11.884 | 12.549 | 11.443 |
| $d_{11}$ | 1.914 | 0.584 | 2.796 |

TABLE 9

(Embodiment 5)

$f = 195.167$ to $185.289$   $F_{NO} = 8.0$
$f_1/f_M = -0.858$   $f_2/f_M = 0.535$
$r_3/r_4 = r_{10}/r_9 = 0.100$   $r_3/r_5 = r_{10}/r_8 = 1.582$

| | Radius of Curvature | | Axial Distance | | Refractive Index | | Abbe Number |
|---|---|---|---|---|---|---|---|
| $r_1$ | −278.19 | | | | | | |
| | | $d_1$ | 2.50 | $N_1$ | 1.6129 | $\nu_1$ | 37.0 |
| $r_2$ | 163.24 | | | | | | |
| | | $d_2$ | Variable | | | | |
| $r_3$ | 50.01 | | | | | | |
| | | $d_3$ | 7.00 | $N_2$ | 1.6779 | $\nu_2$ | 53.4 |
| $r_4$ | 501.25 | | | | | | |
| | | $d_4$ | 1.57 | | | | |
| $r_5$ | 31.60 | | | | | | |
| | | $d_5$ | 5.04 | $N_3$ | 1.6545 | $\nu_3$ | 33.9 |
| $r_6$ | 24.83 | | | | | | |
| | | $d_6$ | Variable | | | | |
| S | — | | | | | | |
| | | $d_7$ | Variable | | | | |
| $r_7$ | −24.83 | | | | | | |
| | | $d_8$ | 5.04 | $N_4$ | 1.6545 | $\nu_4$ | 33.9 |
| $r_8$ | −31.60 | | | | | | |
| | | $d_9$ | 1.57 | | | | |
| $r_9$ | −501.25 | | | | | | |
| | | $d_{10}$ | 7.00 | $N_5$ | 1.6779 | $\nu_5$ | 53.4 |
| $r_{10}$ | −50.01 | | | | | | |
| | | $d_{11}$ | Variable | | | | |
| $r_{11}$ | −163.24 | | | | | | |
| | | $d_{12}$ | 2.50 | $N_6$ | 1.6129 | $\nu_6$ | 37.0 |
| $r_{12}$ | 278.19 | | | | | | |

TABLE 10

(Embodiment 5)

| Magnification | −1.414 | −1.000 | −0.640 |
|---|---|---|---|
| Focal length | 189.13 | 195.17 | 185.29 |
| Half view angle ($\omega$) | 24.7° | 28.3° | 28.9° |
| $d_2$ | 1.801 | 0.570 | 2.617 |
| $d_6$ | 11.829 | 12.444 | 11.421 |
| $d_7$ | 11.829 | 12.444 | 11.421 |

TABLE 10-continued (Embodiment 5)

| | | | |
|---|---|---|---|
| $d_{11}$ | 1.801 | 0.570 | 2.617 |

TABLE 11

(Embodiment 6)

$f = 190.467$ to $168.100$   $F_{NO} = 8.0$
$f_1/f_M = -1.014$   $f_2/f_M = 0.594$
$|r_3/r_4|, |r_{10}/r_9| = 0.227$   $r_3/r_5 = r_{10}/r_8 = 1.351$
$|n_1 - n_2| = 0.065$

| Radius of Curvature | | Axial Distance | | Refractive Index | | Abbe Number |
|---|---|---|---|---|---|---|
| $r_1$ | −420.13 | | | | | |
| | | $d_1$ | 3.00 | $N_1$ | 1.6129 | $\nu_1$ 37.0 |
| $r_2$ | 165.29 | | | | | |
| | | $d_2$ | Variable | | | |
| $r_3$ | 41.23 | | | | | |
| | | $d_3$ | 6.00 | $N_2$ | 1.6779 | $\nu_2$ 53.4 |
| $r_4$ | 181.25 | | | | | |
| | | $d_4$ | 1.89 | | | |
| $r_5$ | 30.51 | | | | | |
| | | $d_5$ | 4.08 | $N_3$ | 1.6545 | $\nu_3$ 33.9 |
| $r_6$ | 23.05 | | | | | |
| | | $d_6$ | 12.79 | | | |
| S | — | | | | | |
| | | $d_7$ | Variable | | | |
| $r_7$ | −23.05 | | | | | |
| | | $d_8$ | 4.08 | $N_4$ | 1.6545 | $\nu_4$ 33.9 |
| $r_8$ | −30.51 | | | | | |
| | | $d_9$ | 1.89 | | | |
| $r_9$ | −181.25 | | | | | |
| | | $d_{10}$ | 6.00 | $N_5$ | 1.6779 | $\nu_5$ 53.4 |
| $r_{10}$ | −41.23 | | | | | |
| | | $d_{11}$ | Variable | | | |
| $r_{11}$ | −165.29 | | | | | |
| | | $d_{12}$ | 3.00 | $N_6$ | 1.6129 | $\nu_6$ 37.0 |
| $r_{12}$ | 420.13 | | | | | |

TABLE 12

(Embodiment 6)

| Magnification | −2.000 | −1.000 | −0.500 |
|---|---|---|---|
| Focal length | 168.10 | 190.47 | 168.10 |
| Half view angle ($\omega$) | 16.6° | 21.5° | 16.6° |
| $d_2$ | 6.696 | 0.570 | 6.696 |
| $d_6$ | 12.790 | 12.790 | 12.790 |
| $d_7$ | 6.668 | 12.790 | 6.663 |
| $d_{11}$ | 6.696 | 0.570 | 6.696 |

TABLE 13

(Embodiment 7)

$f = 230.208$ to $203.134$   $F_{NO} = 7.0$
$f_1/f_M = -0.832$   $f_2/f_M = 0.522$
$|r_3/r_4|, |r_{10}/r_9| = 0.479$   $r_3/r_5 = r_{10}/r_8 = 2.010$
$|n_1 - n_2| = 0.078$

| Radius of Curvature | | Axial Distance | | Refractive Index | | Abbe Number |
|---|---|---|---|---|---|---|
| $r_1$ | −106.86 | | | | | |
| | | $d_1$ | 3.43 | $N_1$ | 1.6129 | $\nu_1$ 37.0 |
| $r_2$ | −1209.95 | | | | | |
| | | $d_2$ | Variable | | | |
| $r_3$ | 101.10 | | | | | |
| | | $d_3$ | 9.16 | $N_2$ | 1.6910 | $\nu_2$ 54.8 |
| $r_4$ | −211.17 | | | | | |
| | | $d_4$ | 8.07 | | | |
| $r_5$ | 50.30 | | | | | |
| | | $d_5$ | 9.59 | $N_3$ | 1.6545 | $\nu_3$ 33.9 |
| $r_6$ | 37.72 | | | | | |
| | | $d_6$ | 12.67 | | | |
| S | — | | | | | |
| | | $d_7$ | Variable | | | |
| $r_7$ | −37.72 | | | | | |
| | | $d_8$ | 9.59 | $N_4$ | 1.6545 | $\nu_4$ 33.9 |
| $r_8$ | −50.30 | | | | | |
| | | $d_9$ | 8.07 | | | |
| $r_9$ | 211.17 | | | | | |
| | | $d_{10}$ | 9.16 | $N_5$ | 1.6910 | $\nu_5$ 54.8 |
| $r_{10}$ | −101.10 | | | | | |
| | | $d_{11}$ | Variable | | | |
| $r_{11}$ | 1209.95 | | | | | |
| | | $d_{12}$ | 3.43 | $N_6$ | 1.6129 | $\nu_6$ 37.0 |
| $r_{12}$ | 106.86 | | | | | |

TABLE 14

(Embodiment 7)

| Magnification | −2.000 | −1.000 | −0.500 |
|---|---|---|---|
| Focal length | 203.13 | 230.21 | 203.13 |
| Half view angle ($\omega$) | 13.83° | 18.05° | 13.83° |
| $d_2$ | 6.984 | 1.145 | 6.934 |
| $d_6$ | 12.669 | 12.669 | 12.669 |
| $d_7$ | 6.880 | 12.669 | 6.880 |
| $d_{11}$ | 6.934 | 1.145 | 6.934 |

TABLE 15

(Embodiment 8)

$f = 201.4$ to $212.7$   $F_{NO} = 8.0$
$f_1/f_M = -1.158$   $f_2/f_M = 0.637$
$(1/r_2 = 1/r_3) \cdot f_M = -1.878$
$|(r_5 - r_6 - d_5)/f_M| = 0.0145$

| Radius of Curvature | | Axial Distance | | Refractive Index | | Abbe Number |
|---|---|---|---|---|---|---|
| $r_1$ | −129.68 | | | | | |
| | | $d_1$ | 3.00 | $N_1$ | 1.7006 | $\nu_1$ 30.1 |
| $r_2$ | −526.48 | | | | | |
| | | $d_2$ | Variable | | | |
| $r_3$ | 144.26 | | | | | |
| | | $d_3$ | 20.00 | $N_2$ | 1.7130 | $\nu_2$ 53.9 |
| $r_4$ | −224.34 | | | | | |
| | | $d_4$ | 0.30 | | | |
| $r_5$ | 55.71 | | | | | |
| | | $d_5$ | 16.46 | $N_3$ | 1.5814 | $\nu_3$ 40.8 |
| $r_6$ | 42.33 | | | | | |
| | | $d_6$ | Variable | | | |
| S | — | | | | | |
| | | $d_7$ | Variable | | | |
| $r_7$ | −42.33 | | | | | |
| | | $d_8$ | 16.46 | $N_4$ | 1.5814 | $\nu_4$ 40.8 |
| $r_8$ | −55.71 | | | | | |
| | | $d_9$ | 0.30 | | | |
| $r_9$ | 224.34 | | | | | |
| | | $d_{10}$ | 20.00 | $N_5$ | 1.7130 | $\nu_5$ 53.9 |
| $r_{10}$ | −144.26 | | | | | |
| | | $d_{11}$ | Variable | | | |
| $r_{11}$ | 526.48 | | | | | |
| | | $d_{12}$ | 3.00 | $N_6$ | 1.7006 | $\nu_6$ 30.1 |
| $r_{12}$ | 129.68 | | | | | |

TABLE 16

(Embodiment 8)

| Magnification | −1.414 | −1.000 | −0.640 |
|---|---|---|---|
| Focal length | 205.8 | 212.7 | 201.4 |
| Half view angle ($\omega$) | 23° | 26° | 22° |
| $d_2$ | 3.348 | 1.166 | 4.789 |
| $d_6$ | 14.786 | 15.877 | 14.066 |
| $d_7$ | 14.786 | 15.877 | 14.066 |
| $d_{11}$ | 3.348 | 1.166 | 4.789 |

TABLE 17

(Embodiment 9)

$f = 201.4$ to $212.6$    $F_{NO} = 8.0$
$f_1/f_M = -1.038$    $f_2/f_M = 0.610$
$(1/r_2 - 1/r_3)\cdot f_M = -1.875$
$|(r_5 - r_6 - d_5)/f_M| = 0.0146$

| Radius of Curvature | | Axial Distance | | Refractive Index | | Abbe Number |
|---|---|---|---|---|---|---|
| $r_1$ | −116.89 | | | | | |
| | | $d_1$ | 3.00 | $N_1$ | 1.6545 | $\nu_2$ 33.9 |
| $r_2$ | −618.28 | | | | | |
| | | $d_2$ | Variable | | | |
| $r_3$ | 138.82 | | | | | |
| | | $d_3$ | 22.71 | $N_2$ | 1.6583 | $\nu_2$ 58.5 |
| $r_4$ | −178.19 | | | | | |
| | | $d_4$ | 1.74 | | | |
| $r_5$ | 50.61 | | | | | |
| | | $d_5$ | 14.20 | $N_3$ | 1.5814 | $\nu_3$ 40.8 |
| $r_6$ | 39.51 | | | | | |
| | | $d_6$ | Variable | | | |
| S | — | | | | | |
| | | $d_7$ | Variable | | | |
| $r_7$ | −39.51 | | | | | |
| | | $d_8$ | 14.20 | $N_4$ | 1.5814 | $\nu_4$ 40.8 |
| $r_8$ | −50.61 | | | | | |
| | | $d_9$ | 1.74 | | | |
| $r_9$ | 178.19 | | | | | |
| | | $d_{10}$ | 22.71 | $N_5$ | 1.6583 | $\nu_5$ 58.5 |
| $r_{10}$ | −138.82 | | | | | |
| | | $d_{11}$ | Variable | | | |
| $r_{11}$ | 618.28 | | | | | |
| | | $d_{12}$ | 3.00 | $N_6$ | 1.6545 | $\nu_6$ 33.9 |
| $r_{12}$ | 116.89 | | | | | |

TABLE 18

(Embodiment 9)

| | | | |
|---|---|---|---|
| Magnification | −1.414 | −1.000 | −0.640 |
| Focal length | 205.7 | 212.6 | 201.4 |
| Half view angle ($\omega$) | 23° | 26° | 22° |
| $d_2$ | 3.542 | 1.658 | 4.789 |
| $d_6$ | 14.101 | 15.043 | 13.477 |
| $d_7$ | 14.101 | 15.043 | 13.477 |
| $d_{11}$ | 3.542 | 1.658 | 4.789 |

TABLE 19

(Embodiment 10)

$f = 201.4$ to $212.4$    $F_{NO} = 8.0$
$f_1/f_M = -0.976$    $f_2/f_M = 0.588$
$(1/r_2 - 1/r_3)\cdot f_m = -1.918$
$|(r_5 - r_6 - d_5)/f_M| = 0.0121$

| Radius of Curvature | | Axial Distance | | Refractive Index | | Abbe Number |
|---|---|---|---|---|---|---|
| $r_1$ | −115.81 | | | | | |
| | | $d_1$ | 3.00 | $N_1$ | 1.6545 | $\nu_1$ 33.9 |
| $r_2$ | −799.72 | | | | | |
| | | $d_2$ | Variable | | | |
| $r_3$ | 128.57 | | | | | |
| | | $d_3$ | 20.00 | $N_2$ | 1.6700 | $\nu_2$ 57.1 |
| $r_4$ | −184.46 | | | | | |
| | | $d_4$ | 0.30 | | | |
| $r_5$ | 49.32 | | | | | |
| | | $d_5$ | 13.62 | $N_3$ | 1.5814 | $\nu_3$ 40.8 |
| $r_6$ | 38.28 | | | | | |
| | | $d_6$ | Variable | | | |
| S | — | | | | | |
| | | $d_7$ | Variable | | | |
| $r_7$ | −38.28 | | | | | |
| | | $d_8$ | 13.62 | $N_4$ | 1.5814 | $\nu_4$ 40.8 |
| $r_8$ | −49.32 | | | | | |
| | | $d_9$ | 0.30 | | | |
| $r_9$ | 184.46 | | | | | |
| | | $d_{10}$ | 20.00 | $N_5$ | 1.6700 | $\nu_5$ 57.1 |
| $r_{10}$ | −128.57 | | | | | |
| | | $d_{11}$ | Variable | | | |
| $r_{11}$ | 799.72 | | | | | |
| | | $d_{12}$ | 3.00 | $N_6$ | 1.6545 | $\nu_6$ 33.9 |
| $r_{12}$ | 115.81 | | | | | |

TABLE 20

(Embodiment 10)

| | | | |
|---|---|---|---|
| Magnification | −1.414 | −1.000 | −0.640 |
| Focal length | 205.7 | 212.4 | 201.4 |
| Half view angle ($\omega$) | 23° | 26° | 22° |
| $d_2$ | 3.657 | 1.947 | 4.789 |
| $d_6$ | 14.632 | 15.487 | 14.066 |
| $d_7$ | 14.632 | 15.487 | 14.066 |
| $d_{11}$ | 3.657 | 1.947 | 4.789 |

TABLE 21

(Embodiment 11)

$f = 201.7$ to $213.0$    $F_{NO} = 8.0$
$f_1/f_M = -1.229$    $f_2/f_M = 0.654$
$(1/r_2 - 1/r_3)\cdot f_M = -2.206$
$|(r_5 - r_6 - d_5)/f_M| = 0.0014$

| Radius of Curvature | | Axial Distance | | Refractive Index | | Abbe Number |
|---|---|---|---|---|---|---|
| $r_1$ | −197.13 | $d_1$ | 3.00 | $N_1$ | 1.7006 | $\nu_1$ 30.1 |
| $r_2$ | 2640.89 | $d_2$ | Variable | | | |
| $r_3$ | 93.15 | $d_3$ | 13.00 | $N_2$ | 1.7130 | $\nu_2$ 53.9 |
| $r_4$ | −877.39 | $d_4$ | 0.30 | | | |
| $r_5$ | 48.26 | $d_5$ | 12.00 | $N_3$ | 1.5814 | $\nu_3$ 40.8 |
| $r_6$ | 36.55 | $d_6$ | Variable | | | |
| S | — | $d_7$ | Variable | | | |
| $r_7$ | −36.55 | $d_8$ | 12.00 | $N_4$ | 1.5814 | $\nu_4$ 40.8 |
| $r_8$ | −48.26 | $d_9$ | 0.30 | | | |
| $r_9$ | 877.39 | $d_{10}$ | 13.00 | $N_5$ | 1.7130 | $\nu_5$ 53.9 |
| $r_{10}$ | −93.15 | $d_{11}$ | Variable | | | |
| $r_{11}$ | −2640.89 | $d_{12}$ | 3.00 | $N_6$ | 1.7006 | $\nu_6$ 30.1 |
| $r_{12}$ | 197.13 | | | | | |

TABLE 22

(Embodiment 11)

| | | | |
|---|---|---|---|
| Magnification | −1.414 | −1.000 | −0.640 |
| Focal length | 206.1 | 213.0 | 201.7 |
| Half view angle ($\omega$) | 23° | 26° | 22° |
| $d_2$ | 3.267 | 0.960 | 4.789 |
| $d_6$ | 15.799 | 16.952 | 15.038 |
| $d_7$ | 15.799 | 16.952 | 15.038 |
| $d_{11}$ | 3.267 | 0.960 | 4.789 |

TABLE 23

(Embodiment 12)

$f = 200.3$ to $211.0$    $F_{NO} = 8.0$
$f_1/f_M = -0.729$    $f_2/f_M = 0.489$
$(1/r_2 - 1/r_3)\cdot f_M = -1.955$
$|(r_5 - r_6 - d_5)/f_M| = 0.0113$

| Radius of Curvature | | Axial Distance | | Refractive Index | | Abbe Number |
|---|---|---|---|---|---|---|
| $r_1$ | −95.35 | $d_1$ | 2.00 | $N_1$ | 1.5955 | $\nu_1$ 39.2 |
| $r_2$ | 2354.33 | $d_2$ | Variable | | | |
| $r_3$ | 103.20 | $d_3$ | 9.95 | $N_2$ | 1.6031 | $\nu_2$ 60.7 |
| $r_4$ | −135.13 | $d_4$ | 0.30 | | | |
| $r_5$ | 34.22 | $d_5$ | 7.98 | $N_3$ | 1.6545 | $\nu_3$ 33.9 |
| $r_6$ | 28.62 | $d_6$ | Variable | | | |
| S | — | $d_7$ | Variable | | | |
| $r_7$ | −28.62 | $d_8$ | 7.98 | $N_4$ | 1.6545 | $\nu_4$ 33.9 |
| $r_8$ | −34.22 | $d_9$ | 0.30 | | | |

TABLE 23-continued
(Embodiment 12)

$f = 200.3$ to $211.0$  $F_{NO} = 8.0$
$f_1/f_M = -0.729$  $f_2/f_M = 0.489$
$(1/r_2-1/r_3)*f_M = -1.955$
$|(r_5-r_6-d_5)/f_M| = 0.0113$

| | Radius of Curvature | | Axial Distance | | Refractive Index | | Abbe Number |
|---|---|---|---|---|---|---|---|
| $r_9$ | 135.13 | $d_{10}$ | 9.95 | $N_5$ | 1.6031 | $v_5$ | 60.7 |
| $r_{10}$ | −103.20 | $d_{11}$ | Variable | | | | |
| $r_{11}$ | −2354.33 | $d_{12}$ | 2.0 | $N_6$ | 1.5955 | $v_6$ | 39.2 |
| $r_{12}$ | 95.35 | | | | | | |

TABLE 24
(Embodiment 12)

| | | | |
|---|---|---|---|
| Magnification | −1.414 | −1.000 | −0.640 |
| Focal length | 204.4 | 211.0 | 200.3 |
| Half view angle ($\omega$) | 17° | 20° | 16° |
| $d_2$ | 2.074 | 1.005 | 2.748 |
| $d_6$ | 14.097 | 15.116 | 13.423 |
| $d_7$ | 14.097 | 15.116 | 13.423 |
| $d_{11}$ | 2.074 | 1.005 | 2.748 |

TABLE 25
(Embodiment 13)

$f = 200.8$ to $211.6$  $F_{NO} = 8.0$
$f_1/f_M = -0.757$  $f_2/f_M = 0.495$
$(1/r_2-1/r_3)*f_M = -2.182$
$|(r_5-r_6-d_5)/f_M| = 0.0028$

| | Radius of Curvature | | Axial Distance | | Refractive Index | | Abbe Number |
|---|---|---|---|---|---|---|---|
| $r_1$ | −123.98 | $d_1$ | 2.00 | $N_1$ | 1.6545 | $v_1$ | 33.9 |
| $r_2$ | 685.88 | $d_2$ | Variable | | | | |
| $r_3$ | 84.95 | $d_3$ | 9.95 | $N_2$ | 1.6935 | $v_2$ | 50.3 |
| $r_4$ | −256.92 | $d_4$ | 0.30 | | | | |
| $r_5$ | 37.67 | $d_5$ | 7.98 | $N_3$ | 1.6545 | $v_3$ | 33.9 |
| $r_6$ | 30.29 | $d_6$ | Variable | | | | |
| S | — | $d_7$ | Variable | | | | |
| $r_7$ | −30.29 | $d_8$ | 7.98 | $N_4$ | 1.6545 | $v_4$ | 33.9 |
| $r_8$ | −37.67 | $d_9$ | 0.30 | | | | |
| $r_9$ | 256.92 | $d_{10}$ | 9.95 | $N_5$ | 1.6935 | $v_5$ | 50.3 |
| $r_{10}$ | −84.95 | $d_{11}$ | Variable | | | | |
| $r_{11}$ | −685.88 | $d_{12}$ | 2.00 | $N_6$ | 1.6545 | $v_6$ | 33.9 |
| $r_{12}$ | 123.98 | | | | | | |

TABLE 26
(Embodiment 13)

| | | | |
|---|---|---|---|
| Magnification | −1.414 | −1.000 | −0.640 |
| Focal length | 205.0 | 211.6 | 200.8 |
| Half view angle ($\omega$) | 17° | 20° | 16° |
| $d_2$ | 1.788 | 0.710 | 2.500 |
| $d_6$ | 13.967 | 15.045 | 13.255 |
| $d_7$ | 13.967 | 15.045 | 13.255 |
| $d_{11}$ | 1.788 | 0.710 | 2.500 |

TABLE 27
(Embodiment 14)

$f = 200.6$ to $211.4$  $F_{NO} = 8.0$
$f_1/f_M = -0.818$  $f_2/f_M = 0.517$
$(1/r_2-1/r_3)*f_M = -2.390$
$|(r_5-r_6-d_5)/f_M| = 0.0026$

| | Radius of Curvature | | Axial Distance | | Refractive Index | | Abbe Number |
|---|---|---|---|---|---|---|---|
| $r_1$ | −157.52 | $d_1$ | 1.98 | $N_1$ | 1.6545 | $v_1$ | 33.9 |
| $r_2$ | 403.30 | $d_2$ | Variable | | | | |
| $r_3$ | 72.53 | $d_3$ | 6.90 | $N_2$ | 1.6935 | $v_2$ | 50.3 |
| $r_4$ | −508.50 | $d_4$ | 0.28 | | | | |
| $r_5$ | 38.55 | $d_5$ | 8.05 | $N_3$ | 1.6200 | $v_3$ | 36.3 |

TABLE 27-continued
(Embodiment 14)

$f = 200.6$ to $211.4$  $F_{NO} = 8.0$
$f_1/f_M = -0.818$  $f_2/f_M = 0.517$
$(1/r_2-1/r_3)*f_M = -2.390$
$|(r_5-r_6-d_5)/f_M| = 0.0026$

| | Radius of Curvature | | Axial Distance | | Refractive Index | | Abbe Number |
|---|---|---|---|---|---|---|---|
| $r_6$ | 29.96 | $d_6$ | Variable | | | | |
| S | — | $d_7$ | Variable | | | | |
| $r_7$ | −29.96 | $d_8$ | 8.05 | $N_4$ | 1.6200 | $v_4$ | 36.3 |
| $r_8$ | −38.55 | $d_9$ | 0.28 | | | | |
| $r_9$ | 508.50 | $d_{10}$ | 6.90 | $N_5$ | 1.6935 | $v_5$ | 50.3 |
| $r_{10}$ | −72.53 | $d_{11}$ | Variable | | | | |
| $r_{11}$ | −403.30 | $d_{12}$ | 1.98 | $N_6$ | 1.6545 | $v_6$ | 33.9 |
| $r_{12}$ | 157.52 | | | | | | |

TABLE 28
(Embodiment 14)

| | | | |
|---|---|---|---|
| Magnification | −1.414 | −1.000 | −0.640 |
| Focal length | 204.8 | 211.4 | 200.6 |
| Half view angle ($\omega$) | 17° | 20° | 16° |
| $d_2$ | 1.403 | 0.221 | 2.183 |
| $d_6$ | 12.248 | 13.610 | 11.648 |
| $d_7$ | 12.428 | 13.610 | 11.648 |
| $d_{11}$ | 1.403 | 0.221 | 2.183 |

TABLE 29
(Embodiment 15)

$f = 201.0$ to $212.1$  $F_{NO} = 5.6$
$f_1/f_M = -0.902$  $f_2/f_M = 0.560$
$(1/r_2-1/r_3)*f_M = -1.889$
$|(r_5-r_6-d_5)/f_M| = 0.0179$

| | Radius of Curvature | | Axial Distance | | Refractive Index | | Abbe Number |
|---|---|---|---|---|---|---|---|
| $r_1$ | −97.14 | $d_1$ | 4.00 | $N_1$ | 1.6477 | $v_1$ | 33.9 |
| $r_2$ | −456.27 | $d_2$ | Variable | | | | |
| $r_3$ | 148.89 | $d_3$ | 10.00 | $N_2$ | 1.6516 | $v_2$ | 58.6 |
| $r_4$ | −146.03 | $d_4$ | 0.30 | | | | |
| $r_5$ | 44.34 | $d_5$ | 12.27 | $N_3$ | 1.5827 | $v_3$ | 46.4 |
| $r_6$ | 35.87 | $d_6$ | Variable | | | | |
| S | — | $d_7$ | Variable | | | | |
| $r_7$ | −35.87 | $d_8$ | 12.27 | $N_4$ | 1.5827 | $v_4$ | 46.4 |
| $r_8$ | −44.34 | $d_9$ | 0.30 | | | | |
| $r_9$ | 146.03 | $d_{10}$ | 10.00 | $N_5$ | 1.6516 | $v_5$ | 58.6 |
| $r_{10}$ | −148.89 | $d_{11}$ | Variable | | | | |
| $r_{11}$ | 456.27 | $d_{12}$ | 4.00 | $N_6$ | 1.6477 | $v_6$ | 33.9 |
| $r_{12}$ | 97.14 | | | | | | |

TABLE 30
(Embodiment 15)

| | | | |
|---|---|---|---|
| Magnification | −1.414 | −1.000 | −0.640 |
| Focal length | 205.3 | 212.1 | 201.0 |
| Half view angle ($\omega$) | 17° | 20° | 16° |
| $d_2$ | 2.068 | 0.653 | 3.000 |
| $d_6$ | 16.147 | 17.562 | 15.214 |
| $d_7$ | 16.147 | 17.562 | 15.214 |
| $d_{11}$ | 2.068 | 0.653 | 3.000 |

TABLE 31
(Embodiment 16)

$f = 200.9$ to $212.0$  $F_{NO} = 5.6$
$f_1/f_M = -0.917$  $f_2/f_M = 0.556$
$(1/r_2-1/r_3)*f_M = -1.942$
$|(r_5-r_6-d_5)/f_M| = 0.0167$

| | Radius of Curvature | | Axial Distance | | Refractive Index | | Abbe Number |
|---|---|---|---|---|---|---|---|
| $r_1$ | −102.94 | $d_1$ | 2.00 | $N_1$ | 1.6545 | $v_1$ | 33.9 |

TABLE 31-continued (Embodiment 16)

f = 200.9 to 212.0  $F_{NO} = 5.6$
$f_1/f_M = -0.917$  $f_2/f_M = 0.556$
$(1/r_2-1/r_3)*f_M = -1.942$
$|(r_5-r_6-d_5)/f_M| = 0.0167$

| | Radius of Curvature | | Axial Distance | Refractive Index | | Abbe Number |
|---|---|---|---|---|---|---|
| $r_2$ | −543.81 | $d_2$ | Variable | | | |
| $r_3$ | 136.57 | $d_3$ | 8.23 | $N_2$ 1.6700 | $v_2$ | 57.1 |
| $r_4$ | −164.66 | $d_4$ | 0.30 | | | |
| $r_5$ | 44.20 | $d_5$ | 12.27 | $N_3$ 1.5814 | $v_3$ | 40.8 |
| $r_6$ | 35.47 | $d_6$ | Variable | | | |
| S | — | $d_7$ | Variable | | | |
| $r_7$ | −35.47 | $d_8$ | 12.27 | $N_4$ 1.5814 | $v_4$ | 40.8 |
| $r_8$ | −44.20 | $d_9$ | 0.30 | | | |
| $r_9$ | 164.66 | $d_{10}$ | 8.23 | $N_5$ 1.6700 | $v_5$ | 57.1 |
| $r_{10}$ | −136.57 | $d_{11}$ | Variable | | | |
| $r_{11}$ | 543.81 | $d_{12}$ | 2.00 | $N_6$ 1.6545 | $v_6$ | 33.9 |
| $r_{12}$ | 102.94 | | | | | |

TABLE 32

(Embodiment 16)

| | | | |
|---|---|---|---|
| Magnification | −1.414 | −1.000 | −0.640 |
| Focal length | 205.2 | 212.0 | 200.9 |
| Half view angle (ω) | 17° | 20° | 16° |
| $d_2$ | 2.057 | 0.617 | 3.000 |
| $d_6$ | 16.160 | 17.597 | 15.214 |
| $d_7$ | 16.160 | 17.597 | 15.214 |
| $d_{11}$ | 2.057 | 0.617 | 3.000 |

TABLE 33

(Embodiment 17)

f = 200.9 to 212.0  $F_{NO} = 5.6$
$f_1/f_M = -0.914$  $f_2/f_M = 0.555$
$(1/r_2-1/r_3)*f_M = -1.870$
$|(r_5-r_6-d_5)/f_M| = 0.0172$

| | Radius of Curvature | | Axial Distance | Refractive Index | | Abbe Number |
|---|---|---|---|---|---|---|
| $r_1$ | −108.03 | $d_1$ | 2.00 | $N_1$ 1.7006 | $v_1$ | 30.1 |
| $r_2$ | −532.90 | $d_2$ | Variable | | | |
| $r_3$ | 143.96 | $d_3$ | 8.23 | $N_2$ 1.7080 | $v_2$ | 53.2 |
| $r_4$ | −176.01 | $d_4$ | 0.30 | | | |
| $r_5$ | 44.34 | $d_5$ | 12.27 | $N_3$ 1.5814 | $v_3$ | 40.8 |
| $r_6$ | 35.73 | $d_6$ | Variable | | | |
| S | — | $d_7$ | Variable | | | |
| $r_7$ | −35.73 | $d_8$ | 12.27 | $N_4$ 1.5814 | $v_4$ | 40.8 |
| $r_8$ | −44.34 | $d_9$ | 0.30 | | | |
| $r_9$ | 176.01 | $d_{10}$ | 8.23 | $N_5$ 1.7080 | $v_5$ | 53.2 |
| $r_{10}$ | −143.96 | $d_{11}$ | Variable | | | |
| $r_{11}$ | 532.90 | $d_{12}$ | 2.00 | $N_6$ 1.7006 | $v_6$ | 30.1 |
| $r_{12}$ | 108.03 | | | | | |

TABLE 34

(Embodiment 17)

| | | | |
|---|---|---|---|
| Magnification | −1.414 | −1.000 | −0.640 |
| Focal length | 205.2 | 212.0 | 200.9 |
| Half view angle (ω) | 17° | 20° | 16° |
| $d_2$ | 2.058 | 0.628 | 3.000 |
| $d_6$ | 16.156 | 17.586 | 15.214 |
| $d_7$ | 16.165 | 17.586 | 15.214 |
| $d_{11}$ | 2.058 | 0.628 | 3.000 |

TABLE 35

(Embodiment 18)

f = 200.9 to 212.0  $F_{NO} = 6.3$
$f_1/f_M = -0.939$  $f_2/f_M = 0.560$
$(1/r_2-1/r_3)*f_M = -1.929$
$|(r_5-r_6-d_5)/f_M| = 0.0180$

| | Radius of Curvature | | Axial Distance | Refractive Index | | Abbe Number |
|---|---|---|---|---|---|---|
| $r_1$ | −110.25 | $d_1$ | 2.00 | $N_1$ 1.6545 | $v_1$ | 33.9 |
| $r_2$ | −722.05 | $d_2$ | Variable | | | |
| $r_3$ | 129.63 | $d_3$ | 8.23 | $N_2$ 1.6700 | $v_2$ | 57.1 |
| $r_4$ | −180.06 | $d_4$ | 0.30 | | | |
| $r_5$ | 42.48 | $d_5$ | 12.27 | $N_3$ 1.5814 | $v_3$ | 40.8 |
| $r_6$ | 34.04 | $d_6$ | Variable | | | |
| S | — | $d_7$ | Variable | | | |
| $r_7$ | −34.04 | $d_8$ | 12.27 | $N_4$ 1.5814 | $v_4$ | 40.8 |
| $r_8$ | −42.48 | $d_9$ | 0.30 | | | |
| $r_9$ | 180.06 | $d_{10}$ | 8.23 | $N_5$ 1.6700 | $v_5$ | 57.1 |
| $r_{10}$ | −129.63 | $d_{11}$ | Variable | | | |
| $r_{11}$ | 722.05 | $d_{12}$ | 2.00 | $N_6$ 1.6545 | $v_6$ | 33.9 |
| $r_{12}$ | 110.25 | | | | | |

TABLE 36

(Embodiment 18)

| | | | |
|---|---|---|---|
| Magnification | −1.414 | −1.000 | −0.640 |
| Focal length | 205.2 | 212.0 | 200.9 |
| Half view angle (ω) | 17° | 20° | 16° |
| $d_2$ | 2.023 | 0.538 | 3.000 |
| $d_6$ | 16.191 | 17.676 | 15.214 |
| $d_7$ | 16.191 | 17.676 | 15.214 |
| $d_{11}$ | 2.023 | 0.538 | 3.000 |

TABLE 37

(Embodiment 19)

f = 200.3 to 177.1  $F_{NO} = 8.0$
$f_1/f_M = -0.694$  $f_2/f_M = 0.490$
$(1/r_2-1/r_3)*f_M = -1.907$
$|(r_5-r_6-d_5)/f_M| = 0.0057$

| | Radius of Curvature | | Axial Distance | Refractive Index | | Abbe Number |
|---|---|---|---|---|---|---|
| $r_1$ | −81.54 | $d_1$ | 3.00 | $N_1$ 1.5955 | $v_1$ | 39.2 |
| $r_2$ | −5204.81 | $d_2$ | Variable | | | |
| $r_3$ | 107.42 | $d_3$ | 9.00 | $N_2$ 1.6031 | $v_2$ | 60.7 |
| $r_4$ | −110.93 | $d_4$ | 0.30 | | | |
| $r_5$ | 36.80 | $d_5$ | 7.98 | $N_3$ 1.6200 | $v_3$ | 36.3 |
| $r_6$ | 30.41 | $d_6$ | Variable | | | |
| S | — | $d_7$ | Variable | | | |
| $r_7$ | −30.41 | $d_8$ | 7.98 | $N_4$ 1.6200 | $v_4$ | 36.3 |
| $r_8$ | −36.80 | $d_9$ | 0.30 | | | |
| $r_9$ | 110.93 | $d_{10}$ | 9.00 | $N_5$ 1.6031 | $v_5$ | 60.7 |
| $r_{10}$ | −107.42 | $d_{11}$ | Variable | | | |
| $r_{11}$ | 5204.81 | $d_{12}$ | 3.00 | $N_6$ 1.5955 | $v_6$ | 39.2 |
| $r_{12}$ | 81.54 | | | | | |

TABLE 38

(Embodiment 19)

| | | | |
|---|---|---|---|
| Magnification | −2.000 | −1.000 | −0.500 |
| Focal length | 177.1 | 200.3 | 177.1 |
| Half view angle (ω) | 16° | 21° | 16° |
| $d_2$ | 6.337 | 2.729 | 6.337 |
| $d_6$ | 8.615 | 12.223 | 8.615 |
| $d_7$ | 8.615 | 12.223 | 8.615 |
| $d_{11}$ | 6.337 | 2.729 | 6.337 |

TABLE 39

(Embodiment 20)

f = 213.7 to 188.1  $F_{NO} = 8.0$
$f_1/f_M = -0.932$  $f_2/f_M = 0.571$
$(1/r_2-1/r_3)\cdot f_M = -2.030$
$|(r_5-r_6-d_5)/f_M| = 0.0074$

| Radius of Curvature | | Axial Distance | | Refractive Index | | Abbe Number | |
|---|---|---|---|---|---|---|---|
| $r_1$ | −125.66 | $d_1$ | 3.00 | $N_1$ | 1.7006 | $v_1$ | 30.1 |
| $r_2$ | −1273.06 | $d_2$ | Variable | | | | |
| $r_3$ | 114.67 | $d_3$ | 16.00 | $N_2$ | 1.7130 | $v_2$ | 53.9 |
| $r_4$ | −234.56 | $d_4$ | 0.30 | | | | |
| $r_5$ | 45.10 | $d_5$ | 10.00 | $N_3$ | 1.7170 | $v_3$ | 47.9 |
| $r_6$ | 36.24 | $d_6$ | Variable | | | | |
| S | — | $d_7$ | Variable | | | | |
| $r_7$ | −36.24 | $d_8$ | 10.00 | $N_4$ | 1.7170 | $v_4$ | 47.9 |
| $r_8$ | −45.10 | $d_9$ | 0.30 | | | | |
| $r_9$ | 234.56 | $d_{10}$ | 16.00 | $N_5$ | 1.7130 | $v_5$ | 53.9 |
| $r_{10}$ | −114.67 | $d_{11}$ | Variable | | | | |
| $r_{11}$ | 1273.06 | $d_{12}$ | 3.00 | $N_6$ | 1.7006 | $v_6$ | 30.1 |
| $r_{12}$ | 125.66 | | | | | | |

TABLE 40

(Embodiment 20)

| Magnification | −2.000 | −1.000 | −0.500 |
|---|---|---|---|
| Focal length | 188.2 | 213.7 | 188.2 |
| Half view angle (ω) | 15° | 19° | 15° |
| $d_2$ | 7.073 | 1.166 | 7.073 |
| $d_6$ | 9.973 | 15.880 | 9.973 |
| $d_7$ | 9.973 | 15.880 | 9.973 |
| $d_{11}$ | 7.073 | 1.166 | 7.073 |

Obviously, many modifications and variations of the present invention are possible in light of the above teachings. It is therefore to be understood that within the scope of the appended claims, the invention may be practiced other than as specifically described.

What is claimed is:

1. A zoom lens system comprising from the object side:
   a first lens unit of a negative power including a negative lens element;
   a second lens unit of a positive power including a positive lens element and a negative meniscus lens element concave to the image side;
   an aperture stop;
   a third lens unit arranged symmetrically with the second lens unit with respect to the aperture stop; and
   a fourth lens unit arranged symmetrically with the first lens unit with respect to the aperture stop, wherein the second lens unit and the fourth lens unit are moved in a same direction in association with each other so that the total length of the zoom lens system is minimum at unity magnification, wherein the aperture stop moves so that the symmetry of the entire zoom lens system is maintained, and wherein an object-image distance is maintained constant by moving the entire zoom lens system.

2. A zoom lens system as claimed in claim 1, wherein the second lens unit and the fourth lens unit are moved by a same amount.

3. A zoom lens system as claimed in claim 1, wherein the distance between the first lens unit and the second lens unit and the distance between the third lens unit and the fourth lens unit are minimum at unity magnification.

4. A zoom lens system as claimed in claim 1, wherein said second lens unit consists of said positive lens element and said negative lens element.

5. A zoom lens system as claimed in claim 1, wherein the first lens unit and the fourth lens units are bi-concave lens elements.

6. A zoom lens system as claimed in claim 1, wherein the first lens unit and the fourth lens units have the same absolute value for their radii of curvature symmetrical to the aperture stop.

7. A zoom lens system as claimed in claim 1, wherein the first and fourth lens units have the same configuration and are arranged in a symmetrical manner, and the second and third lens units have the same configuration and are arranged in a symmetrical manner.

8. A zoom lens system comprising from the object side:
   a first lens unit including a negative lens element concave to the object side;
   a second lens unit including a positive lens element and a negative meniscus lens element concave to the image side;
   an aperture stop;
   a third lens unit arranged symmetrically with the second lens unit with respect to the aperture stop; and
   a fourth lens unit arranged symmetrically with the first lens unit with respect to the aperture stop; wherein the second lens unit and the fourth lens unit are moved in a same direction in association with each other so that the total length of the zoom lens system is minimum at unity magnification, wherein an object-image distance is maintained constant by moving the entire zoom lens system, and wherein the following conditions are fulfilled:

$$-1.3 < f_1/f_M < -0.7$$

$$0.5 < f_2/f_M < 0.7$$

$$0 < r_3/r_4, r_{10}/r_9 < 0.3$$

$$1.2 < r_3/r_5, r_{10}/r_8 < 1.8$$

where:
$f_M$ is a focal length of the zoom lens system at unity magnification;
$f_1$ is a focal length of the first lens unit;
$f_2$ is a focal length of the second lens unit;
$r_3$ is a radius of curvature of the object side surface of the positive lens element of the second lens unit;
$r_4$ is a radius of curvature of the image side surface of the positive lens element of the second lens unit;
$r_5$ is a radius of curvature of the object side surface of the negative meniscus lens element of the second lens unit;
$r_8$ is a radius of curvature of the object side surface of a negative meniscus lens element of the third lens unit;
$r_9$ is a radius of curvature of the object side surface of a positive lens element of the third lens unit; and
$r_{10}$ is a radius of curvature of the image side surface of the positive lens element of the third lens unit.

9. A zoom lens system comprising form the object side:

a first lens unit including a negative lens element concave to the object side;

a second lens unit including a positive lens element and a negative meniscus lens element concave to the image side;

an aperture stop;

a third lens unit arranged symmetrically with the second lens unit with respect to the aperture stop;

a fourth lens unit arranged symmetrically with the first lens unit with respect to the aperture stop, wherein the second lens unit and the fourth lens unit are moved in a same direction in association with each other so that the total length of the zoom lens system is minimum at unity magnification, wherein an object-image distance is maintained constant by moving the entire zoom lens system, and wherein the following conditions are fulfilled:

$-1.0 < f_1/f_M < -0.55$ $0.4 < f_2/f_M < 0.7$ $0 < r_3/r_4, r_{10}/r_9 < 0.3$ $1.2 < r_3/r_5, r_{10}/r_8 < 1.8$ where:

$f_M$ is a focal length of the zoom lens system at unity magnification;

$f_1$ is a focal length of the first lens unit;

$f_2$ is a focal length of the second lens unit;

$r_3$ is a radius of curvature of the object side surface of the positive lens element of the second lens unit;

$r_4$ is a radius of curvature of the image side surface of the positive lens element of the second lens unit;

$r_5$ is a radius of curvature of the object side surface of the negative meniscus lens element of the second lens unit;

$r_8$ is a radius of curvature of the image side surface of a negative meniscus lens element of the third lens unit;

$r_9$ is a radius of curvature of the object side surface of a positive lens element of the third lens unit; and $r_{10}$ is a radius of curvature of the image side surface of the positive lens element of the third lens unit.

10. A zoom lens system comprising from the object side:

a first lens unit of a negative power including a negative lens element;

a second lens unit of a positive power including a positive lens element and a negative meniscus lens element concave to the image side;

an aperture stop;

a third lens unit arranged symmetrically with the second lens unit with respect to the aperture stop; and a fourth lens unit arranged symmetrically with the first lens unit with the aperture stop, wherein the second lens unit and the fourth lens unit are moved in a same direction in association with each other so that the total length of the zoom lens system is minimum at unity magnification, wherein the zoom lens system is symmetrical with respect to the aperture stop at unity magnification whereas it is asymmetrical at a magnification other than unity magnification, wherein an object-image distance is maintained constant by moving the entire zoom lens system, and wherein the following conditions are fulfilled:

$-1.3 < f_1/f_M < -0.8$ $0.5 < f_2/f_M < 0.7$ $|r_3/r_4|, |r_{10}/r_9| < 0.5$ $1.2 < r_3/r_5, r_{10}/r_8 < 2.2$ $|n_1 - n_2| < 0.1$ where:

$f_M$ is a focal length of the zoom lens system at unity magnification;

$f_1$ is a focal length of the first lens unit;

$f_2$ is a focal length of the second lens unit;

$r_3$ is a radius of curvature of the object side surface of the positive lens element of the second lens unit;

$r_4$ is a radius of curvature of the image side surface of the positive lens element of the second lens unit;

$r_5$ is a radius of curvature of the object side surface of the negative meniscus lens element of the second lens unit;

$r_8$ is a radius of curvature of the image side surface of a negative meniscus lens element of the third lens unit;

$r_9$ is a radius of curvature of the object side surface of a positive lens element of the third lens unit;

$r_{10}$ is a radius of curvature of the image side surface of the positive lens element of the third lens unit;

$n_1$ is a refractive index of the negative lens element of the first lens unit; and $n_2$ is a refractive index of the positive lens element of the second lens unit.

11. A zoom lens system as claimed in claim 10, wherein the distance between the second lens unit and the aperture stop is different from the distance between the aperture stop and the third lens unit at a magnification other than unity magnification.

12. A zoom lens unit comprising from the object side:

a first lens unit including a negative lens element;

a second lens unit including a biconvex lens element and a negative meniscus lens element concave to the image side;

an aperture stop;

a third lens unit arranged symmetrically with the second lens unit with respect to the aperture stop; and a fourth lens unit arranged symmetrically with the first lens unit with respect to the aperture stop, wherein the second lens unit and the third lens unit are moved substantially symmetrically with respect to the aperture stop during zooming and wherein the following conditions are fulfilled:

$-1.3 < f_1/f_M < -0.6$ $0.4 < f_2/f_M < 0.7$ $-3.0 < (1/r_2 - 1/r_3)f_M < -1.5$ $|(r_5 - r_6 - d_5)/f_M| < 0.02$ where:

$f_M$ is a focal length of the zoom lens system at unity magnification;

$f_1$ is a focal length of the first lens unit;

$f_2$ is a focal length of the second lens unit;

$r_2$ is a radius of curvature of the image side surface of the negative lens element of the first lens unit;

$r_3$ is a radius of curvature of the object side surface of the biconvex lens element of the second lens unit;

$r_5$ is a radius of curvature of the object side surface of the negative meniscus lens element of the second lens unit;

$r_6$ is a radius of curvature of the image side surface of the negative meniscus lens element of the second lens unit; and $d_5$ is an axial thickness of the negative meniscus lens element of the second lens unit.

13. A zoom lens system as claimed in claim 12, wherein the first lens unit and the fourth lens unit are arranged at predetermined positions with respect to the aperture stop, respectively.

* * * * *